(12) United States Patent
Fujie et al.

(10) Patent No.: US 9,023,139 B2
(45) Date of Patent: May 5, 2015

(54) COLORING COMPOSITION, INK FOR INKJET RECORDING AND INKJET RECORDING METHOD

(71) Applicant: FUJIFILM Corporation, Minato-ku, Tokyo (JP)

(72) Inventors: Yoshihiko Fujie, Kanagawa (JP); Keiichi Tateishi, Kanagawa (GB); Clive Edwin Foster, Manchester (GB)

(73) Assignee: FUJIFILM Corporation, Tokyo (JP)

( * ) Notice: Subject to any disclaimer, the term of this patent is extended or adjusted under 35 U.S.C. 154(b) by 18 days.

(21) Appl. No.: 14/472,775

(22) Filed: Aug. 29, 2014

(65) Prior Publication Data

US 2014/0368573 A1     Dec. 18, 2014

Related U.S. Application Data

(63) Continuation of application No. PCT/JP2013/054612, filed on Feb. 22, 2013.

(30) Foreign Application Priority Data

| Feb. 29, 2012 | (JP) | ................................ 2012-044337 |
| Feb. 29, 2012 | (JP) | ................................ 2012-044338 |
| Feb. 29, 2012 | (JP) | ................................ 2012-044339 |

(51) Int. Cl.
| C09D 11/02 | (2014.01) |
| C07D 311/88 | (2006.01) |
| C09B 67/22 | (2006.01) |
| C09D 11/328 | (2014.01) |
| C08K 5/3492 | (2006.01) |
| C08K 5/3462 | (2006.01) |
| C08K 5/18 | (2006.01) |

(52) U.S. Cl.
CPC ............ *C09D 11/328* (2013.01); *C08K 5/3492* (2013.01); *C08K 5/34926* (2013.01); *C08K 5/3462* (2013.01); *C08K 5/18* (2013.01)

(58) Field of Classification Search
CPC .... C09D 11/328; C07D 311/88; C09B 11/24; C09B 67/0041
USPC .......... 106/31.43, 31.47, 31.48; 549/388, 394
See application file for complete search history.

(56) References Cited

U.S. PATENT DOCUMENTS

| 4,935,059 | A * | 6/1990 | Mayer et al. ................ 106/31.43 |
| 5,599,386 | A | 2/1997 | Sano et al. |

(Continued)

FOREIGN PATENT DOCUMENTS

| EP | 2 302 001 A1 | 3/2011 |
| GB | 2134129 A | 8/1984 |

(Continued)

OTHER PUBLICATIONS

Search Report dated May 28, 2013, issued by the International Searching Authority in counterpart International Application No. PCT/JP2013/054612 [PCT/ISA/210].

(Continued)

*Primary Examiner* — Helene Klemanski
(74) *Attorney, Agent, or Firm* — Sughrue Mion, PLLC

(57) ABSTRACT

There is provided a coloring composition including the compound represented by Formula (1) described in the specification and the compound selected from (A) to (C) described in the specification.

20 Claims, 1 Drawing Sheet

(56) References Cited

U.S. PATENT DOCUMENTS

| | | | |
|---|---|---|---|
| 6,399,392 | B1 | 6/2002 | Haugland et al. |
| 6,998,493 | B2 * | 2/2006 | Banning et al. ............... 549/212 |
| 7,141,342 | B2 * | 11/2006 | Toyoda et al. ............ 430/108.14 |
| 8,343,269 | B2 * | 1/2013 | Takahashi et al. ......... 106/31.43 |
| 8,628,588 | B2 * | 1/2014 | Fujie et al. ................. 106/31.47 |
| 8,636,814 | B2 * | 1/2014 | Fujie et al. ................. 106/31.47 |
| 2004/0239739 | A1 | 12/2004 | Matsumoto et al. |
| 2005/0171351 | A1 | 8/2005 | Matsumoto et al. |
| 2006/0009357 | A1 | 1/2006 | Fujiwara et al. |
| 2006/0230545 | A1 * | 10/2006 | Lagrange ........................... 8/405 |
| 2007/0062413 | A1 | 3/2007 | Matsumoto et al. |
| 2011/0067598 | A1 | 3/2011 | Takahashi et al. |
| 2014/0170538 | A1 * | 6/2014 | Fujie .......................... 106/31.47 |
| 2014/0176653 | A1 * | 6/2014 | Fujie et al. .................... 549/390 |

FOREIGN PATENT DOCUMENTS

| | | | |
|---|---|---|---|
| JP | 7-97539 | A | 4/1995 |
| JP | 08-073791 | A | 3/1996 |
| JP | 09-157562 | A | 6/1997 |
| JP | 2003-192930 | A | 7/2003 |
| JP | 2006-143989 | A | 6/2006 |
| JP | 2010-032999 | A | 2/2010 |
| JP | 2010-244027 | A | 10/2010 |
| JP | 2011-148973 | A | 8/2011 |
| JP | 2012-007121 | A | 1/2012 |
| JP | 2012-32754 | A | 2/2012 |
| KR | 10-2012-0002453 | A | 1/2012 |
| WO | 00/64988 | A1 | 11/2000 |
| WO | 2004/104108 | A1 | 12/2004 |
| WO | 2013/031838 | A1 | 3/2013 |

OTHER PUBLICATIONS

Written Opinion dated May 28, 2013, issued by the International Searching Authority in counterpart International Application No. PCT/JP2013/054612 [PCT/ISA/237].

Preliminary Report on Patentability dated Jan. 22, 2014, issued by the International Searching Authority in counterpart International Application No. PCT/JP2013/054612 [PCT/IPEA/409].

Japanese Office Action issued in corresponding Patent Application No. 2012-044337 issued Jan. 13, 2015.

Japanese Office Action issued in corresponding Patent Application No. 2012-044338 issued Jan. 13, 2015.

Japanese Office Action issued in corresponding Patent Application No. 2012-044339 issued Jan. 13, 2015.

Extended European Search Report issued on Feb. 6, 2105 in EP 13 75 4844.

* cited by examiner

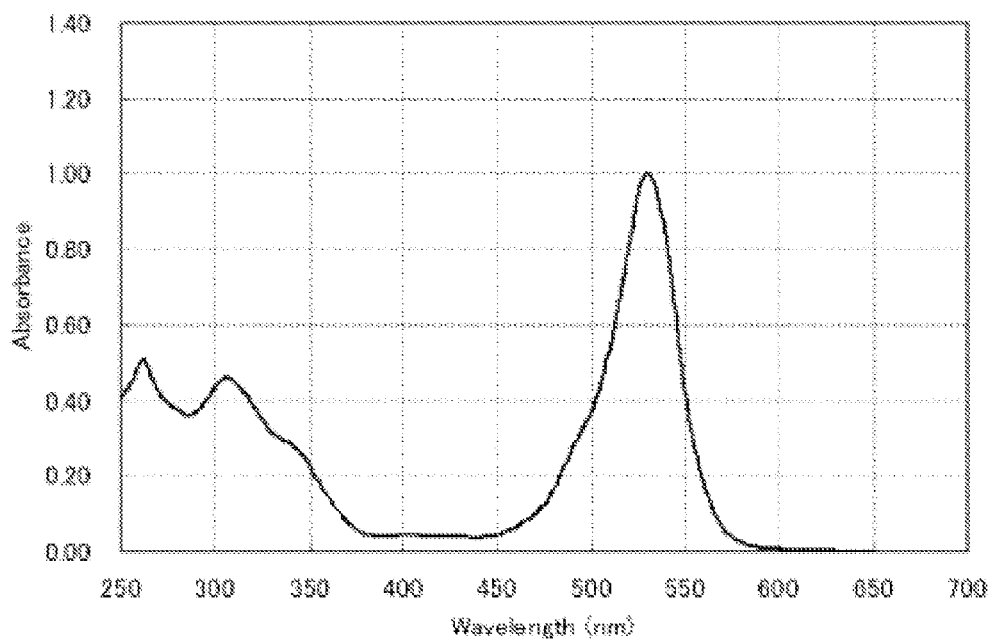

COLORING COMPOSITION, INK FOR INKJET RECORDING AND INKJET RECORDING METHOD

CROSS REFERENCE TO RELATED APPLICATION

This is a continuation of International Application No. PCT/JP2013/054612 filed on Feb. 22, 2013, and claims priority from Japanese Patent Application Nos. 2012-044337 filed on Feb. 29, 2012, 2012-044338 filed on Feb. 29, 2012, and 2012-044339 filed on Feb. 29, 2012, the entire disclosures of which are incorporated herein by reference.

TECHNICAL FIELD

The present invention relates to a coloring composition including a compound having a specific xanthene structure and a specific azo compound, an ink for inkjet recording and an inkjet recording method.

BACKGROUND ART

An inkjet recording method is a method of performing printing by jetting and attaching small liquid drops of ink to a recording medium such as paper, as well-known in the art. By this printing method, it is possible to conveniently print a high-resolution and high-quality image at a high speed with an inexpensive apparatus, and particularly, in color printing, a technical development for the printing method has been recently performed as an image forming method which may replace photographs.

When a color image is formed using an inkjet recording method, it is common to use at least a yellow ink, a magenta ink, a cyan ink and a black ink. In the related art, water-based inks have been mainly used as these inkjet inks in terms of safety, such as odor and hazards associated with firefighting. These inks are required to fall within suitable ranges in physical property values such as viscosity and surface tension, to be excellent in storage stability and prevent clogging of a nozzle, to impart a recording image at a high concentration, and to be excellent in light fastness, ozone resistance, water resistance and moisture resistance.

Such performances are mostly satisfied by using a water-based ink containing water or a mixture solution of water and a water-soluble organic solvent as a main solvent, but since color tone, saturation, light fastness, ozone resistance, water resistance, moisture resistance and the like are influenced considerably by coloring agents, various dyes have been studied in the related art.

In the related art, an acidic dye having good chromogentic property and high water solubility, for example, C.I. Acid Red 52, 249 and 289, is known as a magenta dye for inkjet, but when such a dye is used alone, clogging of a nozzle hardly occurs due to the high water solubility, but the performances of ozone resistance, light fastness and moisture resistance are very low.

Patent Document 1 discloses a water-based ink for inkjet recording, which contains a colorant composed of C.I. Acid Red 289 that is a xanthene derivative, or a xanthene derivative having more sulfo groups than C.I. Acid Red 289.

Further, as the magenta dye for inkjet, an azo-based dye is also known. Patent Document 2 discloses an azo colorant having a specific structure.

PRIOR ART

Patent Document

Patent Document 1: Specification of British Patent No. 2134129
Patent Document 2: Japanese Patent Application Laid-Open No. H8-73791
Patent Document 3: Japanese Patent Application Laid-Open No. 2003-192930
Patent Document 4: International Publication No. 04/104108
Patent Document 5: Japanese Patent Application Laid-Open No. 2006-143989

SUMMARY OF INVENTION

Technical Problem

However, the colorant specifically described in Patent Document 1 is insufficient in fastness such as moisture resistance and ozone resistance. Further, the colorant described in Patent Document 2 is excellent in moisture resistance, but is insufficient in hue, saturation (chroma) and ozone resistance. In addition, the dyes described in Patent Documents 3 and 4 are good in fastness such as light fastness or ozone resistance, but insufficient in print concentration. Furthermore, the dye described in Patent Document 5 is good in fastness such as light fastness or ozone resistance, but there is room for further improvement in hue. That is, none of the colorants and the dyes have established moisture resistance, ozone resistance, hue and saturation to a high level. None of them are sufficiently compatible with fastness and print concentration or fastness and hue.

An object of a first aspect of the present invention is to provide a coloring composition which is excellent in moisture resistance, and also excellent in hue, saturation, and ozone resistance. Further, another object thereof is to provide an ink for inkjet recording, which includes the coloring composition, and an inkjet recording method using the ink for inkjet recording.

An object of a second aspect of the present invention is to provide a coloring composition which is excellent in ozone resistance, light fastness, and moisture resistance, and excellent from the viewpoint of print concentration. In addition, another object thereof is to provide an ink for inkjet recording, which includes the coloring composition, and an inkjet recording method using the ink for inkjet recording.

An object of a third aspect of the present invention is to provide a coloring composition which is sufficiently compatible with excellent image fastness such as ozone resistance and light fastness and good hue, and simultaneously may obtain high moisture resistance. Furthermore, another object thereof is to provide an ink for inkjet recording, which includes the coloring composition, and an inkjet recording method using the ink for inkjet recording.

As a result of intensive investigations in consideration of the aforementioned circumstances, the present inventors have found that in a coloring composition including a multimer of a compound having a xanthene structure in which a specific number of sulfo groups are introduced, and a specific azo compound in the first aspect, performances of image fastness such as moisture resistance and ozone resistance, hue and chroma are better than expected, thereby completing the present invention.

As a result of intensive investigations in consideration of the aforementioned circumstances, the present inventors have found that by combining a multimer of a compound having a xanthene structure, in which a specific number of sulfo groups are introduced, with a coloring composition including a specific dye having an anthrapyridone structure in the second aspect, performances of image fastness such as ozone resistance, light fastness and moisture resistance, and print concentration become particularly better than expected, thereby completing the present invention.

As a result of intensive investigations in consideration of the aforementioned circumstances, the present inventors have found that by combining a multimer of a compound having a xanthene structure, in which a specific number of sulfo groups are introduced, with a coloring composition including a specific heterylazo compound in the third aspect, performances of image fastness such as ozone resistance and light fastness, and hue become particularly better than expected, thereby completing the present invention.

Solution to Problem

That is, the present invention is as follows.

[1] A coloring composition including a compound represented by the following Formula (1) and a compound selected from (A) to (C).

(A): a compound represented by the following Formula (A4)

(B) at least one selected from the group consisting of a compound represented by the following Formula (B4) and a compound represented by the following Formula (B5)

(C): a compound selected from compounds represented by the following Formula (C4)

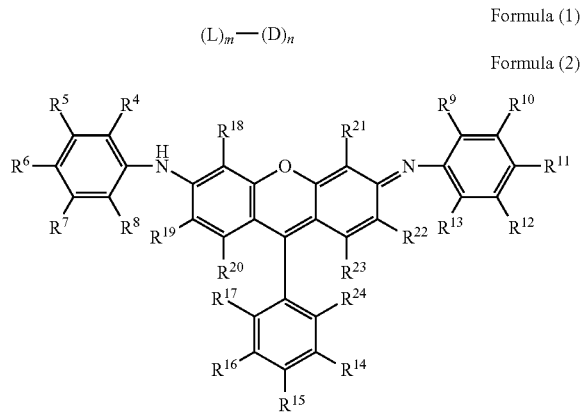

(In Formula (1), L represents a divalent to tetravalent linking group.

D represents a residue in which 1 to 5 hydrogen atoms are removed from a compound represented by Formula (2).

m represents an integer of 1 to 10. Provided that a plurality of L's may be the same or different.

n represents an integer from 2 to 10. Provided that a plurality of D's may be the same or different.

In Formula (2), $R^4$ to $R^{24}$ each independently represent a hydrogen atom or a substituent. Provided that at least one ionic hydrophilic groups are possessed)

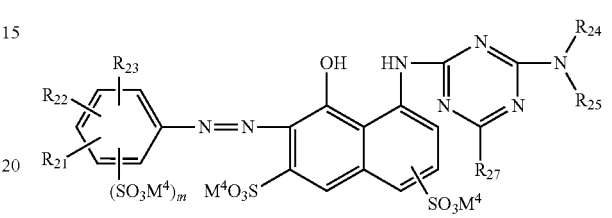

In Formula (A4), $R_{21}$, $R_{22}$ and $R_{23}$ each independently represent a hydrogen atom, a substituted or unsubstituted alkyl group having 1 to 9 carbon atoms, an alkoxy group having 1 to 9 carbon atoms, a halogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group having 1 to 9 carbon atoms, an arylsulfonyl group having 6 to 15 carbon atoms, a carboxyl group or a carboxylic acid ester group.

$R_{27}$ represents a substituted or unsubstituted amino group, or —$OR_{26}$.

m represents 0, 1 or 2.

$R_{24}$, $R_{25}$ and $R_{26}$ each independently represents a hydrogen atom, a substituted or unsubstituted alkyl group having 1 to 18 carbon atoms, a substituted or unsubstituted alkenyl group having 2 to 18 carbon atoms, a substituted or unsubstituted aryl group, a substituted or unsubstituted aralkyl group or a substituted or unsubstituted heterocyclic group.

$M^4$ represents a hydrogen atom or a counter cation. $M^4$'s may be the same or different.

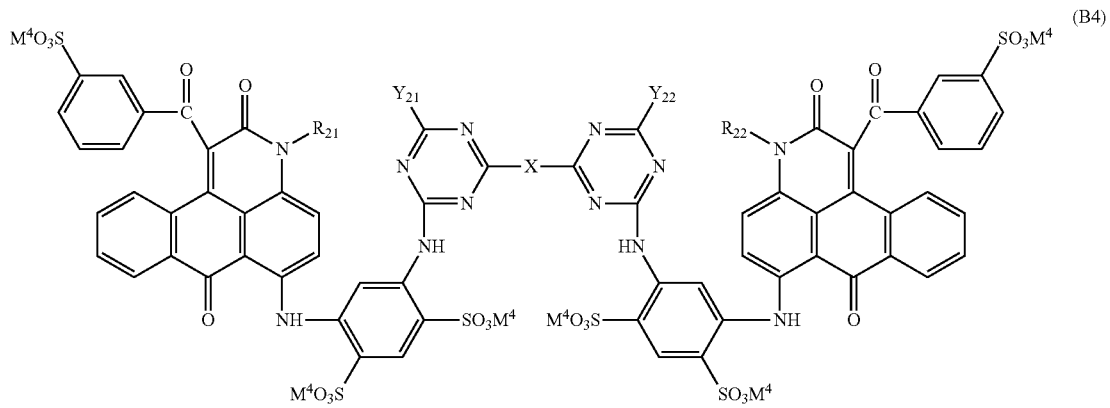

In Formula (A4), $R_{21}$ and $R_{22}$ each independently represent a hydrogen atom or a substituted or unsubstituted alkyl group.

$Y_{21}$ and $Y_{22}$ each independently represent a chlorine atom, a hydroxyl group, a substituted or unsubstituted amino group, an alkoxy group and a substituted or unsubstituted phenoxy group.

X represents a divalent linking group.

$M^4$ represents a hydrogen atom or a counter cation. $M^4$'s may be the same or different.

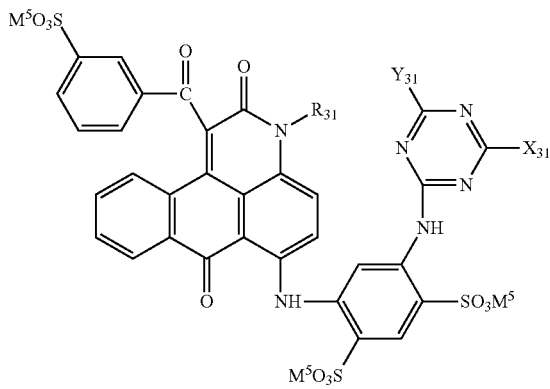

(B5)

In Formula (B5), $R_{31}$ represents a hydrogen atom or a substituted or unsubstituted alkyl group.

$Y_{31}$ represents a chlorine atom, a hydroxyl group, a substituted or unsubstituted amino group or a morpholino group.

$M^5$ represents a hydrogen atom or a counter cation. $M^5$'s may be the same or different.

$X_{31}$ represents a group represented by the following Formula (B5-1).

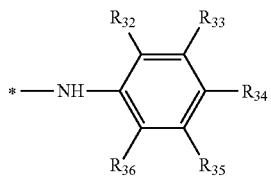

(B5-1)

In Formula (B5-1), $R_{32}$, $R_{33}$, $R_{34}$, $R_{35}$ and $R_{36}$ each independently represent a hydrogen atom, an alkyl group having 1 to 8 carbon atoms or —COOM' (M' represents a hydrogen atom or a counter cation). Provided that at least one of $R_{32}$, $R_{33}$, $R_{34}$, $R_{35}$ and $R_{36}$ represents an alkyl group having 1 to 8 carbon atoms or —COOM'.

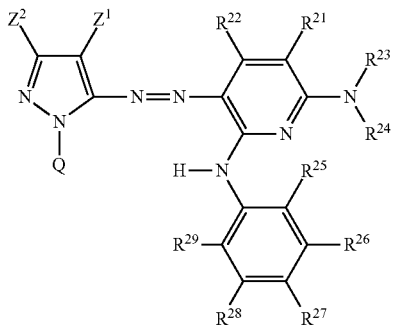

(C4)

In Formula (C4), $Z^1$ represents an electron-withdrawing group having a Hammett's substituent constant σp value of 0.20 or more.

$Z^2$ represents a hydrogen atom, an aliphatic group, an aromatic group, an acyl group or a heterocyclic group.

$R_{23}$ and $R_{24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. Provided that there is no case where both $R_{23}$ and $R_{24}$ are a hydrogen atom at the same time.

$R^{21}$ and $R^{22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkyl or arylsulfonylamino group, an aryloxycarbonylamino group, a nitro group, an alkyl or arylthio group, an alkyl or arylsulfonyl group, an alkyl or arylsulfinyl group, a sulfamoyl group, a sulfo group or a heterocyclic thio group. Further, $R^{21}$ and $R^{23}$ or $R^{23}$ and $R^{24}$ may combine with each other to form a five- or six-membered ring.

$R^{25}$ and $R^{29}$ each independently represent an alkyl group, an alkoxy group or a halogen atom. Provided that when both $R^{25}$ and $R^{29}$ are an alkyl group at the same time, the sum of the number of carbon atoms constituting the alkyl group is 3 or more, and these groups may be further substituted.

$R^{26}$, $R^{27}$ and $R^{28}$ each independently have the same meaning as $R^{21}$ and $R^{22}$, and $R^{25}$ and $R^{26}$, or $R^{28}$ and $R^{29}$ may be condensed with each other to form a ring.

Q represents a hydrogen atom, an aliphatic group, an aromatic group or a heterocyclic group.

Each group of $Z^1$, $Z^2$, $R^{21}$, $R^{22}$, $R^{23}$, $R^{24}$ and Q may further have a substituent.

Provided that Formula (C4) has at least one ionic hydrophilic group.

[2] The coloring composition described in [1], in which in Formula (2), $R^4$, $R^8$, $R^9$ and $R^{13}$ each independently represent a hydrogen atom or an alkyl group.

[3] The coloring composition described in [1] or [2], in which in Formula (2), $R^5$ to $R^7$, $R^{10}$ to $R^{12}$ and $R^{14}$ to $R^{23}$ represent a hydrogen atom.

[4] The coloring composition described in any one of [1] to [3], in which in Formula (1), D represents a residue in which one hydrogen atom is removed from hydrogen atoms as $R^5$ to $R^7$, $R^{10}$ to $R^{12}$, and $R^{24}$ of a compound represented by Formula (2).

[5] The coloring composition described in any one of [1] to [4], in which the compound represented by Formula (1) is a compound synthesized by a synthesis method including:

a step of subjecting a compound represented by Formula (3) to chlorosulfonylation, a step of reacting the resulting product with a diamine compound represented by Formula (d), and a step of hydrolyzing the remaining chlorosulfonyl group.

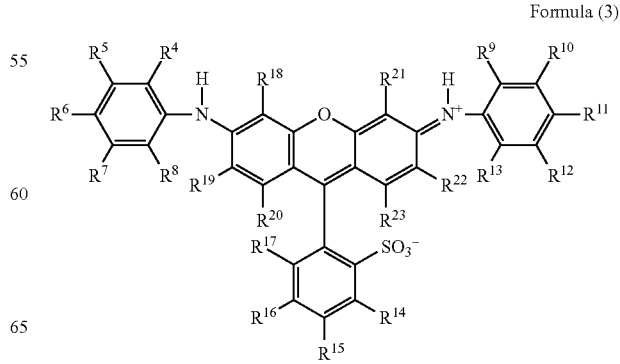

Formula (3)

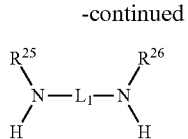

Formula (d)

(In Formula (3), $R^4$ to $R^{23}$ each independently represent a hydrogen atom or a substituent. In Formula (d), $R^{25}$ and $R^{26}$ each independently represent a hydrogen atom or a substituent. $L_1$ represents a divalent linking group.)

[6] The coloring composition described in any one of [1] to [5], in which in Formula (A4), at least one of $R_{24}$, $R_{25}$ and $R_{26}$ represents an alkyl group, an alkenyl group, an aryl group or an aralkyl group, which is substituted with 1 to 4 carboxyl groups.

[7] The coloring composition described in any one of [1] to [6], in which in Formula (A4), one of $R_{24}$ and $R_{25}$ represents a hydrogen group and the other represents an alkyl group, an alkenyl group, an aryl group or an aralkyl group, which is substituted with 1 to 4 carboxyl groups.

[8] The coloring composition described in any one of [1] to [7], in which in Formula (A4), $R_{21}$, $R_{22}$ and $R_{23}$ each independently represent a hydrogen atom, an alkyl group having 1 to 3 carbon atoms, a halogen atom or a carboxyl group.

[9] The coloring composition described in any one of [1] to [8], in which in Formula (A4), $R_{21}$, $R_{22}$ and $R_{23}$ each independently represent a hydrogen atom, a halogen atom or a carboxyl group.

[10] The coloring composition described in any one of [1] to [5], in which the ionic hydrophilic group in Formula (14) is at least one group selected from a sulfo group, a carboxyl group, a phosphono group and a quaternary ammonium group.

[11] The coloring composition described in any one of [1] to [5] and [10], in which in Formula (C4), $R^{23}$ and $R^{24}$ each independently represent a hydrogen atom, an aromatic group or a hetero group.

[12] The coloring composition described in any one of [1] to [5], [10] and [11], in which a content ratio of the compound represented by Formula (1) is 0.1% by mass to 20% by mass.

[13] The coloring composition described in any one of [1] to [5] and [10] to [12], in which a content ratio of the compound represented by Formula (C4) is 1% by mass to 5% by mass.

[14] The coloring composition described in any one of [1] to [13], in which a content ratio of the compound represented by Formula (1) is 0.1% by mass to 20% by mass.

[15] The coloring composition described in any one of [1] to [9] and [14], in which a content ratio of the compound represented by Formula (A4) is 1% by mass to 5% by mass.

[16] The coloring composition in any one of [1] to [9], [14] and [15], in which a mass ratio of a content of the compound represented by Formula (1) and a content of the compound represented by Formula (A4) is 95/5 to 20/80.

[17] The coloring composition in any one of [1] to [5], in which a combined content ratio of the compound represented by Formula (B4) and the compound represented by Formula (B5) is 0.1% by mass to 20% by mass.

[18] The coloring composition in any one of [1] to [5] and [17], in which a mass ratio of a content of the compound represented by Formula (1) and a combined content of the compound represented by Formula (B4) and the compound represented by Formula (B5) is 95/5 to 20/80.

[19] An ink for inkjet recording containing the coloring composition described in any one of [1] to [18].

[20] An inkjet recording method including forming an image by using the coloring composition described in any one of [1] to [18] or the ink for inkjet recording described in [19].

Effects of Invention

According to a first aspect of the present invention, provided is a coloring composition which is excellent in moisture resistance, ozone resistance, hue, and chroma. According to a second aspect, provided is a coloring composition which is sufficiently compatible with excellent image fastness such as ozone resistance, light fastness and moisture resistance, and good print concentration. According to a third aspect, provided is a coloring composition which is sufficiently compatible with excellent image fastness such as ozone resistance and light fastness, and good hue, and may obtain high moisture resistance. Furthermore, provided are an ink for inkjet recording including the coloring composition, and an inkjet recording method using the ink for inkjet recording. The coloring composition of the present invention is particularly useful as a magenta ink.

BRIEF DESCRIPTION OF DRAWINGS

FIG. 1 is a view illustrating an absorption spectrum of Compound (1-1), which is an example of a compound represented by Formula (1) in the present invention, in a dilute aqueous solution.

DESCRIPTION OF EMBODIMENTS

Hereinafter, the present invention will be described in detail.

First, in the present invention, Group A of substituents will be defined.

(Group A of Substituents)

Examples thereof include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a silyl group, and an ionic hydrophilic group. The substituents may be further substituted, and examples of the substituents which is further substituted include groups selected from Group A of substituents.

Examples of the halogen atom include a fluorine atom, a chlorine atom, a bromine atom or an iodine atom.

Examples of the alkyl group include straight, branched and cyclic, substituted or unsubstituted alkyl groups, and also include a cycloalkyl group, a bicycloalkyl group, a tricyclo structure having more cyclic structures, and the like. The alkyl group (for example, an alkyl group in an alkoxy group or an alkylthio group) in the substituents described below also represents an alkyl group of such concept.

Preferred examples of the alkyl group include an alkyl group having 1 to 30 carbon atoms, for example, a methyl group, an ethyl group, an n-propyl group, an i-propyl group, a t-butyl group, an n-octyl group, an eicosyl group, a 2-chloroethyl group, a 2-cyanoethyl group, a 2-ethylhexyl group and the like, preferred examples of the cycloalkyl group include a substituted or unsubstituted cycloalkyl group having 3 to 30 carbon atoms, for example, a cyclohexyl group, a cyclopentyl group, a 4-n-dodecylcyclohexyl group and the like, and preferred examples of the bicycloalkyl group include a substituted or unsubstituted bicycloalkyl group having 5 to 30 carbon atoms, that is, a monovalent group in which one hydrogen atom is removed from bicycloalkane having 5 to 30 carbon atoms, for example, a bicyclo[1,2,2]heptan-2-yl group, a bicyclo[2,2,2]octan-3-yl group and the like.

Examples of the aralkyl group include a substituted or unsubstituted aralkyl group, and preferred examples of the substituted or unsubstituted aralkyl group include an aralkyl group having 7 to 30 carbon atoms. Examples thereof include a benzyl group and a 2-phenethyl group.

Examples of the alkenyl group include a straight, branched or cyclic, substituted or unsubstituted alkenyl group, and include a cycloalkenyl group and a bicycloalkenyl group.

Preferred examples of the alkenyl group include a substituted or unsubstituted alkenyl group having 2 to 30 carbon atoms, for example, a vinyl group, an allyl group, a prenyl group, a geranyl group, an oleyl group and the like, preferred examples of the cycloalkenyl group include a substituted or unsubstituted cycloalkenyl group having 3 to 30 carbon atoms, that is, a monovalent group in which one hydrogen atom is removed from cycloalkene having 3 to 30 carbon atoms, for example, a 2-cyclopenten-1-yl group, a 2-cyclohexen-1-yl group and the like, and examples of the bicycloalkenyl group include a substituted or unsubstituted bicycloalkenyl group, preferably, a substituted or unsubstituted bicycloalkenyl group having 5 to 30 carbon atoms, that is, a monovalent group in which one hydrogen atom is removed from bicycloalkene having one double bond, for example, a bicyclo[2,2,1]hept-2-en-1-yl group, a bicyclo[2,2,2]oct-2-en-4-yl group and the like.

Preferred examples of the alkynyl group include a substituted or unsubstituted alkynyl group having 2 to 30 carbon atoms, for example, an ethynyl group, a propargyl group, a trimethylsilylethynyl group and the like.

Preferred examples of the aryl group include a substituted or unsubstituted aryl group having 6 to 30 carbon atoms, for example, a phenyl group, a p-tolyl group, a naphthyl group, an m-chlorophenyl group, an o-hexadecanoylaminophenyl group and the like.

Preferred examples of the heterocyclic group include a monovalent group in which one hydrogen atom is removed from a 5- or 6-membered substituted or unsubstituted aromatic or non-aromatic heterocyclic compound, and more preferred examples thereof include a 5- or 6-membered aromatic heterocyclic group having 3 to 30 carbon atoms, for example, a 2-furyl group, a 2-thienyl group, a 2-pyrimidinyl group, a 2-benzothiazolyl group and the like. Examples of the non-aromatic heterocyclic group include a morpholinyl group.

Preferred examples of the alkoxy group include a substituted or unsubstituted alkoxy group having 1 to 30 carbon atoms, for example, a methoxy group, an ethoxy group, an isopropoxy group, a t-butoxy group, an n-octyloxy group, a 2-methoxyethoxy group and the like.

Preferred example of the aryloxy group include a substituted or unsubstituted aryloxy group having 6 to 30 carbon atoms, for example, a phenoxy group, a 2-methylphenoxy group, a 4-t-butylphenoxy group, a 3-nitrophenoxy group, a 2-tetradecanoylaminophenoxy group and the like.

Preferred examples of the silyloxy group include a substituted or unsubstituted silyloxy group having 0 to 20 carbon atoms, for example, a trimethylsilyloxy group, a diphenylmethylsilyloxy group and the like.

Examples of the heterocyclic oxy group include a substituted or unsubstituted heterocyclic oxy group having 2 to 30 carbon atoms, for example, a 1-phenyltetrazol-5-oxy group, a 2-tetrahydropyranyloxy group and the like.

Preferred examples of the acyloxy group include a formyloxy group, a substituted or unsubstituted alkylcarbonyloxy group having 2 to 30 carbon atoms, and a substituted or unsubstituted arylcarbonyloxy group having 6 to 30 carbon atoms, for example, an acetyloxy group, a pyvaloyloxy group, a stearoyloxy group, a benzoyloxy group, a p-methoxyphenylcarbonyloxy group and the like.

Preferred examples of the carbamoyloxy group include a substituted or unsubstituted carbamoyloxy group having 1 to 30 carbon atoms, for example, an N,N-dimethylcarbamoyloxy group, an N,N-diethylcarbamoyloxy group, a morpholinocarbonyloxy group, an N,N-di-n-octylaminocarbonyloxy group, an N-n-octylcarbamoyloxy group and the like.

Preferred examples of the alkoxycarbonyloxy group include a substituted or unsubstituted alkoxycarbonyloxy group having 2 to 30 carbon atoms, for example, a methoxycarbonyloxy group, an ethoxycarbonyloxy group, a t-butoxycarbonyloxy group, an n-octylcarbonyloxy group and the like.

Preferred examples of the aryloxycarbonyloxy group include a substituted or unsubstituted aryloxycarbonyloxy group having 7 to 30 carbon atoms, for example, a phenoxycarbonyloxy group, a p-methoxyphenoxycarbonyloxy group, a p-n-hexadecyloxyphenoxycarbonyloxy group and the like.

Examples of the amino group include an alkylamino group, an arylamino group and a heterocyclic amino group, and preferred examples thereof include an amino group, a substituted or unsubstituted alkylamino group having 1 to 30 carbon atoms, and a substituted or unsubstituted anilino group having 6 to 30 carbon atoms, for example, a methylamino group, a dimethylamino group, an anilino group, an N-methyl-anilino group, a diphenylamino group, a triazinylamino group and the like.

Preferred examples of the acylamino group include a formylamino group, a substituted or unsubstituted alkylcarbonylamino group having 1 to 30 carbon atoms, and a substituted or unsubstituted arylcarbonylamino group having 6 to 30 carbon atoms, for example, an acetylamino group, a pyvaloylamino group, a lauroylamino group, a benzoylamino group, a 3,4,5-tri-n-octyloxyphenylcarbonylamino group and the like.

Preferred examples of the aminocarbonylamino group include a substituted or unsubstituted aminocarbonylamino group having 1 to 30 carbon atoms, for example, a carbamoylamino group, an N,N-dimethylaminocarbonylamino group, an N,N-diethylaminocarbonylamino group, a morpholinocarbonylamino group and the like.

Preferred examples of the alkoxycarbonylamino group include a substituted or unsubstituted alkoxycarbonylamino group having 2 to 30 carbon atoms, for example, a methoxycarbonylamino group, an ethoxycarbonylamino group, a t-butoxycarbonylamino group, an n-octadecyloxycarbonylamino group, an N-methyl-methoxycarbonylamino group and the like.

Preferred examples of the aryloxycarbonylamino group include a substituted or unsubstituted aryloxycarbonylamino group having 7 to 30 carbon atoms, for example, a phenoxycarbonylamino group, a p-chlorophenoxycarbonylamino group, an m-n-octyloxyphenoxycarbonylamino group and the like.

Preferred examples of the sulfamoylamino group include a substituted or unsubstituted sulfamoylamino group having 0 to 30 carbon atoms, for example, a sulfamoylamino group, an N,N-dimethylaminosulfonylamino group, an N-n-octylaminosulfonylamino group and the like.

Preferred examples of the alkyl or arylsulfonylamino group include a substituted or unsubstituted alkylsulfonylamino group having 1 to 30 carbon atoms, and a substituted or unsubstituted arylsulfonylamino group having 6 to 30 carbon atoms, for example, a methylsulfonylamino group, a butylsulfonylamino group, a phenylsulfonylamino group, a 2,3,5-trichlorophenylsulfonylamino group, a p-methylphenylsulfonylamino group and the like.

Preferred examples of the alkylthio group include a substituted or unsubstituted alkylthio group having 1 to 30 carbon atoms, for example, a methylthio group, an ethylthio group, an n-hexadecylthio group and the like.

Preferred examples of the arylthio group include a substituted or unsubstituted arylthio group having 6 to 30 carbon atoms, for example, a phenylthio group, a p-chlorophenylthio group, an m-methoxyphenylthio group and the like.

Preferred examples of the heterocyclic thio group include a substituted or unsubstituted heterocyclic thio group having 2 to 30 carbon atoms, for example, a 2-benzothiazolylthio group, a 1-phenyltetrazol-5-ylthio group and the like.

Preferred examples of the sulfamoyl group include a substituted or unsubstituted sulfamoyl group having 0 to 30 carbon atoms, for example, an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, an N—(N'-phenylcarbamoyl) sulfamoyl group and the like.

Preferred examples of the alkyl or arylsulfinyl group include a substituted or unsubstituted alkylsulfinyl group having 1 to 30 carbon atoms, and a substituted or unsubstituted arylsulfinyl group having 6 to 30 carbon atoms, for example, a methylsulfinyl group, an ethylsulfinyl group, a phenylsulfinyl group, a p-methylphenylsulfinyl group and the like.

Preferred examples of the alkyl or arylsulfonyl group include a substituted or unsubstituted alkylsulfonyl group having 1 to 30 carbon atoms, and a substituted or unsubstituted arylsulfonyl group having 6 to 30 carbon atoms, for example, a methylsulfonyl group, an ethylsulfonyl group, a phenylsulfonyl group, a p-methylphenylsulfonyl group and the like.

Preferred examples of the acyl group include a formyl group, a substituted or unsubstituted alkylcarbonyl group having 2 to 30 carbon atoms, a substituted or unsubstituted arylcarbonyl group having 7 to 30 carbon atoms, and a substituted or unsubstituted heterocyclic carbonyl group having 2 to 30 carbon atoms, which is bound via a carbon atom to a carbonyl group, for example, an acetyl group, a pyvaloyl group, a 2-chloroacetyl group, a stearoyl group, a benzoyl group, a p-n-octyloxyphenylcarbonyl group, a 2-pyridylcarbonyl group, a 2-furylcarbonyl group and the like.

Preferred examples of the aryloxycarbonyl group include a substituted or unsubstituted aryloxycarbonyl group having 7 to 30 carbon atoms, for example, a phenoxycarbonyl group, an o-chlorophenoxycarbonyl group, an m-nitrophenoxycarbonyl group, a p-t-butylphenoxycarbonyl group and the like.

Preferred examples of the alkoxycarbonyl group include a substituted or unsubstituted alkoxycarbonyl group having 2 to 30 carbon atoms, for example, a methoxycarbonyl group, an ethoxycarbonyl group, a t-butoxycarbonyl group, an n-octadecyloxycarbonyl group and the like.

Preferred examples of the carbamoyl group include a substituted or unsubstituted carbamoyl group having 1 to 30 carbon atoms, for example, a carbamoyl group, an N-methylcarbamoyl group, an N,N-dimethylcarbamoyl group, an N,N-di-n-octylcarbamoyl group, an N-(methylsulfonyl)carbamoyl group and the like.

Preferred examples of the aryl or heterocyclic azo group include a substituted or unsubstituted arylazo group having 6 to 30 carbon atoms, and a substituted or unsubstituted heterocyclic azo group having 3 to 30 carbon atoms, for example, phenylazo, p-chlorophenylazo, 5-ethylthio-1,3,4-thiadiazol-2-ylazo and the like.

Preferred examples of the imide group include an N-succinimide group, an N-phthalimide group and the like.

Preferred examples of the phosphino group include a substituted or unsubstituted phosphino group having 0 to 30 carbon atoms, for example, a dimethylphosphino group, a diphenylphosphino group, a methylphenoxyphosphino group and the like.

Preferred examples of the phosphinyl group include a substituted or unsubstituted phosphinyl group having 0 to 30 carbon atoms, for example, a phosphinyl group, a dioctyloxyphosphinyl group, a diethoxyphosphinyl group and the like.

Preferred examples of the phosphinyloxy group include a substituted or unsubstituted phosphinyloxy group having 0 to 30 carbon atoms, for example, a diphenoxyphosphinyloxy group, a dioctyloxyphosphinyloxy group and the like.

Preferred examples of the phosphinylamino group include a substituted or unsubstituted phosphinylamino group having 0 to 30 carbon atoms, for example, a dimethoxyphosphinylamino group, a dimethylaminophosphinylamino group and the like.

Preferred examples of the silyl group include a substituted or unsubstituted silyl group having 0 to 30 carbon atoms, for example, a trimethylsilyl group, a t-butyldimethylsilyl group, a phenyldimethylsilyl group and the like.

Examples of the ionic hydrophilic group include a sulfo group, a carboxyl group, a thiocarboxyl group, a sulfino group, a phosphono group, a dihydroxyphosphino group, a quaternary ammonium group and the like. The ionic hydrophilic group is particularly preferably a sulfo group or a carboxyl group. Further, the carboxyl group, the phosphono group and the sulfo group may be in a state of a salt, examples of the counter cation forming the salt include an ammonium ion, an alkali metal ion (for example, a lithium ion, a sodium ion and a potassium ion) and an organic cation (for example, a tetramethylammonium ion, a tetramethylguanidium ion and tetramethylphosphonium), a lithium salt, a sodium salt, a potassium salt, and an ammonium salt are preferred, the sodium salt or a mixture salt including the sodium salt as a main component is more preferred, and the sodium salt is most preferred.

Meanwhile, in the present invention, when the compound is a salt, the salt is dissociated and present as ions in a water-soluble ink.

The coloring composition of the present invention includes compounds having a specific xanthene structure represented by Formula (1) or salts thereof, and the compounds selected from (A) to (C) or salts thereof.

[Compound Represented by Formula (1)]

The compound represented by Formula (1) according to the present invention includes the compound, salts thereof, and hydrates thereof.

Since the compound of the present invention contains a plurality of specific xanthene derivative structures, the compound of the present invention has an unclear mechanism of action, but is excellent in image fastness such as ozone resistance and light fastness. In addition, multimerization via a linking group L exhibits effects that the molecular weight is increased to suppress molecular migration under high humidity conditions, and moisture fastness is also excellent.

$$(L)_m-(D)_n \quad \text{Formula (1)}$$

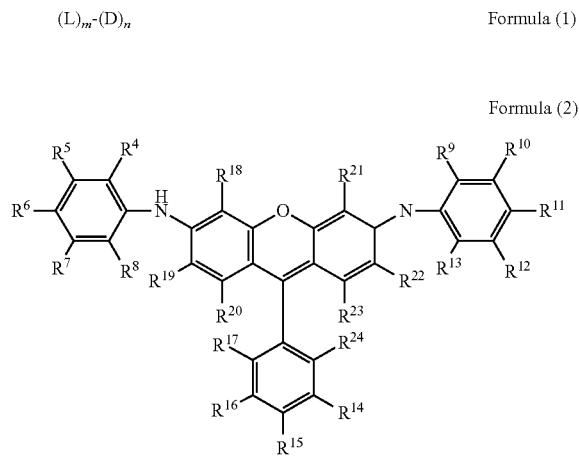

Formula (2)

In Formula (1), L represents a divalent to tetravalent linking group.

D represents a residue in which 1 to 5 hydrogen atoms are removed from a compound represented by Formula (2).

m represents an integer of 1 to 10. Provided that a plurality of L's may be the same or different.

n represents an integer from 2 to 10. Provided that a plurality of D's may be the same or different.

In Formula (2), $R^4$ to $R^{24}$ each independently represent a hydrogen atom or a substituent. Provided that at least one ionic hydrophilic groups are possessed.

m represents an integer of 1 to 10, and is preferably an integer of 1 to 8, more preferably an integer of 1 to 6, even more preferably an integer of 1 to 4, and particularly preferably 1 to 3. Solubility may be maintained by setting m within the range, thereby improving moisture resistance while suppressing clogging of the head in the inkjet printing.

n represents an integer of 2 to 10, and is preferably an integer of 2 to 8, more preferably an integer of 2 to 6, and even more preferably an integer of 2 to 4. Solubility may be maintained by setting n within the range, thereby improving moisture resistance while suppressing clogging of the head in the inkjet printing.

In Formula (1), L represents a divalent to tetravalent linking group. Examples of the divalent to tetravalent linking group include an oxy group (—O—), a thio group (—S—), a carbonyl group (—CO—), a sulfonyl group (—SO$_2$—), an imino group (—NH—), a methylene group (—CH$_2$—), an arylene group, a cycloalkylene group, a heteroarylene group, an ethylene-1,2-diyl group (—CH═CH—) and a group formed by combining these groups, and the divalent to tetravalent linking group is more preferably a group including a sulfonyl group (—SO$_2$—), an imino group (—NH—), a methylene group (—CH$_2$—), an ethylene-1,2-diyl group (—CH═CH—), arylene, and a heteroarylene group.

L is more preferably a divalent linking group.

L may have a substituent, and when L has a substituent, examples of the substituent include Group A of substituents, and the substituent is preferably an alkyl group, an aryl group, a heterocyclic group, an alkyl amino group, an aryl amino group, or an ionic hydrophilic group, and more preferably an aryl amino group or an ionic hydrophilic group. These groups may be further substituted with Group A of substituents, and are more preferably substituted with an ionic hydrophilic group.

L is preferably a linking group represented by the following Formula (V1), (V2), (V3), or (V4).

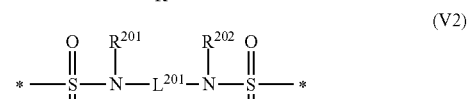

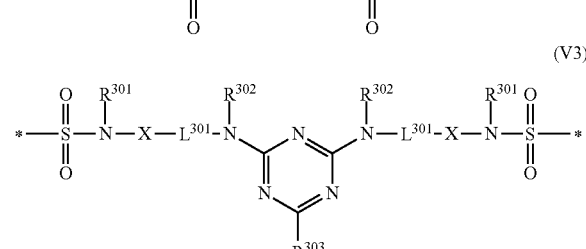

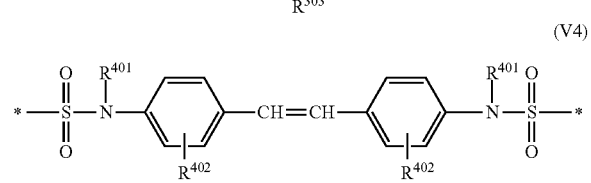

(In Formula (V1), $R^{101}$ and $R^{102}$ each independently represent a hydrogen atom or a substituent.

In Formula (V2), $R^{201}$ and $R^{202}$ each independently represent a hydrogen atom or a substituent, and $L^{201}$ represents a divalent linking group.

In Formula (V3), $R^{301}$, $R^{302}$ and $R^{303}$ each independently represent a hydrogen atom or a substituent, X represents an alkylene group having 2 to 20 carbon atoms, which may have a substituent, and $L^{301}$ represents a single bond or a divalent linking group.

In Formula (V4), $R^{401}$ and $R^{402}$ each independently represent a hydrogen atom or a substituent.)

In Formula (V1), $R^{101}$ and $R^{102}$ each independently represent a hydrogen atom or a substituent. $R^{101}$ and $R^{102}$ are preferably a hydrogen atom or Group A of substituents, more preferably a hydrogen atom, an alkyl group or an aryl group, and particularly preferably a hydrogen atom or an alkyl group. $R^{101}$ and $R^{102}$ may combine with each other to form a ring.

In Formula (V2), $R^{201}$ to $R^{202}$ each independently represent a hydrogen atom or a substituent. $R^{201}$ and $R^{202}$ are preferably a hydrogen atom or Group A of substituents, more preferably a hydrogen atom, an alkyl group or an aryl group, and particularly preferably a hydrogen atom or an alkyl group. $R^{201}$ and $R^{202}$ may combine with each other to form a ring.

$L^{201}$ represents a divalent linking group. Examples of the divalent linking group include an oxy group (—O—), a thio group (—S—), a carbonyl group (—CO—), a sulfonyl group (—SO$_2$—), an imino group (—NH—), a methylene group (—CH$_2$—), an arylene group, a cycloalkylene group, and a group formed by combining these groups. The divalent linking group is preferably an alkylene group having 1 to 20 carbon atoms, a cyclohexylene group, a phenylene group or a xylylene group, more preferably an alkylene group having 1 to 16 carbon atoms, a cyclohexylene group, a phenylene group or a xylylene group, and particularly preferably an alkylene group having 1 to 8 carbon atoms, a cyclohexylene group, a m-phenylene group or a xylylene group.

In Formula (V3), $R^{301}$ and $R^{302}$ each independently represent a hydrogen atom or a substituent, and are preferably a hydrogen atom or Group A of substituents, more preferably a hydrogen atom, an alkyl group, an aryl group, a heterocyclic group, an alkylamino group or an arylamino group, and even more preferably a hydrogen atom or an alkyl group. $R^{301}$ and $R^{302}$ may combine with each other to form a ring.

$R^{303}$ represents a hydrogen atom or a substituent, and is preferably a hydrogen atom or Group A of substituents, and more preferably an amino group, a mono- or dialkylamino group, an arylamino group or an alkylthio group. These groups may be further substituted with Group A of substituents, and more preferably substituted with an ionic hydrophilic group.

X represents an alkylene group having 2 to 20 carbon atoms which may have a substituent, or arylene group having 6 to 10 carbon atoms which may have a substituent. The alkylene group having 2 to 20 carbon atoms is preferred from the viewpoint of the ease of synthesis.

The alkylene group having 2 to 20 carbon atoms is preferably an ethylene group or an n-propylene group, and more preferably an ethylene group. Examples of the substituent which has a substituent include a methyl group.

$L^{301}$ represents a single bond or a divalent linking group. Examples of the divalent linking group include an oxy group (—O—), a thio group (—S—), a carbonyl group (—CO—), a sulfonyl group (—SO$_2$—), an imino group (—NH—), a methylene group (—CH$_2$—), an arylene group, a cycloalkylene group, and a group formed by combining these groups, and preferably a phenylene group, a cyclohexylene group or a methylene group, and $L^{301}$ is more preferably a single bond.

In Formula (V4), $R^{401}$ each independently represents a hydrogen atom or a substituent. $R^{401}$ is preferably a hydrogen atom or Group A of substituents, more preferably a hydrogen atom or an alkyl group having 1 to 6 carbon atoms, and particularly preferably a hydrogen atom.

$R^{402}$ each independently represents a hydrogen atom or a substituent, and is preferably a hydrogen atom or Group A of substituents, more preferably an ionic hydrophilic group, and particularly preferably a sulfo group.

Hereinafter, specific examples of L in Formula (1) will be described, but the present invention is not limited to the specific examples.

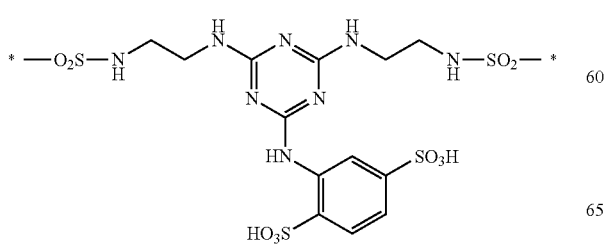

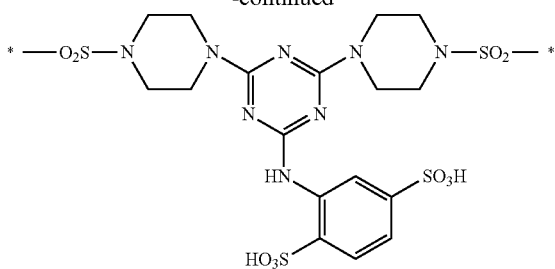

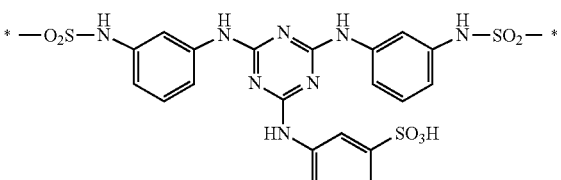

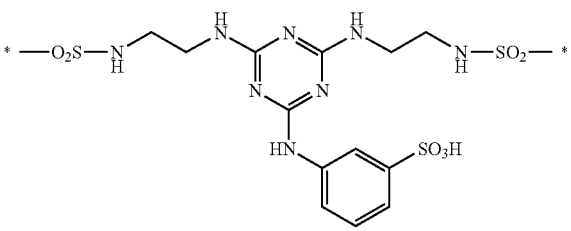

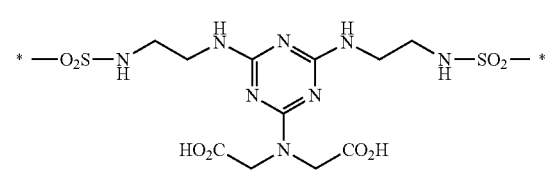

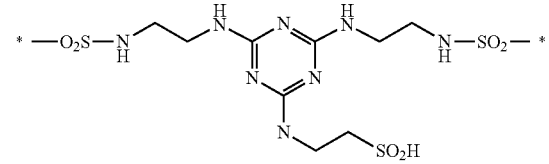

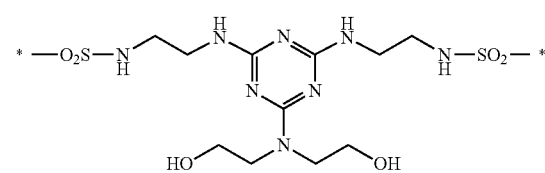

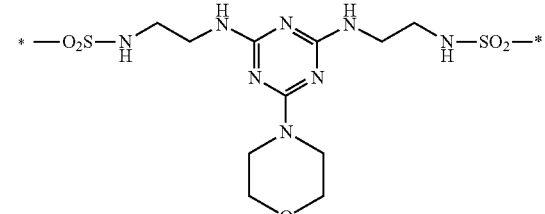

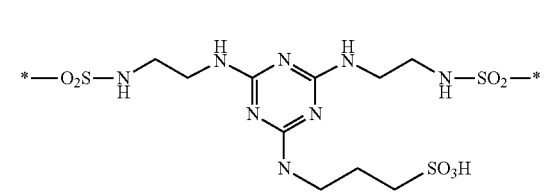

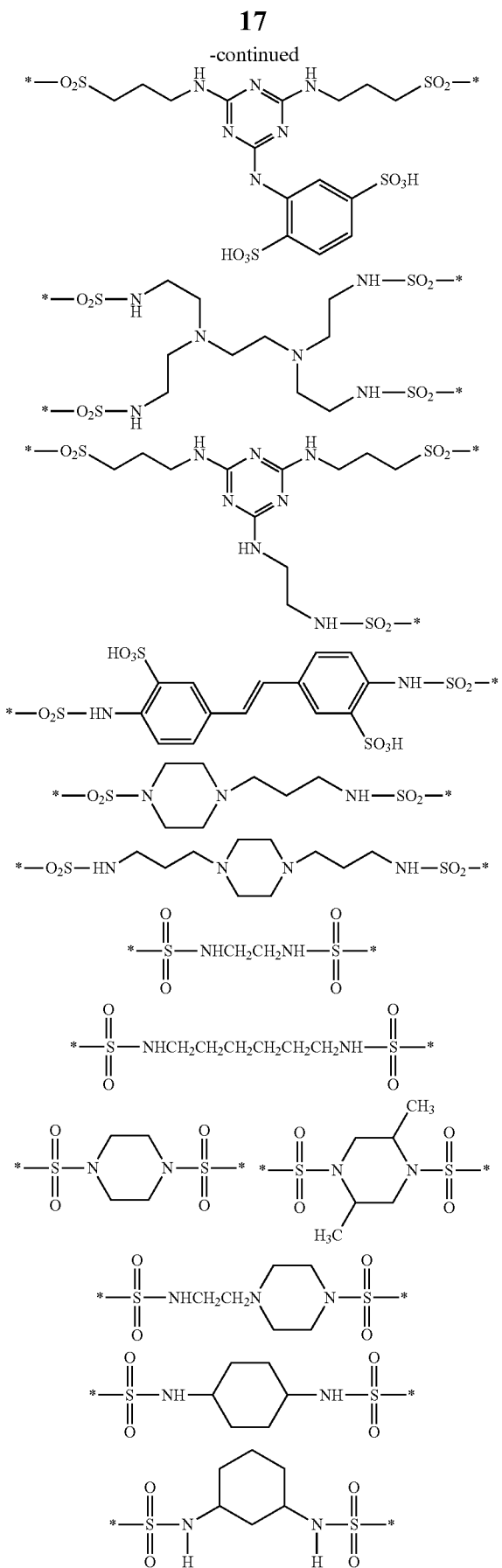
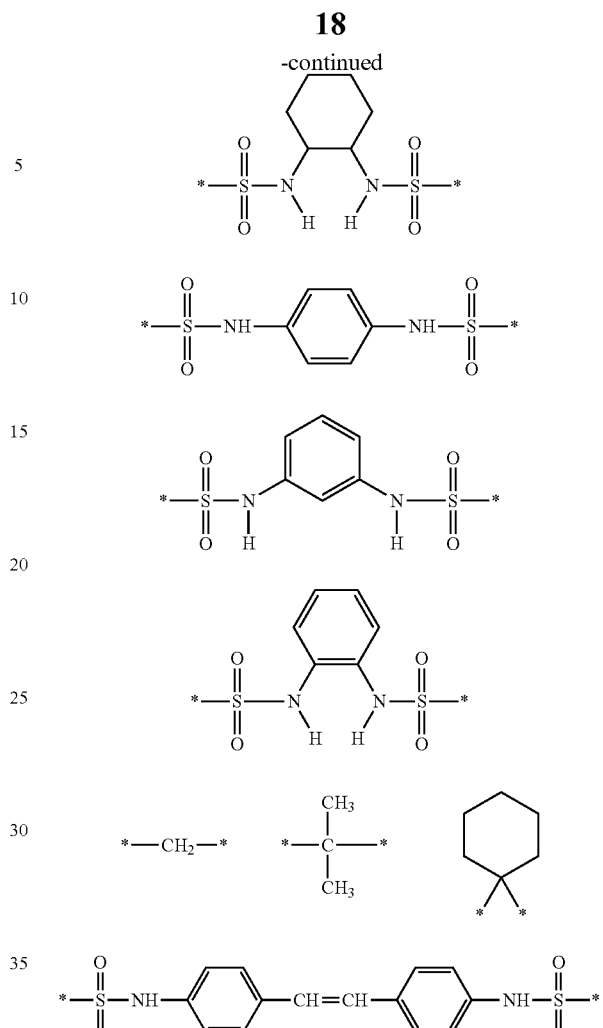

In Formula (1), D represents a residue in which one hydrogen atom is removed from the compound represented by Formula (2).

In Formula (2), $R^4$ to $R^{23}$ each independently represent a hydrogen atom or a substituent. Examples of the substituent include the above-described Group A of substituents.

In Formula (2), it is preferred that $R^4$, $R^8$, $R^9$ and $R^{13}$ each independently represent a hydrogen atom or an alkyl group. The alkyl group may be unsubstituted or may have a substituent, and is preferably an alkyl group having a total carbon number of 1 to 20, more preferably an alkyl group having a total carbon number of 1 to 10, and even more preferably an alkyl group having a total carbon number of 1 to 10. Examples thereof include a methyl group, an ethyl group, an ethynyl group, an isopropanyl group and a 2-ethylhexyl group. It is preferred that $R^4$, $R^8$, $R^9$ and $R^{13}$ each independently represent an alkyl group in terms of hue.

In Formula (2), it is preferred that $R^5$ to $R^7$, $R^{10}$ to $R^{12}$ and $R^{14}$ to $R^{23}$ represent a hydrogen atom due to the ease of synthesis. $R^{24}$ is preferably a hydrogen atom or an ionic hydrophilic group, and more preferably a sulfo group.

In Formula (1), it is preferred that D represents a residue in which 1 to 5 hydrogen atoms are removed from the hydrogen atoms as $R^5$ to $R^7$, $R^{10}$ to $R^{12}$, $R^{19}$, $R^{22}$ or $R^{24}$ in the compound represented by Formula (2) in terms of the ease of synthesis.

It is preferred from the viewpoint of the availability of raw materials and low cost preparation that the compound represented by Formula (1) is synthesized by a synthesis method including:

a step of subjecting the compound represented by Formula (3) to chlorosulfonylation, a step of reacting the resulting product with a diamine compound represented by Formula (d), and a step of hydrolyzing the remaining chlorosulfonyl group.

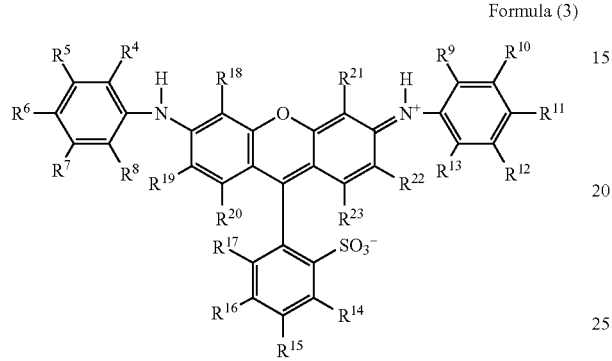

Formula (3)

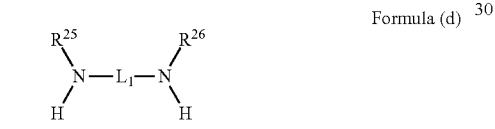

Formula (d)

In Formula (3), $R^4$ to $R^{23}$ each independently represent a hydrogen atom or a substituent.

In Formula (d), $R^{25}$ and $R^{26}$ each independently represent a hydrogen atom or a substituent. $L_1$ represents a divalent linking group.

In Formula (3), $R^4$ to $R^{23}$ have the same meaning as $R^4$ to $R^{23}$ in Formula (2), and the preferred examples are also the same.

In Formula (d), $R^{25}$ and $R^{26}$ each independently represent preferably a hydrogen atom, a substituted or unsubstituted alkyl group having 1 to 6 carbon atoms, a substituted or unsubstituted aryl group having 6 to 10 carbon atoms, more preferably a hydrogen atom, a substituted or unsubstituted alkyl group having 1 to 6 carbon atoms, and particularly preferably a hydrogen atom.

$L_1$ is preferably a substituted or unsubstituted alkylene group having 1 to 20 carbon atoms, a substituted or unsubstituted cyclohexylene group, a substituted or unsubstituted phenylene group, a substituted or unsubstituted xylylene group, a substituted or unsubstituted stilben-4,4'-diyl group, more preferably a substituted or unsubstituted alkylene group having 1 to 10 carbon atoms, an unsubstituted cyclohexylene group, an unsubstituted phenylene group, an unsubstituted xylylene group, a substituted or unsubstituted stilben-4,4'-diyl group, and particularly preferably a stilben-4,4'-diyl group which is substituted with a sulfo group.

Hereinafter, specific examples of the compound represented by Formula (3) will be described, but the present invention is not limited to the specific examples.

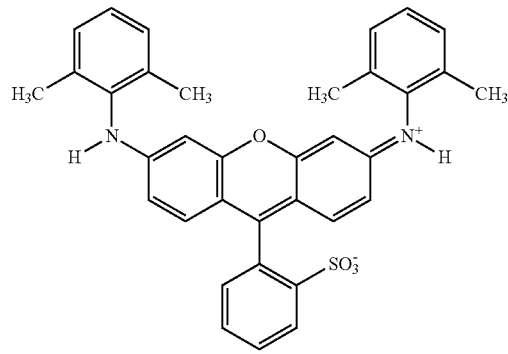

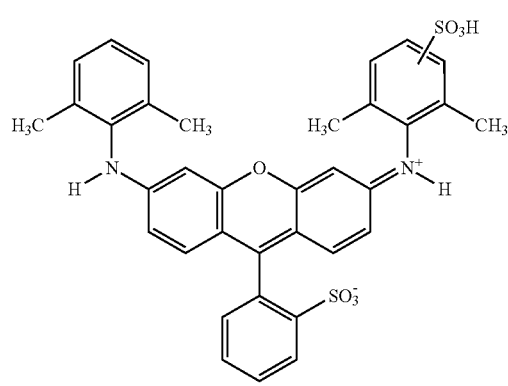

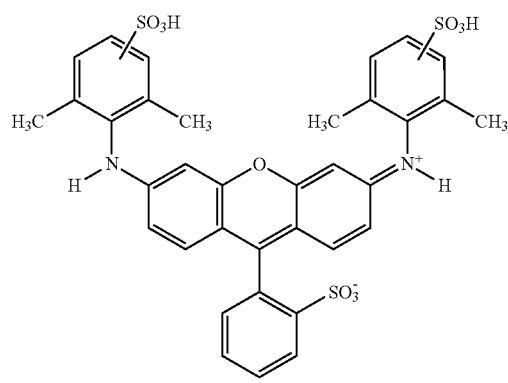

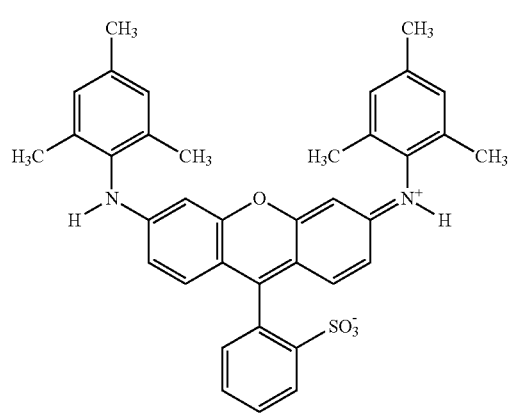

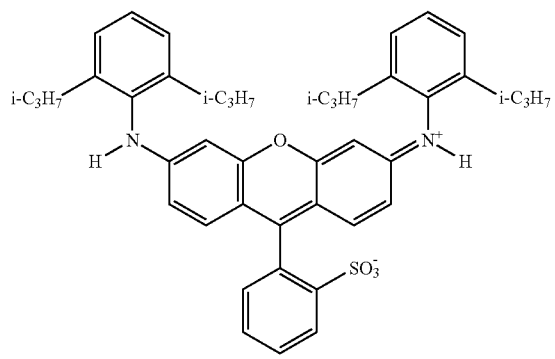

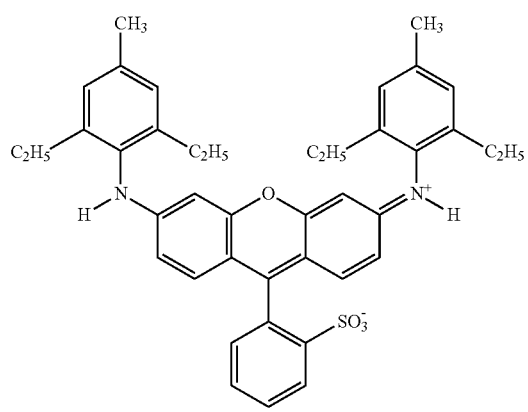

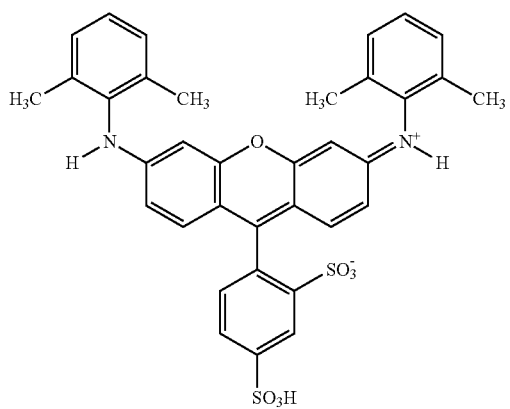

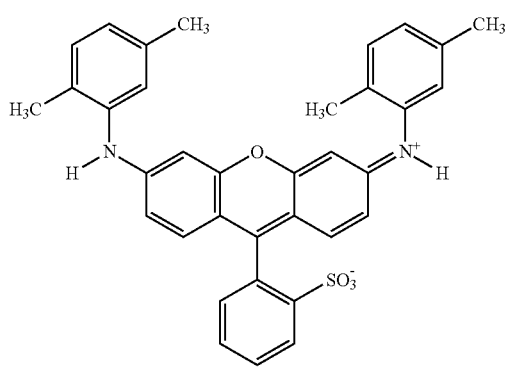

Hereinafter, specific examples of the compound represented by Formula (3) will be described, but the present invention is not limited to the specific examples.

NH₂—CH₂CH₂—NH₂    NH₂—CH₂CH₂CH₂CHCH₂—NH₂
                                    |
                                    CH₃

NH₂—CH₂CH₂CH₂—NH₂    NH₂—CH₂CH₂CH₂CH₂CH₂CH₂CH₂—NH₂

NH₂—CH₂CH—NH₂    NH₂—CH₂CH₂CH₂CH₂CH₂CH₂CH₂CH₂—NH₂
         |
         CH₃

NH₂—CH₂CH₂CH₂CH₂—NH₂

NH₂—CH₂CH₂CH₂CH₂CH₂CH₂CH₂CH₂CH₂CH₂—NH₂

CH₃
          |
NH₂—C—CH₂—NH₂
          |
         CH₃

NH₂—CH₂CH₂CH₂CH₂CH₂CH₂CH₂CH₂CH₂CH₂CH₂CH₂—NH₂

NH₂—CH₂CH₂—NH—CH₃

NH₂—CH—CH₂·NH₂    NH₂—CH₂CH₂—NH—CH₂CH₃
     |
     CH₂CH₃

NH₂—CH₂CH₂CH₂CH₂CH₂—NH₂    NH₂—CH₂CH₂—NH—CH₂CH₂CH₃

CH₃
          |
NH₂—CH₂—C—CH₂—NH₂    NH₂—CH₂CH₂—NH—CHCH₃
          |                              |
         CH₃                            CH₃

NH₂—CH₂CH₂CH₂CH₂CH₂CH₂—NH₂

CH₃—NH—CH₂CH₂—NH—CH₃

CH₃CH—NH—CH₂CH₂—NH—CHCH₃
   |                  |
   CH₃               CH₃

CH₃CH₂—NH—CH₂CH₂—NH—CH₂CH₃

-continued
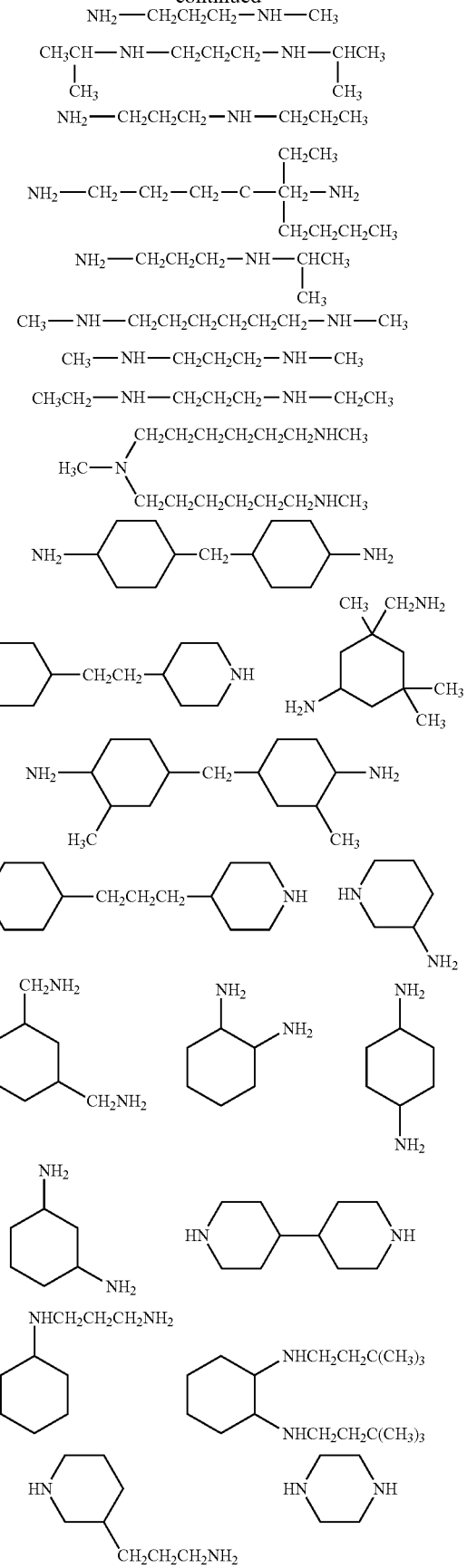
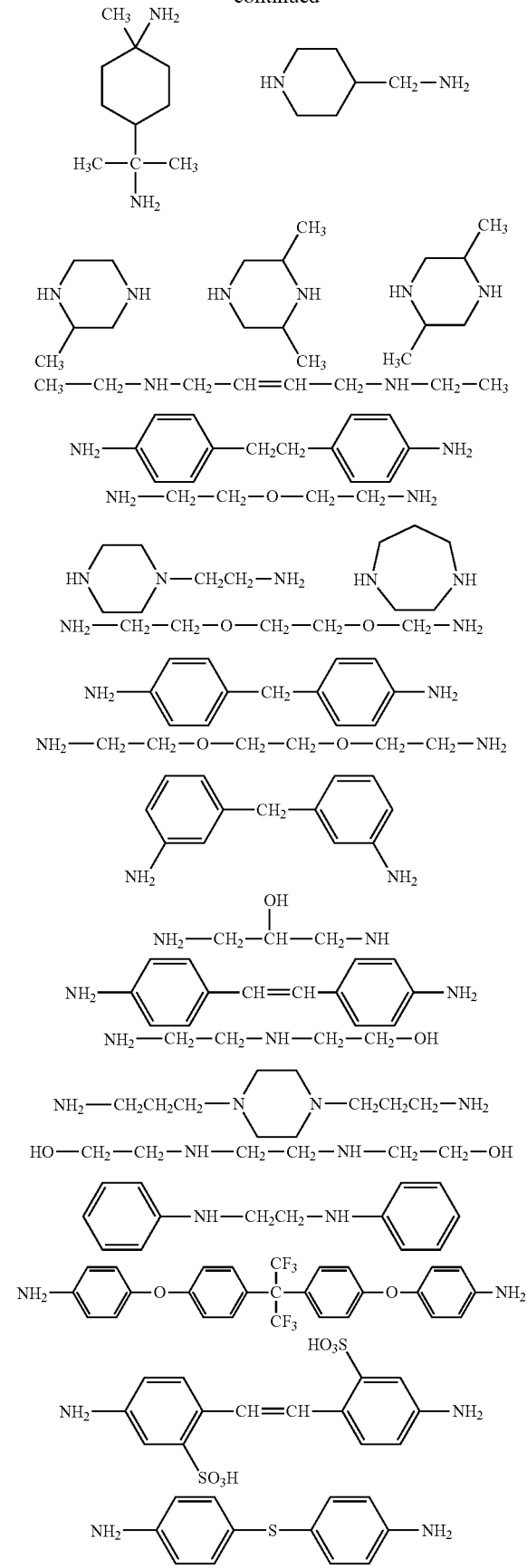

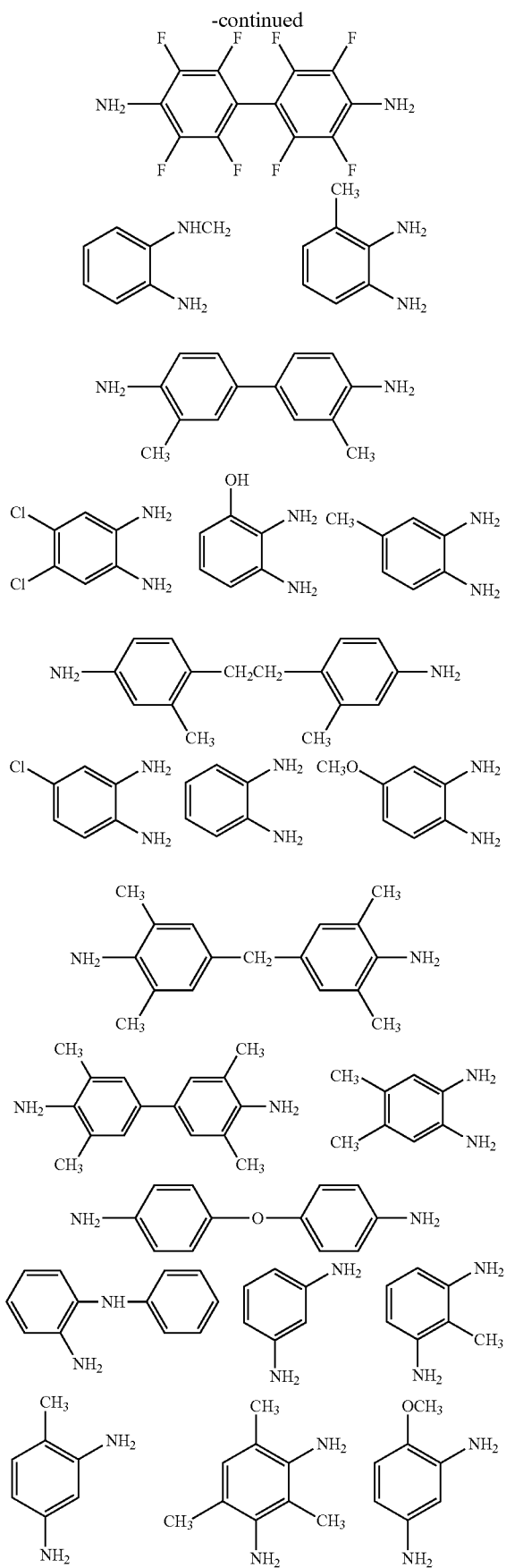
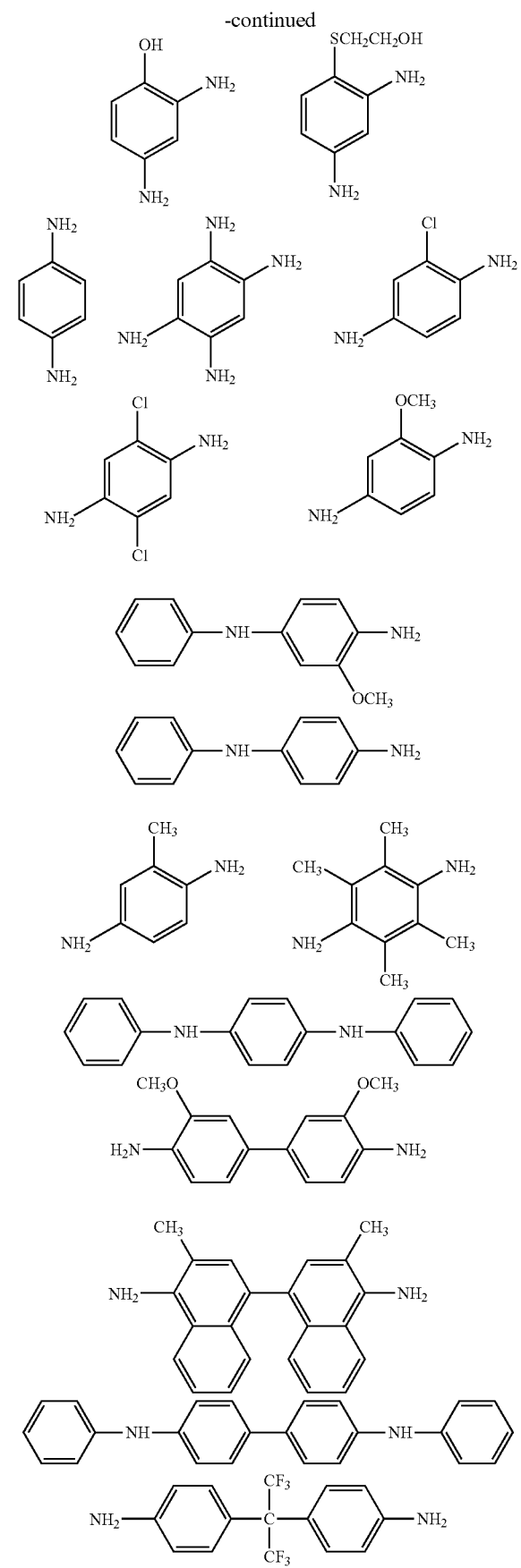

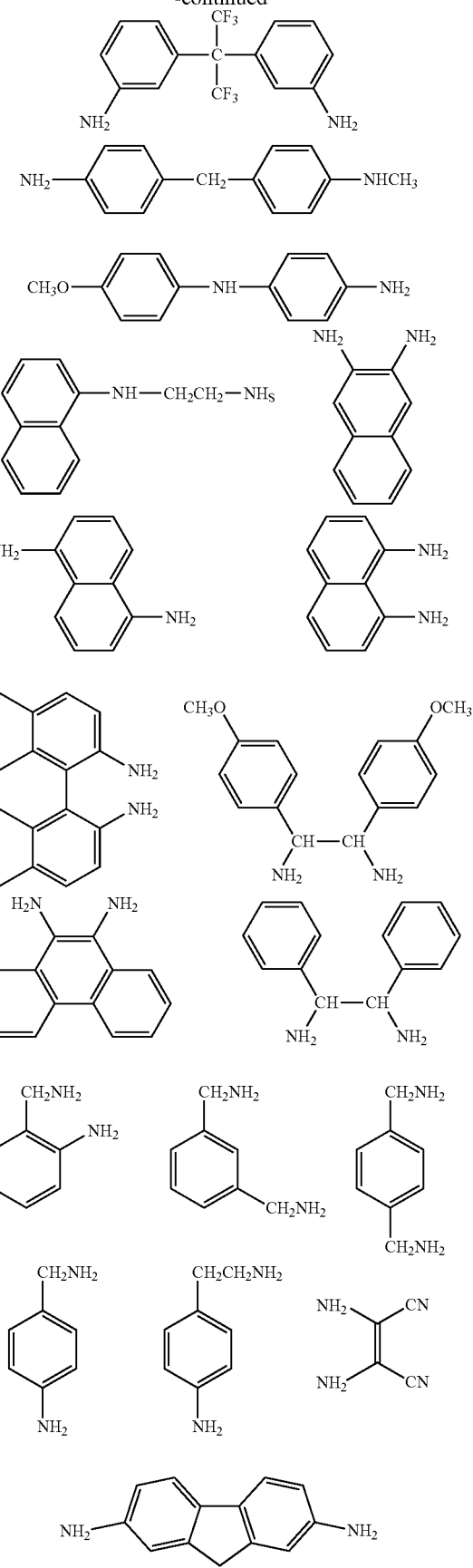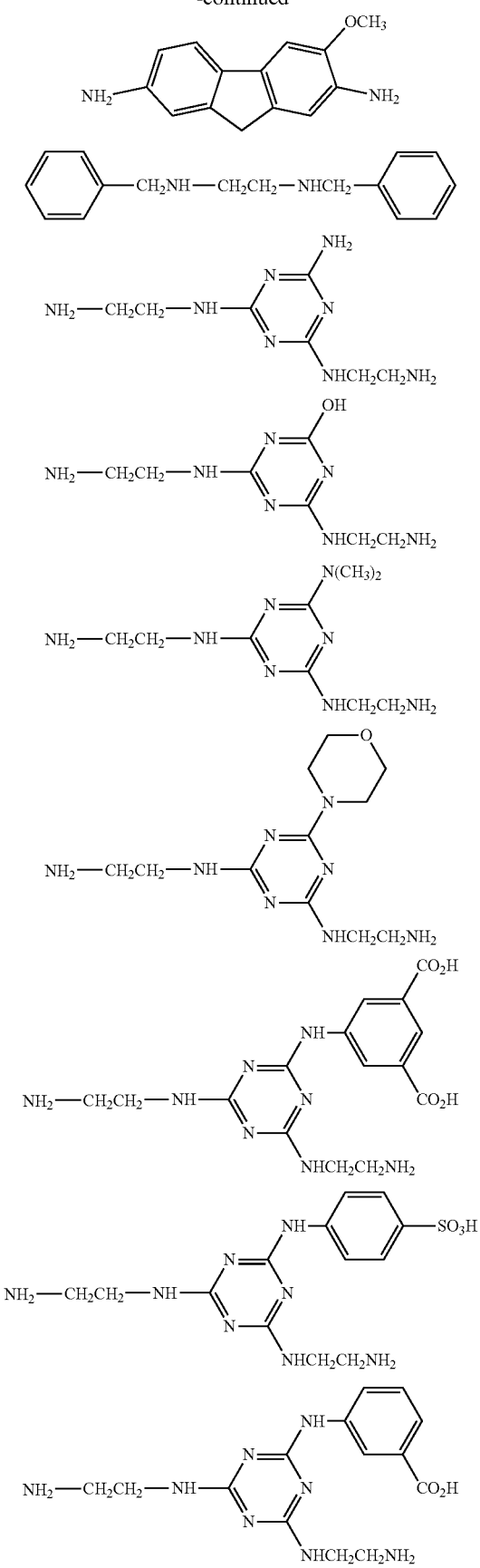

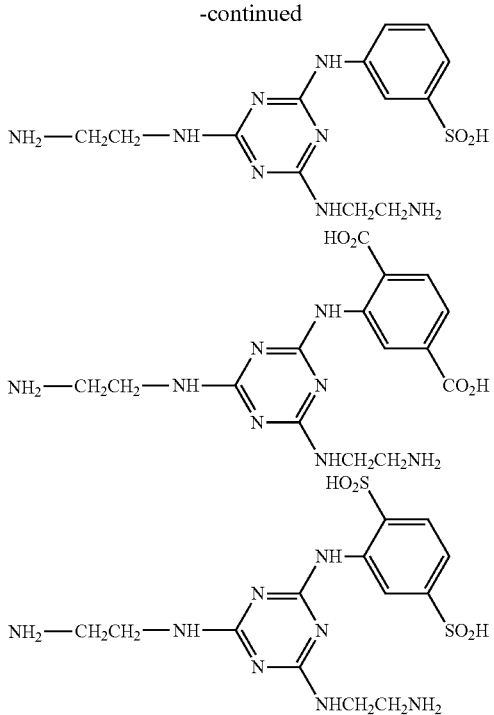
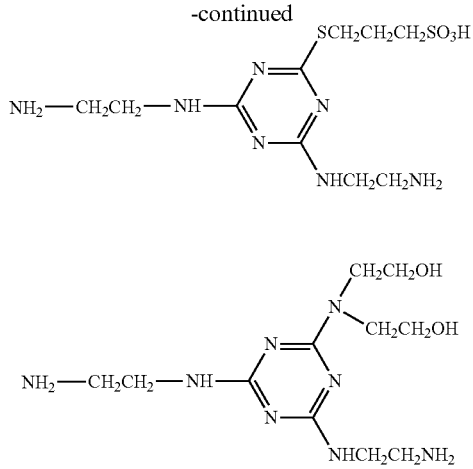

The preparation method of the present invention will be described, but the concept of the present invention is not limited to the preparation method as described below at all, because the compound is obtained by multimerizing the xanthene-based compound represented by Formula (2) via a linking group.

(1) Method of Linking from the Anilino Group Moiety Compound Via Methylene

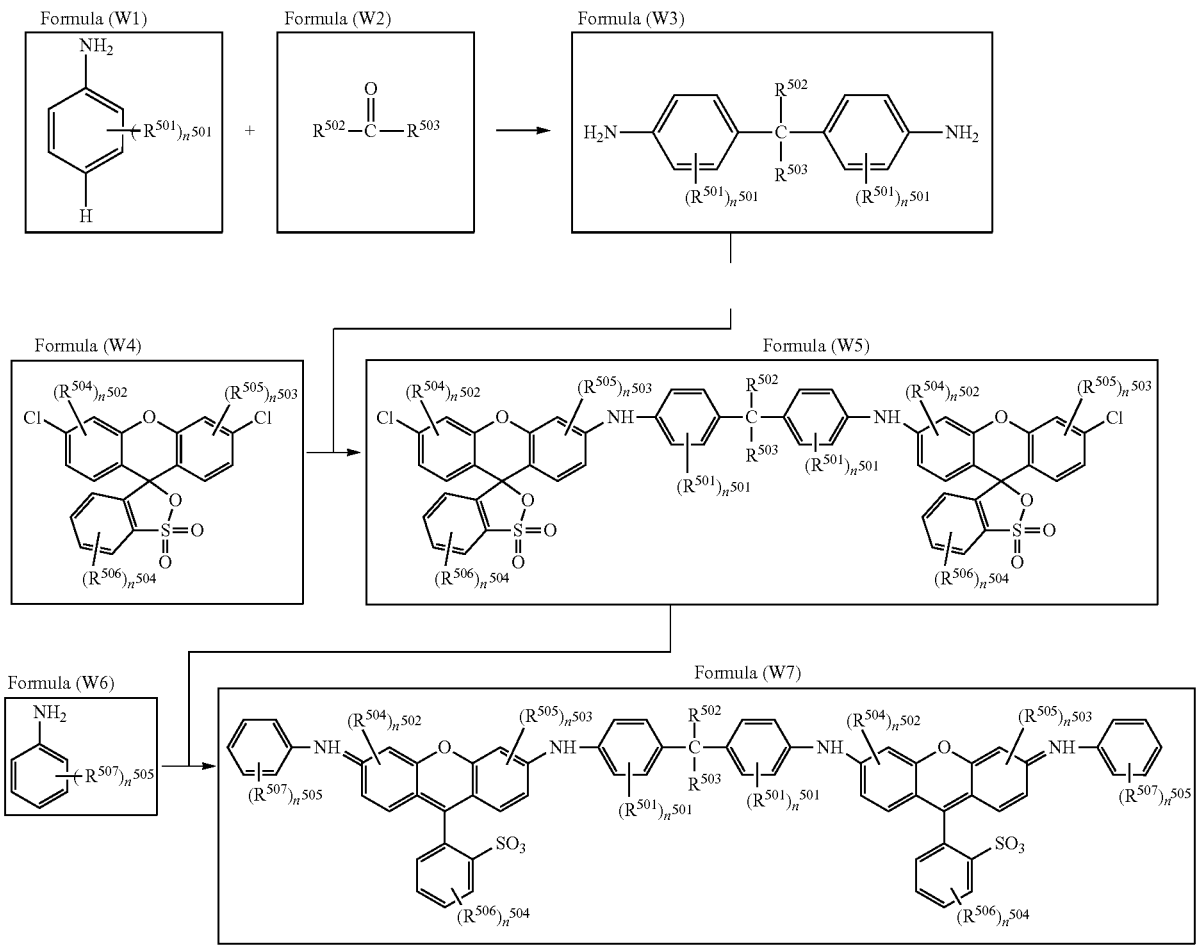

In Formula (W1), $R^{501}$ represents a substituent, and $n^{501}$ represents an integer of 0 to 4. When $n^{501}$ is 2 or more, a plurality of $R^{501}$'s may be the same or different.

In Formula (W2), $R^{502}$ and $R^{503}$ represent a hydrogen atom, a substituted or unsubstituted alkyl group, a substituted or unsubstituted aryl group, and a substituted or unsubstituted heterocyclic group. Provided that there is no case where both $R^{502}$ and $R^{503}$ are a hydrogen atom at the same time.

In Formula (W3), $R^{501}$, $R^{502}$, $R^{503}$ and $n^{501}$ have the same meaning as $R^{501}$, $R^{502}$, $R^{503}$ and $n^{501}$ in Formulae (W1) and (W2).

In Formula (W4), $R^{504}$, $R^{505}$ and $R^{506}$ represent a substituent, $n^{502}$ and $n^{503}$ represent an integer of 0 to 3, and $n^{504}$ represents an integer of 0 to 4. When $n^{502}$, $n^{503}$ and/or $n^{504}$ are each independently 2 or more, a plurality of $R^{504}$'s, $R^{505}$'s and/or $R^{506}$'s may be the same or different.

In Formula (W5), $R^{501}$, $R^{502}$, $R^{503}$, $R^{504}$, $R^{505}$, $R^{506}$, $n^{501}$, $n^{502}$, $n^{503}$ and $n^{504}$ have the same meaning as $R^{501}$, $R^{502}$, $R^{503}$, $R^{504}$, $R^{505}$, $R^{506}$, $n^{501}$, $n^{502}$, $n^{503}$ and $n^{504}$ in Formulae (W1), (W2) and (W4).

In Formula (W6), $R^{507}$ represents a substituent, and $n^{505}$ represents an integer of 0 to 5. When $n^{505}$ is 2 or more, a plurality of $R^{507}$'s may be the same or different.

In Formula (W5), $R^{501}$, $R^{502}$, $R^{503}$, $R^{504}$, $R^{505}$, $R^{506}$, $R^{507}$, $n^{501}$, $n^{502}$, $n^{503}$, $n^{504}$ and $n^{505}$ have the same meaning as $R^{501}$, $R^{502}$, $R^{503}$, $R^{504}$, $R^{505}$, $R^{506}$, $R^{507}$, $n^{501}$, $n^{502}$, $n^{503}$, $n^{504}$ and $n^{505}$ in Formulae (W1), (W2), (W4) and (W6).

The compound represented by Formula (W3) may be obtained by heating 2 moles of the compound represented by Formula (W1) and 1 mole of the compound represented by Formula (W2) while stirring in the presence of strong acid.

The compound represented by Formula (W5) may be obtained by heating 1 mole of the compound represented by Formula (W3) and 1 mole of the compound represented by Formula (W4) while stirring together with aluminum chloride.

The compound represented by Formula (W7), which corresponds to the compound of Formula (1) of the present invention, may be obtained by heating 1 mole of the compound represented by Formula (W5) and 2 moles or more of the compound represented by Formula (W6) while stirring together with zinc chloride.

The compound represented by (W1) is available as a reagent (for example, Catalog No. D146005 and the like, manufactured by Aldrich Co.).

The compound represented by (W2) is available as a reagent (for example, Catalog No. 227048 and the like, manufactured by Sigma-Aldrich Co.).

The compound represented by (W4) may be synthesized by the method described in Journal of the American Chemical Society, Vol. 46, p 1899 (1924).

The compound represented by (W5) is available as a reagent (for example, Catalog No. D146005 and the like, manufactured by Aldrich Co.).

Meanwhile, in order to impart water solubility required to use the compound of the present invention as a water-based ink for use in inkjet and the like, it is preferred to further subject the compound represented by Formula (W7) to post-reaction such as sulfonation. The details of the preparation method will be illustrated by Examples.

(2) for a Xanthene Compound Having a Sulfo Group, a Method of Converting the Sulfo Group into a Chlorosulfonyl Group, and then Reacting with Polyvalent Amine and the Like

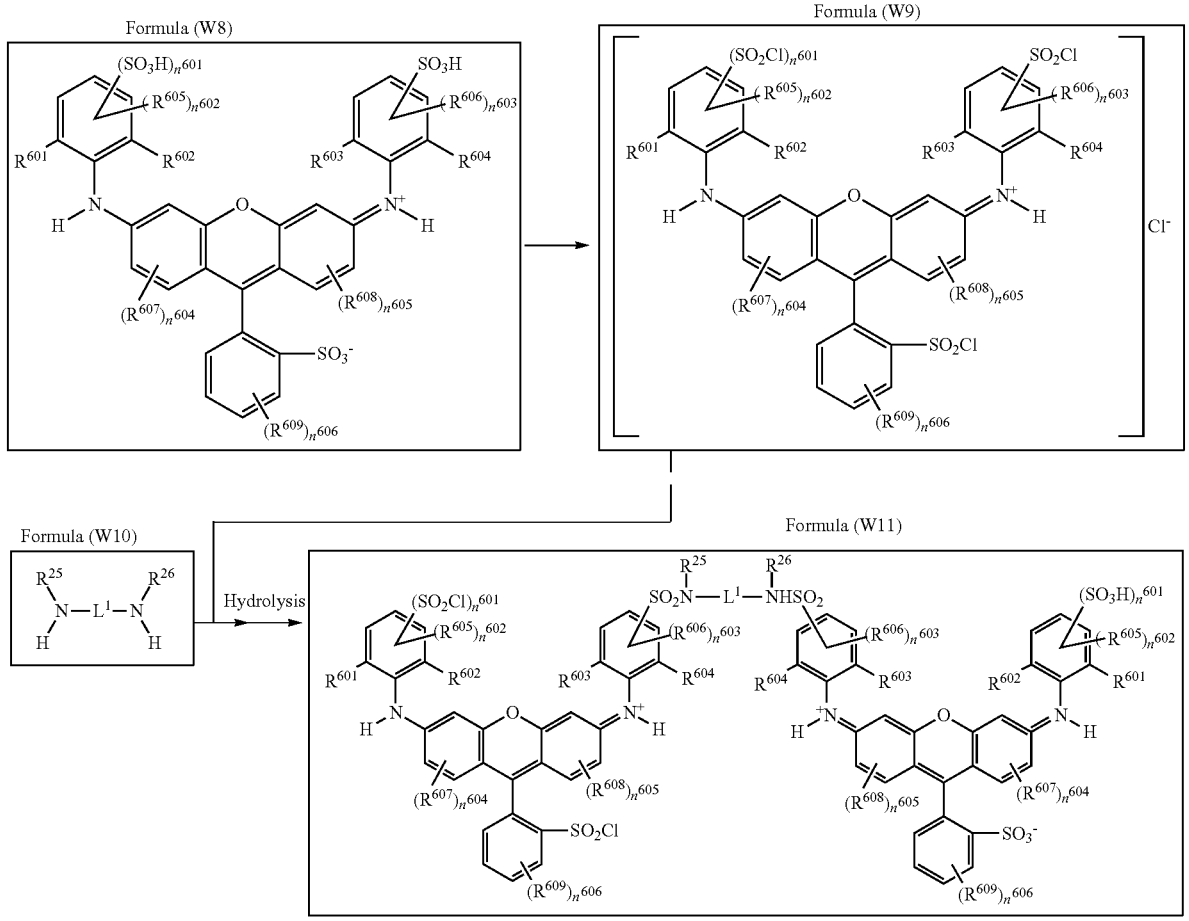

In Formula (W8), $R^{601}$, $R^{602}$, $R^{603}$ and $R^{604}$ represent a hydrogen atom or a substituent, $R^{605}$, $R^{606}$, $R^{607}$, $R^{608}$ and $R^{609}$ represent a substituent, $n^{601}$ represents an integer of 0 to 1, $n^{602}$ and $n^{603}$ represent an integer of 0 to 3, $n^{604}$ and $n^{605}$ represent an integer of 0 to 3, and $n^{606}$ represents an integer of 0 to 4. When $n^{602}$, $n^{603}$, $n^{604}$ and/or $n^{605}$ are 2 or more, a plurality of $R^{605}$'s, $R^{606}$'s, $R^{607}$'s, $R^{608}$'s and/or $R^{609}$'s may be the same or different.

In Formula (W9), $R^{601}$, $R^{602}$, $R^{603}$, $R^{604}$, $R^{605}$, $R^{606}$, $R^{607}$, $R^{608}$, $R^{609}$, $n^{601}$, $n^{602}$, $n^{603}$, $n^{604}$, $n^{605}$ and $n^{606}$ have the same meaning as $R^{601}$, $R^{602}$, $R^{603}$, $R^{604}$, $R^{605}$, $R^{606}$, $R^{607}$, $R^{608}$, $R^{609}$, $n^{601}$, $n^{602}$, $n^{603}$, $n^{604}$, $n^{605}$ and $n^{606}$ in Formula (W8).

In Formula (W10), $R^{25}$, $R^{26}$ and $L^1$ have the same meaning as $R^{25}$, $R^{26}$ and $L^1$ in Formula (d).

In Formula (W11), $R^{601}$, $R^{602}$, $R^{603}$, $R^{604}$, $R^{605}$, $R^{606}$, $R^{607}$, $R^{608}$, $R^{609}$ $n^{601}$, $n^{602}$, $n^{603}$, $n^{604}$, $n^{605}$, $n^{606}$, $R^{25}$, $R^{26}$ and $L^1$ have the same meaning as $R^{601}$, $R^{602}$, $R^{603}$, $R^{604}$, $R^{605}$, $R^{606}$, $R^{607}$, $R^{608}$, $R^{609}$, $n^{601}$, $n^{602}$, $n^{603}$, $n^{604}$, $n^{605}$, $n^{606}$, $R^{25}$, $R^{26}$ and $L^1$ in Formulae (W8) and (d).

The compound represented by Formula (W8) is available as a reagent (for example, trade name CHUGAI AMINOL FAST PINKR and the like, manufactured by Chugai Kasei Co., Ltd.).

The compound represented by Formula (W10) is available as a reagent (for example, Catalog No. D25206, manufactured by Aldrich Co.).

Formula (W9) may be obtained by converting the compound represented by Formula (W8) into an acid chloride using a chlorinating agent such as phosphorus oxychloride or thionyl chloride.

The compound represented by Formula (1) of the present invention may be obtained as a mixture having a representative structure represented by Formula (W11) by reacting the compound represented by Formula (W9) and the compound represented by Formula (W10) in an arbitrary ratio (preferably a molar ratio of 2:1), and hydrolyzing unreacted sulfonyl chloride with alkali.

The representative structure represented by Formula (W11) will be described. The bonding moiety of the xanthene structure and the linking group is a sulfonic acid or sulfonate moiety of the xanthene compound used as Formula (W8), and does not have reaction selectivity.

Examples of a form, which may be included in a mixture obtained by hydrolysis of the compound obtained by reacting the compound represented by Formula (W9) and the compound represented by Formula (W10), include a dimer as well as an oligomer such as a trimer and a tetramer. Such a multimer (oligomer) may be in a straight form, a branched form, a cyclic form and a combination thereof.

Meanwhile, these are represented by using the representative structure represented by Formula (W11) in the present specification, showing that such a mixture is included therein.

(3) For a Xanthene Compound, a Method of Reacting with Polyvalent Amine after Directly Performing Chlorosulfonylation

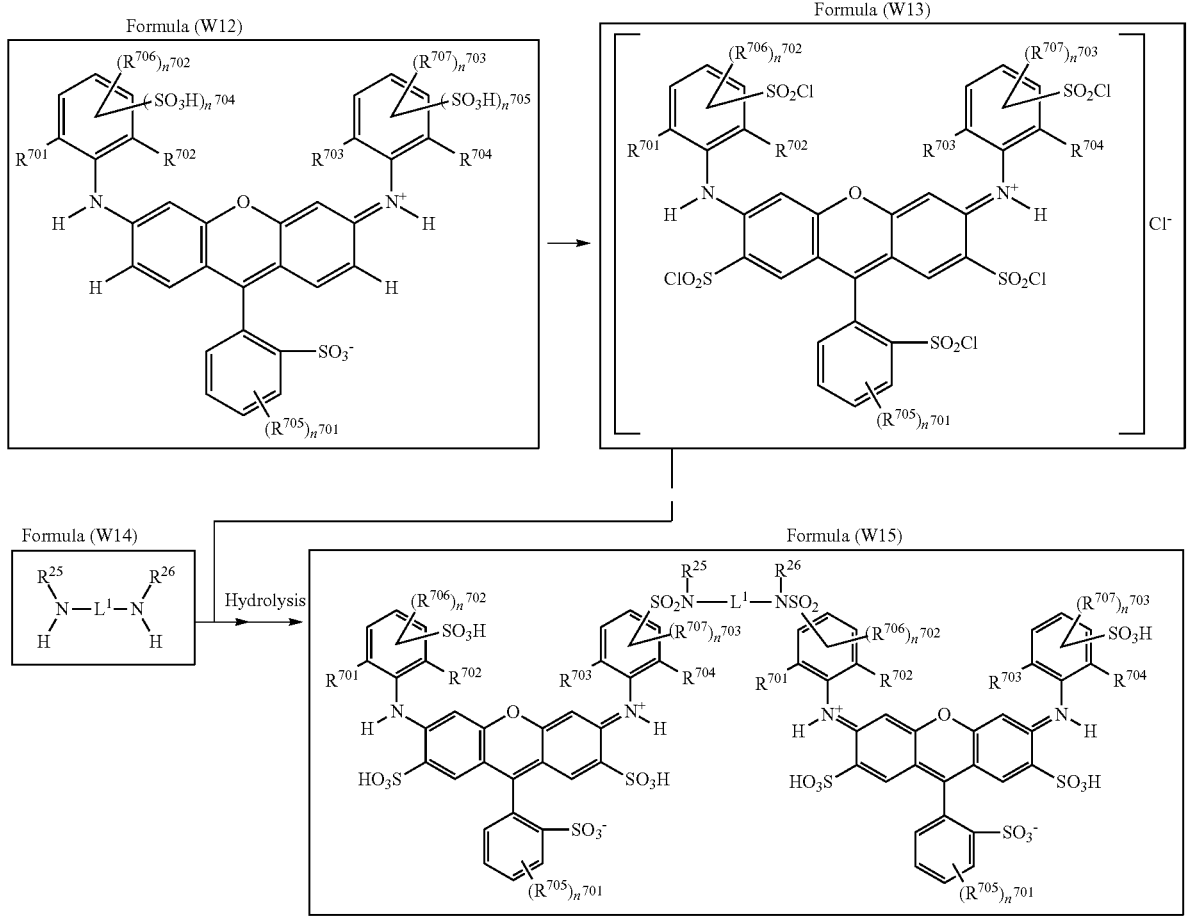

In Formula (W12), $R^{701}$, $R^{702}$, $R^{703}$ and $R^{704}$ each independently represent a hydrogen atom or a substituent, $R^{705}$, $R^{706}$ and $R^{707}$ represent a substituent, $n^{701}$ represents an integer of 0 to 4, $n^{702}$ and $n^{703}$ each independently represent an integer of 0 to 2, and $n^{704}$ and $n^{705}$ each independently represent an integer of 0 to 1. When $n^{701}$, $n^{702}$ and/or $n^{703}$ are each independently 2 or more, a plurality of $R^{705}$'s, $R^{706}$'s and/or $R^{707}$'s may be the same or different.

In Formula (W13), $R^{701}$, $R^{702}$, $R^{703}$, $R^{704}$, $R^{705}$, $R^{706}$, $R^{707}$, $n^{701}$, $n^{702}$ and $n^{703}$ have the same meaning as $R^{701}$, $R^{702}$, $R^{703}$, $R^{704}$, $R^{705}$, $R^{706}$, $R^{707}$, $n^{701}$, $n^{702}$ and $n^{703}$ in Formula (W12).

In Formula (W14), $R^{25}$, $R^{26}$ and $L^1$ have the same meaning as $R^{25}$, $R^{26}$ and $L^1$ in Formula (d).

In Formula (W15), $R^{701}$, $R^{702}$, $R^{703}$, $R^{704}$, $R^{705}$, $R^{706}$, $R^{707}$, $n^{701}$, $n^{702}$, $n^{703}$, $R^{25}$, $R^{26}$ and $L^1$ have the same meaning as $R^{701}$, $R^{702}$, $R^{703}$, $R^{704}$, $R^{705}$, $R^{706}$, $R^{707}$, $n^{701}$, $n^{702}$, $n^{703}$, $R^{25}$, $R^{26}$ and $L^1$ in Formulae (W12) and (13).

The compound represented by Formula (W12) is available as a reagent (for example, trade name CHUGAI AMINOL FAST PINKR and the like, manufactured by Chugai Kasei Co., Ltd.).

The compound represented by Formula (W14) is available as a reagent (for example, Catalog No. D25206, manufactured by Aldrich Co.).

The compound represented by Formula (W13) may be obtained by subjecting the compound represented by Formula (W12) to chlorosulfonylation by using chlorosulfonic acid.

The compound represented by Formula (1) of the present invention may be obtained as a mixture having a representative structure represented by Formula (W15) by reacting the compound represented by Formula (W13) and the compound represented by Formula (W14) in an arbitrary ratio (preferably a molar ratio of 2:1), and hydrolyzing unreacted sulfonyl chloride with alkali.

The representative structure represented by Formula (W15) will be described. The bonding moiety of the xanthene structure and the linking group is a sulfonyl chloride moiety of the xanthene compound of Formula (W13), and does not have reaction selectivity.

Examples of a form, which may be included in a mixture obtained by hydrolysis of the compound obtained by reacting the compound represented by Formula (W13) and the compound represented by Formula (W14), include a dimer as well as an oligomer such as a trimer and a tetramer. Such a multimer (oligomer) may be in a straight form, a branched form, a cyclic form and a combination thereof.

Meanwhile, these are represented by using the representative structure represented by Formula (W15) in the present specification, showing that such a mixture is included therein.

Hereinafter, specific examples (representative structure) of the compound of the present invention, which is represented by Formula (1), will be described, but the present invention is not limited to these specific examples.

| Exemplary Compound | Structural Formula |
|---|---|
| 1 | (structure) |
| 2 | (structure) |
| 3 | (structure) |

-continued

| Exemplary Compound | Structural Formula |
|---|---|
| 4 | (structure) |
| 5 | (structure) |

-continued

| Exemplary Compound | Structural Formula |
|---|---|
| 6 | (structure) |
| 7 | (structure) |
| 8 | (structure) |

| Exemplary Compound | Structural Formula |
|---|---|
| 9 | (structure) |
| 100 | (structure) |
| 111 | (structure) |

-continued

| Exemplary Compound | Structural Formula |
|---|---|
| 12 2 | |
| 13 | |
| 14 | |

-continued

| Exemplary Compound | Structural Formula |
|---|---|
| 15 | |
| 16 | |
| 17 | |

-continued
| Exemplary Compound | Structural Formula |
|---|---|
| 18 | 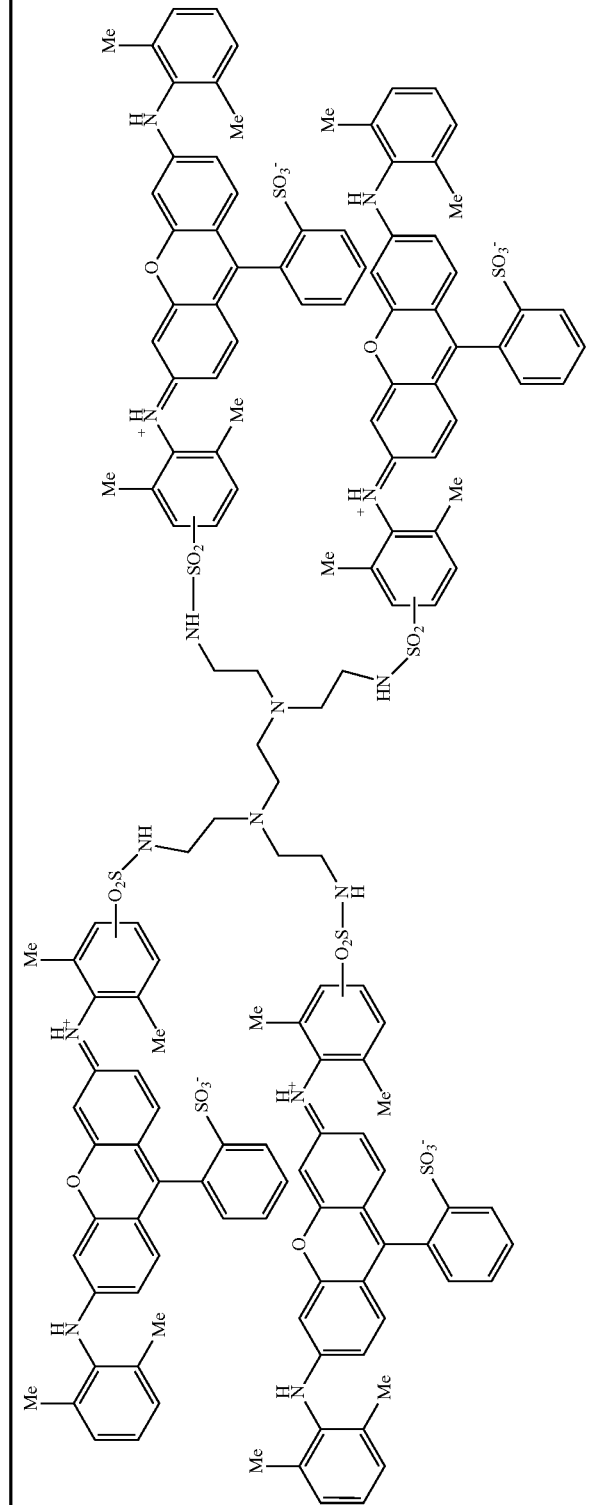 |

Exemplary Compound 1-1: Reaction mixture including the following structure, obtained by reacting Compound A (2 moles) and 4,4'-diaminostilben-2,2'-disulfonic acid (1 mole) at this ratio, and then hydrolyzing unreacted sulfonyl=chloride with sodium hydroxide

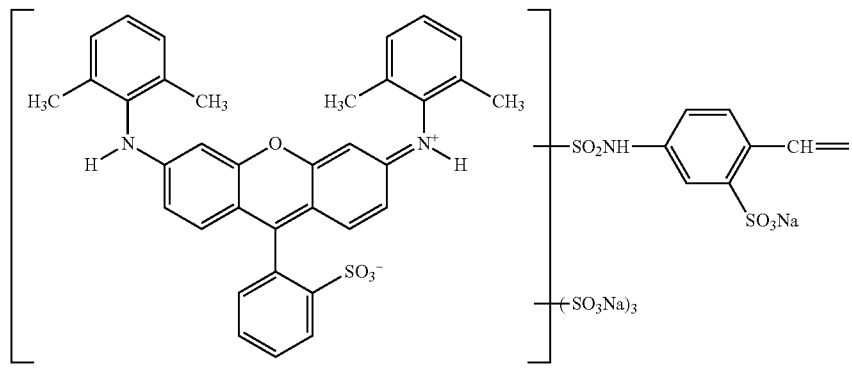

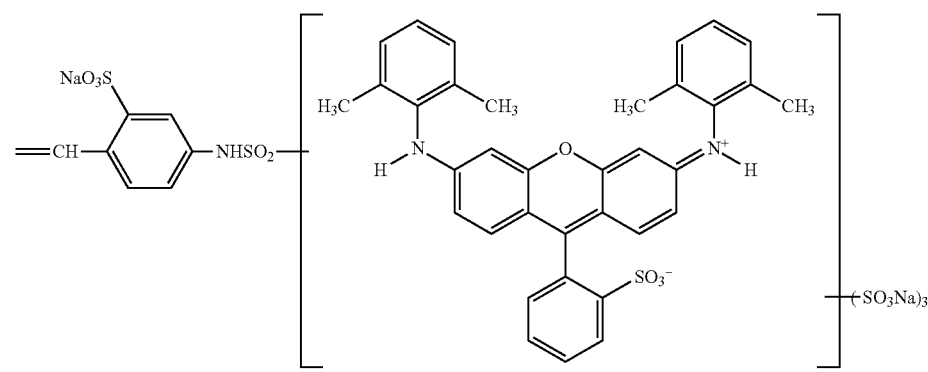

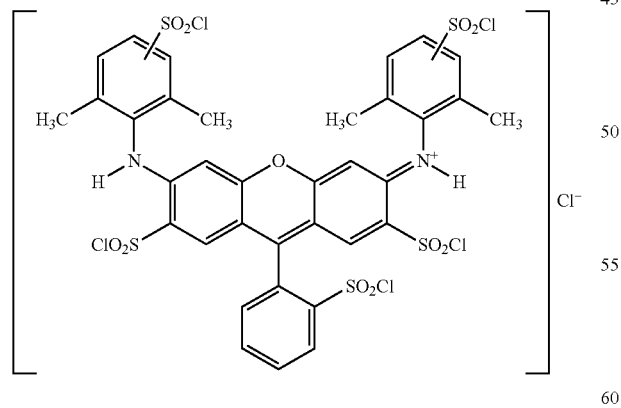

Compound A

Exemplary Compound 1-2: Reaction mixture including the following structure, obtained by reacting Compound A (2 moles) and ethylenediamine (1 mole) at this ratio, and then hydrolyzing unreacted sulfonyl=chloride with sodium hydroxide

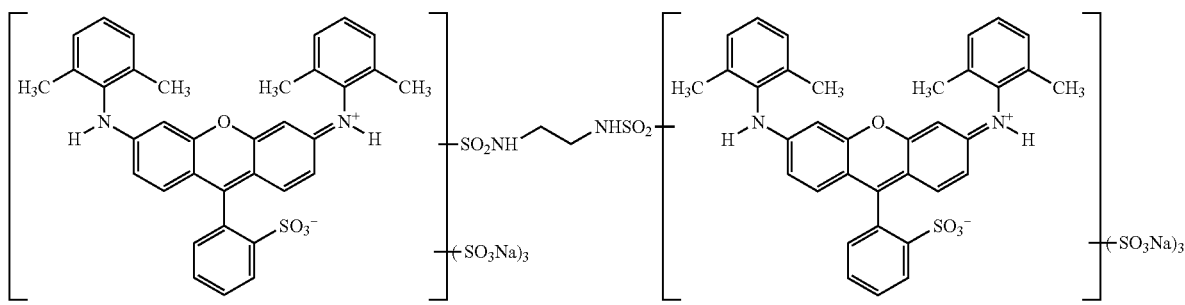

Exemplary Compound 1-3: Reaction mixture including the following structure, obtained by reacting Compound A (2 moles) and piperazine (1 mole) at this ratio, and then hydrolyzing unreacted sulfonyl=chloride with sodium hydroxide

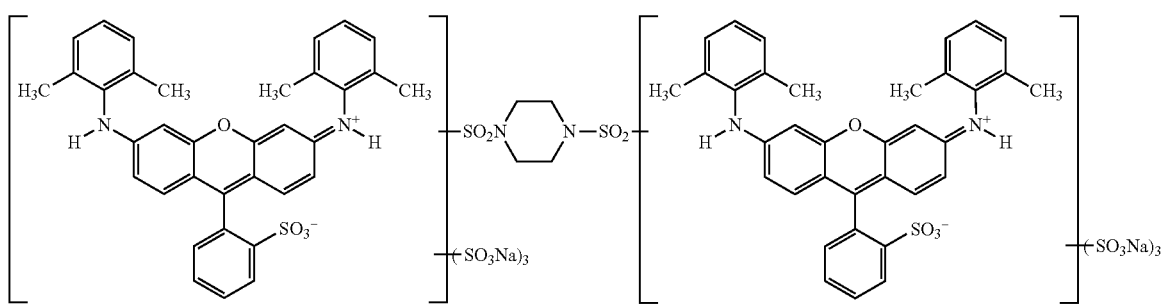

Exemplary Compound 1-4: Reaction mixture including the following structure, obtained by reacting Compound A (2 moles) and 2,5-dimethylpiperazine (1 mole) at this ratio, and then hydrolyzing unreacted sulfonyl=chloride with sodium hydroxide

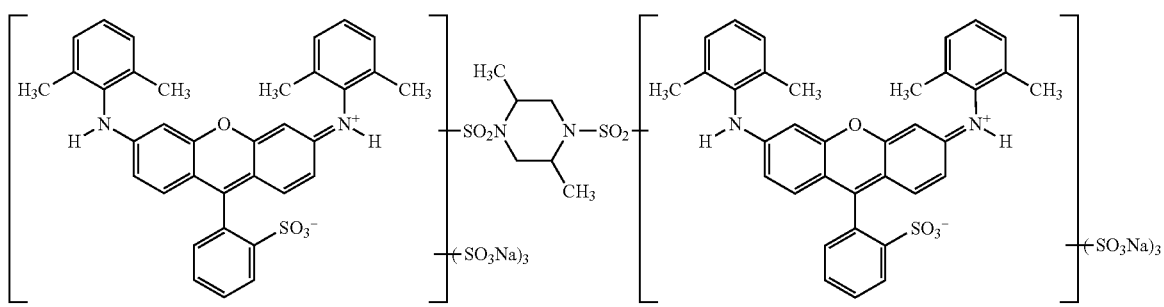

Exemplary Compound 1-5: Reaction mixture including the following structure, obtained by reacting Compound A (2 moles) and 1-(2-aminoethyl)piperazine (1 mole) at this ratio, and then hydrolyzing unreacted sulfonyl=chloride with sodium hydroxide

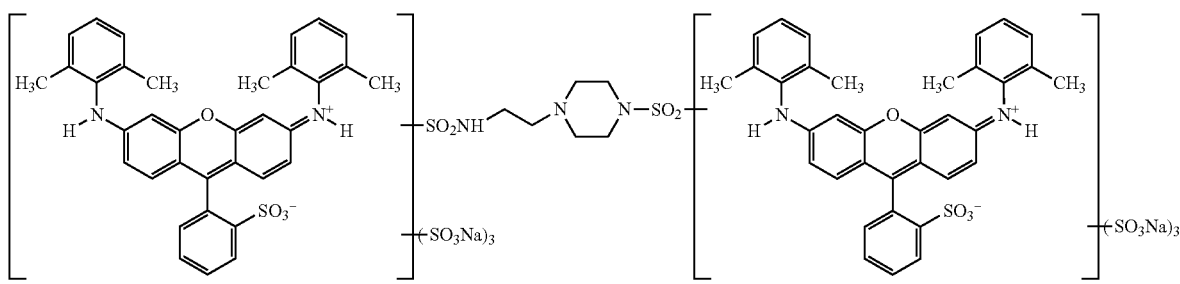

Exemplary Compound 1-6: Reaction mixture including the following structure, obtained by reacting Compound A (2 moles) and 1,4-bis(3-aminopropyl)piperazine (1 mole) at this ratio, and then hydrolyzing unreacted sulfonyl=chloride with sodium hydroxide

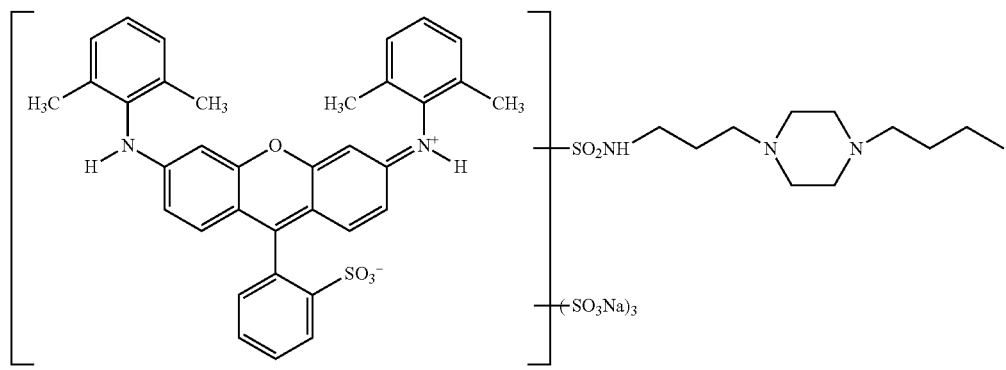

Exemplary Compound 1-7: Reaction mixture including the following structure, obtained by reacting Compound A (2 moles) and 1,2-cyclohexanediamine (1 mole) at this ratio, and then hydrolyzing unreacted sulfonyl=chloride with sodium hydroxide

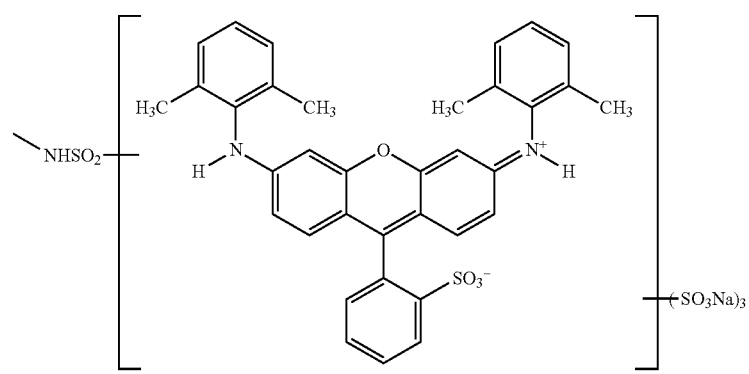

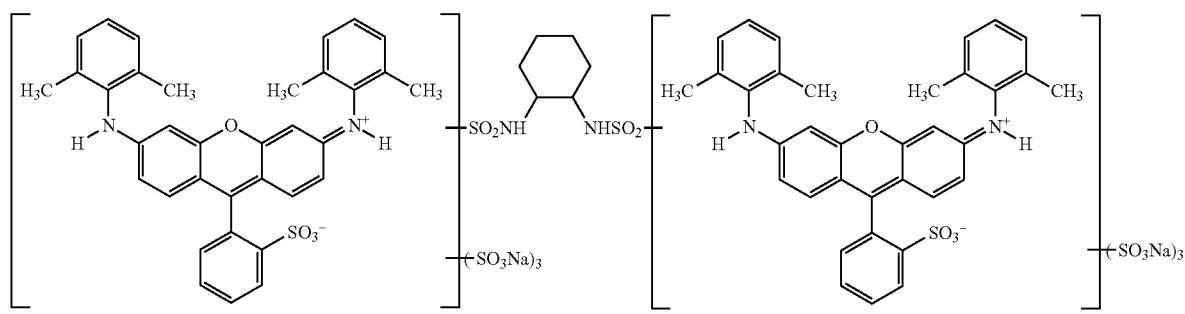

Exemplary Compound 1-8: Reaction mixture including the following structure, obtained by reacting Compound A (2 moles) and 1,3-cyclohexanediamine (1 mole) at this ratio, and then hydrolyzing unreacted sulfonyl=chloride with sodium hydroxide

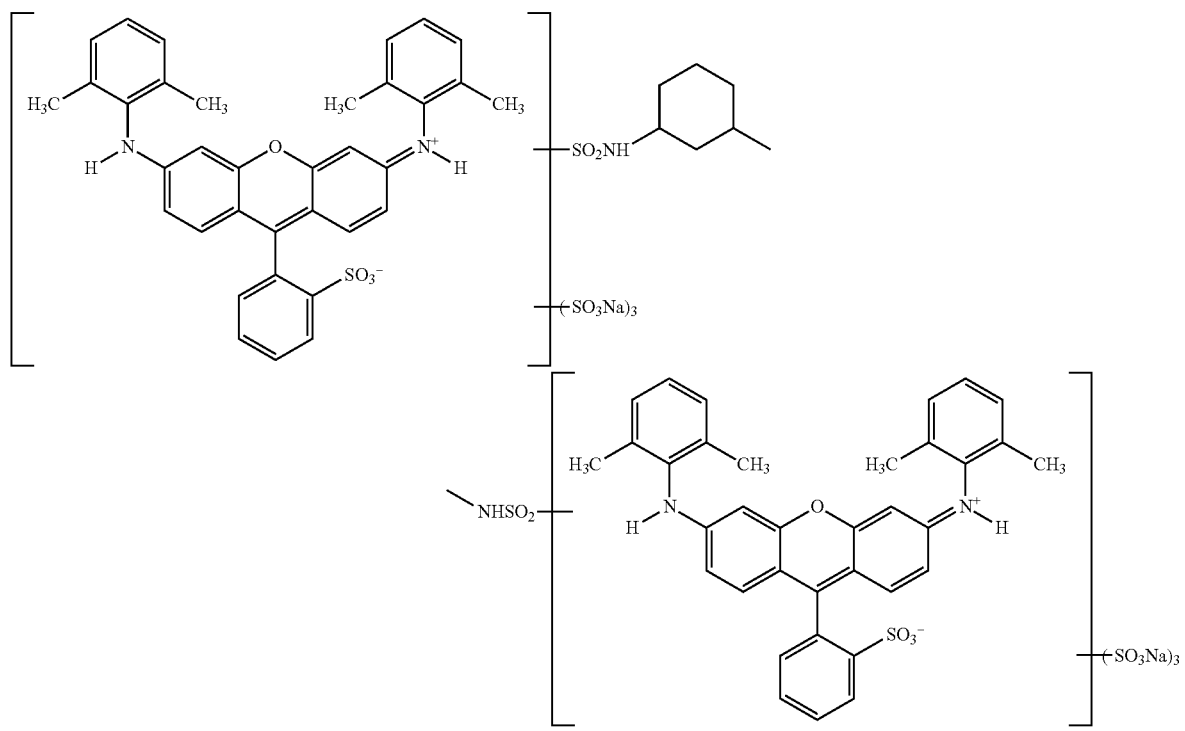

Exemplary Compound 1-9: Reaction mixture including the following structure, obtained by reacting Compound A (2 moles) and 1,4-cyclohexanediamine (1 mole) at this ratio, and then hydrolyzing unreacted sulfonyl=chloride with sodium hydroxide Exemplary Compound 1-10: Reaction mixture including the following structure, obtained by reacting Compound A (2 moles) and m-phenylenediamine (1 mole) at this ratio, and then hydrolyzing unreacted sulfonyl=chloride with sodium hydroxide

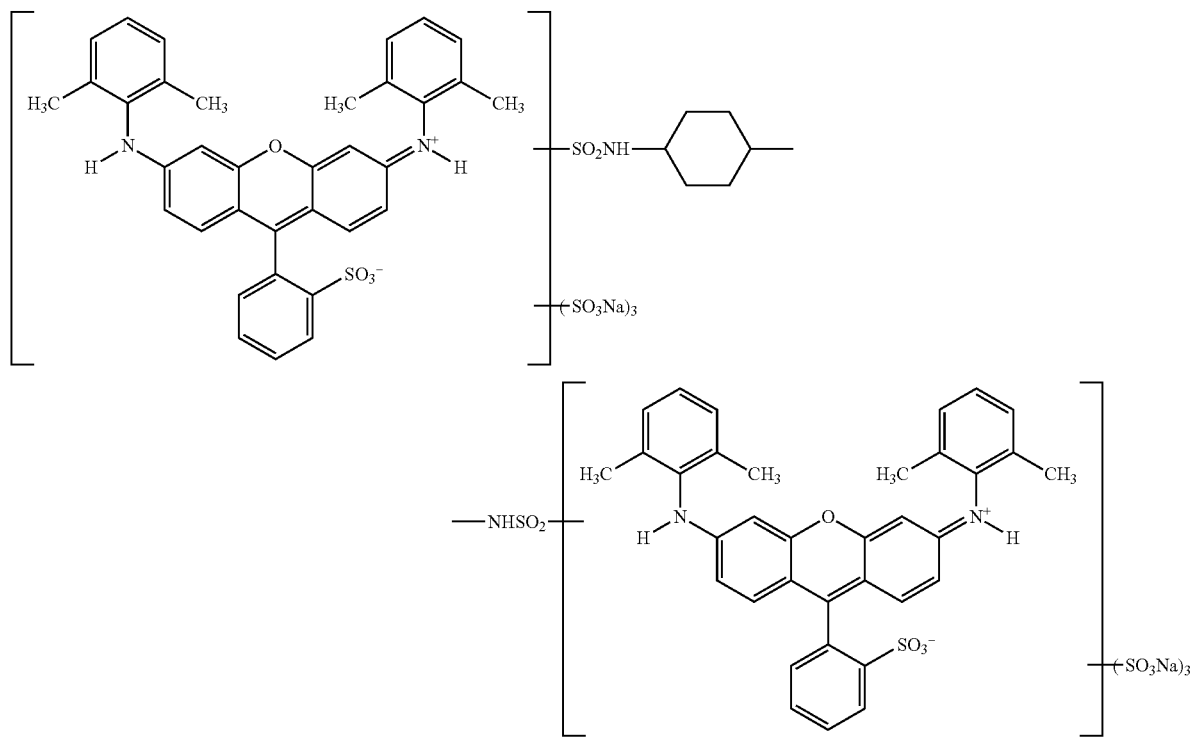

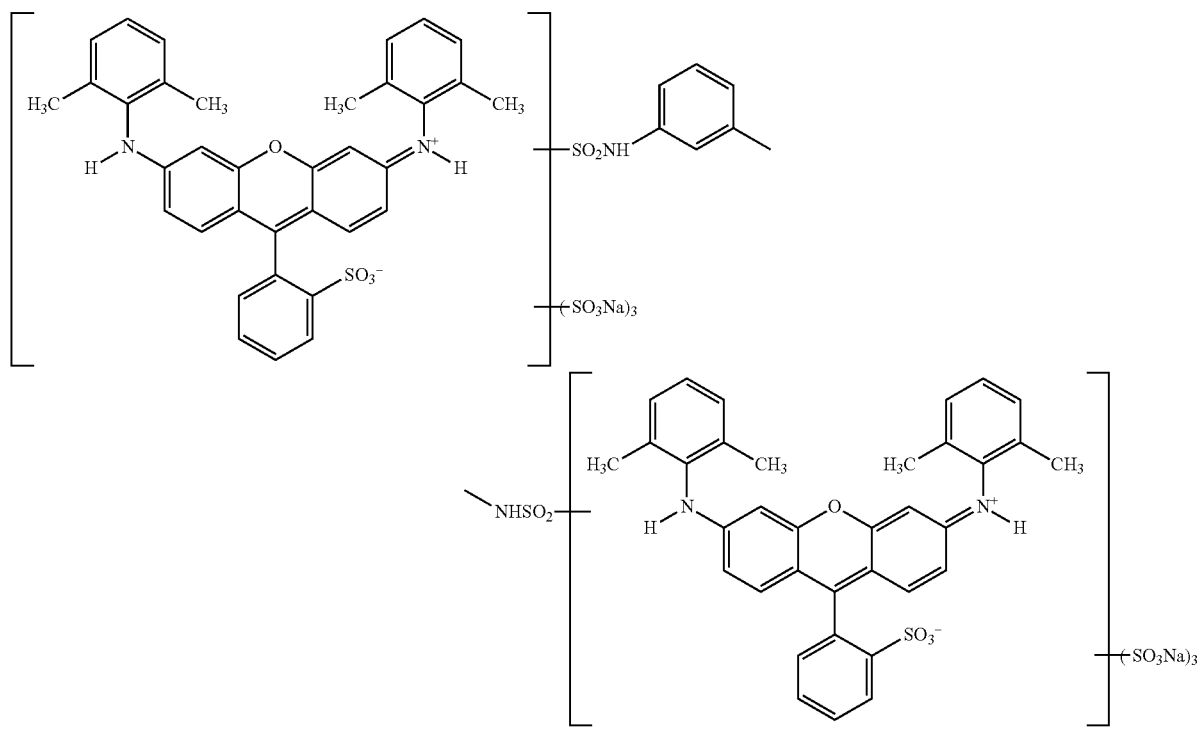
Exemplary Compound 1-11: Reaction mixture including the following structure, obtained by reacting Compound A (2 moles) and p-xylylenediamine (1 mole) at this ratio, and then hydrolyzing unreacted sulfonyl=chloride with sodium hydroxide
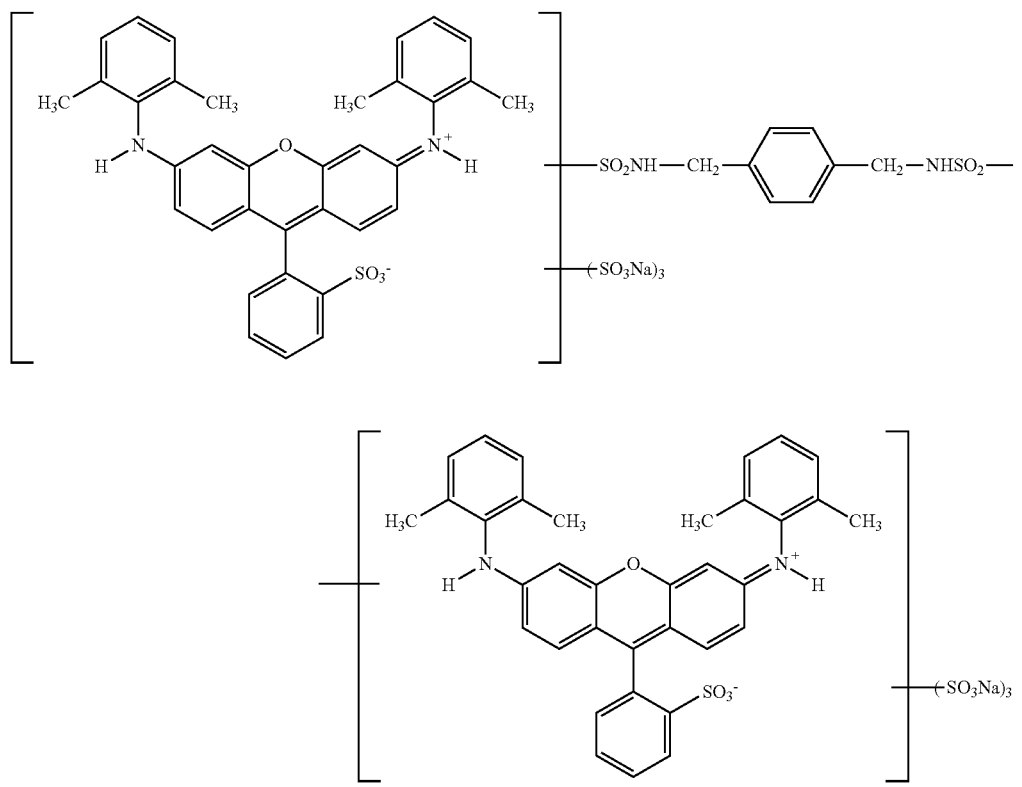

Exemplary Compound 1-12: Reaction mixture including the following structure, obtained by reacting Compound A (2 moles) and disodium 4,6-di(2-aminoethylamino)-1,3,5-triazin-2-ylaminobenzene-2,5-disulfonate (1 mole) at this ratio, and then hydrolyzing unreacted sulfonyl=chloride with sodium hydroxide

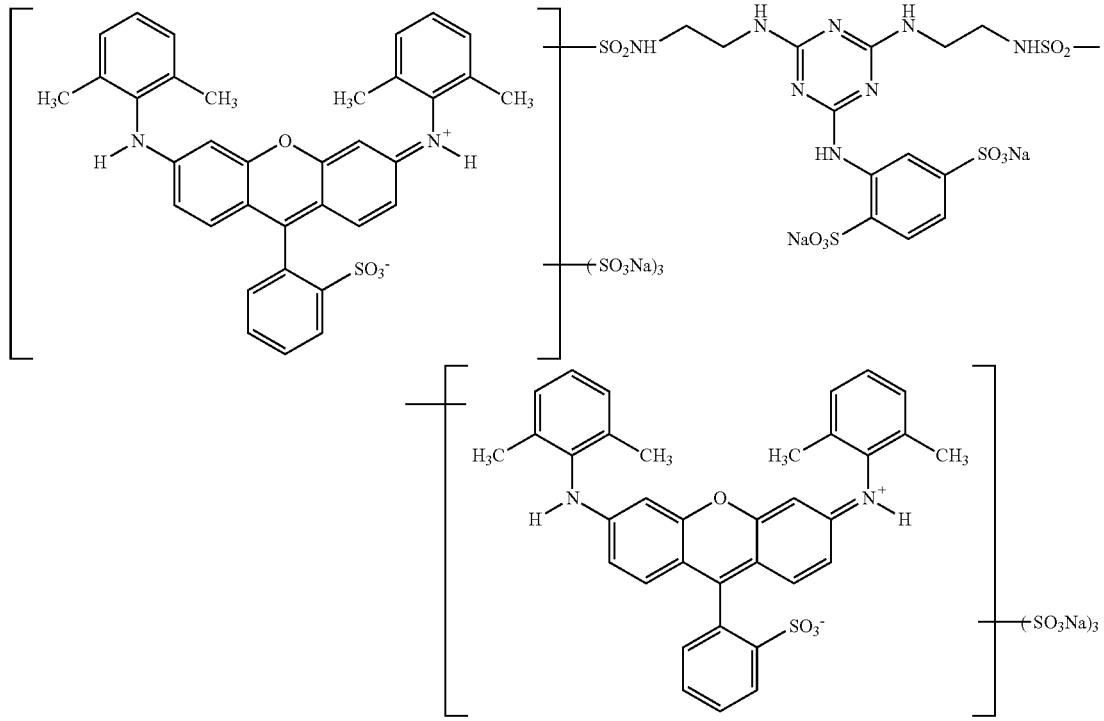

Exemplary Compound 1-13: Reaction mixture including the following structure, obtained by reacting Compound A (2 moles) and disodium 4,6-di(2-aminoethylamino)-1,3,5-triazin-2-ylaminoisophthalate (1 mole) at this ratio, and then hydrolyzing unreacted sulfonyl=chloride with sodium hydroxide

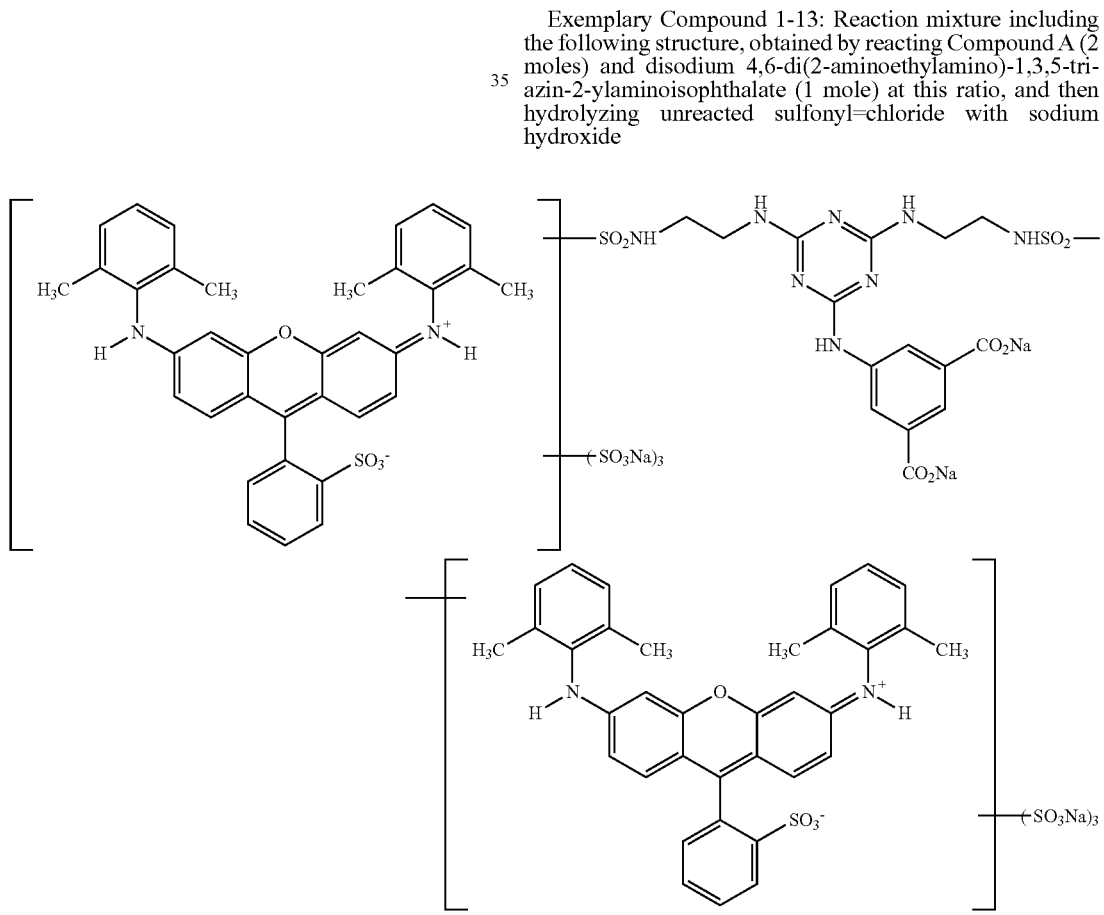

Exemplary Compound 1-14: Reaction mixture including the following structure, obtained by reacting Compound A (2 moles) and 4,6-di(2-aminoethylamino)-2-hydroxy-1,3,5-triazine (1 mole) at this ratio, and then hydrolyzing unreacted sulfonyl=chloride with sodium hydroxide
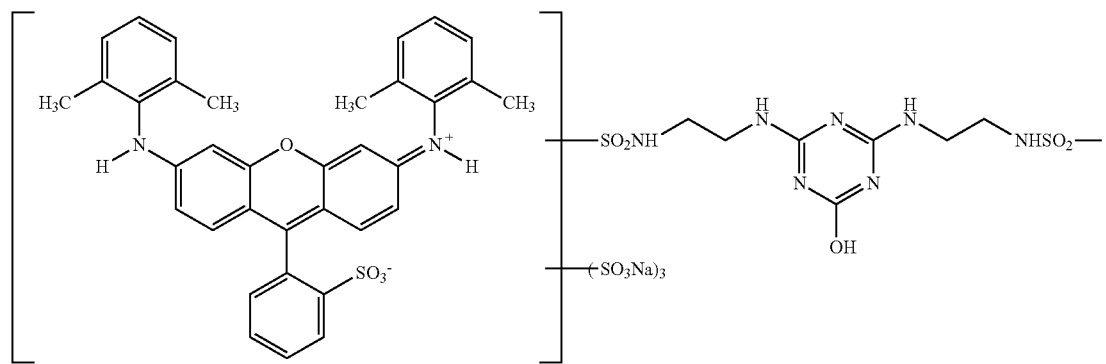
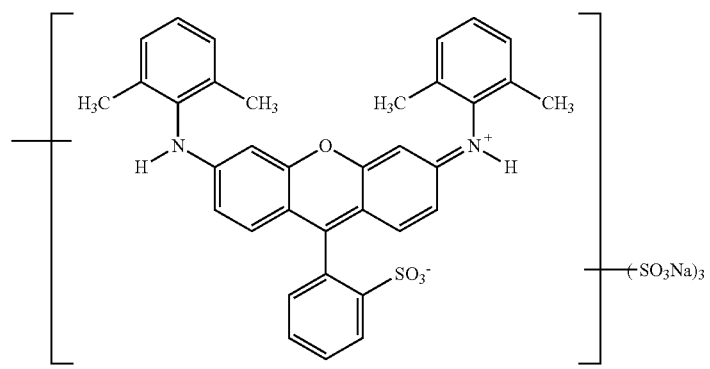
Exemplary Compound 1-15:
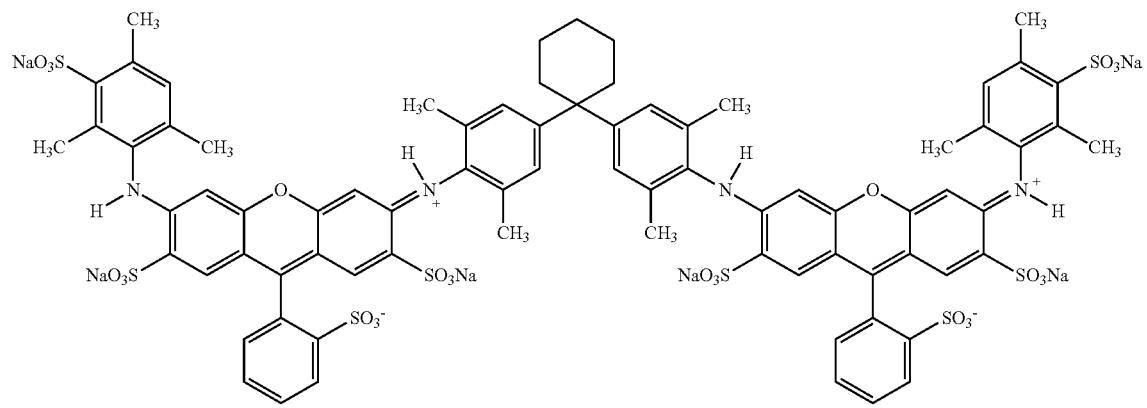

Exemplary Compound 1-16:
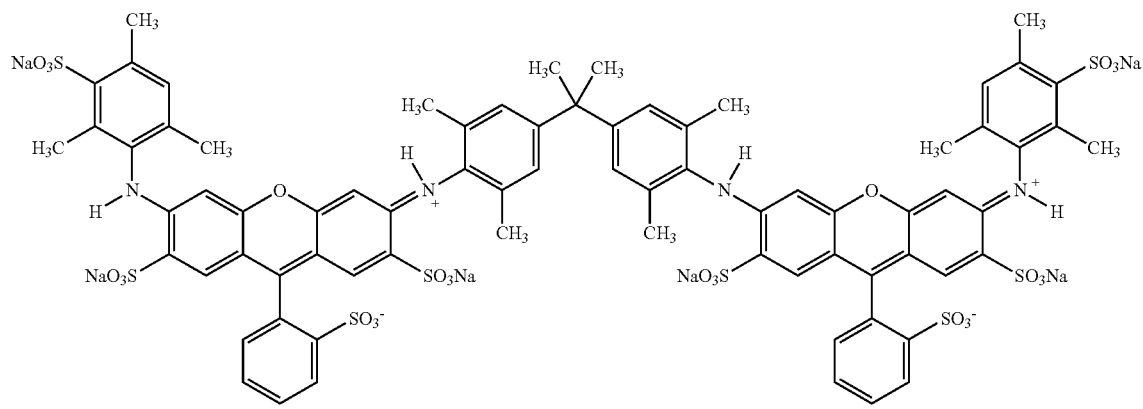
Exemplary Compound 1-17: Reaction mixture including the following structure, obtained by reacting Compound B (2 moles) and 4,4'-diaminostilbene-2,2'-disulfonic acid (1 mole) at this ratio, and then hydrolyzing unreacted sulfonyl=chloride with sodium hydroxide
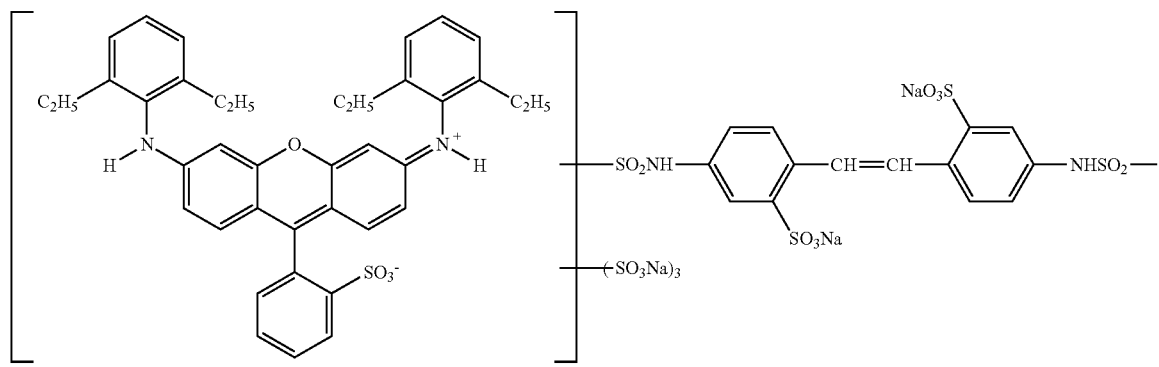
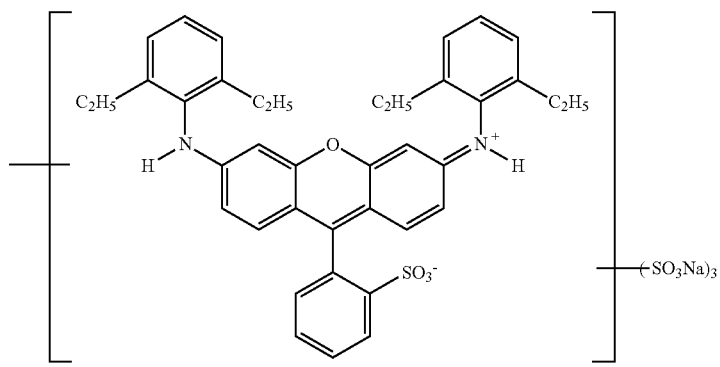

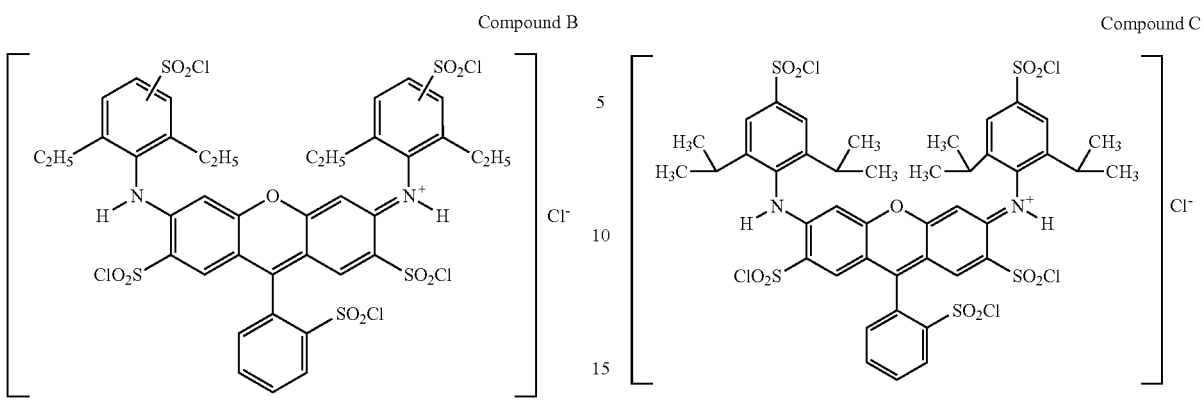

Exemplary Compound 1-18: Reaction mixture including the following structure, obtained by reacting Compound C (2 moles) and 4,4'-diaminostilbene-2,2'-disulfonic acid (1 mole) at this ratio, and then hydrolyzing unreacted sulfonyl=chloride with sodium hydroxide Exemplary Compound 1-19: Reaction mixture including the following structure, obtained by reacting Compound D (2 moles) and 4,4'-diaminostilbene-2,2'-disulfonic acid (1 mole) at this ratio, and then hydrolyzing unreacted sulfonyl=chloride with sodium hydroxide

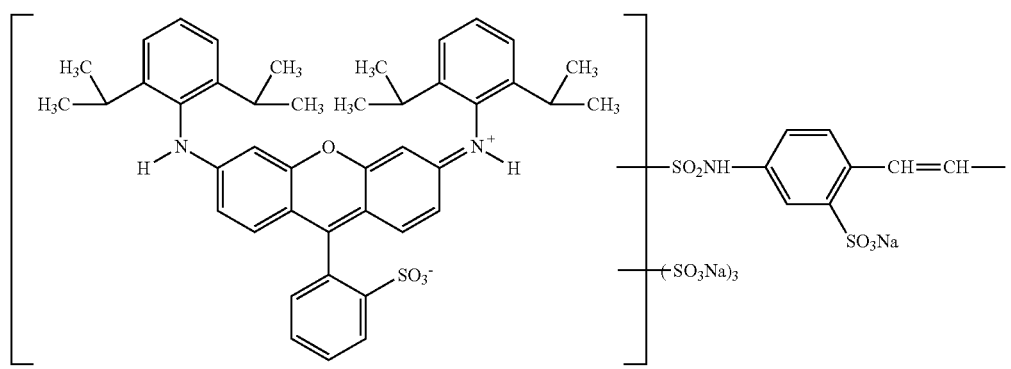

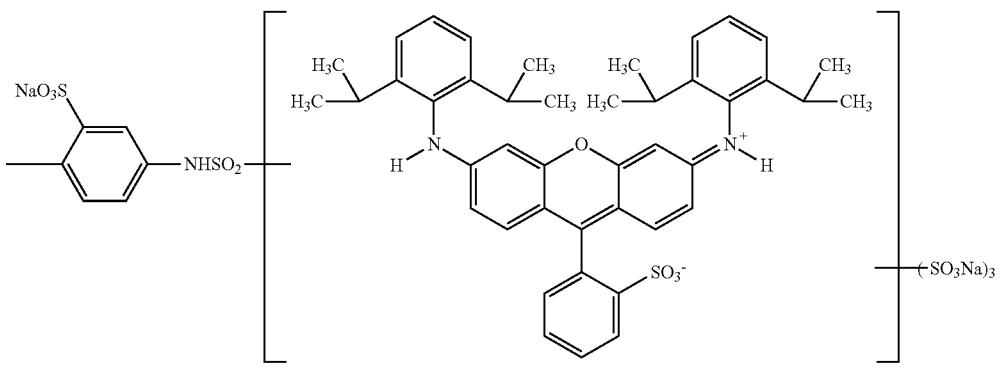

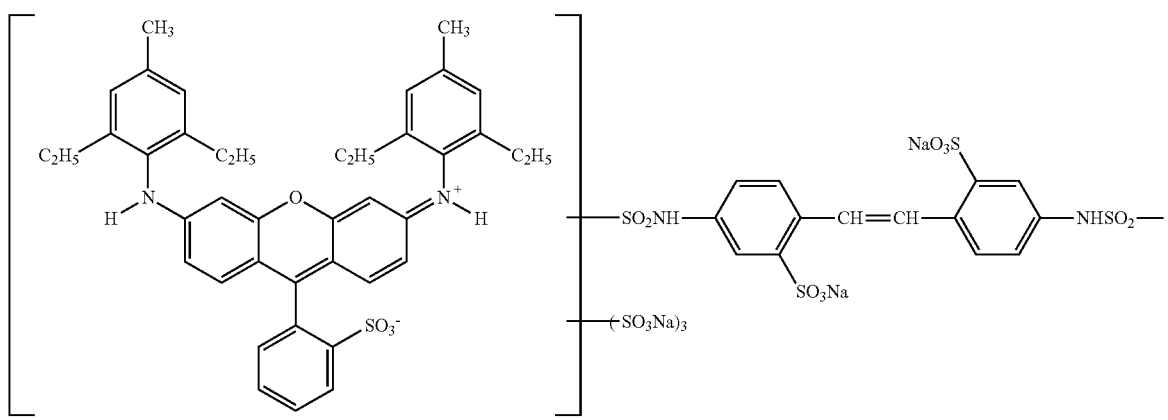
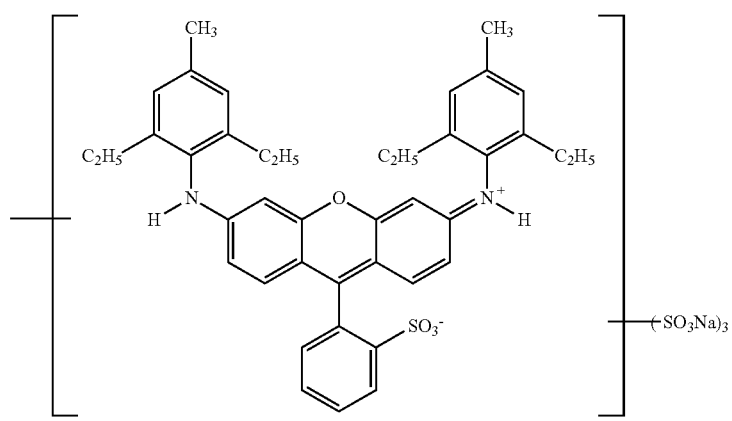
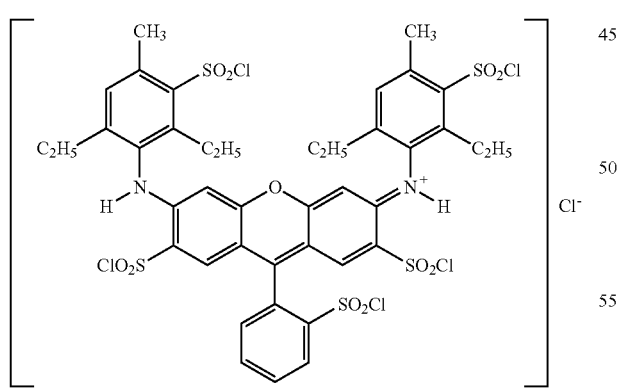
Compound D
Exemplary Compound 1-20: Reaction mixture including the following structure, obtained by reacting Compound A (1 mole), Compound B (1 mole) and 4,4'-diaminostilbene-2,2'-disulfonic acid (1 mole) at this ratio, and then hydrolyzing unreacted sulfonyl=chloride with sodium hydroxide

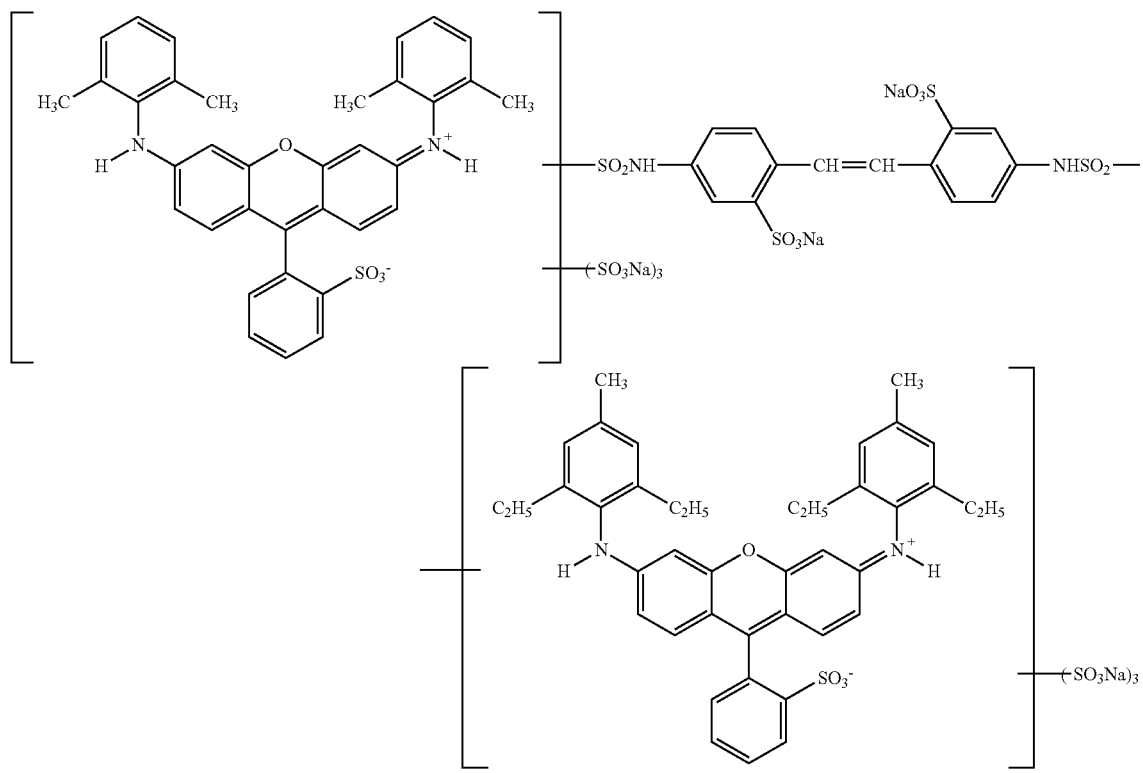
Exemplary Compound 1-21: Reaction mixture including the following structure, obtained by reacting Compound A (2 moles) and 4,4'-diaminostilbene-2,2'-disulfonic acid (1 mole) at this ratio, and then hydrolyzing unreacted sulfonyl=chloride with lithium hydroxide
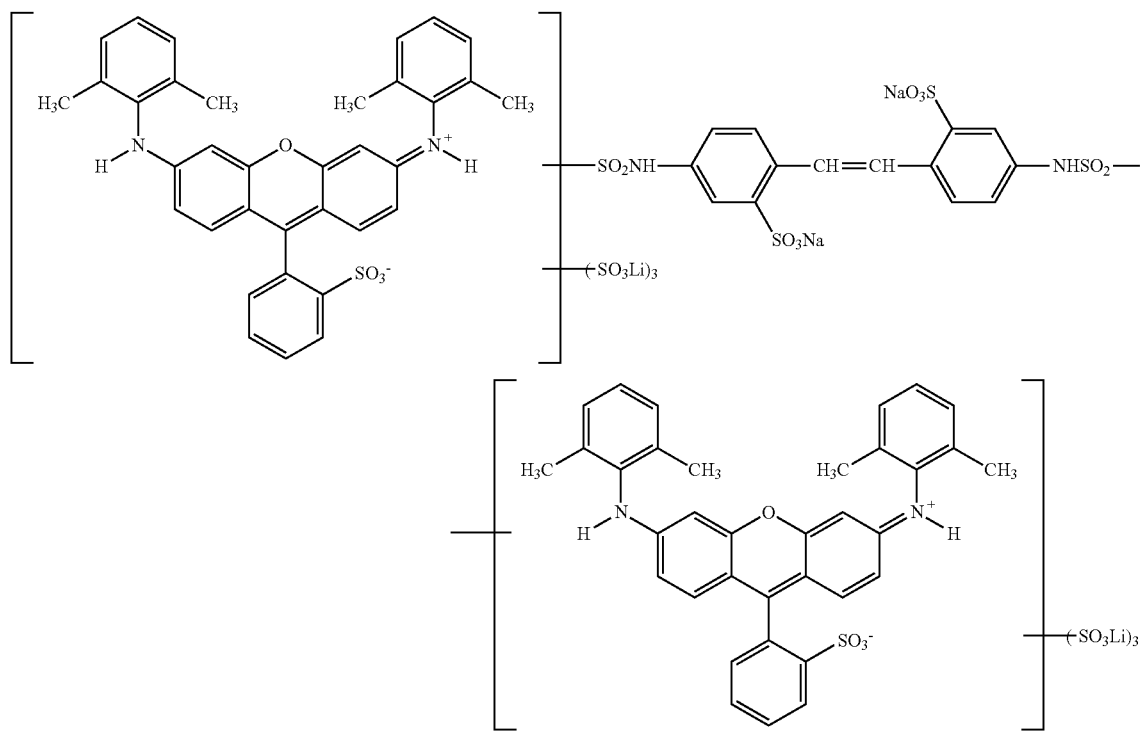

Exemplary Compound 1-22: Reaction mixture including the following structure, obtained by reacting Compound A (2 moles) and 4,4'-diaminostilbene-2,2'-disulfonic acid (1 mole) at this ratio, and then hydrolyzing unreacted sulfonyl=chloride with potassium hydroxide

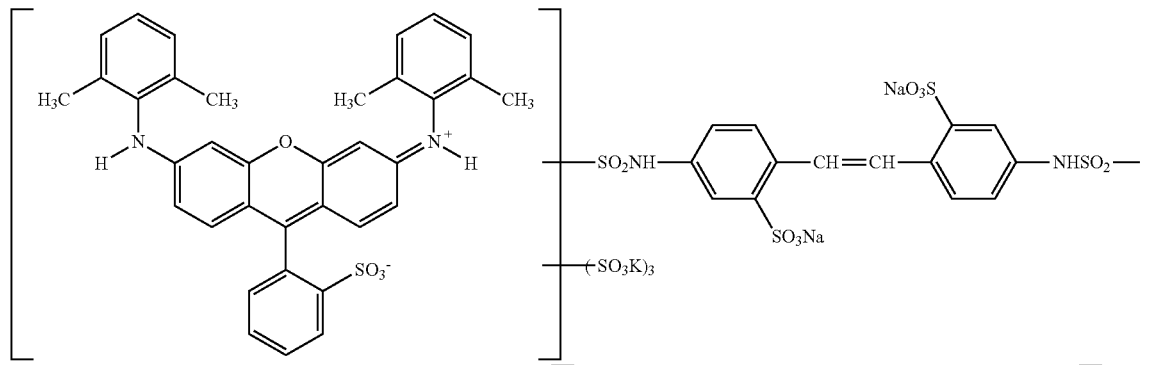

Exemplary Compound 1-23: Reaction mixture including the following structure, obtained by reacting Compound A (2 moles) and 4,4'-diaminostilbene-2,2'-disulfonic acid (1 mole) at this ratio, hydrolyzing unreacted sulfonyl=chloride with sodium hydroxide; and being converted into an ammonium salt by using an ion exchange resin

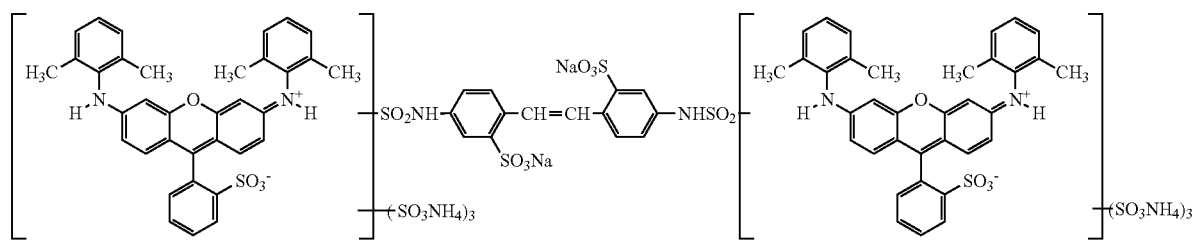

Exemplary Compound 1-24: Reaction mixture including the following structure, obtained by reacting Compound E (2 moles) and 4,4'-diaminostilbene-2,2'-disulfonic acid (1 mole) at this ratio, and then hydrolyzing unreacted sulfonyl=chloride with sodium hydroxide

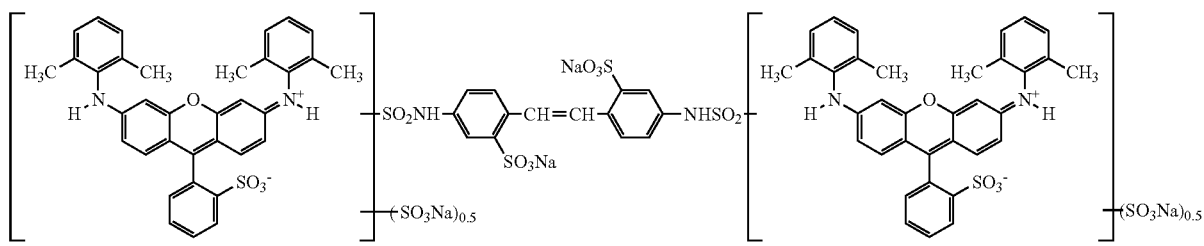

Compound E: Approximately 1:1 mixture of Compounds E1 and E2

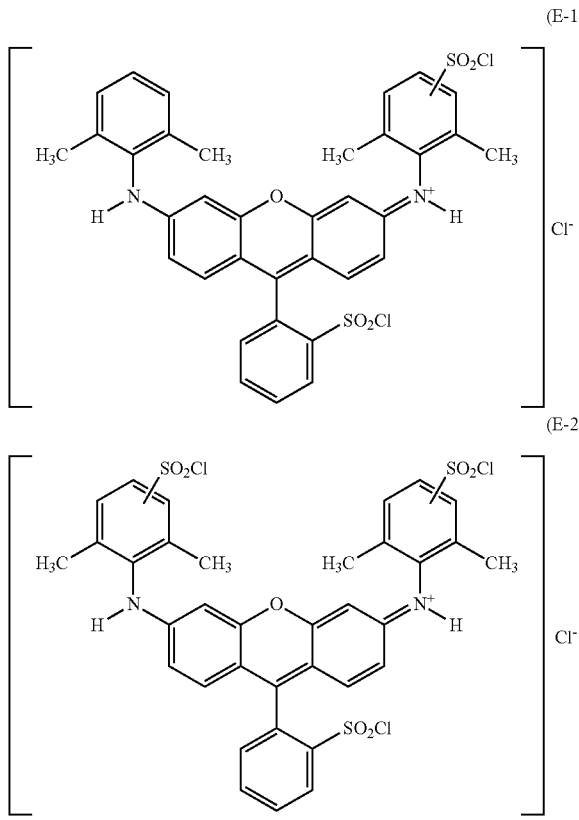

Exemplary Compound 1-25: Reaction mixture including the following structure, obtained by reacting Compound E (2 moles) and disodium 4,6-di(2-aminoethylamino)-1,3,5-triazin-2-ylaminoisophthalate (1 mole) at this ratio, and then hydrolyzing unreacted sulfonyl=chloride with sodium hydroxide

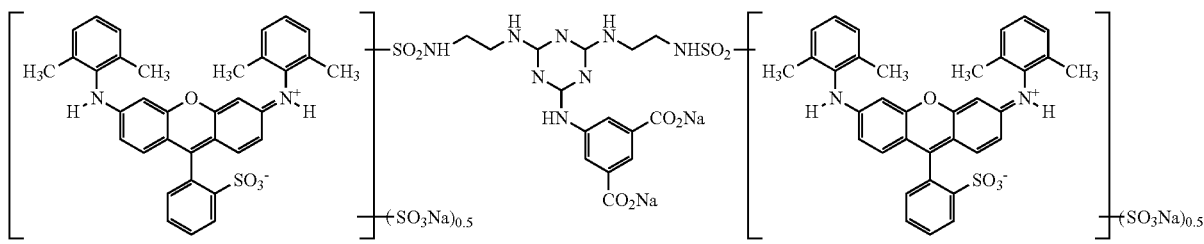

[Compound Represented by Formula (A4)]

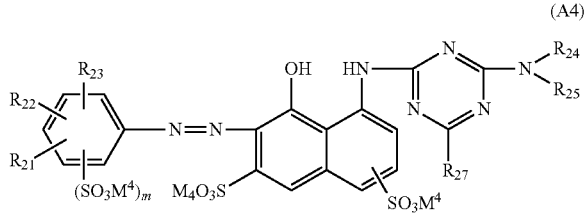

(A4)

In Formula (A4), $R_{21}$, $R_{22}$ and $R_{23}$ each independently represent a hydrogen atom, a substituted or unsubstituted alkyl group having 1 to 9 carbon atoms, an alkoxy group having 1 to 9 carbon atoms, a halogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group having 1 to 9 carbon atoms, an arylsulfonyl group having 6 to 15 carbon atoms, a carboxyl group or a carboxylic acid ester group.

m represents 0, 1 or 2.

$R_{27}$ represents a substituted or unsubstituted amino group, or $-OR_{26}$.

$R_{24}$, $R_{25}$ and $R_{26}$ each independently represent a hydrogen atom, a substituted or unsubstituted alkyl group having 1 to 18 carbon atoms, a substituted or unsubstituted alkenyl group having 2 to 18 carbon atoms, a substituted or unsubstituted aryl group, a substituted or unsubstituted aralkyl group or a substituted or unsubstituted heterocyclic group.

$M^4$ represents a hydrogen atom or a counter cation. $M^{4}$'s may be the same or different.

In Formula (A4), $R_{21}$, $R_{22}$ and $R_{23}$ each independently represent a hydrogen atom, a substituted or unsubstituted alkyl group having 1 to 9 carbon atoms, an alkoxy group having 1 to 9 atoms, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group having 1 to 9 carbon atoms, an arylsulfonyl group having 6 to 15 carbon atoms, a carboxyl group or a carboxylic acid ester group.

The alkyl group having 1 to 9 carbon atoms may be any one of straight, branched or cyclic (a cycloalkyl group) alkyl group, and examples thereof include a methyl group, an ethyl group, an n-propyl group, an isopropyl group, an n-butyl group, a cyclohexyl group and the like.

The alkyl group having 1 to 9 carbon atoms is preferably a straight or branched alkyl group, and more preferably a straight or branched alkyl group having 1 to 4 carbon atoms.

The alkyl group may have a substituent, examples of the substituent include the substituents described in Group A of substituents, and preferred examples thereof include a halogen atom, an amino group and the like. These substituents may be further substituted with the substituents described in Group A of substituents.

Examples of the alkyl group having a substituent include a trifluoromethyl group, a dimethylaminomethyl group and the like.

Examples of the alkoxy group having 1 to 9 carbon atoms include a methoxy group, an ethoxy group, an isopropoxy group, an n-butoxy group and the like, an alkoxy group having 1 to 4 carbon atoms is preferred, and a methoxy group or an ethoxy group is more preferred.

Examples of the halogen atom include a fluorine atom, a chlorine atom, a bromine atom and the like, and a chlorine atom is preferred.

Examples of the carbamoyl group include a carbamoyl group having a substituent in addition to an unsubstituted carbamoyl group.

Examples of the substituent include the substituents described in Group A of substituents, and preferred examples thereof include an alkyl group, an aryl group and the like.

Examples of the carbamoyl group having a substituent include an N,N-dimethylcarbamoyl group, a phenylcarbamoyl group and the like.

Examples of the sulfamoyl group include a sulfamoyl group having a substituent in addition to an unsubstituted sulfamoyl group.

Examples of the substituent include the substituents described in Group A of substituents, and preferred examples thereof include an alkyl group, an aryl group and the like.

These substituents may be further substituted with the substituents described in Group A of substituents.

Examples of the sulfamoyl group having a substituent include an N-methylsulfamoyl group, an N-ethylsulfamoyl group, an N-ethyl-N-phenylsulfamoyl group, an N,N-dimethylsulfamoyl group, a p-carboxyphenylsulfamoyl group and the like.

Examples of the amino group include an amino group having a substituent in addition to an unsubstituted amino group.

Examples of the substituent include the substituents described in Group A of substituents, and preferred examples thereof include an alkyl group, a carbamoyl group, an acyl group and the like.

Examples of the amino group having a substituent include an N-methylamino group, a carbamoylamino group, an N,N-diethylamino group, an acetylamino group and the like.

Examples of the sulfonic acid ester group include an alkyloxysulfonyl group, an aryloxysulfonyl group and the like, and for example, a phenoxysulfonyl group and the like.

The alkylsulfonyl group having 1 to 9 carbon atoms is preferably an alkylsulfonyl group having 1 to 4 carbon atoms, and examples thereof include a methylsulfonyl group, an ethylsulfonyl group and the like.

The alkylsulfonyl group having 1 to 9 carbon atoms may further have a substituent, examples of the substituent include the substituents described in Group A of substituents, and preferred examples thereof include an aryl group, a hydroxyl group and the like.

Examples of the alkylsulfonyl group having a substituent include a hydroxyethylsulfonyl group, a benzylsulfonyl group and the like.

Examples of the arylsulfonyl group having 6 to 15 carbon atoms include a phenylsulfonyl group and the like.

Examples of the carboxylic acid ester group include an alkyloxycarbonyl group, an aryloxycarbonyl group and the like, an alkyloxycarbonyl group is preferred, and examples thereof include a methoxycarbonyl group and the like.

For reasons of the availability of raw materials and hue, light fastness, ozone resistance and moisture resistance in a printed matter, $R_{21}$, $R_{22}$ and $R_{23}$ are each independently preferably an alkyl group having 1 to 3 carbon atoms, a halogen atom, a hydrogen atom or a carboxyl group, more preferably a halogen atom, a hydrogen atom or a carboxyl group, and even more preferably a hydrogen atom or a carboxyl group.

Furthermore, it is preferred that one or two of $R_{21}$, $R_{22}$ and $R_{23}$ is or are a hydrogen atom.

In Formula (A4), m represents 0, 1 or 2.

For a reason of striking a balance between both moisture resistance and water solubility, m is preferably 0 or 1, and more preferably 0.

In Formula (A4), $R_{24}$, $R_{25}$ and $R_{26}$ each independently represents a hydrogen atom, a substituted or unsubstituted alkyl group having 1 to 18 carbon atoms, a substituted or unsubstituted alkenyl group having 2 to 18 carbon atoms, a substituted or unsubstituted aryl group, a substituted or unsubstituted aralkyl group or a substituted or unsubstituted heterocyclic group.

The alkyl group having 1 to 18 carbon atoms may be any one of straight, branched or cyclic (a cycloalkyl group) alkyl group, and examples thereof include a methyl group, an ethyl group, an n-propyl group, an isopropyl group, an n-butyl group, a t-butyl group, an n-hexyl group, an n-octyl group, an ethylhexyl group, a methylbutyl group, a cyclohexyl group and the like.

The alkyl group having 1 to 18 carbon atoms is preferably a straight or branched alkyl group, and more preferably a straight or branched alkyl group having 1 to 8 carbon atoms.

The alkyl group may have a substituent, examples of the substituent include the substituents described in Group A of substituents, and preferred examples thereof include an aryl group, a hydroxyl group, a carboxyl group, a carbamoyl group, a mercapto group, a morpholinyl group and the like.

Examples of the alkyl group having a substituent include a hydroxyethyl group, a carboxypropyl group, a carboxycyclohexylmethyl group, a 1-carboxy-2-mercaptoethyl group, a 1-carboxy-2-carbamoyl-ethyl group, a 1-isopropyl-1-carboxymethyl group, a 1,2-dicarboxypropyl group and the like.

The alkenyl group having 2 to 18 carbon atoms is preferably an alkenyl group having 2 to 8 carbon atoms, and examples thereof include a vinyl group, an allyl group and the like.

The alkenyl group may have a substituent, examples of the substituent include the substituents described in Group A of substituents, and preferred examples thereof include an alkyl group, a carboxyl group and the like.

Examples of the alkenyl group having a substituent include a 2-methyl-1-propenyl group and the like.

The aryl group is preferably an aryl group having 6 to 20 carbon atoms, examples thereof include a phenyl group, naphthyl group and the like, and a phenyl group is particularly preferred.

The aryl group may have a substituent, examples of the substituent include the substituents described in Group A of substituents, and preferred examples thereof include an alkyl group, a carboxyl group, a substituted or unsubstituted sulfamoyl group, a substituted or unsubstituted carbamoyl group, a nitro group, a hydroxyl group, a halogen atom and the like.

Examples of the aryl group having a substituent include a 3,4-dicarboxyphenyl group, a 4-butylphenyl group, a 4-carboxyphenyl group and the like.

Examples of the aralkyl group include a benzyl group and the like.

The aralkyl group may have a substituent, examples of the substituent include the substituents described in Group A of substituents, and preferred examples thereof include a hydroxyl group, a carboxyl group and the like. These substituents may be further substituted with the substituents described in Group A of substituents.

Examples of the aralkyl group having a substituent include a 1-carboxy-2-phenyl-ethyl group, a 1-carboxy-2-hydroxyphenylethyl group, a 4-carboxybenzyl group and the like.

Examples of the heterocyclic group include a pyridyl group, a pyrazinyl group, a thienyl group, a thiadiazolyl group, a benzothiazolyl group and the like.

The heterocyclic group may have a substituent, examples of the substituent include the substituents described in Group A of substituents, and preferred examples thereof include an alkyl group, a carboxyl group and the like.

Examples of the heterocyclic group having a substituent include a 2,2,6,6-tetramethylpiperidinyl group and the like.

From the viewpoint of the availability of raw materials, the ease of synthesis, water solubility and moisture resistance, $R_{27}$ preferably represents an unsubstituted amino group or —$OR_{26}$, at least one of $R_{24}$, $R_{25}$ and $R_{26}$ is preferably an alkyl group, an alkenyl group, an aryl group, an aralkyl group or a heterocyclic group, which is substituted with 1 to 4 carboxyl groups, and at least one of $R_{24}$, $R_{25}$ and $R_{26}$ is more preferably an alkyl group, an alkenyl group, an aryl group or an aralkyl group, which is substituted with 1 to 4 carboxyl groups.

Further, it is preferred that one of $R_{24}$ and $R_{25}$ represents a hydrogen atom and the other is an alkyl group, an alkenyl group, an aryl group or an aralkyl group, which is substituted with 1 to 4 carboxyl groups, and it is more preferred that one of $R_{24}$ and $R_{25}$ represents a hydrogen atom and the other is an aryl group which is substituted with 1 to 4 carboxyl groups.

In addition, in order to prepare a recording liquid of a preferred magenta color, it is preferred that $R_{24}$ and $R_{25}$ are each independently a hydrogen atom or a group represented by the following Formula (A4-1).

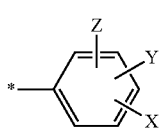

Formula (A4-1)

In Formula (A4-1), X, Y and Z each independently represent a hydrogen atom, a halogen atom, a hydroxyl group, a substituted or unsubstituted alkyl group having 1 to 9 carbon atoms, an alkoxy group having 1 to 9 carbon atoms, a substituted or unsubstituted carbamoyl group, a substituted or unsubstituted sulfamoyl group, a substituted or unsubstituted amino group, a nitro group, a sulfonic acid ester group or a carboxylic acid ester group.

Specific examples and preferred examples of each group which X, Y and Z represent are the same as the specific examples and preferred examples of each group which $R_{21}$, $R_{22}$ and $R_{23}$ represent.

In Formula (A4), $M^4$ represents a hydrogen atom or a counter cation. $M^{4+}$'s may be the same or different.

In Formula (A4), when $M^4$ is a hydrogen atom, the hydrogen atom is in a form of a free acid, and when $M^4$ is a counter cation, the counter cation is in a form of a salt.

Examples of the counter cation that forms a salt include a monovalent counter cation, and the counter cation is preferably an alkali metal ion, an ammonium ion, an organic cation and the like.

Examples of the organic cation include an ammonium ion (for example, an ammonium ion substituted with an alkyl group or a hydroxyalkyl group) having a substituent, and a cation in which a hydrogen ion is added to an organic amine (for example, a cation and the like in which a hydrogen ion is added to a lower alkylamine, a hydroxy-substituted lower alkylamine, a carboxy-substituted lower alkylamine, and a polyamine having from 2 to 10 alkyleneimine units each having from 2 to 4 carbon atoms and the like).

From the viewpoint of water solubility, an alkali metal ion is preferred, and a lithium ion, a sodium ion and a potassium ion are more preferred. In particular, the sodium ion is preferred from the viewpoint of low cost preparation.

In Formula (A4), $M^{4+}$'s may be the same or different. That is, the compound represented by Formula (A4) in a form of a salt includes a case where all sulfo groups are salts, and a case where some sulfo groups are in a form of a free acid and some sulfo groups are salts. Furthermore, the counter cation forming a salt may be present either alone or in plurality.

Further, the same applies to those (for example, a carboxyl group) which may be in a form of a salt as a group other than a sulfo group.

It is particularly preferred that the compound represented by Formula (A4) has 6 or less, preferably 5 or less, and particularly preferably 4 or less of the sum of a sulfo group, a carboxyl group or a group of the salt of an acid thereof in the structure thereof.

The compound used in the present invention may be used in the form of the free acid represented by Formula (A4) as it is, but when the compound is obtained in the form of a salt during the preparation, the compound may be used as it is, and may be modified into the form of a desired salt. In addition, some of the acidic group may be in the form of a salt, and a compound in the form of a salt and a compound in the form of a free acid may be present in a mixed state.

Specific examples of the compound represented by Formula (A4) include, for example, compounds having a structure shown in the following No. 2-1 to 2-58.

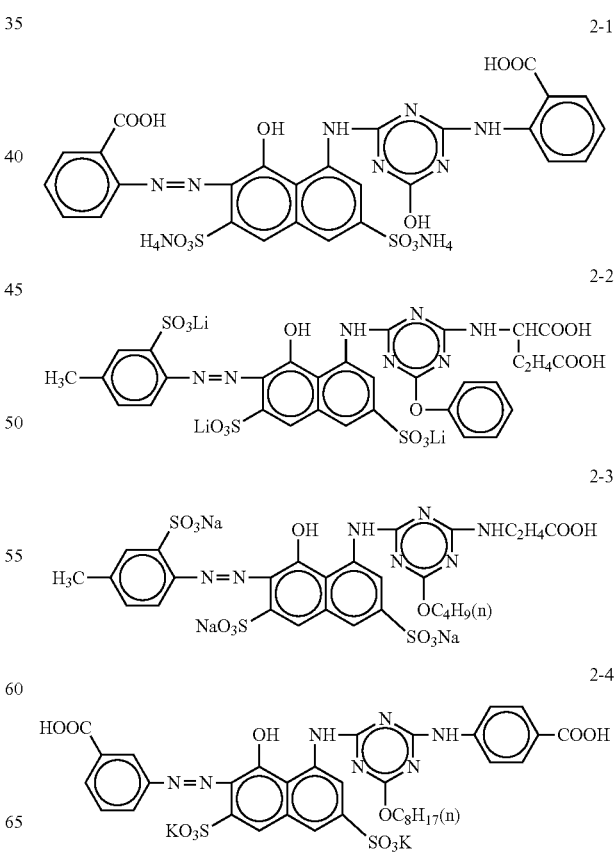

2-5
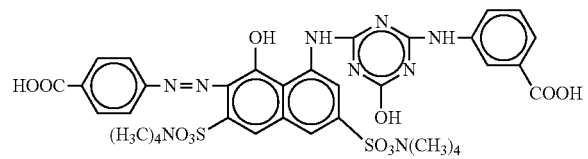
2-6
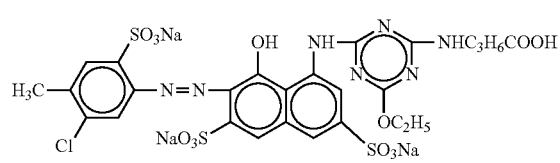
2-7
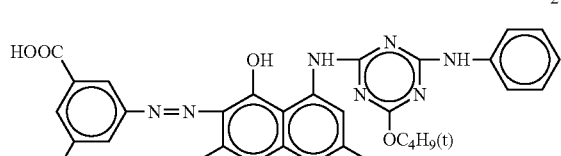
2-8
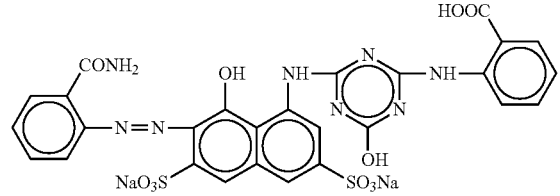
2-9
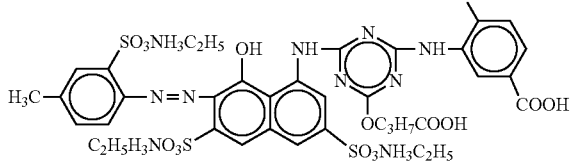
2-10
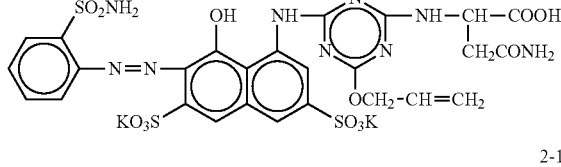
2-11
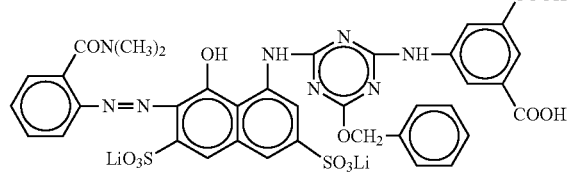
2-12
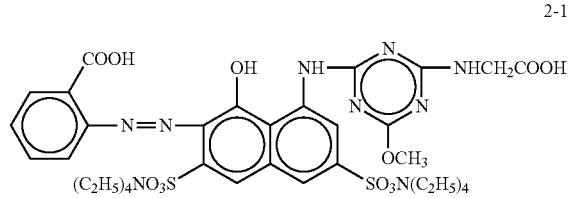
2-13
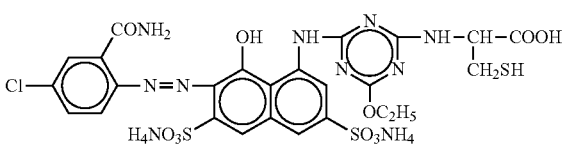
2-14
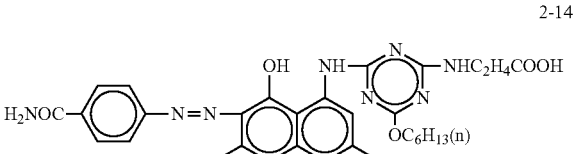
2-15
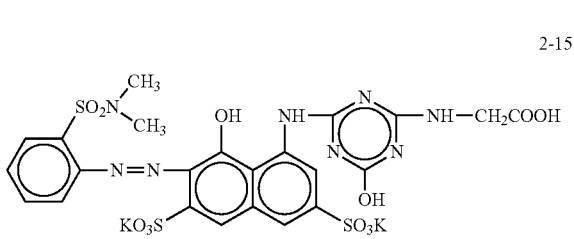
2-16
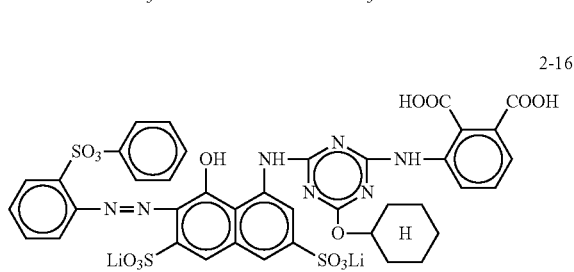
2-17
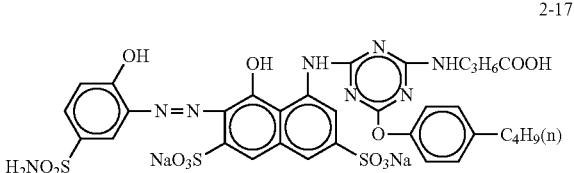
2-18
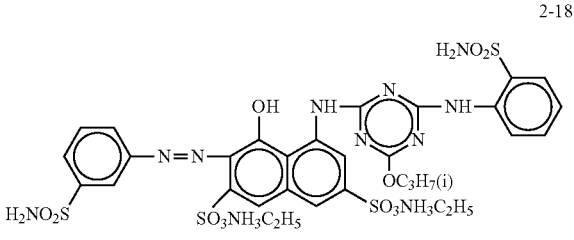
2-19
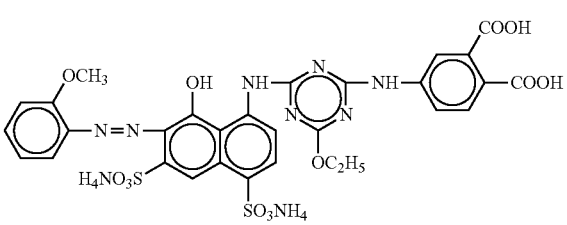

2-20
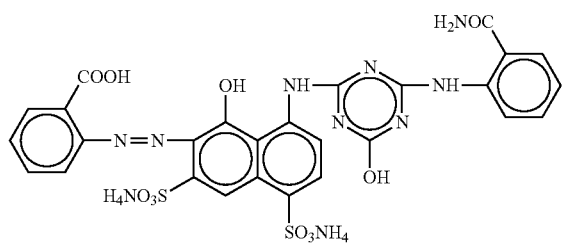
2-21
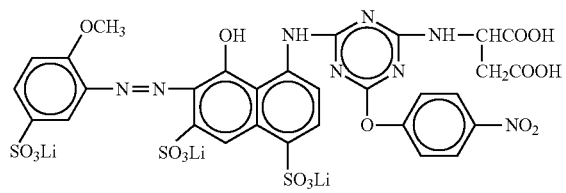
2-22
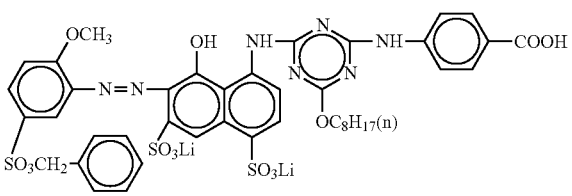
2-23
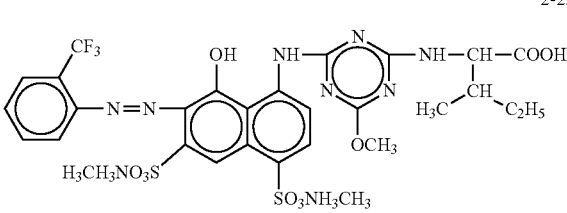
2-24
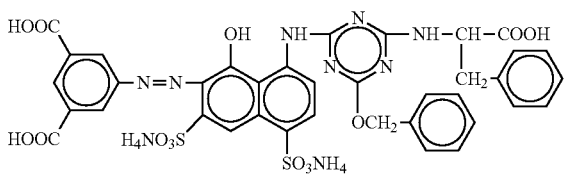
2-25
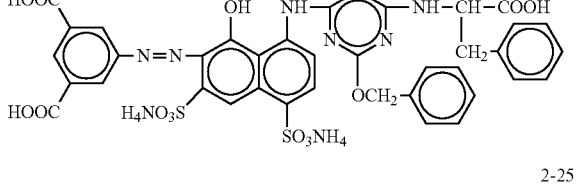
2-26
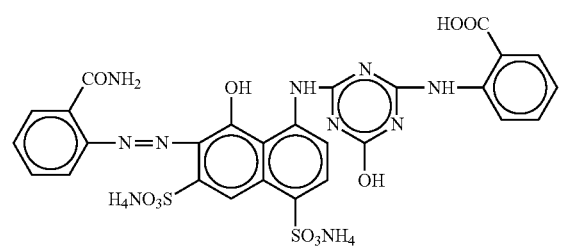
2-27
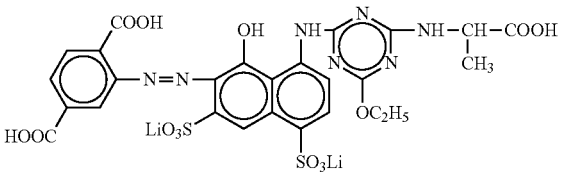
2-28
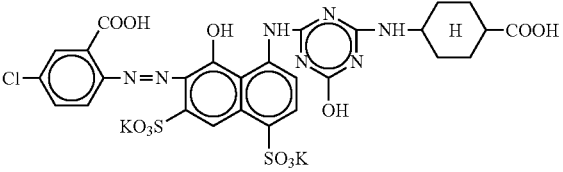
2-29
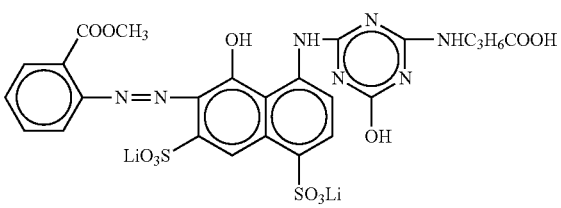
2-30
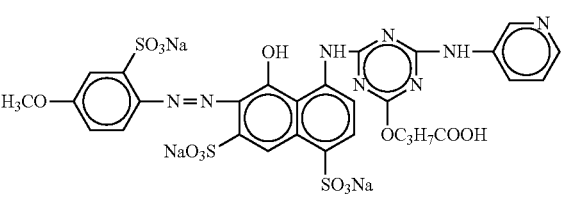
2-31
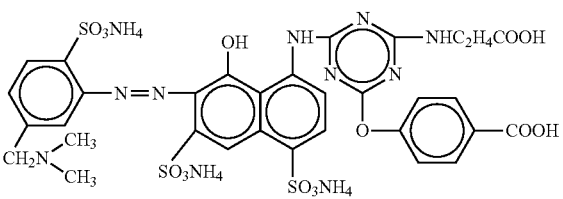
2-32
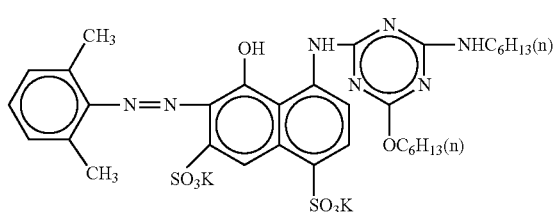
2-33
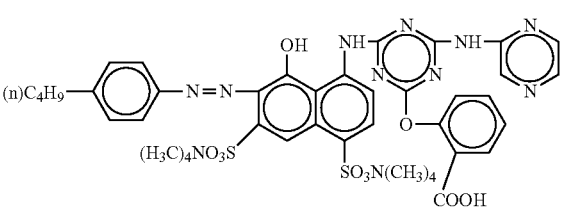

2-34
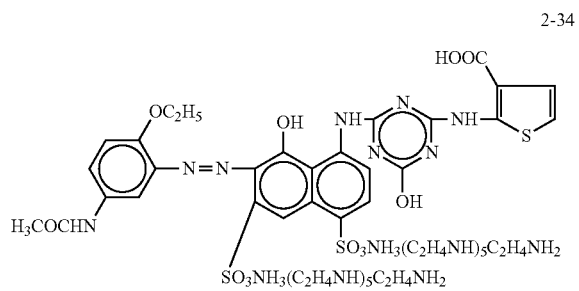
2-41
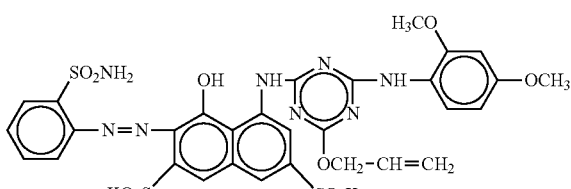
2-35
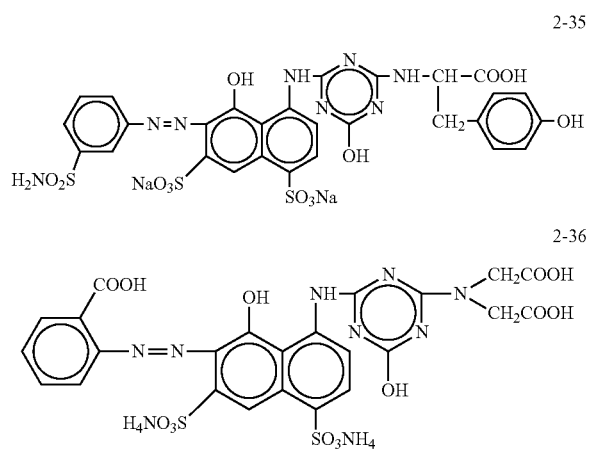
2-42
2-36
2-43
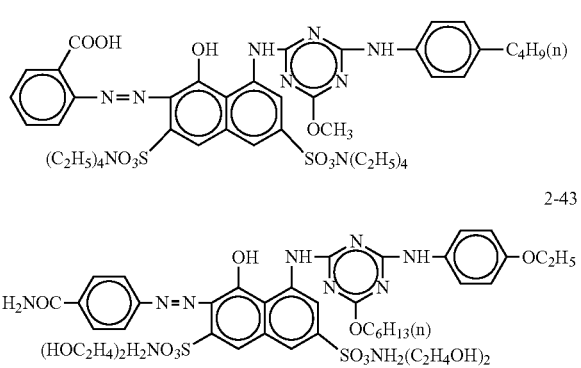
2-37
2-44
2-38
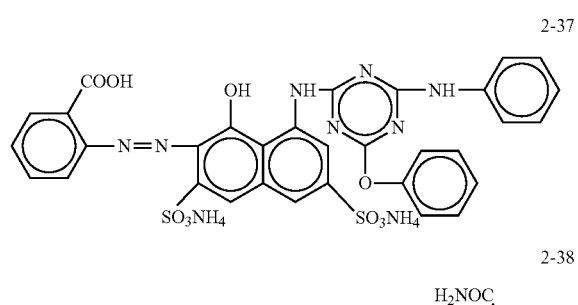
2-45
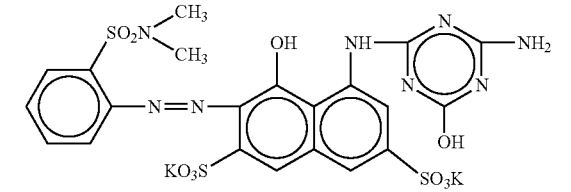
2-39
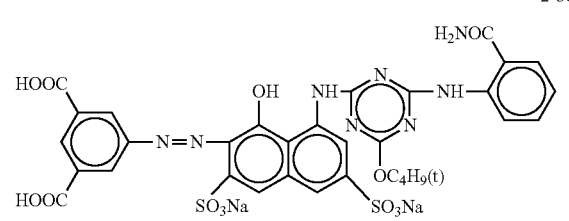
2-46
2-40
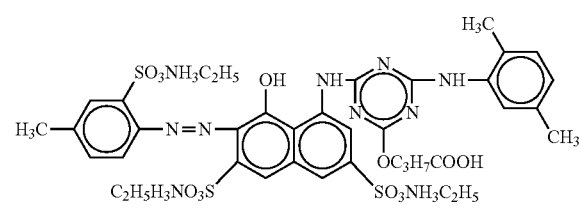
2-47
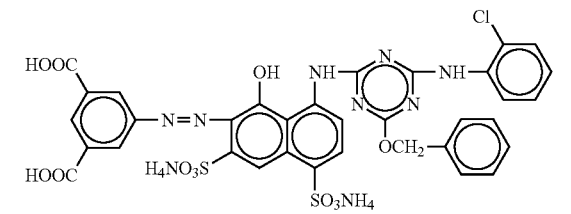

-continued 2-48
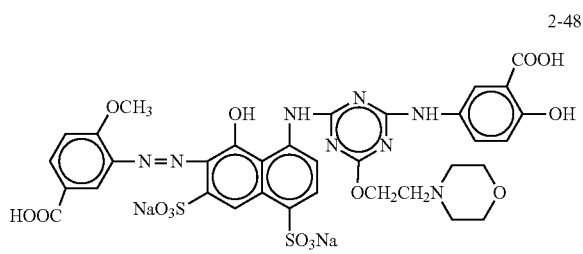

2-49
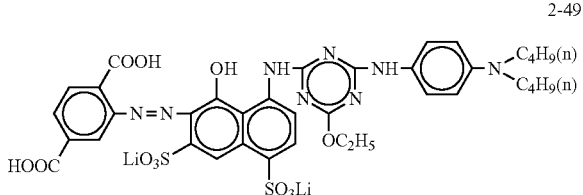

2-50
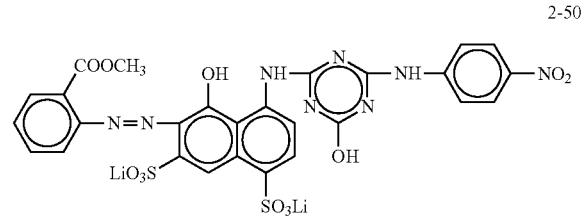

2-51
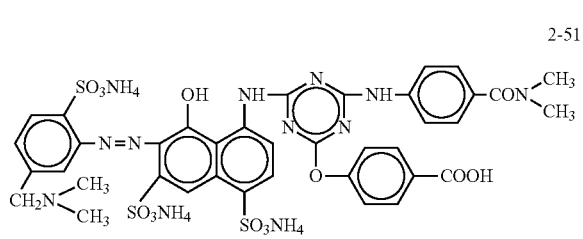

2-52
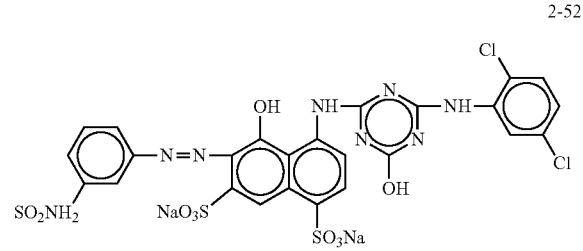

2-53
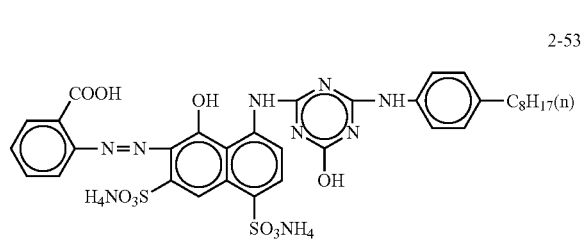

2-54
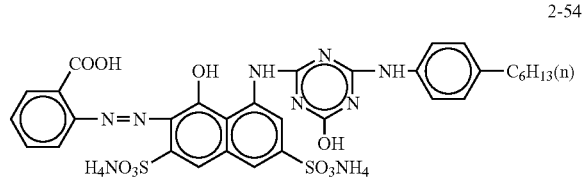

-continued 2-55
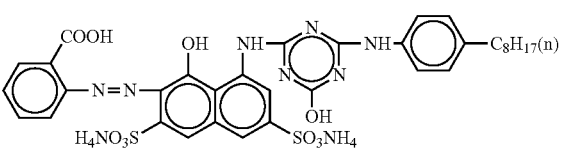

2-56
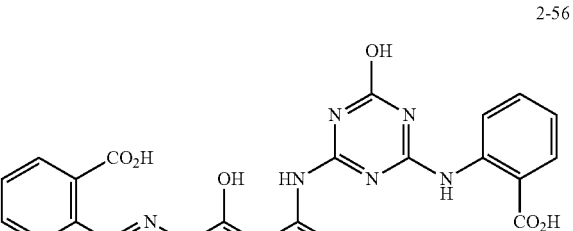

2-57, 2-58
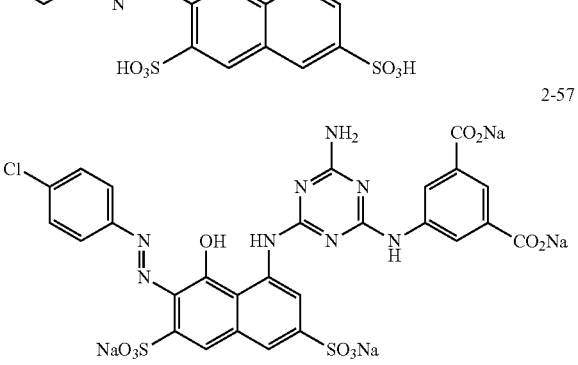
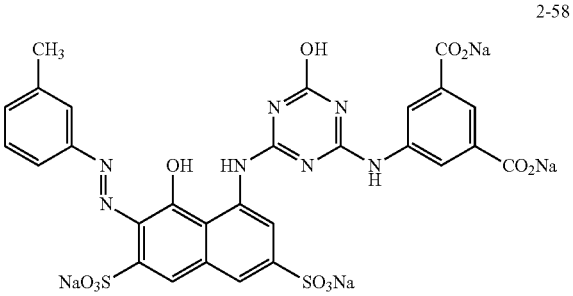

The compound represented by Formula (A4) may be prepared by a publicly known method. For example, the colorant represented by No. A2-1 may be prepared by the following (A) to (C) steps. (A) From 2-aminobenzoic acid (anthranilic acid) and 1-amino-8-hydroxy-3,6-naphthalenedisulfonic acid (H-acid), a monoazocompound is prepared through the steps of diazotization and coupling according to a typical method [see, for example, pp. 396 to 409 of "New Dyestuff Chemistry" written by Yutaka Hosoda (published by GIHODO SHUPPAN Co., Ltd., Dec. 21, 1973)]. (B) The obtained monoazocompound is added to a cyanuric chloride suspension while maintaining the pH at 4 to 6 and the temperature at 0° C. to 5° C., and reacted for several hours. Subsequently, an aqueous solution of 2-aminobenzoic acid (anthranilic acid) is added to the reaction mixture at room temperature such that the reaction mixture does not become alkaline, and the reaction mixture is subjected to condensation reaction for several hours. Subsequently, a 25% sodium hydroxide aqueous solution is added thereto at 50° C. to 60° C. to make the reaction mixture strongly alkaline, thereby causing a hydrolysis reaction to complete the reaction. (C) After cooling, the reaction product may be subjected to salting out with sodium chloride to obtain a target compound No. A2-1.

[Compound Represented by Formula (B4)]

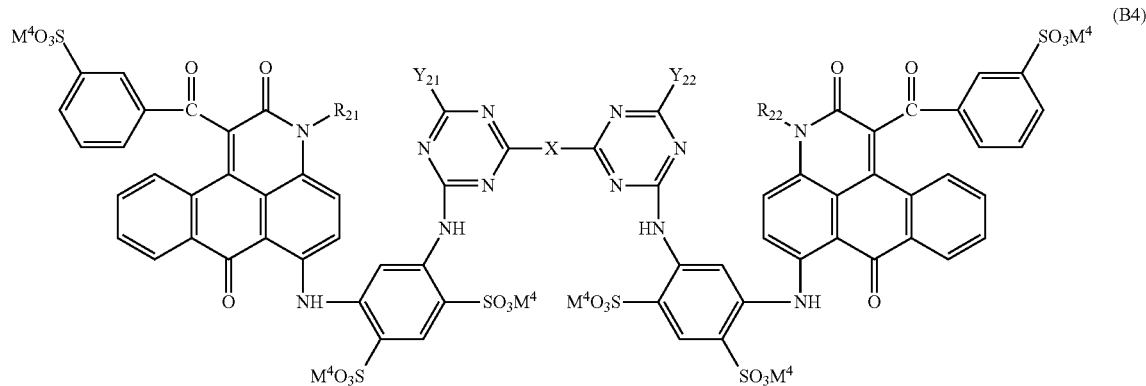

In Formula (B4), $R_{21}$ and $R_{22}$ each independently represent a hydrogen atom or a substituted or unsubstituted alkyl group.

$Y_{21}$ and $Y_{22}$ each independently represent a chlorine atom, a hydroxyl group, a substituted or unsubstituted amino group, an alkoxy group and a substituted or unsubstituted phenoxy group.

X represents a divalent linking group.

$M^4$ represents a hydrogen atom or a counter cation. $M^4$'s may be the same or different.

In Formula (B4), $R_{21}$ and $R_{22}$ each independently represent a hydrogen atom or a substituted or unsubstituted alkyl group.

When $R_{21}$ and $R_{22}$ represent an alkyl group, the alkyl group may be straight, branched or cyclic (a cycloalkyl group), and is preferably an alkyl group having 1 to 10 carbon atoms, more preferably an alkyl group having 1 to 8 carbon atoms, even more preferably an alkyl group having 1 to 6 carbon atom, and particularly preferably an alkyl group having 1 to 4 carbon atoms.

When the alkyl group is a cyclic alkyl group, a cyclohexyl group is preferred.

As the alkyl group, a straight or branched alkyl group is more preferred.

Specific examples of the alkyl group include a methyl group, an ethyl group, an n-propyl group, an isopropyl group, an n-butyl group, a t-butyl group, an n-hexyl group, an n-octyl group, a cyclohexyl group and the like.

When $R_{21}$ and $R_{22}$ represent an alkyl group, the alkyl group may have a substituent. As the substituent, an amino group is preferred, in which a hydroxyl group, a cyano group or an alkyl group is substituted.

When a hydroxyl group or a cyano group is substituted, an ethyl group is most preferred as the alkyl group.

Examples of the amino group in which an alkyl group is substituted include a monoalkylamino group or a dialkylamino group, and as the alkyl group, a straight or branched alkyl group is preferred. The amino group is preferably a mono or dialkylamino group in which an alkyl group having 1 to 8 carbon atoms is substituted, more preferably a mono or dialkylamino group in which an alkyl group having 1 to 6 carbon atoms is substituted, even more preferably a mono or dialkylamino group in which an alkyl group having 1 to 4 carbon atoms is substituted, and particularly preferably a mono or dialkylamino group in which a methyl group or an ethyl group is substituted.

As $R_{21}$ and $R_{22}$, a hydrogen atom or an unsubstituted alkyl group is preferred, a hydrogen atom or a methyl group is more preferred, and a methyl group is even more preferred, from the viewpoint of the availability of raw materials.

In Formula (B4), $Y_{21}$ and $Y_{22}$ each independently represent a chlorine atom, a hydroxyl group, a substituted or unsubstituted amino group, an alkoxy group and a substituted or unsubstituted phenoxy group.

When $Y_{21}$ and $Y_{22}$ represent an amino group, the amino group may have a substituent.

As the substituent, an alkyl group or an aryl group is preferred.

When $Y_{21}$ and $Y_{22}$ represent an amino group (an alkylamino group) having an alkyl group as a substituent, the amino group may be a monoalkylamino group or a dialkylamino group.

The alkyl group may be straight, branched or cyclic (a cycloalkyl group).

When the alkyl group is a straight or branched alkyl group, an alkyl group having 1 to 8 carbon atoms is preferred, and examples thereof include a methyl group, an ethyl group, a butyl group, a 2-ethylhexyl group and the like.

When the alkyl group is a straight or branched alkyl group, the alkyl group may further have a substituent, and as the substituent further having a substituent, an alkylamino group, an aryl group, a sulfo group, a carboxyl group or a hydroxyl group is preferred. When the alkyl group further has a substituent, the alkyl group is preferably an alkyl group having a substituent selected from the group consisting of a sulfo group, a carboxyl group and a hydroxyl group, an alkyl group (an aralkyl group) having an aryl group or an alkyl group having an alkylamino group.

The alkyl group having a substituent selected from the group consisting of a sulfo group, a carboxyl group and a hydroxyl group is preferably an alkyl group having 1 to 4 carbon atoms, and examples thereof include a methyl group, an ethyl group, an n-propyl group, an n-butyl group and the like.

Specific examples of the mono or dialkylamino group having a sulfo group or a carboxyl group include, for example, a 2-sulfoethylamino group, a carboxymethylamino group, a 2-carboxyethylamino group, a 1-carboxyethylamino group, a 1,2-dicarboxyethylamino group, a di(carboxymethyl)amino group or the like.

Specific examples of the mono or dialkylamino group having a hydroxyl group include, for example, a hydroxyethylamino group, a dihydroxyethylamino group and the like.

The amino group having an aralkyl group is preferably an amino group having an alkyl group having 1 to 6 carbon atoms, in which a phenyl group is substituted, and examples thereof include a benzylamino group, a phenetylamino group, a phenylpropylamino group and the like.

The alkylamino group as the substituent further having a substituent may be a monoalkylamino group or a dialkylamino group, and specific examples and preferred ranges of the alkylamino group are the same as those of the alkylamino group as $Y_{21}$ and $Y_{22}$.

When $Y_{21}$ and $Y_{22}$ represent an amino group having a cycloalkyl group, the cycloalkyl group is preferably a cycloalkyl group having 5 to 7, and examples thereof include a cyclohexyl group, a cyclopentyl group and the like.

When $Y_{21}$ and $Y_{22}$ represent an amino group (an arylamino group) having an aryl group as a substituent, an amino group is preferred, in which a phenyl group or a naphthyl group is substituted.

As the amino group in which a phenyl group is substituted, an anilino group is preferred. The anilino group may be an anilino group in which at least one substituent selected from the group consisting of a sulfo group and a carboxyl group on a benzene ring is further substituted, in addition to an unsubstituted anilino group, and examples thereof include a 2,5-disulfoanilino group, a 3-sulfoanilino group, a 2-sulfoanilino group, a 4-sulfoanilino group, a 2-carboxy-4-sulfoanilino group, a 2-carboxy-5-sulfoanilino group and the like.

The amino group (a naphthylamino group) in which a naphthyl group is substituted may be a group in which a naphthyl group is further substituted with a sulfo group, in addition to an unsubstituted naphthylamino group, and examples thereof include a 3,6,8-trisulfo-1-naphthylamino group, a 4,6,8-trisulfo-2-naphthylamino group, a 3,6,8-trisulfo-2-naphthylamino group, a 4,8-disulfo-2-naphthylamino group and the like.

When $Y_{21}$ and $Y_{22}$ represent an alkoxy group, as the alkoxy group, for example, an alkoxy group having 1 to 4 carbon atoms, such as a methoxy group, an ethoxy group, an n-propoxy group, an isopropoxy group and a butoxy group, is preferred.

When $Y_{21}$ and $Y_{22}$ represent a phenoxy group, the phenoxy group may also be an unsubstituted phenoxy group, or a phenoxy group having a substituent. The substituent is preferably at least one substituent selected from the group consisting of a sulfo group, a carboxy group, an acetylamino group, an amino group and a hydroxyl group. As the phenoxy group substituted with a substituent selected from the group consisting of a sulfo group, a carboxy group, an acetylamino group, an amino group and a hydroxyl group, examples thereof include a 4-sulfophenoxy group, a 4-carboxyphenoxy group, a 4-acetylamino-phenoxy group, a 4-aminophenoxy group, a 4-hydroxyphenoxy group and the like.

As $Y_{21}$ and $Y_{22}$, a chlorine atom, a hydroxyl group or an unsubstituted amino group is preferred from the viewpoint of moisture resistance.

In Formula (B4), X represents a divalent linking group. Examples of the divalent linking group include a divalent group having a nitrogen atom or an oxygen atom at both ends of a hydrocarbon residue having 1 to 20 carbon atoms, which may include a nitrogen atom, an oxygen atom or a sulfur atom, and using a nitrogen atom or an oxygen atom at the both ends as a bonding hand, and specific examples thereof include a group represented by

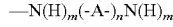

—N(H)$_m$(-A-)$_n$N(H)$_m$ or

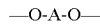

—O-A-O—

(in the formula, A is a divalent hydrocarbon residue having 1 to 20 carbon atoms and may include a nitrogen atom, an oxygen atom or a sulfur atom, n represents 1 or 2 and m represents 1 or 0, and when n is 1, m represents 1, and when n is 2, m represents 0).

Examples of the divalent hydrocarbon residue having 1 to 20 carbon atoms of A include a divalent aliphatic group having 1 to 15 carbon atoms, which may include one or two heteroatoms (for example, a nitrogen atom, an oxygen atom, a sulfur atom and the like), a divalent aromatic group having 3 to 10 carbon atoms, preferably 5 to 10 carbon atoms, which may include one to three heteroatoms (for example, a nitrogen atom, an oxygen atom, a sulfur atom and the like), and a divalent group produced by combining the aliphatic group and the aromatic group. These groups may have a substituent (a sulfo group, a carboxyl group, an amino group, an alkyl group having 1 to 10 carbon atoms in the case of an aromatic group, and the like).

Examples of the aforementioned aliphatic group include: a (poly)methylene having 1 to 6 carbon atoms, which may be substituted with an alkyl group having 1 to 10 carbon atoms, such as methylene, dimethylene (ethylene), trimethylene (propylene), 2-methyltrimethylene (2-methylpropylene)tetramethylene (butylene) and hexamethylene; a cycloalkylene having 5 to 7 carbon atoms, such as cyclopentane-1,2-diyl, cyclopentane-1,3-diyl, cyclohexane-1,2-diyl, cyclohexane-1,3-diyl, cyclohexane-1,4-diyl and cycloheptane-diyl; an aliphatic group including an alkylene having 1 to 10 carbon atoms, such as methylenecyclohexane-1,4-diylmethylene (—CH$_2$—C$_6$H$_{10}$—CH$_2$—), methylenedicyclohexane-diyl (—C$_6$H$_{10}$—CH$_2$—C$_6$H$_{10}$—), methylenebis(methylcyclohexane-diyl) {—C$_6$H$_{10}$(CH$_3$)—CH$_2$—C$_6$H$_{10}$(CH$_3$)—}, and cyclohexane-diyl-dimethylene (—CH$_2$—C$_6$H$_{10}$—CH$_2$—), and an aliphatic ring having 5 to 7 carbon atoms (may have an alkyl substitution with 1 to 10 carbon atoms); an aliphatic group having 1 to 7 carbon atoms, which includes a heteroatom such as methyleneoxymethylene (—CH$_2$—O—CH$_2$—), bis(dimethylene)amino (—C$_2$H$_4$—NH—C$_2$H$_4$—), methylenethiomethylene (—CH$_2$—S—CH$_2$—) and oxydicyclohexane-diyl(—C$_6$H$_{10}$—O—C$_6$H$_{10}$—); and the like.

Examples of the divalent aromatic group include an aromatic group having 6 to 10 carbon atoms, such as phenylene (—C$_6$H$_4$—) and naphthylene (—C$_{10}$H$_6$—).

Examples of the divalent group produced by combining the aliphatic group and the aromatic group include xylylene (—CH$_2$—C$_6$H$_4$—CH$_2$—) and the like.

Examples of the more preferred one as A include dimethylene, hexamethylene, 1,3-xylylene, methylenedicyclohexane-4,1-diyl, methylenebis(2-methylcyclohexane-4,1-diyl) and cyclohexane-1,3-diyl-dimethylene.

Examples of the divalent linking group X: include a diaminoalkylene group such as a 1,2-diaminoethylene group (—NH—CH$_2$CH$_2$—NH—), a 1,4-diaminobutylene group (—NH—C$_4$H$_8$—NH—) and a 1,6-diaminohexylene group (—NH—C$_6$H$_{12}$—NH—); a diaminophenylene group such as a 1,4-piperazinediyl group (—NC$_4$H$_8$N—), a 1,4-diaminophenylene group (—NH—C$_6$H$_4$-p-NH—) and a 1,3-diaminophenylene group (—NH—C$_6$H$_4$-m-NH—); a substituted diaminophenylene group such as a 4-sulfo-1,3-diaminophenylene group {—NH—C$_6$H$_4$(p-SO$_3$H)-m-NH—} and a 5-carboxy-1,3-diaminophenylene group; a dioxy-substituted alkylene group such as a 1,3-diaminoxylylene group (—NH—CH$_2$—C$_6$H$_4$-m-CH$_2$—NH—), a 1,4-diaminoxylylene group (—NH—CH$_2$—C$_6$H$_4$-p-CH$_2$—NH—), a 4,4'-diamino-2-sulfo-diphenylamino group {—NH—C$_6$H$_4$(m-SO$_3$H)—NH—C$_6$H$_4$-p-NH—}, a 4,4'-diaminodicyclohexylmethane group (—NH—C$_6$H$_{10}$-4-CH$_2$—C$_6$H$_{10}$-4'-NH—), a 4,4'-diamino-3,3'-dimethyldicyclohexylmethane group {—NH—C$_6$H$_{10}$(3-CH$_3$)-4-CH$_2$—C$_6$H$_{10}$(3'-

$CH_3$)-4'-NH—), a 1,3-bis(aminomethyl)cyclohexane group (—NH—$CH_2$—$C_6H_{10}$-3-$CH_2$—NH—), a dioxy-substituted alkylene group such as a dioxyethylene group (—O—$CH_2CH_2$—O—), a 1,4-dioxybutylene group (—O—$C_4H_8$—O—) and a 2,2'-dioxyethylether group (—O—$CH_2CH_2$—O—$CH_2CH_2$—O—); a 1,4-dioxyphenylene group (—O—$C_6H_4$-p-O—), a 1,3-dioxyphenylene group (—O—$C_6H_4$-m-O—), a 4,4'-dioxydiphenylether group (—O—$C_6H_4$-p-O—$C_6H_4$-p-O—), a 4,4'-dioxyphenylenethioether group (—O—$C_6H_4$-p-S—$C_6H_4$-p-O—), 2,5- and 2,6-norbornanediamino groups, a 1,4-dioxymethylcyclohexylene group (—O—$CH_2$—$C_6H_{10}$-4-$CH_2$—O—) and the like.

Meanwhile, examples of the group in the case where n is 2 and m is 0 in Formula —N(H)$_m$(-A-)$_n$N(H)$_m$— include the 1,4-piperazinediyl (—N$C_4H_8$N—) and the like.

X is preferably a diaminoethylene group, a 1,4-piperazinediyl group, a 1,3-diaminoxylylene group, a 4,4'-diaminodicyclohexylmethane group, a 4,4'-diamino-3,3'-dimethyl-dicyclohexylmethane group, or a 1,3-bis(aminomethyl) cyclohexane group.

In Formula (B4), $M^4$ represents a hydrogen atom or a counter cation. $M^4$'s may be the same or different.

In Formula (B4), when $M^4$ is a hydrogen atom, the hydrogen atom is in a form of a free acid, and when $M^4$ is a counter cation, the counter cation is in a form of a salt.

Examples of the counter cation that forms a salt include a monovalent counter cation, and the counter cation is preferably an alkali metal ion, an ammonium ion, an organic cation and the like.

Examples of the organic cation include a cation in which a hydrogen ion is added to alkylamine or alkanolamine, examples of the alkylamine include trimethylamine, triethylamine and the like, and examples of the alkanolamine include monoethanolamine, diethanolamine, triethanolamine, monoisopropanolamine, diisopropanolamine, triisopropanolamine and the like.

From the viewpoint of solubility, an alkali metal ion is preferred, and a lithium ion, a sodium ion and a potassium ion are more preferred. In particular, the sodium ion is preferred from the viewpoint of low cost preparation.

In Formula (B4), $M^4$'s may be the same or different. That is, the compound represented by Formula (B4) in a form of a salt includes a case where all sulfo groups are salts, and a case where some sulfo groups are in a form of a free acid and some sulfo groups are salts. Furthermore, the counter cation forming a salt may be present either alone or in plurality.

Further, the same applies to those (for example, a carboxyl group) which may be in a form of a salt as a group other than a sulfo group.

Specific examples of the anthrapyridone compound represented by Formula (B4) are shown in Table 1. Meanwhile, in Table 1, diaminoethylene means a 1,2-diaminoethylene group (—NH—$CH_2CH_2$—NH—). In addition, Ph denotes a phenyl group, for example, PhO denotes a phenoxy group and NHPh denotes an anilino group, and the same applies to the others. Furthermore, NHPh(p-$SO_3H$) denotes a 4-sulfoanilino group (p-$SO_3H$ indicates that a sulfonic acid group is present at the para position of a phenyl group), NHPh(COOH)$_2$(3,5) denotes a 3,5-dicarboxyanilino group {Ph(COOH)$_2$(3,5) indicates that a carboxyl group is substituted at the 3-position and the 5-position of a phenyl group}, and the other groups are also described in the same manner. Further, naphthyl denotes a naphthyl group, NH-2 naphthyl (SO3H)$_3$(3,6,8) denotes 3,6,8-trisulfo-2naphthylamino, and NH(cyclohexyl) denotes cyclohexylamino. Meanwhile, in the following specific examples, the sulfo group may be in a state of a salt.

TABLE 1

| No. | $R_{21}, R_{22}$ | X | $Y_{21}, Y_{22}$ |
|---|---|---|---|
| 2-0-1 | $CH_3$ | Diaminoethylene | OH |
| 2-0-2 | $CH_3$ | Diaminoethylene | Cl |
| 2-0-3 | $CH_3$ | Diaminoethylene | $NH_2$ |
| 2-0-4 | $CH_3$ | 1,4-Piperazinediyl | Cl |
| 2-0-5 | $CH_3$ | 1,4-Piperazinediyl | $NH_2$ |
| 2-0-6 | $CH_3$ | 1,3-Diaminoxylylene | Cl |
| 2-0-7 | $CH_3$ | 1,3-Diaminoxylylene | $NH_2$ |
| 2-0-8 | $CH_3$ | 1,4-Diaminoxylylene | $NH_2$ |
| 2-0-9 | $CH_3$ | Bis(3-aminopropyl)ether | $NH_2$ |
| 2-0-10 | $CH_3$ | 3,3'-Iminodi(propylamine) | $NH_2$ |
| 2-0-11 | $CH_3$ | 2,2'-Iminodi(ethylamine) | $NH_2$ |
| 2-0-12 | $CH_3$ | 1,4-Diaminobutylene | $NH_2$ |
| 2-0-13 | $CH_3$ | 1,6-Diaminohexylene | $NH_2$ |
| 2-0-14 | $CH_3$ | 1,4-Diaminophenylene | $NH_2$ |
| 2-0-15 | $CH_3$ | 1,3-Diaminophenylene | $NH_2$ |
| 2-0-16 | $CH_3$ | 1,3-Diamino-4-sulfophenylene | $NH_2$ |
| 2-0-17 | $CH_3$ | 1,3-Diamino-5-carboyphenylene | $NH_2$ |
| 2-0-18 | $CH_3$ | 4,4'-Diamino-2-sulfodiphenylamine | $NH_2$ |
| 2-0-19 | $CH_3$ | 4,4-Diamino-3,3'-dimethyl-dicyclohexylmethane | $NH_2$ |
| 2-0-20 | $CH_3$ | 4,4'-Diamino-dicyclohexylmethane | $NH_2$ |
| 2-0-21 | $CH_3$ | Diaminoethylene | $NH_2$ |
| 2-0-22 | $CH_3$ | Diaminoethylene | NH($CH_2$COOH) |
| 2-0-23 | $CH_3$ | Diaminoethylene | NH($CH_2$(COOH)$CH_2$COOH) |
| 2-0-24 | $CH_3$ | Diaminoethylene | NH($CH_2$(COOH)$CH_2CH_2$COOH) |
| 2-0-25 | $CH_3$ | Diaminoethylene | $CH_3$O |
| 2-0-26 | $CH_3$ | Diaminoethylene | $C_6H_5$O |
| 2-0-27 | $CH_3$ | Diaminoethylene | NH($CH_2CH_2SO_3H$) |
| 2-0-28 | $CH_3$ | Diaminoethylene | NH$C_6H_5$ |
| 2-0-29 | $CH_3$ | Diaminoethylene | NHPh(p-$SO_3H$) |
| 2-0-30 | $CH_3$ | Diaminoethylene | NHPh(COOH)$_2$(3,5) |
| 2-0-31 | $CH_3$ | Diaminoethylene | NHPh(COOH)$_2$(2,5) |
| 2-0-32 | $CH_3$ | Diaminoethylene | NHPh(o-$SO_3H$) |
| 2-0-33 | $CH_3$ | Diaminoethylene | NHPh(m-$SO_3H$) |
| 2-0-34 | $CH_3$ | Diaminoethylene | NHPh($SO_3H$)$_2$(2,5) |

TABLE 1-continued

| No. | $R_{21}, R_{22}$ | X | $Y_{21}, Y_{22}$ |
|---|---|---|---|
| 2-0-35 | $CH_3$ | Diaminoethylene | $NH(CH_2CH_2CH_2N(C_2H_5)_2)$ |
| 2-0-36 | $CH_3$ | Diaminoethylene | $NH(CH_2CH_2CH_2N(CH_3)_2)$ |
| 2-0-37 | $CH_3$ | Diaminoethylene | NH-2-naphthyl$(SO_3H)_3$(3,6,8) |
| 2-0-38 | $CH_3$ | Diaminoethylene | NH-2-naphthyl$(SO_3H)_3$(4,6,8) |
| 2-0-39 | $CH_3$ | Diaminoethylene | NH-2-naphthyl$(SO_3H)_2$(4,8) |
| 2-0-40 | $CH_3$ | Diaminoethylene | $NH(n-C_4H_9)$ |
| 2-0-41 | $CH_3$ | Diaminoethylene | NH(Cyclohexyl) |
| 2-0-42 | $CH_3$ | Diaminoethylene | $NH(CH_2CH_2OH)$ |
| 2-0-43 | $CH_3$ | Diaminoethylene | $N(CH_2CH_2OH)$ |
| 2-0-44 | $CH_3$ | Diaminoethylene | $NHCH_2Ph$ |
| 2-0-45 | H | Diaminoethylene | $NH_2$ |
| 2-0-46 | H | 1,3-Diaminoxylylene | $NH_2$ |
| 2-0-47 | H | 1,4-Piperazinediyl | $NH_2$ |
| 2-0-48 | $C2H_5$ | 1,3-Diaminoxylylene | $NH_2$ |
| 2-0-49 | $C4H_9$ | 1,3-Diaminoxylylene | $NH_2$ |
| 2-0-50 | isoC3$H_7$ | 1,3-Diaminoxylylene | $NH_2$ |
| 2-0-51 | Cyclohexyl | 1,3-Diaminoxylylene | $NH_2$ |
| 2-0-52 | $C_3H_6N(C_2H_5)_2$ | 1,3-Diaminophenylene | $NH_2$ |
| 2-0-53 | $CH_3$ | 1,4-Dioxyphenylene | $NH_2$ |
| 2-0-54 | $CH_3$ | 4,4'-Dioxydiphenylether | $NH_2$ |
| 2-0-55 | $CH_3$ | 4,4'-Dioxydiphenylthioether | $NH_2$ |
| 2-0-56 | $CH_3$ | 4,4'-Dioxydiphenylsulfone | $NH_2$ |
| 2-0-57 | $CH_3$ | 4,4'-Dioxydiplienylmethane | $NH_2$ |
| 2-0-58 | $CH_3$ | 2,5- and 2,6-Norbornanediamino | $NH_2$ |
| 2-0-59 | $CH_3$ | 1,4-Dioxymethylcyclohexylene | $NH_2$ |
| 2-0-60 | $CH_3$ | 2,5-Dimethyl-1,4-piperazinediyl | $NH_2$ |

A method of synthesizing the compound represented by Formula (B4) will be described.

In the compound of Formula (B4), for example, in order to obtain a compound having an amino group at both ends in X, a compound (in the formula, $R_{21}$, $R_{22}$, m, n and A represent the same meaning as described above) of Formula (B4-9), in which Y is a chlorine atom and both ends of the crosslinking group X are an amino group, is obtained as a secondary condensate, by reacting, at a pH of 4 to 10 and 5° C. to 90° C. for 10 minutes to 5 hours, 1 mole of the diamino compound of the following Formula (B4-8) with a compound (in the formula, $R_{21}$ represents the same meaning as described above) of Formula (B4-7) which is a primary condensate obtained by reacting 2 moles of the compound (in the formula, $R_{21}$ represents the same meaning as described above) of the following Formula (B4-6) with 2 to 2.4 moles of 2,4,6-trichloro-S-triazine (cyanuric chloride) in water at a pH of 3 to 7 and 5° C. to 35° C. for 2 to 8 hours.

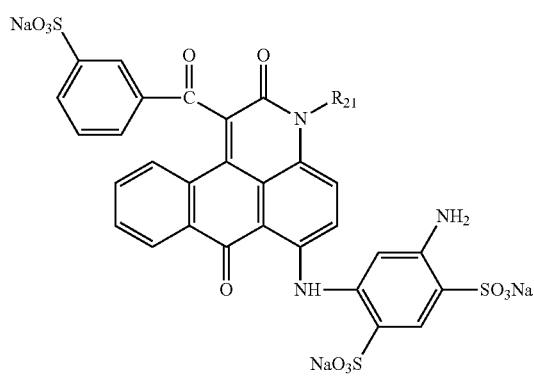

(B4-6)

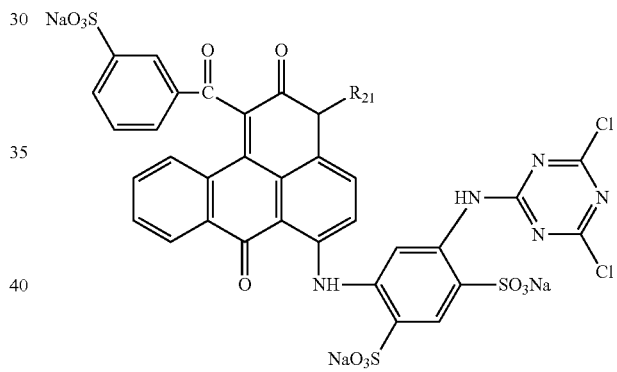

(B4-7)

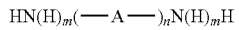

(B4-8)

In the formula, A is a linking group, for example, a divalent hydrocarbon residue having 1 to 20 carbon atoms and may include a nitrogen atom, an oxygen atom or a sulfur atom, n represents 1 or 2 and m represents 1 or 0, and when n is 1, m represents 1, and when n is 2, m represents 0. Preferred examples of A include a (poly)methylene having 1 to 6 carbon atoms, and phenylene, xylylene, methylenedicyclohexane-diyl, methylenebis(methylenecyclohexane-diyl) and cyclohexane-diyl-dimethylene, which may have a substituent, and more preferred examples thereof include dimethylene, hexamethylene, 1,3-xylylene, methylenedicyclohexane-4,1-diyl, methylenebis(2-methylcyclohexane)-4,1-diyl and cyclohexane-1,3-diyl-dimethylene.

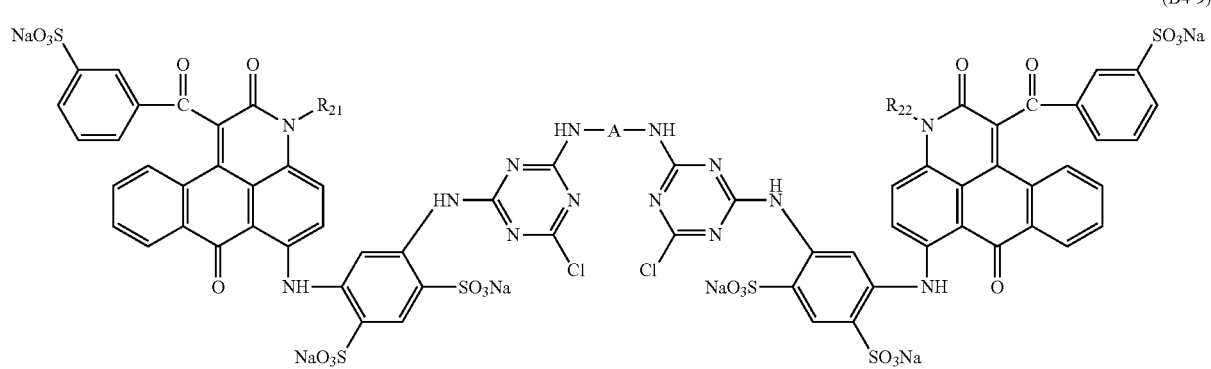

(B4-9)

Provided that when a compound represented by HN(-A-)$_2$NH (in Formula (B4-8), n=2 and m=0) such as piperidine in Formula (B4-8) is used, a compound, which is —N(-A-)$_2$N-instead of —NH-A-NH— in Formula (B4-9), may be obtained. Subsequently, it is possible to obtain a compound of Formula (B4-10) in which Y is other than a chlorine atom, as a tertiary condensate, by performing hydrolysis at pH of 9 to 12 and 70° C. to 90° C. for 1 to 5 hours, or reacting ammonia with corresponding amines, phenols, naphthols or alcohols such as methanol at a pH of 8 to 10 and 90° C. to 100° C. for 3 to 8 hours (in the formula, $R_{21}$, $R_{22}$, $Y_{21}$, $Y_{22}$ and A represent the same meaning as described above).

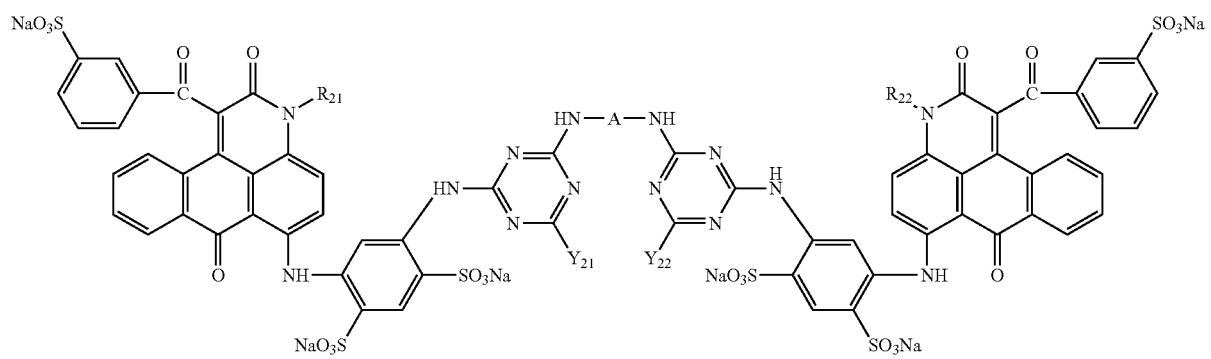

(B4-10)

Furthermore, when the compound represented by HN(-A-)$_2$NH in Formula (B4-8) is used, a compound, which is —N(-A-)$_2$N— instead of —NH-A-NH— in Formula (B4-10), may be obtained.

Meanwhile, the order of the condensation is appropriately determined depending on the reactivity of various compounds, but is not limited to the above order. A plurality of specific examples of the anthrapyridone compound of the present invention represented by the Formula (B4-10) is included in the previous Table B1, but the preferred compound in the present invention is shown in the following Table 2, also including the compounds shown in Table 1. Meanwhile, in the following specific examples, the sulfo group may be in a state of a salt.

TABLE 2

| No. | $R_{21}$, $R_{22}$ | X | $Y_{21}$, $Y_{22}$ |
|---|---|---|---|
| 2-1-1 | CH$_3$ | Methylenedicyclohexane-4,1-diyl | NH$_2$ |
| 2-1-2 | CH$_3$ | Methylenedicyclohexane-4,1-diyl | Ethylamino |
| 2-1-3 | CH$_3$ | Methylenedicyclohexane-4,1-diyl | Propylamino |
| 2-1-4 | CH$_3$ | Methylenedicyclohexane-4,1-diyl | Propylamino |
| 2-1-5 | CH$_3$ | Methylenedicyclohexane-4,1-diyl | Butylamino |
| 2-1-6 | CH$_3$ | Methylenedicyclohexane-4,1-diyl | 2-Ethylhexylamino |

TABLE 2-continued

| No. | $R_{21}, R_{22}$ | X | $Y_{21}, Y_{22}$ |
|---|---|---|---|
| 2-1-7 | $CH_3$ | Methylenedicyclohexane-4,1-diyl | Benzyl |
| 2-1-8 | $CH_3$ | Methylenebis(2-methylcyclohexane-4,1-diyl) | $NH_2$ |
| 2-1-9 | $CH_3$ | Cyclohexane-1,3-diyl-dimethylene | $NH_2$ |
| 2-1-10 | $CH_3$ | Cyclohexane-1,3-diyl-hdimethylene | Ethylamino |
| 2-1-11 | $CH_3$ | Cyclohexane-1,3-diyl-dimethylene | Butylamino |
| 2-1-12 | $CH_3$ | Cyclohexane-1,3-diyl-dimethylene | Dibutylamino |
| 2-1-13 | $CH_3$ | Cyclohexane-1,3-diyl-dimethylene | 2-Ethylhexylamino |
| 2-1-14 | $CH_3$ | Cyclohexane-1,3-diyl-dimethylene | Benzyl |
| 2-1-15 | $CH_3$ | Methylenedicyclohexane-4,1-diyl | Cyclohexylamino |
| 2-1-16 | $CH_3$ | Methylenedicyclohexane-4,1-diyl | Cyclopentylamino |
| 2-1-17 | $CH_3$ | Methylenedicyclohexane-4,1-diyl | Diethylaminopropylamino |
| 2-1-18 | $CH_3$ | Methylenedicyclohexane-4,1-diyl | Dibutylaminopropylamino |

It is possible to obtain a compound, in which the crosslinking group —NH-A-NH— in Formula (B4-9) is changed into —O-A-O—, by performing a condensation reaction by a typical method using a glycol compound represented by the following Formula HO-A-OH (in the formula, A is the same as the above) instead of the diamino compound of Formula (B4-8), and hereinafter, it is possible to obtain a compound, in which the crosslinking group —NHA-NH— in Formula (B4-10) is changed into —O-A-O—, by performing treatment in the same manner as the above.

The compound thus obtained is present in a form of a free acid, or in a form of a salt thereof. In the present invention, as the free acid or the salt thereof, it is possible to use an alkali metal salt, an alkali earth metal salt, an alkylamine salt, an alkanolamine salt or an ammonium salt. Preferred examples thereof include: an alkali metal salt such as a sodium salt, a potassium salt and a lithium salt; an alkanolamine salt such as a monoethanolamine salt, a diethanolamine salt, a triethanolamine salt, a monoisopropanolamine salt, a diisopropanolamine salt and a triisopropanolamine salt; and an ammonium salt. Further, as a method of producing a salt, for example, the salt is obtained in the form of a free acid (or a part of the free acid is a sodium salt as it is) by adding a table salt to the reaction solution of the tertiary condensate obtained above, salting out thereby and filtrating to obtain the sodium salt as a wet cake, which is again dissolved in water, adding hydrochloric acid thereto to adjust the pH to 1 to 2, and filtering the crystal obtained. Furthermore, for example, when potassium hydroxide, lithium hydroxide or aqueous ammonia is added to make an alkaline solution, while the wet cake in the form of the free acid is stirred with water, it is possible to obtain the potassium salt, the lithium salt or the ammonium salt, respectively. Meanwhile, the anthrapyridone compound of Formula (B4-6) is obtained, for example, by the following process. That is, by reacting 1 mole of the anthraquinone compound represented by Formula (B4-11)

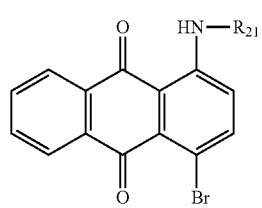

(B4-11)

(in the formula, $R_{21}$ represents the same meaning as described above) with 1.1 to 3 moles of benzoyl acetic acid ethyl ester in a polar solvent such as xylene in the presence of a basic compound such as sodium carbonate at 130° C. to 180° C. for 5 to 15 hours, the compound of the following Formula (B4-12) may be obtained

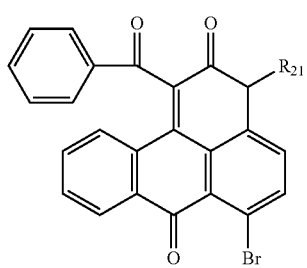

(B4-12)

(In the formula, $R_{21}$ represents the same meaning as described above).

Subsequently, by subjecting 1 mole of the compound of Formula (B4-12) to condensation by Ulmann reaction with 1 to 5 moles of meta amino acetanilide in an aprotic polar organic solvent such as N,N-dimethyl formamide in the presence of a base such as sodium carbonate and a copper catalyst such as copper acetate at 110° C. to 150° C. for 2 to 6 hours, the compound of the following formula (B4-13)

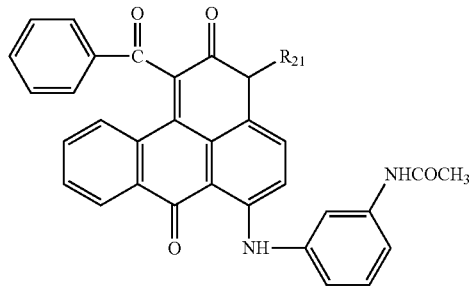

(B4-13)

(In the formula, $R_{21}$ represents the same meaning as described above) may be obtained.

Subsequently, by subjecting the compound of Formula (B4-13) to sulfonation and subjecting the acetylamino group to hydrolysis in 8 to 15% of fumed sulfuric acid at 50° C. to 120° C., the anthrapyridone compound of Formula (B4-6)

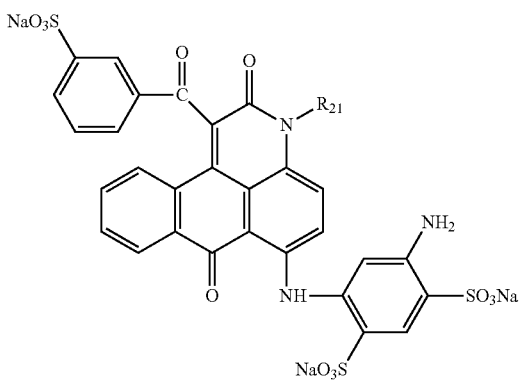

(B4-6)

(In the formula, $R_{21}$ represents the same meaning as described above) may be obtained.

[Compound Represented by Formula (B5)]

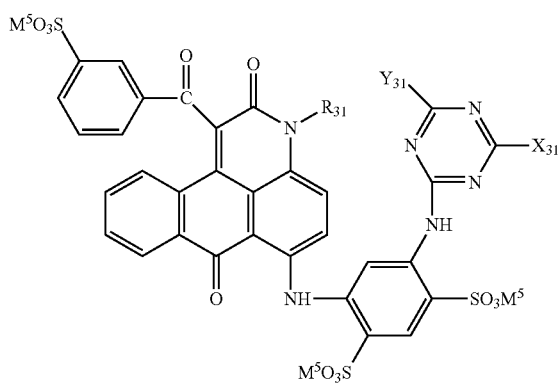

(B5)

In Formula (B5), $R_{31}$ represents a hydrogen atom or a substituted or unsubstituted alkyl group.

$Y_{31}$ represents a chlorine atom, a hydroxyl group, a substituted or unsubstituted amino group or a morpholino group.

$M^5$ represents a hydrogen atom or a counter cation. $M^5$'s may be the same or different.

$X_{31}$ represents a group represented by the following Formula (B5-1).

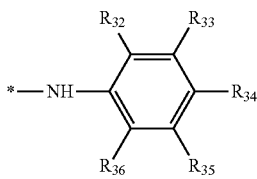

(B5-1)

In Formula (B5-1), $R_{32}$, $R_{33}$, $R_{34}$, $R_{35}$ and $R_{36}$ each independently represent a hydrogen atom, an alkyl group having 1 to 8 carbon atoms or —COOM' (M' represents a hydrogen atom or a counter cation). Provided that at least one of $R_{32}$, $R_{33}$, $R_{34}$, $R_{35}$ and $R_{36}$ represents an alkyl group having 1 to 8 carbon atoms or —COOM'.

In Formula (B5), $R_{31}$ represents a hydrogen atom or a substituted or unsubstituted alkyl group.

Specific examples of the alkyl group and the substituent in the case where $R_{31}$ represents a substituted or unsubstituted alkyl group are the same as those of $R_{21}$ in Formula (24).

As $R_{31}$, a hydrogen atom or an unsubstituted alkyl group is preferred, a hydrogen atom or a methyl group is more preferred, and a methyl group is even more preferred from the viewpoint of the availability of raw materials.

In Formula (B5), $Y_{31}$ represents a chlorine atom, a hydroxyl group, a substituted or unsubstituted amino group or a morpholino group.

Specific examples and preferred ranges of the case where $R_{31}$ represents a substituted or unsubstituted amino group are the same as those of $R_{21}$ in Formula (B4).

As $R_{31}$, a chlorine atom, a hydroxyl group or an amino group is preferred, a hydroxyl group or an amino group is more preferred, and a hydroxyl group is even more preferred, from the viewpoint of moisture resistance.

In Formula (B5), $X_{31}$ represents a group (a substituted anilino group) represented by the following Formula (B5-1).

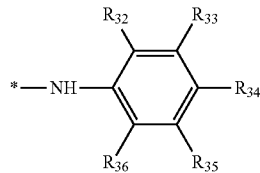

(B5-1)

In Formula (B5-1), $R_{32}$, $R_{33}$, $R_{34}$, $R_{35}$ and $R_{36}$ each independently represent a hydrogen atom, an alkyl group having 1 to 8 carbon atoms or —COOM' (M' represents a hydrogen atom or a counter cation). Provided that at least one of $R_{32}$, $R_{33}$, $R_{34}$, $R_{35}$ and $R_{36}$ represents an alkyl group having 1 to 8 carbon atoms or —COOM'.

When $R_{32}$, $R_{33}$, $R_{34}$, $R_{35}$ and $R_{36}$ represent an alkyl group having 1 to 8 carbon atoms, the alkyl group having 1 to 8 carbon atoms is preferably a straight or branched alkyl group, and examples thereof include a methyl group, an ethyl group, an n-propyl group, an isopropyl group, an n-butyl group, a t-butyl group, an n-hexyl group, an n-octyl group and the like.

In the case of the alkyl group, it is preferred that at least one of $R_{232}$ and $R_{236}$ is an alkyl group, and the other is a hydrogen atom, in consideration of hue. Furthermore, as the alkyl group, a methyl group, an ethyl group, an n-propyl group or an isopropyl group is preferred.

M' represents a hydrogen atom or a counter cation. Examples of the counter cation include a monovalent counter cation, and an alkali metal ion (preferably a lithium ion, a sodium ion and a potassium ion, and more preferably a sodium ion), an ammonium ion, an organic cation and the like are preferred. Examples of the organic cation include a cation in which a hydrogen ion is added to alkylamine or alkanolamine, examples of the alkylamine include trimethylamine, triethylamine and the like, and examples of the alkanolamine include monoethanolamine, diethanolamine, triethanolamine, monoisopropanolamine, diisopropanolamine, triisopropanolamine and the like.

It is preferred that M' is a hydrogen atom or an alkali metal ion.

As $R_{32}$ to $R_{36}$, an alkyl group having 1 to 8 carbon atoms or —COOM' is preferred, and the case where one to three, more preferably one to two of $R_{32}$ to $R_{36}$ are these groups, and the others are a hydrogen atom is preferred.

When two of these groups are a group other than a hydrogen atom, the case where $R_{32}$ and $R_{36}$ or $R_{33}$ and $R_{35}$ are a group other than a hydrogen atom is preferred, and when three of these groups are a group other than a hydrogen atom, it is preferred that $R_{32}$, $R_{34}$ and $R_{36}$ are a group other than a hydrogen atom. The case where one to three of $R_{32}$ to $R_{36}$ are —COOM', and the others are a hydrogen atom is more preferred. The case where at least one of $R_{32}$, $R_{33}$ or $R_{35}$ is —COOM' is even more preferred.

Specific examples of $X_{31}$ include, for example, a 2-methylanilino group, a 2,6-dimethylanilino group, a 2,5-dimethylanilino group, a 2,4,6-trimethylanilino group, a 2,6-diethylanilino group, a 2,5-diethylanilino group, a 2,6-di-iso-propylanilino group, a 2,5-di-iso-propylanilino group, a 2-carboxyanilino group, a 3-carboxyanilino group, a 4-carboxyanilino group, a 2,5-dicarboxyanilino group, a 3,5-dicarboxyanilino group, a 5-carboxy-2-methylanilino group, a 5-carboxy-2-ethylanilino group and the like.

As $X_{31}$, a 2,6-dimethylanilino group, a 2,4,6-trimethylanilino group, a 2,6-diethylanilino group, a 2,6-di-iso-propylanilino group, a 2-carboxyanilino group or a 3,5-dicarboxyanilino group is preferred, a 2,6-dimethylanilino group, a 2,6-diethylanilino group, a 2,6-di-iso-propylanilino group, a 2-carboxyanilino group or a 3,5-dicarboxyanilino group is more preferred, and a 2-carboxyanilino group or a 3,5-dicarboxyanilino group is even more preferred.

In Formula (B5), $M^5$ represents a hydrogen atom or a counter cation. $M^5$'s may be the same or different.

In Formula (B5), when $M^5$ is a hydrogen atom, the hydrogen atom is in a form of a free acid, and when $M^5$ is a counter cation, the counter cation is in a form of a salt.

Examples of the counter cation that forms a salt include a monovalent counter cation, and the counter cation is preferably an alkali metal ion, an ammonium ion, an organic cation and the like.

Examples of the organic cation include a cation in which a hydrogen ion is added to alkylamine or alkanolamine, examples of the alkylamine include trimethylamine, triethylamine and the like, and examples of the alkanolamine include monoethanolamine, diethanolamine, triethanolamine, monoisopropanolamine, diisopropanolamine, triisopropanolamine and the like.

From the viewpoint of water solubility, an alkali metal ion is preferred, and a lithium ion, a sodium ion and a potassium ion are more preferred. In particular, the sodium ion is preferred from the viewpoint of low cost preparation.

In Formula (B5), $M^5$'s may be the same or different. That is, the compound represented by Formula (B5) in a form of a salt includes a case where all sulfo groups are salts, and a case where some sulfo groups are in a form of a free acid and some sulfo groups are salts. Further, the counter cation forming a salt may be present either alone or in plurality.

In addition, the same applies to those (for example, a carboxyl group) which may be in a form of a salt as a group other than a sulfo group.

Specific examples of the anthrapyridone compound represented by Formula (B5) are shown in Table B3. In Table B3, (K) and 2(K) mean a carboxy group and a dicarboxy group, respectively. Meanwhile, in the following specific examples, the sulfo group may be in a state of a salt.

TABLE 3

| No. | $R_{21}, R_{22}$ | X | $Y_{21}, Y_{22}$ |
|---|---|---|---|
| 3-0-1 | $CH_3$ | 2,6-Dimethylanilino | OH |
| 3-0-2 | $CH_3$ | 2,6-Dimethylanilino | $NH_2$ |
| 3-0-3 | $CH_3$ | 2,5-Dimethylanilino | OH |
| 3-0-4 | $CH_3$ | 2-Methylanilino | OH |

TABLE 3-continued

| No. | $R_{21}, R_{22}$ | X | $Y_{21}, Y_{22}$ |
|---|---|---|---|
| 3-0-5 | $CH_3$ | 2,4,6-Trimethylanilino | OH |
| 3-0-6 | $CH_3$ | 2,4,6-Trimethylanilino | $NH_2$ |
| 3-0-7 | H | 2,4,6-Trimethylanilino | Cl |
| 3-0-8 | $CH_3$ | 2,4,6-Trimethylanilino | 2-Ethylhexylamino |
| 3-0-9 | $CH_3$ | 2,6-Diisopropylanilino | OH |
| 3-0-10 | $CH_3$ | 2,6-Diisopropylanilino | $NH_2$ |
| 3-0-11 | $C_2H_5$ | 2,6-Diisopropylanilino | Cl |
| 3-0-12 | $CH_3$ | 2,6-Diisoprosylanilino | Monoethanolamine |
| 3-0-13 | $CH_3$ | 2,5-Diisopropylanilino | OH |
| 3-0-14 | $CH_3$ | 2,6-Diethylanilino | OH |
| 3-0-15 | $CH_3$ | 2,6-Diethylanilino | $NH_2$ |
| 3-0-16 | $CH_3$ | 2,6-Diethylanilino | Cl |
| 3-0-17 | $CH_3$ | 2,6-Diethylanilino | 2-Ethylhexylamino |
| 3-0-18 | $CH_3$ | 2,6-Diethylanilino | Monoethanolamino |
| 3-0-19 | $CH_3$ | 2,6-Diethylanilino | Diethanolamino |
| 3-0-20 | $C_2H_4OH$ | 2,6-Diethylanilino | Morpholino |
| 3-0-21 | $CH_3$ | 2,5-Diethylanilino | OH |
| 3-0-22 | $CH_3$ | 2,5-Diethylanilino | $NH_2$ |
| 3-0-23 | $CH_3$ | 2-(K)-anilino | OH |
| 3-0-24 | $CH_3$ | 2-(K)-anilino | $NH_2$ |
| 3-0-25 | $CH_3$ | 2,5-2(K)-anilino | OH |
| 3-0-26 | $C_4H_9$ | 2,5-2(K)-anilino | $NH_2$ |
| 3-0-27 | $CH_3$ | 3,5-2(K)-anilino | OH |
| 3-0-28 | $CH_3$ | 3-(K)-anilino | OH |
| 3-0-29 | $CH_3$ | 4-(K)-anilino | OH |
| 3-0-30 | $CH_3$ | 5-(K)-2-methylanilino | OH |
| 3-0-31 | $CH_3$ | 5-(K)-2-ethylanilino | OH |
| 3-0-32 | $CH_3$ | 2,5-Diisopropylanilino | Cl |
| 3-0-33 | $CH_3$ | 2,4,6-Trimethylanilino | Cl |
| 3-0-34 | $CH_3$ | 2-(K)-anilino | Cl |
| 3-0-35 | $CH_3$ | 3,5-2(K)-anilino | Cl |
| 3-0-36 | $CH_3$ | 4-(K)-anilino | Cl |
| 3-0-37 | $CH_3$ | 3-(K)-anilino | Cl |

A method of synthesizing the compound represented by Formula (B5) will be described.

The anthrapyridone compound of Formula (B5) is prepared by, for example, the following method. That is, by reacting the compound of Formula (B5-3) (in the formula, $R_{31}$ represents the same meaning as described above) which is a primary condensate obtained by reaction of 1 mole of the compound of the following Formula (B5-2)

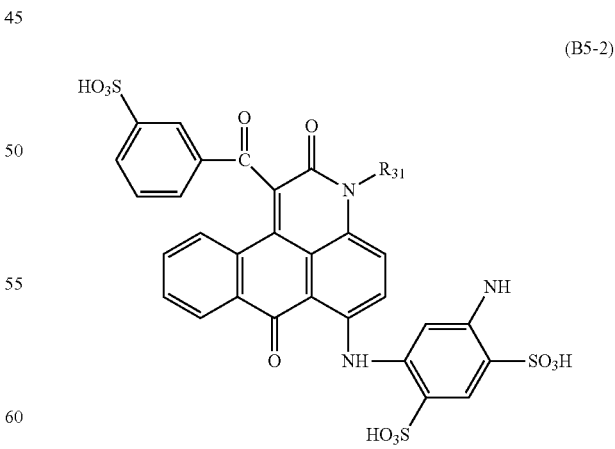

(B5-2)

(in the formula, $R_{31}$ represents the same meaning as described above) with 1 to 1.3 moles of 2,4,6-trichloro-S-triazine (cyanuric chloride) in water at a pH of 2 to 7 and 5° C. to 35° C. for 2 to 8 hours, (B5-3)

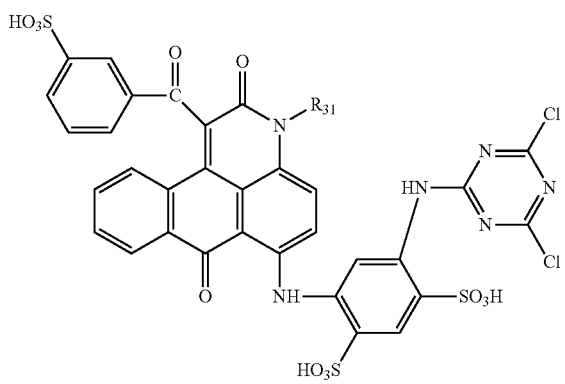

with 1 mole of corresponding anilines at a pH of 4 to 9 and 5° C. to 90° C. for 10 minutes to 5 hours, the compound of Formula (B5-4) in which $Y_{31}$ is a chlorine atom (B5-4)

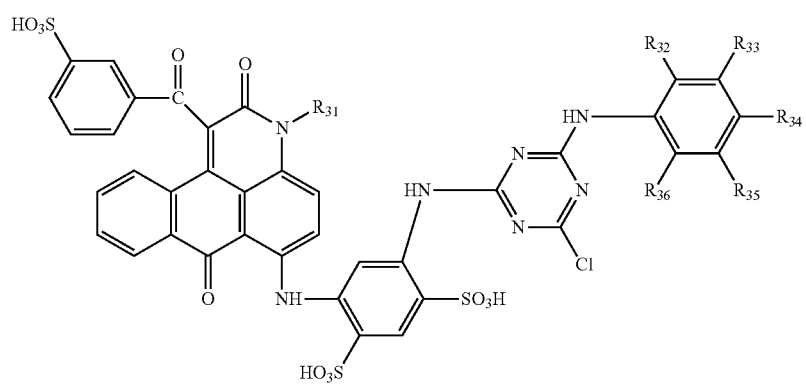

(in the formula, $R_{31}$ to $R_{36}$ have the same meaning as described above) is obtained as a secondary condensate. Subsequently, by performing hydrolysis at a pH of 9 to 12 and 50° C. to 100° C. for 10 minutes to 5 hours, or reacting ammonium or the corresponding amines at a pH of 8 to 10 and 50° C. to 100° C. for 10 minutes to 8 hours, a compound of Formula (B5-5) in which $Y_{31}$ is other than a chlorine atom (in the formula, $R_{31}$ to $R_{36}$ and $Y_{31}$ represent the same meaning as described above) is obtained as a tertiary condensate.

Meanwhile, the order of the condensation is appropriately determined depending on the reactivity of various compounds, but is not limited to the above order.

The compound thus obtained is present in a form of a free acid, or in a form of the salt thereof. The method of producing a salt is the same as the method of producing a salt in the compound represented by Formula (B4).

Meanwhile, the anthrapyridone compound of Formula (B5-2) may be obtained in the same manner as in the Synthesis Example of the anthrapyridone compound of Formula (B4-6) in the method of synthesizing Formula (B4). Meanwhile, $R_{21}$ in Formula (B4-6) is reread as $R_{31}$, and $R_{31}$ in Formula (B5-2) represents the same meaning as described above.

(B5-5)

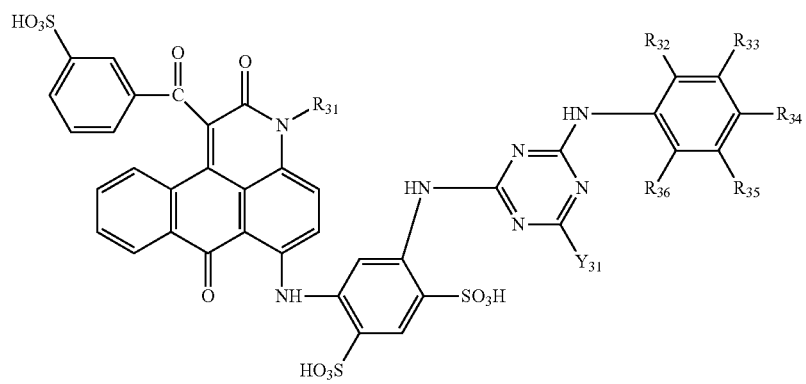

[Compound Represented by Formula (C4)]

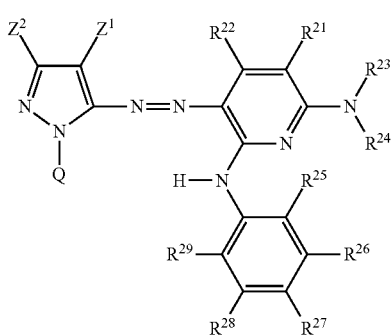

In Formula (C4), $Z^1$ represents an electron-withdrawing group having a Hammett's substituent constant σp value of 0.20 or more.

$Z^2$ represents a hydrogen atom, an aliphatic group, an aromatic group, an acyl group or a heterocyclic group.

$R_{23}$ and $R_{24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. Provided that there is no case where both $R_{23}$ and $R_{24}$ are a hydrogen atom at the same time.

$R_{21}$ and $R_{22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkyl or arylsulfonylamino group, an aryloxycarbonylamino group, a nitro group, an alkyl or arylthio group, an alkyl or arylsulfonyl group, an alkyl or arylsulfinyl group, a sulfamoyl group, a sulfo group or a heterocyclic thio group. Further, $R^{21}$ and $R^{23}$ or $R^{23}$ and $R^{24}$ may combine with each other to form a five- or six-membered ring.

$R^{25}$ and $R^{29}$ each independently represent an alkyl group, an alkoxy group or a halogen atom. Provided that when both $R^{25}$ and $R^{29}$ are an alkyl group at the same time, the sum of the number of carbon atoms constituting the alkyl group is 3 or more, and these groups may be further substituted.

$R^{26}$, $R^{27}$ and $R^{28}$ each independently have the same meaning as $R^{21}$ and $R^{22}$, and $R^{25}$ and $R^{26}$, or $R^{28}$ and $R^{29}$ may be condensed with each other to form a ring.

Q represents a hydrogen atom, an aliphatic group, an aromatic group or a heterocyclic group.

Each group of $Z^1$, $Z^2$, $R^{21}$, $R^{22}$, $R^{23}$, $R^{24}$ and Q may further have a substituent.

Provided that Formula (C4) has at least one ionic hydrophilic group.

In Formula (C4), $Z^1$ represents an electron-withdrawing group having a Hammett's substituent constant σp value of 0.20 or more.

(Hammett's Substituent Constant σp Value)

The Hammett's substituent constant σp value used in the present specification will be described. The Hammett's rule is an empirical rule proposed by L. P. Hammett in 1935 in order to quantitatively discuss an influence of substituent groups exerted on reaction or equilibrium of a benzene derivative, and the validity of this rule is widely recognized today. The substituent constant required by the Hammett's rule includes an σp value and an σm value, and these values are disclosed in many general literatures, the details of which are described in, for example, J. A. Dean, Ed., "Lange's Handbook of Chemistry", 12th Edition, 1979 (McGraw-Hill) or "Realms of Chemistry" special issue, No. 122, pp. 96 to 103, 1979 (Nankodo). Meanwhile, each substituent in the present invention is limited or described by the substituent constant up of Hammett, but it is not meant that the substituents are not limited only to a substituent group which may be found in the aforementioned literatures and the value of which is already known in the literatures, but even if the value is not yet known in the literatures, the substituent will be definitely included in the present invention as long as the value falls within the range when measured on the basis of the Hammett's rule.

The electron-withdrawing group of $Z^1$ is an electron-withdrawing group having a Hammett's substituent constant σp value of 0.20 or more, and more preferably 0.30 or more. The upper limit of the σp value is preferably 1.0 or less.

Specific examples of the electron-withdrawing group having an σp value of 0.20 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, a heterocyclic group, a halogen atom, an azo group, a selenocyanate group and an aryl group substituted with another electron-withdrawing group having an σp value of 0.20 or more.

From the viewpoint of hue and fastness, $Z^1$ is preferably a cyano group, a nitro group or a halogen atom, more preferably a halogen atom or a cyano group, and most preferably a cyano group.

In Formula (C4), $Z^2$ represents a hydrogen atom, an aliphatic group, an aromatic group, an acyl group or a heterocyclic group.

Examples of the aliphatic group include an alkyl group, a cycloalkyl group and the like.

Examples of the aromatic group include an aryl group and the like.

In addition, examples of a group corresponding to the aromatic group and the aliphatic group include an aralkyl group.

The alkyl group is preferably an alkyl group having 1 to 12 carbon atoms, and more preferably an alkyl group having 1 to 6 carbon atoms, and examples thereof include a methyl group, an ethyl group, a butyl group, an isopropyl group, a t-butyl group and the like.

The alkyl group may have a substituent, and examples of the substituent include the above-described Group A of substituents, and are preferably a hydroxyl group, an alkoxy group, a cyano group, a halogen atom and an ionic hydrophilic group.

Examples of the alkyl group having a substituent include a hydroxyethyl group, a methoxyethyl group, a cyanoethyl group, a trifluoromethyl group, a 3-sulfopropyl group, a 4-sulfobutyl group and the like.

The cycloalkyl group is preferably a cycloalkyl group having 5 to 12 carbon atoms, and examples thereof include a cyclohexyl group and the like.

The cycloalkyl group may have a substituent, examples of the substituent include the above-described Group A of substituents, and the substituent is preferably an ionic hydrophilic group.

The aralkyl group is preferably an aralkyl group having 7 to 12 carbon atoms, and examples thereof include a benzyl group, a 2-phenethyl group and the like.

The aralkyl group may have a substituent, examples of the substituent include the above-described Group A of substituents, and the substituent is preferably an ionic hydrophilic group.

The aryl group is preferably an aryl group having 6 to 12 carbon atoms, and examples thereof include a phenyl group, a naphthyl group and the like.

The aryl group may have a substituent, examples of the substituent include the above-described Group A of substituents, or an amide group, a sulfonamide group, an ester group and the like, and the substituent is preferably an alkyl group, an alkoxy group, a halogen atom, an alkylamino group, an amide group, a carbamoyl group, a sulfamoyl group, a sulfonamide group, a hydroxy group, an ester group or an ionic hydrophilic group.

Examples of the aryl group having a substituent include a p-tolyl group, a p-methoxyphenyl group, o-chlorophenyl, a m-(3-sulfopropylamino)phenyl group and the like.

The heterocyclic group is preferably a 5- or 6-membered heterocyclic group, and examples thereof include a 2-pyridyl group, a 2-thienyl group, a 2-thiazolyl group, a 2-benzothiazolyl group, a 2-benzoxazolyl group, a 2-furyl group, and the like.

The heterocyclic group may have a substituent, examples of the substituent include the above-described Group A of substituents, or an amide group, a sulfonamide group, an ester group and the like, and the substituent is preferably an amide group, a carbamoyl group, a sulfamoyl group, a sulfonamide group, a hydroxy group, an ester group and an ionic hydrophilic group.

The acyl group is preferably an acyl group having 1 to 12 carbon atoms, and examples thereof include an acetyl group, a benzoyl group and the like.

The acyl group may have a substituent, examples of the substituent include the above-described Group A of substituents, and the substituent is preferably an ionic hydrophilic group.

As $Z^2$, an alkyl group or an aryl group is preferred, an alkyl group having 3 or 4 carbon atoms (preferably an isopropyl group or a t-butyl group), a phenyl group, or a phenyl group further having a substituent at any one of the 2-, 4- and 6-positions looking from the pyrazole mother nucleus side is more preferred, and a t-butyl group is even more preferred.

In Formula (C4), $R^{23}$ and $R^{24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group.

Examples of the aliphatic group include an alkyl group, a cycloalkyl group, an alkenyl group, an alkynyl group and the like.

Examples of the aromatic group include an aryl group and the like.

In addition, examples of a group corresponding to the aromatic group and the aliphatic group include an aralkyl group.

Provided that there is no case where both $R^{23}$ and $R^{24}$ are a hydrogen atom at the same time.

Examples of the alkyl group, the cycloalkyl group, the aralkyl group, the aryl group, the heterocyclic group and the acyl group include each group described in the above-described $Z^2$.

Each group may further have a substituent, and examples of the substituent are also the same as the examples described in the above-described $Z^2$.

The alkenyl group is preferably an alkenyl group having 5 to 12 carbon atoms, and examples thereof include a vinyl group, an allyl group and the like.

The alkenyl group may have a substituent, examples of the substituent include the above-described Group A of substituents, and the substituent is preferably an ionic hydrophilic group.

Examples of the alkoxycarbonyl group, the aryloxycarbonyl group, the carbamoyl group, the alkylsulfonyl group, the arylsulfonyl group, the sulfamoyl group and the alkynyl group include each group described in the above-described Group A of substituents.

Each group may further have a substituent, and examples of the substituent include the above-described Group A of substituents.

From the viewpoint of hue, $R^{23}$ and $R^{24}$ are each independently preferably a hydrogen atom, an alkyl group, a cycloalkyl group, an aralkyl group, an alkenyl group, an aromatic group, a heterocyclic group, a sulfonyl group, an acyl group or a carbamoyl group, more preferably a hydrogen atom, an alkyl group, an aralkyl group, an aromatic group, a heterocyclic group, a sulfonyl group or an acyl group, and even more preferably a hydrogen atom, an aromatic group or a heterocyclic group.

It is particularly preferred that $R^{23}$ is a hydrogen atom or a heterocyclic group, and $R^{24}$ is an aromatic group.

As the heterocyclic group, preferably, a benzoxazolyl group or a benzothiazolyl group is particularly preferred, and more specifically, an unsubstituted benzothiazolyl group or a benzothiazolyl group in which a sulfo group (also includes a state of a salt) is substituted is preferred.

The aromatic group is preferably an aryl group in which at least one group selected from an alkyl group and a sulfo group (also includes a state of a salt) is substituted, and particularly preferably a phenyl group in which at least one group selected from an alkyl group and a sulfo group is substituted.

Specific examples and preferred ranges of a counter cation in the case where the sulfo group is in the state of a salt are the same as specific examples and preferred ranges of the case where the compound represented by Formula (1) becomes a salt.

In Formula (C4), $R^{21}$ and $R^{22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkyl or arylsulfonylamino group, an aryloxycarbonylamino group, a nitro group, an alkyl or arylthio group, an alkyl or arylsulfonyl group, an alkyl or arylsulfinyl group, a sulfamoyl group, a sulfo group or a heterocyclic thio group. Furthermore, $R^{21}$ and $R^{23}$ or $R^{23}$ and $R^{24}$ may combine with each other to form a 5- or 6-membered ring.

Examples of the aliphatic group include an alkyl group, a cycloalkyl group, an alkenyl group, an alkynyl group and the like.

Examples of the aromatic group include an aryl group and the like.

Further, examples of a group corresponding to the aromatic group and the aliphatic group include an aralkyl group.

Specific examples of each group represented by $R^{21}$ and $R^{22}$ include each group described in the above-described Group A of substituents.

Each group may further have a substituent, and examples of the substituent include the above-described Group A of substituents.

As $R^{21}$ and $R^{22}$, from the viewpoint of the ease of synthesis, light fastness and ozone resistance, a hydrogen atom, an alkyl group, a carbamoyl group or a cyano group is preferred, and a hydrogen atom, an alkyl group having 1 to 4 carbon atoms, a carbamoyl group or a cyano group is more preferred. In particular, it is preferred that $R^{21}$ is a hydrogen atom, and $R^{22}$ is a hydrogen atom or an alkyl group having 1 to 4 carbon atoms (most preferably a methyl group).

In Formula (C4), $R^{25}$ and $R^{29}$ each independently represent an alkyl group, an alkoxy group or a halogen atom. When both $R^{25}$ and $R^{29}$ are an alkyl group at the same time, the sum of the number of carbon atoms constituting the alkyl group is 3 or more, and these groups may be further substituted.

Specific examples of the alkyl group, the alkoxy group and the halogen atom include each group described in the above-described Group A of substituents.

The alkyl group and the alkoxy group may further have a substituent, and examples of the substituent include the above-described Group A of substituents.

From the viewpoint of light fastness and ozone resistance, $R^{25}$ and $R^{29}$ are preferably an alkyl group, and are each preferably an alkyl group having 1 to 3 carbon atoms (preferably a methyl group, an ethyl group and an isopropyl group). Provided that the sum of the number of carbon atoms constituting the alkyl groups of $R^{25}$ and $R^{29}$ is 3 or more, an alkyl group with a sum of 3 to 5 carbon atoms, which may be substituted, is preferred, and an unsubstituted alkyl group with a sum of 4 or 5 carbon atoms is more preferred.

In Formula (C4), $R^{26}$, $R^{27}$ and $R^{28}$ each independently have the same meaning as $R^{21}$ and $R^{22}$, and $R^{25}$ and $R^{26}$, or $R^{28}$ and $R^{29}$ may be condensed with each other to form a ring.

Specific examples of $R^{26}$, $R^{27}$ and $R^{28}$ are the same as those of $R^{21}$ and $R^{22}$ and preferred ranges thereof are also the same, but as $R^{26}$, $R^{27}$ and $R^{28}$, a hydrogen atom, an alkyl group or a sulfo group (also includes a state of a salt) is preferred, and a hydrogen atom, an alkyl group having 1 to 4 carbon atoms (most preferably a methyl group) or a sulfo group is more preferred.

Specific examples and preferred ranges of a counter cation in the case where the sulfo group is in the state of a salt are the same as specific examples and preferred ranges of the case where the compound represented by Formula (1) becomes a salt.

In Formula (C4), Q represents a hydrogen atom, an aliphatic group, an aromatic group or a heterocyclic group.

Examples of the aliphatic group include an alkyl group, a cycloalkyl group, an alkenyl group and the like.

Examples of the aromatic group include an aryl group and the like.

Further, examples of a group corresponding to the aromatic group and the aliphatic group include an aralkyl group.

Specific examples of the alkyl group, the cycloalkyl group, the aralkyl group, the alkenyl group, the aryl group and the heterocyclic group include each group described in the above-described $R^{23}$ and $R^{24}$.

Each group may further have a substituent, and examples of the substituent are also the same as the examples described in the above-described $R^{23}$ and $R^{24}$.

It is preferred that Q is an aryl group or a heterocyclic group substituted with an electron-withdrawing group or a sulfo group (also includes a state of a salt). Specific examples and preferred ranges of a counter cation in the case where the sulfo group is in the state of a salt are the same as specific examples and preferred ranges of the case where the compound represented by Formula (1) becomes a salt.

The electron-withdrawing group is an electron-withdrawing group having a Hammett's substituent constant σp value of 0.20 or more, and preferably 0.30 or more. The upper limit of the σp value is preferably 1.0 or less.

Specific examples of the electron-withdrawing group having an σp value of 0.20 or more include the electron-withdrawing group described in $Z^1$, and the electron-withdrawing group is preferably a cyano group, a nitro group and a halogen atom.

The compound represented by Formula (C4) has at least one ionic hydrophilic group.

From the viewpoint of water solubility, the ionoic hydrophilic group is preferably at least one group selected from a sulfo group, a carboxyl group, a phosphono group and a quaternary ammonium group.

As the ionoic hydrophilic group, at least one group selected from a sulfo group, a carboxyl group and a phosphono group is preferred, and among them, a carboxyl group and a sulfo group are preferred. In particular, it is most preferred that at least one is a sulfo group. The carboxyl group, the phosphono group and the sulfo group may be in a state of a salt, examples of the counter ion forming the salt include an ammonium ion, an alkali metal ion (for example, a lithium ion, a sodium ion and a potassium ion) and an organic cation (for example, a tetramethylammonium ion, a tetramethylguanidium ion and tetramethylphosphonium). Among the counter ions, an alkali metal salt is preferred. Among the alkali metal salts, a potassium ion, a sodium ion and a lithium ion are preferred, a lithium ion and a sodium ion are more preferred, and a sodium ion is most preferred.

The compound represented by Formula (C4) is preferably a compound having 3 to 6 ionic hydrophilic groups in the molecule thereof, more preferably a compound having 3 to 6 sulfo groups, and even more preferably a compound having 3 to 5 sulfo groups, from the viewpoint of water solubility.

The compound represented by Formula (C4) is preferably a compound represented by the following Formula (C4').

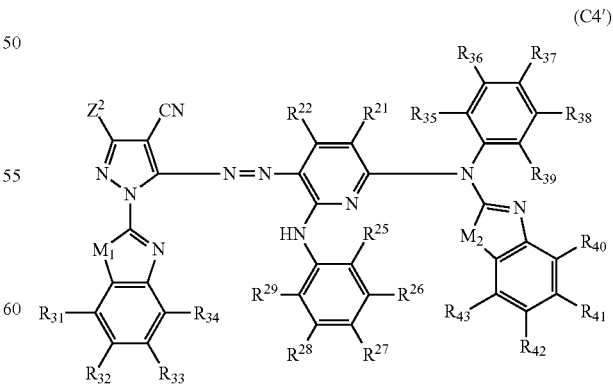

(C4')

In Formula (C4'), $Z^2$ represents a hydrogen atom, an aliphatic group, an aromatic group, an acyl group or a heterocyclic group.

$R^{21}$ and $R^{22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkyl or arylsulfonylamino group, an aryloxycarbonylamino group, a nitro group, an alkyl or arylthio group, an alkyl or arylsulfonyl group, an alkyl or arylsulfinyl group, a sulfamoyl group, a sulfo group or a heterocyclic thio group.

$R^{25}$ and $R^{29}$ each independently represent an alkyl group, an alkoxy group or a halogen atom. Provided that when both $R^{25}$ and $R^{29}$ are an alkyl group at the same time, the sum of the number of carbon atoms constituting the alkyl group is 3 or more, and these groups may be further substituted.

$R^{26}$, $R^{27}$ and $R^{28}$ each independently have the same meaning as $R^{21}$ and $R^{22}$, and $R^{25}$ and $R^{26}$, or $R^{28}$ and $R^{29}$ may be condensed with each other to form a ring.

$R_{31}$, $R_{32}$, $R_{33}$, $R_{34}$, $R_{35}$, $R_{36}$, $R_{37}$, $R_{38}$, $R_{39}$, $R_{40}$, $R_{41}$, $R_{42}$ and $R_{43}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, a sulfamoyl group or an ionic hydrophilic group.

$M_1$ and $M_2$ each independently represent a hydrogen atom or a sulfur atom.

Each group of $Z^2$, $R^{21}$ and $R^{22}$ may further have a substitutent.

Provided that Formula (C4') has at least one ionic hydrophilic group.

In Formula (C4'), $Z^2$, $R^{21}$, $R^{22}$, $R^{25}$, $R^{26}$, $R^{27}$, $R^{28}$ and $R^{29}$ have the same meaning as $Z^2$, $R^{21}$, $R^{22}$, $R^{25}$, $R^{26}$, $R^{27}$, $R^{28}$ and $R^{29}$ in Formula (C4), and specific examples and preferred ranges thereof are also the same.

In Formula (C4'), $R_{31}$, $R_{32}$, $R_{33}$, $R_{34}$, $R_{35}$, $R_{36}$, $R_{37}$, $R_{38}$, $R_{39}$, $R_{40}$, $R_{41}$, $R_{42}$ and $R_{43}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, a sulfamoyl group or an ionic hydrophilic group. Specific examples of each of the groups are the same as those described in $R^{23}$ and $R^{24}$ in Formula (C4). The ionic hydrophilic group is the same as described above.

It is preferred that $R_{31}$, $R_{32}$, $R_{33}$, $R_{34}$, $R_{35}$, $R_{36}$, $R_{37}$, $R_{38}$, $R_{39}$, $R_{40}$, $R_{41}$, $R_{42}$ and $R_{43}$ are a hydrogen atom, an alkyl group or a sulfo group.

In Formula (C4'), $M_1$ and $M_2$ each independently represent a hydrogen atom or a sulfur atom, and are preferably a sulfur atom.

A method of synthesizing the compound represented by Formula (C4) will be described. Herein, among the compounds represented by Formula (C4), a method of preparing a compound represented by the following Formula (C4-R1) or (C4-R2) will be described.

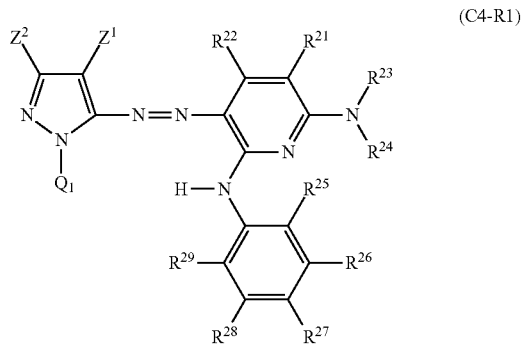

(C4-R1)

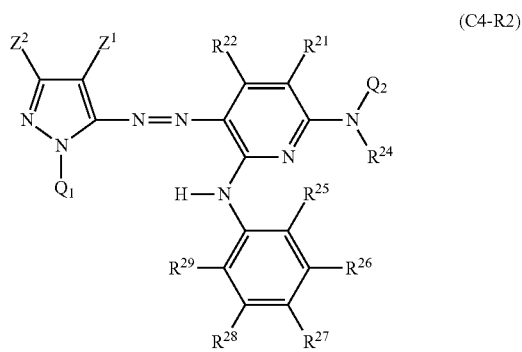

(C4-R2)

In Formula (C4-R1), $Z^1$, $Z^2$, $R^{21}$, $R^{22}$, $R^{23}$, $R^{24}$, $R^{25}$, $R^{26}$, $R^{27}$, $R^{28}$ and $R^{29}$ each have the same meaning as $Z^1$, $Z^2$, $R^{21}$, $R^{22}$, $R^{23}$, $R^{24}$, $R^{25}$, $R^{26}$, $R^{27}$, $R^{28}$ and $R^{29}$ in Formula (C4). $Q_1$ represents an aliphatic group, an aromatic group or a heterocyclic group.

In Formula (C4-R2), $Z^1$, $Z^2$, $R^{21}$, $R^{22}$, $R^{24}$, $R^{25}$, $R^{26}$, $R^{27}$, $R^{28}$ and $R^{29}$ each have the same meaning as $Z^1$, $Z^2$, $R^{21}$, $R^{22}$, $R^{24}$, $R^{25}$, $R^{26}$, $R^{27}$, $R^{28}$ and $R^{29}$ in Formula (C4). $Q_1$ and $Q_2$ each independently represent an aliphatic group, an aromatic group or a heterocyclic group.

The compound of Formula (C4-R1) is obtained by any one method of the following method <1> and/or <2>.

Method <1> is a method including: (a) a step of forming a diazonium salt by reacting an aminopyrazole represented by the following Formula (C4-1) with a diazotizing agent, (b) a step of forming a compound represented by the following Formula (C4-H1) by reacting the diazonium salt formed in step (a) with a coupling agent represented by the following Formula (C4-2), and (c) a step of forming the compound represented by Formula (C4-R1) by reacting the compound formed in step (b) with an alkylating agent, an arylating agent or a heterylating agent in the presence of a base.

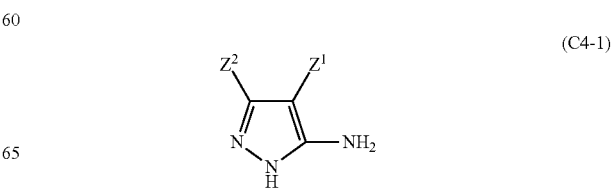

(C4-1)

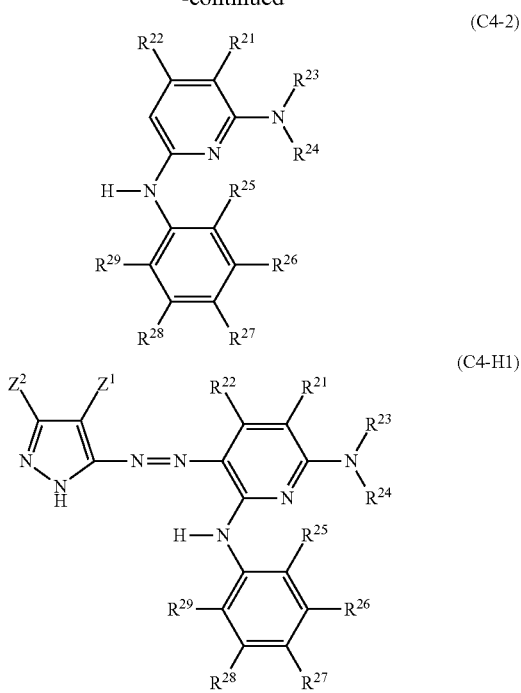

In Formulae (C4-1), (C4-2) and (C4-H1), $Z^1$, $Z^2$, $R^{21}$, $R^{22}$, $R^{23}$, $R^{24}$, $R^{25}$, $R^{26}$, $R^{27}$, $R^{28}$ and $R^{29}$ each have the same meaning as $Z^1$, $Z^2$, $R^{21}$, $R^{22}$, $R^{23}$, $R^{24}$, $R^{25}$, $R^{26}$, $R^{27}$, $R^{28}$ and $R^{29}$ in Formula (C4).

Method <2> is a method including a step of introducing a water-soluble group into the compound represented by Formula (C4-R1) by an electrophilic reaction. Further, it is preferred that the electrophilic reaction is a method described in detail below.

In method <1>, it is preferred that as the diazotizing agent used in step (a), a dilute hydrochloric acid aqueous solution of sodium nitrite is used. In addition, isopentyl nitrite, nitrosyl sulfuric acid and the like may also be used as the diazotizing agent.

In method <1>, it is most preferred that as the coupling agent used in step (b), a nitrogen-containing 6-membered heterocyclic coupler represented by Formula (C4) is used. Preferred examples of $Z^1$, $Z^2$, $R^{21}$, $R^{22}$, $R^{23}$, $R^{24}$, $R^{25}$, $R^{26}$, $R^{27}$, $R^{28}$ and $R^{29}$ in Formula (C4) are the same as the case in Formula (C4).

In method <1>, the alkylating agent, the arylating agent or the heterylating agent used in step (c) is represented by the following Formula (C5), (C6) or (C7).

R—X  Formula (C5)

Ar—X  Formula (C6)

Het-X  Formula (C7)

In Formula (C5), R represents an alkyl group which may be substituted, and X represents a halogen atom or $OSO_2R'$. R' represents an alkyl group or an aryl group such as a phenyl group.

In Formula (C6), Ar represents a phenyl group in which an electron-withdrawing group is substituted, and is preferably substituted with a substituent having the sum of Hammett's σp values of 0.2 or more. X represents a halogen atom or $OSO_2R'$. R' represents an alkyl group or an aryl group such as a phenyl group.

In Formula (C7), Het denotes a heterocyclic ring, and is preferably a 2-pyridyl group, a 2-thienyl group, a 2-thiazolyl group, a 2-benzothiazolyl group, a triazyl group and a 2-furyl group. X represents a halogen atom or $OSO_2R'$. R' represents an alkyl group or an aryl group such as a phenyl group.

As the base used in step (c), it is possible to use an organic base, such as diisopropylethylamine, and an inorganic base, such as potassium carbonate, sodium carbonate, sodium hydrogencarbonate, potassium hydrogencarbonate, sodium hydroxide, and potassium hydroxide.

The electrophilic reaction in method <2> includes sulfonation, Mannich reaction, and Friedel-Crafts reaction, and among them, sulfonation is preferred.

As a method of sulfonation of Formula (C4-R1), sulfonation may be performed using a sulfonating agent such as concentrated sulfuric acid, 10 to 60% fuming sulfuric acid, chlorosulfonic acid, sulfur trioxide and amidosulfuric acid. Furthermore, a solvent may be used, and as the solvent, acetic acid, acetic anhydride, sulfolane, ethyl acetate, ether, carbon tetrachloride, acetonitrile and the like may be used.

In Formula (C4-R1), it is preferred that $Q_1$, $R^{23}$, $R^{24}$, $R^{26}$ ($R^{28}$) and $R^{27}$ are sulfonated, and when substituents of $Q_1$, $R^{23}$, $R^{24}$, $R^{26}(R^{28})$ and $R^{27}$ have a plurality of reaction sites capable of being sulfonated, sulfonated colorants having different substitution sites may be incorporated.

In this case, sulfonated colorants having different substitution positions may be incorporated in a range of 0.1% to 50% in terms of HPLC area % based on a mainly sulfonated colorant. The reaction temperature (Celsius degree) is preferably −5° C. to 80° C., and more preferably in a range of 10° C. to 70° C. The reaction time is preferably 30 minutes to 10 hours, and more preferably 1 hour to 6 hours.

In the preparation method of Formula (C4-R1) or Formula (C4-R2), as an oxygen-free condition, it is preferred to prepare the compound by filling the reaction system with an inert gas such as nitrogen and argon, and furthermore, it is preferred to bubble the reaction solution with these inert gases.

The aminopyrazole represented by Formula (C4-1) as a starting material used in step (a) of method <1> may be synthesized by the methods described in the specification of U.S. Pat. No. 3,336,285, Heterocycles 20,519 (1983), the official gazette of Japanese Patent Publication No. H6-19036 and the like.

The pyridine coupler (coupling agent represented by Formula (C4-2)) used in step (b) of method <1> may be synthesized by the methods described in the official gazettes of Japanese Patent Application Laid-Open Nos. S51-83631 and S49-74718 and Japanese Patent Publication No. S52-46230, and the like.

The azo colorant represented by Formula (C4) may be synthesized by the above-described preparation method of the present invention. Specific examples of the azo colorant of the present invention will be described below, but are not limited to the following examples.

Meanwhile, in the following specific examples, the sulfo group may be in a state of a salt.

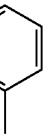
| Compound | Z² | Q | R²¹ | R²² | R²³ | R²⁴ | R²⁵ | R²⁶ | R²⁷ | R²⁸ | R²⁹ |
|---|---|---|---|---|---|---|---|---|---|---|---|
| d-1 | ![phenyl] | 2-methylbenzothiazole-6-SO₃H | CN | CH₃ | H | 4-SO₃H-phenyl | CH₃ | H | SO₃H | H | C₂H₅ |
| d-2 | t-Bu | 2-methylbenzothiazole-6-SO₃H | CONH₂ | H | H | 3,5-bis(1-methylethyl)-4-methyl-phenyl-SO₃H | iPr | H | SO₃H | H | iPr |
| d-3 | t-Bu | 2-methylbenzothiazole-6-SO₃H | H | CH₃ | 2-methylbenzothiazole-6-SO₃H | 3,5-bis(1-methylethyl)-4-methyl-phenyl-SO₃H | iPr | H | SO₃H | H | iPr |

-continued

| Compound | $Z^2$ | Q | $R^{21}$ | $R^{22}$ | $R^{23}$ | $R^{24}$ | $R^{25}$ | $R^{26}$ | $R^{27}$ | $R^{28}$ | $R^{29}$ |
|---|---|---|---|---|---|---|---|---|---|---|---|
| d-4 | t-Bu | 2-methyl-6-sulfobenzothiazolyl | H | $CH_3$ | 2-methyl-6-sulfobenzothiazolyl | 3-ethyl-4-methyl-5-ethyl-phenyl with $SO_3H$ | $C_2H_5$ | H | $SO_3H$ | H | $C_2H_5$ |
| d-5 | t-Bu | 2-methyl-6-sulfobenzothiazolyl | H | $CH_3$ | 2-methyl-6-sulfobenzothiazolyl | 3-ethyl-4-methyl-5-ethyl-6-methyl-phenyl with $SO_3H$ | $C_2H_5$ | H | $CH_3$ | $SO_3H$ | $C_2H_5$ |
| d-6 | t-Bu | 2-methyl-6-sulfobenzothiazolyl | H | $CH_3$ | 2-methyl-6-sulfobenzothiazolyl | 3-methyl-4-methyl-5-(1-methylethyl)-phenyl with $SO_3H$ | $CH_3$ | H | $SO_3H$ | H | iPr |

-continued

| Compound | Z² | Q | R²¹ | R²² | R²³ | R²⁴ | R²⁵ | R²⁶ | R²⁷ | R²⁸ | R²⁹ |
|---|---|---|---|---|---|---|---|---|---|---|---|
| d-7 | t-Bu | 2-methyl-6-sulfo-benzothiazole | H | CH₃ | 2-methyl-6-sulfo-benzothiazole | 3-methyl-4-methyl-5-methoxy-phenyl with SO₃H | CH₃ | H | SO₃H | H | OCH₃ |
| d-8 | t-Bu | 2-methyl-6-sulfo-benzothiazole | H | CH₃ | 2-methyl-6-sulfo-benzothiazole | 2-chloro-4-methyl-6-methyl-phenyl with SO₃H | CH₃ | H | CH₃ | SO₃H | Cl |
| d-9 | t-Bu | 3,5-dicarboxyphenyl-SO₂NH-2-methyl-6-benzothiazole | H | CH₃ | 3,5-dicarboxyphenyl-SO₂NH-2-methyl-6-benzothiazole | 2,4,6-triethyl-phenyl with SO₃H | C₂H₅ | H | CH₃ | SO₃H | C₂H₅ |

-continued

[Structure: pyrazole with Z², CN, N=N linked to pyridine bearing R²¹, R²², NR²³R²⁴, and NH-phenyl with R²⁵-R²⁹ substituents; pyrazole N-Q]

| Compound | Z² | Q | R²¹ | R²² | R²³ | R²⁴ | R²⁵ | R²⁶ | R²⁷ | R²⁸ | R²⁹ |
|---|---|---|---|---|---|---|---|---|---|---|---|
| d-10 | t-Bu | [3-SO₂NH-5-COOH-phenyl with COOH] | H | CH₃ | [2-methylbenzothiazol-6-yl-SO₂NH-3,5-dicarboxyphenyl] | [3,5-bis(1-methylethyl)-4-methyl-phenyl with SO₃H] | iPr | H | SO₃H | SO₃H | iPr |
| d-16 | t-Bu | [2-methyl-benzothiazol-6-SO₃H] | H | CH₃ | [2-methyl-benzothiazol-6-SO₃H] | [2,6-diethyl-4-methyl-phenyl with SO₃H and CH₃] | C₂H₅ | H | CH₃ | SO₃H | C₂H₅ |
| d-17 | t-Bu | [2-methyl-benzothiazol-6-SO₃H] | H | CH₃ | [2-methyl-benzothiazol-6-SO₃H] | [2,6-diethyl-4-methyl-phenyl with SO₃H and CH₃] | C₂H₅ | H | CH₃ | SO₃H | C₂H₅ |

-continued
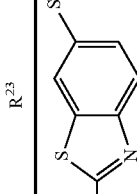
| Compound | $Z^2$ | Q | $R^{21}$ | $R^{22}$ | $R^{23}$ | $R^{24}$ | $R^{25}$ | $R^{26}$ | $R^{27}$ | $R^{28}$ | $R^{29}$ |
|---|---|---|---|---|---|---|---|---|---|---|---|
| d-18 | t-Bu | 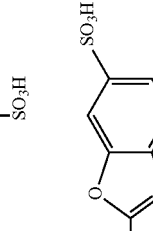 | H | $CH_3$ | 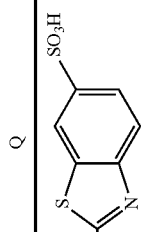 | 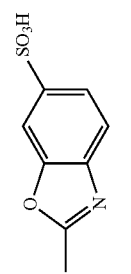 | $C_2H_5$ | H | $CH_3$ | $SO_3H$ | $C_2H_5$ |
| d-19 | t-Bu |  | H | $CH_3$ | 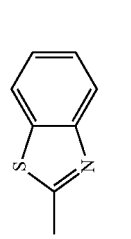 |  | $C_2H_5$ | H | $CH_3$ | $SO_3H$ | $C_2H_5$ |
| d-20 | t-Bu |  | H | $CH_3$ |  |  | $C_2H_5$ | H | $CH_3$ | $SO_3H$ | $C_2H_5$ |

-continued
| Compound | Z² | Q | R²¹ | R²² | R²³ | R²⁴ | R²⁵ | R²⁶ | R²⁷ | R²⁸ | R²⁹ |
|---|---|---|---|---|---|---|---|---|---|---|---|
| d-21 | t-Bu | 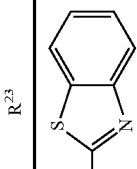 | CN | CH₃ | 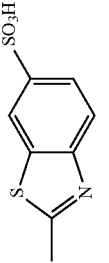 | 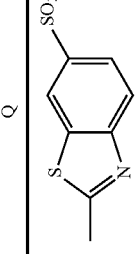 | C₂H₅ | H | CH₃ | SO₃H | C₂H₅ |
| d-22 | t-Bu | 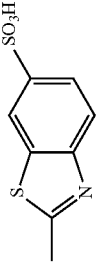 | CN | CH₃ | 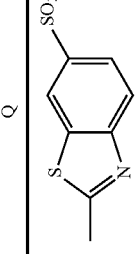 | (3,5-diethyl-4-methylphenyl) | C₂H₅ | H | CH₃ | SO₃H | C₂H₅ |
| d-23 | t-Bu | 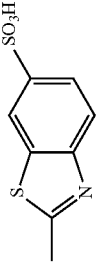 | CN | CH₃ | (2-methyl-benzothiazole-6,4-disulfonic acid) | (2,6-diethyl-4-methylphenyl-SO₃H) | C₂H₅ | H | CH₃ | SO₃H | C₂H₅ |

-continued
| Compound | $Z^2$ | Q | $R^{21}$ | $R^{22}$ | $R^{23}$ | $R^{24}$ | $R^{25}$ | $R^{26}$ | $R^{27}$ | $R^{28}$ | $R^{29}$ |
|---|---|---|---|---|---|---|---|---|---|---|---|
| d-24 | t-Bu |  | CN | $CH_3$ | 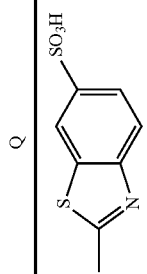 |  | $C_2H_5$ | $SO_3H$ | $CH_3$ | $SO_3H$ | $C_2H_5$ |
| d-25 | t-Bu | 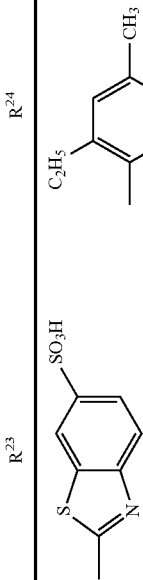 | CN | $CH_3$ |  |  | $C_2H_5$ | H | $CH_3$ | H | $C_2H_5$ |

[Coloring Composition]

The coloring composition of a first aspect of the present invention contains the compound represented by Formula (1) and the compound represented by Formula (A4). A synergistic effect is exhibited by interaction (control of permeability in a print medium, or becoming a preferred absorption waveform in the design of hue) by using the compound represented by Formula (1) and the compound represented by Formula (A4) in combination, so that good moisture resistance, ozone resistance, hue and chroma may be obtained.

The coloring composition of a second aspect of the present invention contains the compound represented by Formula (1) and at least one selected from the group consisting of the compound represented by Formula (B4) and the compound represented by Formula (B5). Any one or both of the compound represented by Formula (B4) and Formula (B5) may be used. Both good fastness and good print concentration may be compatible by a synergistic effect due to interaction (deactivation by intermolecular energy shift of excited energy, control of permeability in a print medium and the like) by using the compound represented by Formula (1) and at least one selected from the group consisting of the compound represented by Formula (B4) and the compound represented by Formula (B5) in combination.

The coloring composition of a third aspect of the present invention contains at least one of the compound represented by Formula (1) of the present invention and at least one of the compound represented by Formula (C4) of the present invention. Both good fastness and good hue may be compatible by a synergistic effect of the compound represented by Formula (1) and the compound represented by Formula (C4).

The coloring composition of a first aspect of the present invention may contain a medium, and the case of using a solvent as the medium is particularly suitable as an ink for inkjet recording. The coloring composition of the present invention may be manufactured by using a lipophilic medium or an aqueous medium as a medium, and dissolving and/or dispersing the compound represented by Formula (1) and the compound represented by Formula (A4) in the medium. The coloring composition of the present invention preferably uses an aqueous medium. A composition for ink except for the medium is also included in the coloring composition of the present invention. In the present invention, the content of the compound of the present invention included in the coloring composition may be determined by the kind of substituent in Formulae (1) and (A4) to be used, the kind of solvent component used to prepare the coloring composition and the like, and the content ratio of the compound represented by Formula (1) in the coloring composition is preferably 0.1 to 20% by mass, more preferably 0.4 to 10% by mass and even more preferably 0.75 to 6% by mass, based on the total mass of the coloring composition.

A required image concentration may be secured while improving chromogenic property of ink on a recording medium during printing by setting the content ratio of the compound represented by Formula (1) included in the coloring composition of the first aspect to 0.75% by mass or more. In addition, it is possible to improve discharge property of the coloring composition when used in the inkjet recording method by setting the content ratio of the compound represented by Formula (1) included in the coloring composition to 20% by mass or less, and furthermore, it is possible to obtain an effect in that it is difficult for the inkjet nozzle to be clogged and the like.

The content ratio of the compound represented by Formula (A4) in the coloring composition of the first aspect is preferably 0.1 to 20% by mass, more preferably 0.4 to 10% by mass, and even more preferably 0.75 to 6% by mass based on the total mass of the coloring composition, from the viewpoint of discharging property of the coloring composition when used in the inkjet recording method.

In the coloring composition of the first aspect, the mass ratio of the content of the compound represented by Formula (1) to the content of the compound represented by Formula (A4) is preferably 95/5 to 5/95, more preferably 95/5 to 10/90, and even more preferably 95/5 to 20/80. It is preferred to set the mass ratio within the aforementioned ranges from the viewpoint of the balance of moisture resistance, print concentration, ozone resistance and light fastness.

The coloring composition of the second aspect of the present invention may contain a medium, and the case of using a solvent as the medium is particularly suitable as an ink for inkjet recording. The coloring composition of the present invention may be manufactured by using a lipophilic medium or an aqueous medium as a medium, and dissolving and/or dispersing at least one selected from the group consisting of the compound represented by Formula (1), the compound represented by Formula (B4) and the compound represented by Formula (B5) in the medium. The coloring composition of the present invention preferably uses an aqueous medium. A composition for ink except for the medium is also included in the coloring composition of the present invention.

In the present invention, the content of the compound of the present invention included in the coloring composition of the second aspect may be determined by the kind of substituent in Formulae (1) (A4) and (B5) to be used, the kind of solvent component used to prepare the coloring composition and the like, and the content ratio of the compound represented by Formula (1) in the coloring composition is preferably 0.1 to 20% by mass, more preferably 0.4 to 10% by mass and even more preferably 0.4 to 6% by mass, based on the total mass of the coloring composition.

A required image concentration may be secured while chromogenic property of ink on a recording medium during printing may be improved by setting the content ratio of the compound represented by Formula (11) included in the coloring composition of the second aspect to 0.1% by mass or more. In addition, it is possible to improve discharge property of the coloring composition when used in the inkjet recording method by setting the content ratio of the compound represented by Formula (1) included in the coloring composition to 20% by mass or less, and furthermore, it is possible to obtain an effect in that it is difficult for the inkjet nozzle to be clogged and the like.

The combined content ratio of the compound represented by Formula (B4) and the compound represented by Formula (B5) in the coloring composition of the second aspect is preferably 1 to 20% by mass, more preferably 1 to 10% by mass, and even more preferably 2 to 6% by mass based on the total mass of the coloring composition, from the viewpoint of stability over time and discharging property of the coloring composition when used in an inkjet recording method.

In the coloring composition of the second aspect, the mass ratio of the content of the compound represented by Formula (1) to the combined content of the compound represented by Formula (B4) and the compound represented by Formula (B5) is preferably 95/5 to 5/95, more preferably 95/5 to 10/90, and even more preferably 95/5 to 20/80. It is preferred to set the mass ratio within the aforementioned ranges from the viewpoint of establishing ozone resistance, light fastness, moisture resistance and print concentration.

The coloring composition of the third aspect of the present invention may contain a medium, and the case of using a solvent as the medium is particularly suitable as an ink for inkjet recording. The coloring composition of the present invention may be manufactured by using a lipophilic medium or an aqueous medium as a medium, and dissolving and/or dispersing the compound of the present invention in the medium. The coloring composition of the present invention preferably uses an aqueous medium. A composition for ink except for the medium is also included in the coloring composition of the present invention.

In the present invention, the content of the compound of the present invention included in the coloring composition of the third aspect may be determined by the kind of substituent in Formulae (1) and (C4) to be used, the kind of solvent component used to prepare the coloring composition and the like, and the content of the compound represented by Formula (1) in the coloring composition is preferably 0.1 to 20% by mass, more preferably 0.4 to 10% by mass and even more preferably 0.75 to 6% by mass, based on the total mass of the coloring composition.

Chromogenic property of ink on a recording medium during printing may be improved by setting the content ratio of the compound represented by Formula (1) included in the coloring composition of the third aspect to 0.75% by mass or more, and further, a required image concentration may be secured. In addition, it is possible to improve discharge property of the coloring composition when used in the inkjet recording method by setting the combined amount of the compound represented by Formula (1) included in the coloring composition to 20% by mass or less, and furthermore, it is possible to obtain an effect in that it is difficult for the inkjet nozzle to be clogged and the like.

The content of the compound represented by Formula (C4) in the coloring composition of the third aspect is preferably 0.1 to 18% by mass, and more preferably 0.15 to 10% by mass based on the total mass of the coloring composition, from the viewpoint of hue.

In the coloring composition of the third aspect, the mass ratio of the content of the compound represented by Formula (1) to the content of the compound represented by Formula (C4) is preferably 95/5 to 5/95, more preferably 95/5 to 10/90, and even more preferably 95/5 to 20/80. It is preferred to set the mass ratio within the aforementioned ranges from the viewpoint of balance of light fastness, ozone resistance and hue.

The coloring composition of the third aspect of the present invention may contain other additives within a range not impairing the effect of the present invention, if necessary. Examples of the other additives include additives which may be used in the ink for inkjet recording to be described below.

The coloring composition of the present invention may contain other additives within a range not impairing the effect of the present invention, if necessary. Examples of the other additives include additives which may be used in the ink for inkjet recording to be described below.

[Ink for Inkjet Recording]

Subsequently, an ink for inkjet recording of the present invention will be described.

The present invention also relates to an ink for inkjet recording which contains the coloring composition of the present invention.

The ink for inkjet recording may be manufactured by dissolving and/or dispersing the compound (mixture) of the present invention in a lipophilic medium or an aqueous medium. The ink is preferably an ink using an aqueous medium.

If necessary, the ink may contain other additives within a range not impairing the effect of the present invention. Examples of the other additives include publicly known additives such as a drying inhibitor (wetting agent), a discoloration inhibitor, an emulsification stabilizer, a permeation accelerator, an ultraviolet absorbent, an antiseptic, a fungicide, a pH adjusting agent, a surface tension adjusting agent, a defoaming agent, a viscosity adjusting agent, a dispersing agent, a dispersion stabilizer, a rust inhibitor and a chelating agent. These various additives are directly added to an ink solution in the case of an aqueous ink. When an oil-soluble dye is used in the form of a dispersion, the additives are generally added to the dispersion after the preparation of a dye dispersion, but may be added to the oil or aqueous phase during the preparation.

The drying inhibitor is suitably used for the purpose of preventing occurrence of clogging as the ink for inkjet recording is dried in the ink jetting port of a nozzle used for an inkjet recording system.

It is preferred that the drying inhibitor is a water-soluble organic solvent having vapor pressure that is lower than that of water. Specific examples thereof include polyhydric alcohols represented by ethylene glycol, propylene glycol, diethylene glycol, polyethylene glycol, thiodi glycol, dithiodi glycol, 2-methyl-1,3-propandiol, 1,2,6-hexanetriol, an acetylene glycol derivative, glycerin, trimethylolpropane and the like, low alkylethers of polyhydric alcohol such as ethylene glycol monomethyl (or ethyl)ether, diethylene glycol monomethyl (or ethyl)ether and triethylene glycol monoethyl (or butyl) ether, heterocyclic rings such as 2-pyrrolidone, N-methyl-2-pyrrolidone, 1,3-dimethyl-2-imidazolidinone and N-ethylmorpholine, a sulfur-containing compound such as sulfolane, dimethylsulfoxide and 3-sulfolene, a polyfunctional compound such as diacetone alcohol and diethanol amine, and a urea derivative. Among them, polyhydric alcohol such as glycerin and diethylene glycol is more preferred. Further, the aforementioned drying inhibitor may be used either alone or in combination of two or more thereof. The drying inhibitor is preferably contained in an amount of 10 to 50% by mass in the ink.

The permeation accelerator is suitably used for the purpose of obtaining higher permeation of the ink for inkjet recording into paper. As the permeation accelerator, it is possible to use alcohols such as ethanol, isopropanol, butanol, di(tri)ethylene glycol monobutyl ether, and 1,2-hexanediol, sodium lauryl sulfate, sodium oleate, a nonionic surfactant, and the like. When the aforementioned permeation accelerator is contained in an amount of 5 to 30 mass % in the ink, there is typically a sufficient effect, and it is preferred to use the permeation accelerator within an addition amount range causing no blurring of printed letter or no print through.

The ultraviolet absorbent is used for the purpose of enhancing the preservability of image. As the ultraviolet absorbent, it is possible to use a benzotriazole-based compound described in the official gazettes of Japanese Patent Application Laid-Open Nos. S58-185677 and S61-190537, Japanese Patent Application Laid-Open Nos. H2-782, H5-197075, and H9-34057 and the like, a benzophenone-based compound described in the official gazettes of Japanese Patent Application Laid-Open Nos. S46-2784 and H5-194483, the specification of U.S. Pat. No. 3,214,463 and the like, a cinnamic acid-based compound described in the official gazettes of Japanese Patent Publication Nos. S48-30492 and S56-21141, Japanese Patent Application Laid-Open No. H10-88106 and the like, a triazine-based compound described in the official gazettes of Japanese Patent Application Laid-Open Nos. H4-298503, H8-53427, H8-239368 and H10-182621, Japanese Unexamined Patent Application Publication No. H8-501291 and the like, a compound described in Research Disclosure No. 24239, or also a compound which absorbs UV to emit fluorescence, a so-called fluorescent brightening agent, which is represented by a stilbene-based compound and a benzoxazole-based compound.

The discoloration inhibitor is used for the purpose of enhancing the preservability of image. As the discoloration inhibitor, various organic-based and metal complex-based discoloration inhibitors may be used. Examples of the organic discoloration inhibitor include hydroquinones, alkoxyphenols, dialkoxyphenols, phenols, anilines, amines, indanes, chromans, alkoxyanilines, heterocyclic rings and the like, and examples of the metal complex include a nickel complex, a zinc complex and the like. More specifically, it is possible to use compounds described in patents cited in Research Disclosure Nos. 17643 (Items VII-I to VII-J), 15162, 18716 (page 650, left column), 36544 (page 527), 307105 (page 872) and 15162, or compounds included in formulae of representative compounds and in the examples of compounds described in the official gazette of Japanese Patent Application Laid-Open No. S62-215272 (pages 127 to 137).

Examples of the fungicide include sodium dehydroacetate, sodium benzoate, sodium pyridinethione-1-oxide, p-hydroxybenzoate ethyl ester, 1,2-benzisothiazolin-3-one, salts thereof and the like. The fungicide is preferably used in an amount of 0.02 to 1.00% by mass in the ink.

The aforementioned neutralizer (an organic salt group, and inorganic alkali) may be used as the pH adjusting agent. For the purpose of enhancing storage stability of an ink for inkjet recording, the pH adjusting agent is added such that the ink for inkjet recording has a pH of preferably 6 to 10, and more preferably 7 to 10.

Examples of the surface tension adjusting agent include nonionic, cationic or anionic surfactants. Meanwhile, the surface tension of the ink for inkjet recording of the present invention is preferably 25 to 70 mN/m. In addition, the surface tension is preferably 25 to 60 mN/m. Furthermore, the viscosity of the ink for inkjet recording of the present invention is preferably 30 mPa·s or less. Further, the viscosity is more preferably adjusted to 20 mPa·s or less. Preferred examples of the surfactant include anionic surfactants such as fatty acid salt, alkylsulfuric ester salt, alkylbenzene sulfonate, alkylnaphthalene sulfonate, dialkyl sulfosuccinate, alkyl ester phosphate, naphthalene sulfonic acid formaline condensate, and polyoxyethylenealkyl ester sulfate, and non-ionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethyleneoxypropylene block copolymer. In addition, SURFYNOLS (Air Products & Chemicals Co., Ltd.) that is an acetylene-based polyoxyethylene oxide surfactant is also preferably used. Furthermore, amine oxide type ampholytic surfactants such as N,N-dimethyl-N-alkylamine oxide are also preferred. Further, it is also possible to use a surfactant exemplified as the surfactants in pages (37) and (38) of the official gazette of Japanese Patent Application Laid-Open No. S59-157,636 and Research Disclosure No. 308119 (1989).

As the defoaming agent, a chelating agent represented by fluorine- or silicon-based compounds or EDTA may also be used, if necessary.

When the compound of the present invention is dispersed in an aqueous medium, it is preferred that a colored particle containing the compound and an oil-soluble polymer is dispersed in an aqueous medium as described in each official gazette such as Japanese Patent Application Laid-Open No. H11-286637, Japanese Patent Application Nos. H2000-78491, H2000-80259 and H2000-62370, or the compound of the present invention dissolved in a high-boiling point organic solvent is dispersed in an aqueous medium as described in each specification of Japanese Patent Application Nos. H2000-78454, H2000-78491, H2000-203856 and H2000-203857. As a specific method when the compound of the present invention is dispersed in an aqueous medium, and an oil-soluble polymer, a high-boiling point organic solvent and an additive, which are to be used, and the use amounts thereof, those described in the patent official gazettes and the like may be preferably used. Otherwise, the compound of the present invention may be dispersed in the form of a solid as it is in a particle state. At the time of dispersing, a dispersing agent or a surfactant may be used. As the dispersing device, it is possible to use a simple stirrer, an impeller stirring system, an in-line stirring system, a mill system (for example, colloid mill, ball mill, sand mill, attritor, roll mill, agitator and the like), an ultrasonic system, and a high-pressure emulsion dispersion system (high-pressure homogenizer; Gaulin homogenizer, Microfluidizer, DeBEE 2000 and the like as a specific commercially available device). The aforementioned preparation method of the ink for inkjet recording is described in detail, in addition to the above-described patents, in each official gazette of Japanese Patent Application Laid-Open Nos. H5-148436, H5-295312, H7-97541, H7-82515, H7-118584 and H11-286637 and Japanese Patent Application No. 2000-87539, and may also be used for the preparation of the ink for inkjet recording of the present invention.

As the aqueous medium, a mixture, which contains water as a major component and is added with a water-miscible organic solvent, if desired, may be used. Examples of the water-miscible organic solvent include alcohol (for example, methanol, ethanol, propanol, isopropanol, butanol, isobutanol, sec-butanol, t-butanol, pentanol, hexanol, cyclohexanol and benzylalcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodi glycol), a glycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether), amine (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine), and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone). Meanwhile, two or more water-miscible organic solvents may be used in combination.

The compound represented by Formula (1) and the compound selected from (A) to (C) are contained in an amount of preferably 0.2 part by mass to 10 parts by mass and more preferably 1 part by mass to 6 parts by mass in 100 parts by mass of the ink for inkjet recording of the present invention. In addition, other colorants may be used in combination with the compound represented by Formula (1) and the compound selected from (A) to (C) in the ink for inkjet recording of the present invention. When two or more colorants are used in combination, it is preferred that the sum of the contents of the colorants is in the aforementioned range.

It is preferred that the ink for inkjet recording of the present invention has a viscosity of 30 mPa·s or less. Furthermore, the surface tension thereof is preferably 25 mN/m to 70 mN/m. The viscosity and the surface tension may be adjusted by adding various additives, for example, a viscosity adjusting agent, a surface tension adjusting agent, a specific resistance adjusting agent, a film adjusting agent, an ultraviolet absorbent, an antioxidant, a discoloration inhibitor, a fungicide, a rust inhibitor, a dispersant and a surfactant.

The ink for inkjet recording of the present invention may be used not only in forming a monochromatic image, but also in forming a full-color image. In order to form a full-color image, a magenta tone ink, a cyan tone ink and a yellow tone ink may be used, and in order to adjust the tone, a black tone ink may be further used.

As an applicable yellow dye, any dye may be used. Examples of the yellow dye include: an aryl or heterylazo dye having, for example, phenols, naphthols, anilines, heterocyclic rings such as pyrazolone or pyridone, chain-opening active methylene compounds and the like as a coupling component (hereinafter, referred to as "coupler component"); an azomethine dye having, for example, chain-opening active methylene compounds and the like as the coupler component; a methine dye such as, for example, a benzylidene dye or a monomethineoxonol dye; a quinone-based dye such as, for example, a naphthoquinone dye or an anthraquinone dye, and examples of the other dyes include a quinophthalone dye, nitro and nitroso dyes, an acridine dye, an acridinone dye and the like.

As an applicable magenta dye, any dye may be used. Examples thereof include: an aryl or heterylazo dye having, for example, phenols, naphthols, anilines and the like as the coupler component; an azomethine dye having, for example, pyrazolones, pyrazolotriazoles and the like as the coupler component; a methine dye such as, for example, an arylidene dye, a styryl dye, a melocyanine dye, a cyanine dye and an oxonol dye; a carbonium dye such as a diphenylmethane dye, a triphenylmethane dye and a xanthene dye; an quinone dye such as, for example, naphthoquinone, anthraquinone and anthrapyridone; and a condensated polycyclic dye such as, for example, a dioxazine dye, and the like.

As an applicable cyan dye, any dye may be used. Examples thereof include: an aryl or heterylazo dye having, for example, phenols, naphthols, anilines and the like as the coupler component; an azomethine dye having heterocyclic rings and the like such as, for example, phenols, naphthols and pyrrolotriazole as the coupler component; a polymethine dye such as a cyanine dye, an oxonol dye and a melocyanine dye; a carbonium dye such as a diphenylmethane dye, a triphenylmethane dye and a xanthene dye; a phthalocyanine dye; an anthraquinone dye; indigo and thioindigo dyes and the like.

Each dye as described above may be a dye that exhibits each color of yellow, magenta and cyan only after a part of the chromophore is dissociated, and in that case, the counter cation may be an inorganic cation such as an alkali metal or ammonium, and an organic cation such pyridinium and a quaternary ammonium salt, and furthermore may be a polymer cation having these compounds in the partial structure thereof.

Examples of an applicable black material include a dispersing element of carbon black in addition to disazo, trisazo and tetraazo dyes.

The ink composition of the present invention may be used in recording methods such as printing, copying, marking, writing, drafting and stamping, and is particularly suitable for use in the inkjet recording method.

[Inkjet Recording Method]

The present invention also relates to an inkjet recording method of forming an image by using the coloring composition or ink for inkjet recording of the present invention.

The inkjet recording method of the present invention donates energy to the ink for inkjet recording, and forms an image on publicly known image-receiving materials, that is, plain paper, resin-coated paper, exclusive inkjet paper described in, for example, the official gazettes of Japanese Patent Application Laid-Open Nos. H8-169172, H8-27693, H2-276670, H7-276789, H9-323475, S62-238783, H10-153989, H10-217473, H10-235995, H10-337947, H10-217597 and H10-337947, and the like, a film, electrophotographic common paper, fabric, glass, metal, ceramics and the like.

When an image is formed, a polymer particle dispersion (also referred to as a polymer latex) may be used in combination for the purpose of imparting glossiness or water resistance or improving weather resistance. A time point when a polymer latex is imparted to an image-receiving material may be before or after a coloring agent is imparted, or a simultaneous time point, and accordingly, a place where the polymer latex is added may also be in the image-receiving paper or in an ink, or the polymer latex may be used alone as a liquid material. Specifically, it is possible to preferably use the methods described in each specification of Japanese Patent Application Nos. 2000-363090, 2000-315231, 2000-354380, 2000-343944, 2000-268952, 2000-299465 and 2000-297365.

Hereinafter, the recording paper and the recording film used to perform inkjet printing by using the ink of the present invention will be described.

In the recording paper and the recording film, a support is formed of a chemical pulp such as LBKP and NBKP, a mechanical pulp such as GP, PGW, RMP, TMP, CTMP, CMP and CGP, a waste paper pulp such as DIP, and the like, and if necessary, it is possible to use a support manufactured by various devices such as a Fourdrinier paper machine and a cylinder paper machine by mixing additives, such as a pigment, a binder, a sizing agent, a fixing agent, a cationic agent and a paper strengthening agent, which are publicly known in the related art. In addition to the aforementioned support, any matter of a synthetic paper and a plastic film sheet may be used, and it is preferred that the thickness of the support is 10 to 250 m and the basis weight thereof is 10 to 250 g/m$^2$.

An ink absorbing layer and a backcoat layer may be formed on the support as it is, or after a size press or an anchor coat layer is formed by starch, polyvinyl alcohol and the like, the ink absorbing layer and the backcoat layer may be formed. Further, the support may be subjected to planarization treatment by a calendar device such as a machine calendar, a TG calendar, or a soft calendar. In the present invention, paper and plastic films, in which polyolefins (for example, polyethylene, polystyrene, polyethylene terephthalate, polybutene and a copolymer thereof) are laminated on both surfaces thereof, are more preferably used as the support.

It is preferred that a white pigment (for example, titanium oxide and zinc oxide) or a tint-imparting dye (for example, cobalt blue, ultramarine blue and neodymium oxide) is added to polyolefins.

A pigment or an aqueous binder is contained in an ink absorbing layer to be formed on a support. As the pigment, a white pigment is preferred, and examples of the white pigment include a white inorganic pigment such as calcium carbonate, kaolin, talc, clay, diatomite, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate, an organic pigment such as a styrene-based pigment, an acrylic pigment, a urea resin and a melamine resin, and the like. As the white pigment contained in the ink absorbing layer, a porous inorganic pigment is preferred, and a synthetic amorphous silica having a large pore area and the like are particularly suitable. As the synthetic amorphous silica, it is possible to use either a silicic acid anhydride obtained by a dry production method or a water-containing silicic acid obtained by a wet production method, but it is particularly preferred that a water-containing silicic acid is used.

The aqueous binder contained in the ink absorbing layer may be a water-soluble polymer such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide, or a polyalkylene oxide derivative, a water-dispersible polymer such as a styrenebutadiene latex or an acryl emulsion, and the like. These aqueous binders may be used either alone or in combination of two or more thereof. In the present invention, among the aqueous binders, polyvinyl alcohol or silanol-modified polyvinyl alcohol is particularly suitable from the viewpoint of an attachment property to the pigment and peeling resistance of an ink absorbing layer.

The ink absorbing layer may contain a mordant, a water-resistant agent, a light fastness enhancer, a surfactant and other additives in addition to the pigment and the aqueous binder.

It is preferred that the mordant added to the ink absorbing layer is immobilized. To this end, a polymer-mordant is preferably used.

The polymer-mordant is described in each official gazette of Japanese Patent Application Laid-Open Nos. S48-28325, S54-74430, S54-124726, S55-22766, S55-142339, S60-23850, S60-23851, S60-23852, S60-23853, S60-57836, S60-60643, S60-118834, S60-122940, S60-122941, S60-122942, and S60-235134, and H1-161236, and each specification of U.S. Pat. Nos. 2,484,430, 2,548,564, 3,148,061, 3,309,690, 4,115,124, 4,124,386, 4,193,800, 4,273,853, 4,282,305, and 4,450,224. An image-receiving material including the polymer-mordant described on pages 212 to 215 of the official gazette of Japanese Patent Application Laid-Open No. H1-161236 is particularly preferred. When the polymer-mordant described in the official gazette is used, an image having excellent image quality may be obtained, and light fastness of the image is also improved.

The water-resistant agent is effective for making the image water-resistant, and as the water-resistant agent, a cationic resin is particularly preferred. Examples of the cationic resin include polyamide polyamine epichlorohydrin, polyethyleneimine, polyaminesulfone, a dimethyldiallyl ammonium chloride polymer, cationic polyacrylamide, colloidal silica and the like, and among these cationic resins, polyamide polyamine epichlorohydrin is particularly suitable. The content of the cation resin is preferably 1 to 15% by mass and particularly preferably 3 to 10% by mass, based on the total solid content of the ink absorbing layer.

Examples of the light fastness enhancer include zinc sulfate, zinc oxide, hindered amine-based antioxidants, benzotriazole-based ultraviolet absorbents such as benzophenone, and the like. Among them, zinc sulfate is particularly suitable.

The surfactant functions as a coating aid, a peeling improving agent, a slipping improving agent, or an antistatic agent. The surfactant is described in each official gazette of Japanese Patent Application Laid-Open Nos. S62-173463 and S62-183457. An organic fluoro compound may be used instead of the surfactant. It is preferred that the organic fluoro compound is hydrophobic. Examples of the organic fluoro compound include a fluorine-based surfactant, an oil type fluorine-based compound (for example, fluorine oil), and a solid type fluorine compound resin (for example, a tetrafluoro ethylene resin). The organic fluoro compound is described in each official gazette of Japanese Patent Publication No. S57-9053 (8th to 17th columns), and Japanese Patent Application Laid-Open Nos. S61-20994 and S62-135826. Examples of other additives added to the ink absorbing layer include a pigment dispersant, a thickener, a defoaming agent, a dye, a fluorescent brightening agent, an antiseptic, a pH adjusting agent, a matting agent, a film hardening agent and the like. Meanwhile, the ink absorbing layer may have one layer or two layers.

A backcoat layer may also be formed onto the recording paper and the recording film, and examples of the component that may be added to the layer include a white pigment, an aqueous binder, and other components. Examples of the white pigment contained in the backcoat layer include a white inorganic pigment such as calcium carbonate light, calcium carbonate heavy, kaolin, talc, calcium sulfate, barium sulfate, titanium dioxide, zinc oxide, zinc sulfide, zinc carbonate, satin white, aluminum silicate, diatomite, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate and magnesium hydroxide, an organic pigment such as a styrene-based plastic pigment, an acrylic plastic pigment, polyethylene, microcapsules, a urea resin and a melamine resin, and the like.

Examples of the aqueous binder contained in the backcoat layer include a water-soluble polymer such as a styrene/maleate copolymer, a styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, a water-dispersible polymer such as a styrenebutadiene latex or an acryl emulsion, and the like. Examples of the other components contained in the backcoat layer include a defoaming agent, a foam inhibitor, a dye, a fluorescent brightening agent, an antiseptic, a water-resistant agent and the like.

A polymer latex may be added to the constituent layer (including the backcoat layer) of the inkjet recording paper and the recording film. The polymer latex is used for the purpose of improving physical properties of the film, such as dimensional stabilization, curling prevention, adherence prevention, and crack prevention of the film. The polymer latex is described in each official gazette of Japanese Patent Application Laid-Open Nos. S62-245258, S62-136648, and S62-110066. When a polymer latex having a low glass transition temperature (40° C. or less) is added to a layer including the mordant, cracks or curling of the layer may be prevented. Furthermore, even though a polymer latex having a high glass transition temperature is added to the backcoat layer, curling may be prevented.

The ink of the present invention has no limitation on the inkjet recording system, and is used in a known system, for example, a charge control system of discharging an ink using an electrostatic attraction force, a drop-on-demand system (pressure pulse system) using the oscillating pressure of a piezoelectric element, an acoustic inkjet system of discharging ink by converting electrical signals into acoustic beams to irradiate the acoustic beams on the ink and using radiation pressure, a thermal inkjet system of using pressure produced by heating ink to form bubbles, and the like. Examples of the inkjet recording system include a system of injecting a number of small volumes of ink with low concentration, which is called photo ink, a system of improving image quality using a plurality of inks having substantially the same color and different concentrations, or a system of using colorless and transparent ink.

EXAMPLES

Hereinafter, a synthesis method of the compound (mixture) of the present invention will be described in detail in Examples, but the present invention is not limited to these Examples at all. Unless otherwise indicated, "%" and "parts" in the Examples are % by mass and parts by mass.

Synthesis Example

Synthesis of Exemplary Compound 1-1

120 g of chlorosulfonic acid and 12.4 g of phosphorus oxychloride were added to a 500 ml 3-necked flask, 19 g of Acid Red 289 (manufactured by Chugai Kasei Co., Ltd., content ratio 71%) was dividedly added with caution thereto while stirring, and then the resulting mixture was reacted at 70° C. for 1 hour. The reaction solution was cooled to room temperature, and then cautiously poured into a place where 600 g of ice was being stirred in a 2 L beaker, to precipitate a solid. The precipitated solid was filtered out, and washed using a saturated brine solution at 10° C. or less to obtain 80.4 g of a wet cake of Compound A.

450 g of ice water was added to 80.4 g of the wet cake in a 1 L 3-necked flask to disperse the resulting mixture at 5° C. or less, a solution, in which 3.9 g of 4,4'-diaminostilbene-2,2'-disulfonic acid (manufactured by ACROS Co., Ltd., 95%) was dissolved in 60 mL of water by adjusting a pH to 9.0 using a 2 N sodium hydroxide aqueous solution, was added thereto, and the resulting mixture was warmed to 50° C. Herein, the mixture was stirred at 50° C. until the change in pH was removed while maintaining the pH at 9 with a 2N sodium hydroxide aqueous solution, and was further stirred at 50° C. for 1 hour.

The reaction solution was allowed to pass through a GF/F filter (manufactured Whatman, Inc.) to remove the insoluble material, and sodium chloride corresponding to 25 wt % of the total weight of the obtained filtrate was added thereto and the pH was adjusted to 4 using concentrated hydrochloric acid while stirring at room temperature to precipitate a solid. The precipitated solid was filtered out, the obtained solid was dispersed in 600 mL of water, the pH was adjusted to 9 using 2 N sodium hydroxide to dissolve the solid, and then the solution was desalted using a dialysis tube until the electrical conductivity became 10 μS or less, the resulting solution was again allowed to pass through a GF/F filter in order to capture dust, and the obtained filtrate was concentrated and dried at 60° C. to obtain 17.4 g of a green luster crystal of Exemplary Compound 1-1.

As a result of measurement of MS spectrum, 706.3 (100%) corresponding to $[(M-3)/3]^-$ of a dimer (in Formula (1), m=1 and n=2), which was a representative structure of the compound, and 529.5 corresponding to $[(M-4)/4]^-$ were observed. In addition, 823.7 corresponding to $[(M-3)/3]^-$ of a different dimer (in Formula (1), m=2 and n=2) and 617.5 corresponding to $[(M-4)/4]^-$ were observed, and 836.5 corresponding to $[(M-4)/4]^-$ of a trimer (in Formula (1), m=2 and n=3) was observed. The absorption spectrum of the compound in the aqueous solution was 529 nm.

Synthesis of Exemplary Compound 1-2

60 g of chlorosulfonic acid and 6.2 g of phosphorus oxychloride were added to a 250 ml 3-necked flask, 9.54 g of Acid Red 289 (manufactured by Chugai Kasei Co., Ltd., content ratio 71%) was dividedly added with caution thereto while stirring, and then the resulting mixture was reacted at 70° C. for 1 hour. The reaction solution was cooled to room temperature, and then cautiously poured into a place where 300 g of ice was being stirred in a 1 L beaker, to precipitate a solid. The precipitated solid was filtered out, and washed using a saturated brine solution at 10° C. or less to obtain a wet cake of Compound A.

The total amount of the wet cake of Compound A was dispersed in 150 mL of ice water in a 1 L beaker, 0.30 g of ethylenediamine was added thereto, and the resulting mixture was reacted at 50° C. for 3 hours while maintaining the pH of the reaction solution at 9 using a 2N sodium hydroxide aqueous solution. The reaction solution was cooled to room temperature, the Whatman GF/F filter was used to remove the insoluble material, the pH was adjusted to 8.5 using dilute hydrochloric acid, and then the resulting solution was desalted using a dialysis tube until the electrical conductivity became 10 μS or less, and concentrated and solidified to obtain 4.2 g of a green luster crystal of Exemplary Compound 1-2.

As a result of measurement of MS spectrum, 905.5 corresponding to $[(M-2)/2]^-$ of a dimer (in Formula (1), m=1 and n=2) which was a representative structure of the compound, 603 (100%) corresponding to $[(M-3)/3]^-$, and 452 corresponding to $[(M-4)/4]^-$ were observed.

The absorption spectrum of the compound in the aqueous solution was 530 nm.

Synthesis of Exemplary Compound 1-3

4.3 g of a green luster crystal of Exemplary Compound 1-3 was obtained in the same manner as in the synthesis of Exemplary Compound 1-2, except that ethylenediamine was changed into 4.3 g of piperazine. As a result of measurement of MS spectrum, 918 corresponding to $[(M-2)/2]^-$ of a dimer (in Formula (1), m=1 and n=2) which was a representative structure of the compound, 611 (100%) corresponding to $[(M-3)/3]^-$, and 458 corresponding to $[(M-4)/4]^-$ were observed. The absorption spectrum of the compound in the aqueous solution was 529 nm.

Synthesis of Exemplary Compound 1-4

4.1 g of a green luster crystal of Exemplary Compound 1-4 was obtained in the same manner as in the synthesis of Exemplary Compound 1-2, except that ethylenediamine was changed into 0.57 g of 2,5-dimethylpiperazine. As a result of measurement of MS spectrum, 932 corresponding to $[(M-2)/2]^-$ of a dimer (in Formula (1), m=1 and n=2) which was a representative structure of the compound, 621 (100%) corresponding to $[(M-3)/3]^-$, and 465.5 corresponding to $[(M-4)/4]^-$ were observed. The absorption spectrum of the compound in the aqueous solution was 529 nm.

Synthesis of Exemplary Compound 1-5

4.4 g of a green luster crystal of Exemplary Compound 1-5 was obtained in the same manner as in the synthesis of Exemplary Compound 1-2, except that ethylenediamine was changed into 0.65 g of 1-(2-aminoethyl)piperazine. As a result of measurement of MS spectrum, 944.5 corresponding to [(M−2)/2]⁻ of a dimer (in Formula (1), m=1 and n=2) which was a representative structure of the compound, 629 (100%) corresponding to [(M−3)/3]⁻, and 471.7 corresponding to [(M−4)/4]⁻ were observed. The absorption spectrum of the compound in the aqueous solution was 529 nm.

Synthesis of Exemplary Compound 1-6

4.9 g of a green luster crystal of Exemplary Compound 1-6 was obtained in the same manner as in the synthesis of Exemplary Compound 1-2, except that ethylenediamine was changed into 1.00 g of 1,4-bis(3-aminopropyl)piperazine. As a result of measurement of MS spectrum, 975.1 corresponding to [(M−2)/2]⁻ of a dimer (in Formula (1), m=1 and n=2) which was a representative structure of the compound, 649.7 (100%) corresponding to [(M−3)/3]⁻, and 487.1 corresponding to [(M−4)/4]⁻ were observed. The absorption spectrum of the compound in the aqueous solution was 529 nm.

Synthesis of Exemplary Compound 1-7

4.0 g of a green luster crystal of Exemplary Compound 1-7 was obtained in the same manner as in the synthesis of Exemplary Compound 1-2, except that ethylenediamine was changed into 0.57 g of 1,2-cyclohexanediamine. As a result of measurement of MS spectrum, 932.1 corresponding to [(M−2)/2]⁻ of a dimer (in Formula (1), m=1 and n=2) which was a representative structure of the compound, 621 (100%) corresponding to [(M−3)/3]⁻, 465.5 corresponding to [(M−4)/4]⁻, and 372.2 corresponding to [(M−5)/5]⁻ were observed. The absorption spectrum of the compound in the aqueous solution was 530 nm.

Synthesis of Exemplary Compound 1-8

4.1 g of a green luster crystal of Exemplary Compound 1-8 was obtained in the same manner as in the synthesis of Exemplary Compound 1-2, except that ethylenediamine was changed into 0.57 g of 1,3-cyclohexanediamine. As a result of measurement of MS spectrum, 932.1 corresponding to [(M−2)/2]⁻ of a dimer (in Formula (1), m=1 and n=2) which was a representative structure of the compound, 621 (100%) corresponding to [(M−3)/3]⁻, 465.5 corresponding to [(M−4)/4]⁻, and 372.2 corresponding to [(M−5)/5]⁻ were observed. The absorption spectrum of the compound in the aqueous solution was 530 nm.

Synthesis of Exemplary Compound 1-9

4.1 g of a green luster crystal of Exemplary Compound 1-9 was obtained in the same manner as in the synthesis of Exemplary Compound 1-2, except that ethylenediamine was changed into 0.57 g of 1,4-cyclohexanediamine. As a result of measurement of MS spectrum, 932.1 corresponding to [(M−2)/2]⁻ of a dimer (in Formula (1), m=1 and n=2) which was a representative structure of the compound, 621 corresponding to [(M−3)/3]⁻, 465.5 (100%) corresponding to [(M−4)/4]⁻, and 372.2 corresponding to [(M−5)/5]⁻ were observed. The absorption spectrum of the compound in the aqueous solution was 530 nm.

Synthesis of Exemplary Compound 1-10

4.0 g of a green luster crystal of Exemplary Compound 1-10 was obtained in the same manner as in the synthesis of Exemplary Compound 1-2, except that ethylenediamine was changed into 0.54 g of m-phenylenediamine. As a result of measurement of MS spectrum, 929 corresponding to [(M−2)/2]⁻ of a dimer (in Formula (1), m=1 and n=2) which was a representative structure of the compound, 619 (100%) corresponding to [(M−3)/3]⁻, 464 corresponding to [(M−4)/4]⁻, and 371 corresponding to [(M−5)/5]⁻ were observed. The absorption spectrum of the compound in the aqueous solution was 530 nm.

Synthesis of Exemplary Compound 1-12

<Synthesis of Intermediate B>
Intermediate B

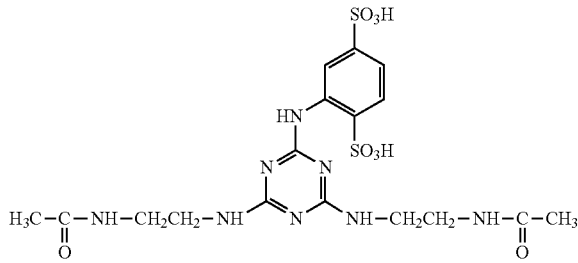

18.6 g of cyanuric chloride, 100 g of ice water and 4 drops of calsolene oil were added to a 2 L beaker, and the mixture was stirred at an internal temperature of 5° C. or less. 20.4 g of N-acetylethylenediamine was added thereto at one time at an internal temperature of 5° C. or less. Stirring was performed at an internal temperature of 5° C. for 2 hours, at room temperature overnight, at an internal temperature of 30° C. for 1 hour, at an internal temperature of 40° C. for 1 hour, and at an internal temperature of 50° C. for 4 hours. After the precipitated solid was filtered out while being heated, the obtained white solid was dispersed in 500 mL of acetone, and the dispersion was stirred at room temperature for 15 minutes. The solid was filtered and separated, and washed with 200 mL of acetone. The obtained white solid was dispersed in 800 mL of water at room temperature, 28.9 g of 2,5-disulfoaniline monosodium salt was added thereto, and then the pH was adjusted to 9 using a 2N sodium hydroxide aqueous solution. The internal temperature was raised to 80° C., and after the reaction was performed for 2 hours, 250 g of sodium chloride was added and the temperature was lowered to room temperature. The pH was adjusted to 1 or less using concentrated hydrochloric acid, the precipitated solids were filtered out, the obtained wet cake was dispersed in 500 mL of acetone, and the dispersion was stirred at room temperature for 15 minutes. The solid was filtered out and sufficiently washed with acetone, and the obtained crystal was vacuum dried at 40° C. to obtain 40.2 g of a white solid. As a result of measurement of MS spectrum, 531 corresponding to [M−1]⁻ of Intermediate B was observed.

<Synthesis of Intermediate C>

Intermediate C

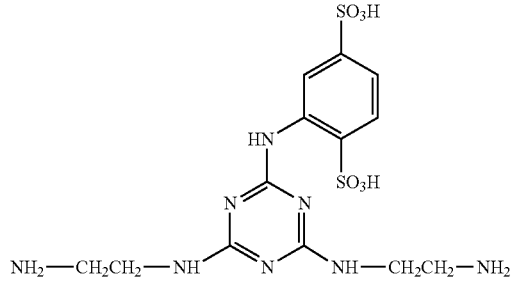

25 g of Intermediate B, 180 mL of water and 20 mL of concentrated hydrochloric acid were added to a 500 mL 3-necked flask, and the mixture was reacted at 95° C. for 6 hours. The reaction solution was cooled to 50° C., 56 g of sodium chloride was added, and then the reaction solution was further cooled to room temperature to filter out the precipitated solid. The obtained solid was dispersed in 100 mL of water, and the dispersion was dissolved while being neutralized with 2N sodium hydroxide, and 150 mL of acetone was added dropwise to the obtained solution. The precipitated crystal was filtered out, washed with 200 mL of acetone, and dried by air blow at 60° C. to obtain 19 g of a white crystal of Intermediate C. As a result of measurement of MS spectrum, 531 corresponding to [M−1]⁻ of Intermediate C was observed. Further, from the result of elemental analysis, the content ratio of the obtained crystal was estimated to be 82%.

Synthesis of Exemplary Compound 1-12

4.7 g of a green luster crystal of Exemplary Compound 1-12 was obtained in the same manner as in the synthesis of Exemplary Compound 1-2, except that ethylenediamine was changed into 2.73 g of Intermediate C (content ratio 82%). As a result of measurement of MS spectrum, 732.4 corresponding to [(M−3)/3]⁻ of a dimer (in Formula (1), m=1 and n=2) which was a representative structure of the compound, 549 (100%) corresponding to [(M−4)/4]⁻, and 439 corresponding to [(M−5)/5]⁻ were observed. The absorption spectrum of the compound in the aqueous solution was 530 nm.

Synthesis of Exemplary Compound 1-13

<Synthesis of Intermediate D>
Intermediate D

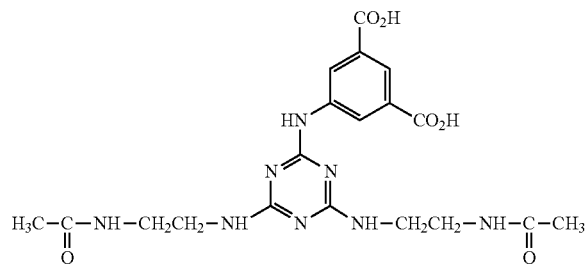

18.6 g of cyanuric chloride, 100 g of ice water and 4 drops of calsolene oil were added to a 2 L beaker, and the mixture was stirred at an internal temperature of 5° C. or less. 20.4 g of N-acetylethylenediamine was added thereto at one time at an internal temperature of 5° C. or less. Stirring was performed at an internal temperature of 5° C. for 2 hours, at room temperature overnight, at an inner temperature of 30° C. for 1 hour, at an internal temperature of 40° C. for 1 hour, and at an internal temperature of 50° C. for 4 hours. After the precipitated solid was filtered out while being heated, the obtained white solid was dispersed in 500 mL of acetone, and the dispersion was stirred at room temperature for 15 minutes. The solid was filtered out, and washed with 200 mL of acetone. The obtained white solid was dispersed in 800 mL of water at room temperature, 19 g of 5-aminoisophthalic acid was added thereto, and then the pH was adjusted to 9 using a 2N sodium hydroxide aqueous solution. The internal temperature was raised to 80° C., and after the reaction was performed for 2 hours, the temperature was lowered to room temperature. After the precipitated solid was filtered out and sufficiently washed with water, the obtained wet cake was dispersed in 500 mL of acetone, and the dispersion was stirred at room temperature for 15 minutes. The solid was filtered out and sufficiently washed with acetone, and the obtained crystal was vacuum dried at 40° C. to obtain 28.6 g of a white solid. As a result of measurement of MS spectrum, 461 corresponding to [M+1]⁻ of Intermediate D was observed.

<Synthesis of Intermediate E>
Intermediate E

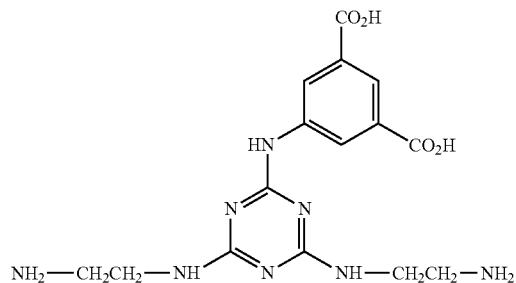

25 g of Intermediate D, 180 mL of water and 20 mL of concentrated hydrochloric acid were added to a 500 mL 3-necked flask, and the mixture was reacted at 95° C. for 6 hours. The reaction solution was cooled to 50° C., 56 g of sodium chloride was added, and then the reaction solution was further cooled to room temperature to filter out the precipitated solid. The obtained solid was dispersed in 100 mL of water, and the dispersion was dissolved while being neutralized with 2N sodium hydroxide, and 150 mL of acetone was added dropwise to the obtained solution. The precipitated crystal was filtered out, washed with 200 mL of acetone, and dried by air blow at 60° C. to obtain 18 g of a white crystal of Intermediate E. As a result of measurement of MS spectrum, 375 corresponding to [M−1]⁻ of Intermediate E was observed. Further, from the result of elemental analysis, the content ratio of the obtained crystal was estimated to be 88%.

Synthesis of Exemplary Compound 1-13

4.5 g of a green luster crystal of Exemplary Compound 1-13 was obtained in the same manner as in the synthesis of Exemplary Compound 1-2, except that ethylenediamine was changed into 2.13 g of Intermediate E (content ratio 88%). As a result of measurement of MS spectrum, 708.6 corresponding to [(M−3)/3]⁻ of a dimer (in Formula (1), m=1 and n=2) which was a representative structure of the compound, 531.2 (100%) corresponding to [(M−4)/4]⁻, and 424.8 corresponding to [(M−5)/5]⁻ were observed. The absorption spectrum of the compound in the aqueous solution was 529 nm.

Synthesis of Exemplary Compound 1-15

<Synthesis of Intermediate F>
Intermediate E

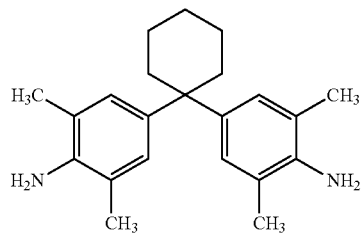 [SMILES: Cc1cc(C2(c3cc(C)c(N)c(C)c3)CCCCC2)cc(C)c1N]

122.4 g of 2,6-dimethylanline and 47.2 g of cyclohexanone were added to a 1 L 3-necked flask. 120 mL of concentrated hydrochloric acid was cautiously added thereto and the reaction system was heated under reflux for 2 days. The reaction solution was cooled to room temperature, 500 mL of water was added, and then the pH was adjusted to 8 or more using a concentrated sodium hydroxide aqueous solution, extraction was performed using dichloromethane, the organic layer was dried with sodium sulfate and concentrated using a rotary evaporator, and then hexane was added to the concentrated solution to precipitate a solid, the solid was filtered out, and the filtered solid was sufficiently washed with hexane, and dried at 60° C. to obtain 77 g of a peach white solid of Intermediate F. As a result of measurement of MS spectrum, 323 corresponding to [M+1]$^+$ of Intermediate F was observed.

<Synthesis of Intermediate G>

Intermediate G

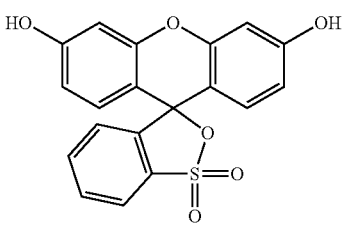 [SMILES: O=S1(=O)OC2(c3ccc(O)cc3Oc3cc(O)ccc32)c2ccccc21]

100 g of 2-sulfobenzoic acid cyclic anhydride and 150 g of resorcinol were added to a 1 L 3-necked flask, and cautiously heated to 140° C. (dissolution started at about 80° C. and the mixture was completely dissolved at about 120° C. Calorification started around 140° C. and the temperature rose to the vicinity of 150° C.). By the reaction at 140° C. for about 30 minutes, the reaction solution was solidified. Stirring was made possible by lowering the inner temperature to 100° C. and cautiously adding dropwise 600 mL of water, this reaction solution was poured into a place where 1,000 mL of hot water was being stirred in a separately prepared 2 L beaker, and the precipitated crystal was filtered out, sufficiently washed with 5,000 mL of hot water, and dried at 60° C. by a vacuum dryer to obtain 119 g of a brown crystal of Intermediate G. As a result of measurement of MS spectrum, 368 corresponding to [M]$^+$ of Intermediate G was observed.

<Synthesis of Intermediate H>

Intermediate H

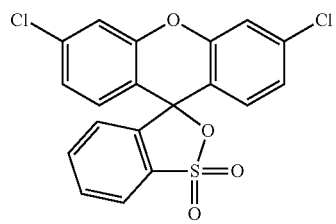 [SMILES: O=S1(=O)OC2(c3ccc(Cl)cc3Oc3cc(Cl)ccc32)c2ccccc21]

119 g of Intermediate G and 250 g of phosphorus oxychloride were added to a 1 L 3-necked flask, the temperature was raised to 90° C., and the system was allowed to react for 2 hours. The reaction solution was cooled to room temperature, this reaction solution was poured into a large amount of ice, and the precipitated crystal was filtered out and sufficiently washed with water. The obtained brown crystal was stirred in 2,500 ml of dichlromehane to filter out the insoluble material, and the filtrate was dried with sodium sulfate anhydride, and concentrated and solidified using a rotary evaporator to obtain 53.4 g of a yellow powder of Intermediate H. As a result of measurement of MS spectrum, 406 corresponding to [M+1]$^+$ of Intermediate H was observed.

<Synthesis of Intermediate I>

Intermediate I

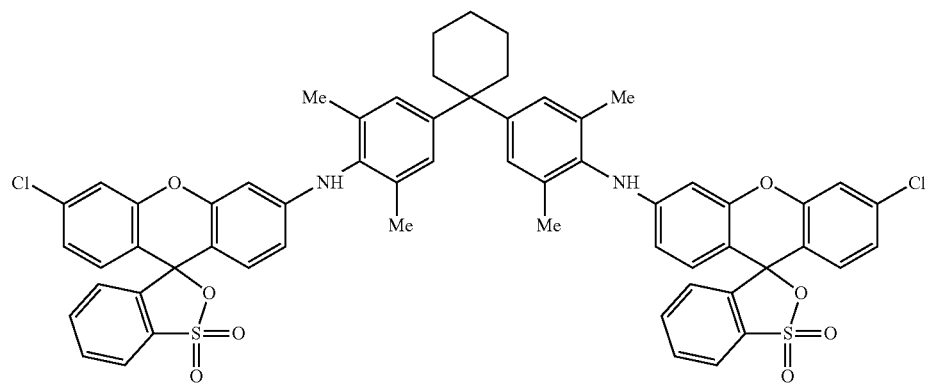 [SMILES: Cc1cc(C2(c3cc(C)c(Nc4ccc5c(c4)Oc4cc(Cl)ccc4C54OS(=O)(=O)c5ccccc54)c(C)c3)CCCCC2)cc(C)c1Nc1ccc2c(c1)Oc1cc(Cl)ccc1C21OS(=O)(=O)c2ccccc21]

20.25 g of Intermediate H and 80 mL of sulfolane were added to a 250 mL 3-necked flask, and 27 g of aluminum chloride was cautiously added to a place where stirring was performed at room temperature (the internal temperature rose to about 60° C.). To a place where stirring was performed at an internal temperature of 60° C., 8.06 g of Intermediate F was added and 10.6 g of triethylamine was continuously added dropwise, and then, the reaction was carried out at an internal temperature of 90° C. for 2 hours. The reaction solution was cooled to room temperature, and was poured into 1 L of water, and the precipitated crystal was filtered out and sufficiently washed with water, and dried by air blow at 60° C. to obtain 25.7 g of orange Intermediate I. As a result of measurement of MS spectrum, 1059 corresponding to [M+1]$^+$ of Intermediate I was observed.

<Synthesis of Intermediate J>
Intermediate J

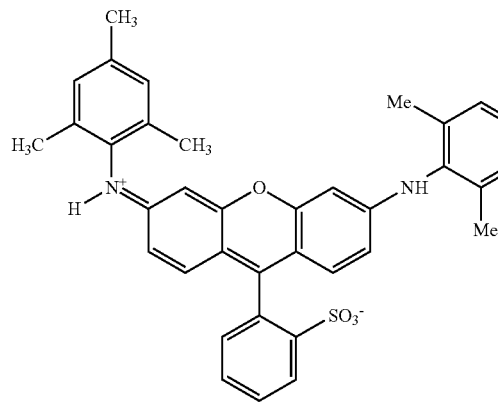

11.4 g of 2,4,6-trimethylaniline, 19.4 g of Intermediate I, 4.1 g of zinc chloride and 80 mL of sulfolane were added to a 250 mL 3-necked flask to react the mixture at 200° C. for 3 hours. The reaction solution was cooled to room temperature, 150 mL of ethyl acetate was added thereto, this reaction solution was poured into a place where 300 mL of ethyl acetate was being stirred in a separately prepared beaker, and the precipitated crystal was filtered out, and sufficiently washed with ethyl acetate, water, further acetone in order. The obtained crystal was dispersed in 500 mL of dichloromethane to filter out the crystal, and further, the obtained crystal was dispersed in 500 mL of methanol, and the crystal was filtered out, and dried by air blow at 60° C. to obtain 16.2 g of a reddish purple powder of Intermediate J. From the result of MS spectrum, 1251 corresponding to [M−1]⁻ of Intermediate J and 625 corresponding to [(M−2)/2]⁻ were observed.

Synthesis of Exemplary Compound 1-15

60 g of chlorosulfonic acid and 6.2 g of phosphorus oxychloride were added to a 250 mL 3-necked flask, and 12.5 g of Intermediate J was dividedly added thereto. After raising the internal temperature to 70° C. to perform reaction for 1 hour, the reaction solution was cooled to room temperature, the reaction solution was poured into 300 g of ice water, and the precipitated crystal was filtered out and washed with a saturated brine solution. The obtained crystal was dispersed in 300 mL of water, and reacted at an internal temperature of 50° C. for 6 hours while adjusting and maintaining the pH at 9.0 using 2N sodium hydroxide. The insoluble material was filtered and removed from the reaction system, the pH was adjusted to 8.5 using a dilute hydrochloric acid, and the solution was desalted using a dialysis tube until the electric conductivity became 10 μS or less, and concentrated and solidified to obtain 8.9 g of Exemplary Compound 1-15. As a result of measurement of MS spectrum, 867.1 corresponding to [(M−2)/2]⁻ of Exemplary Compound 1-15, 577.7 corresponding to [(M−3)/3]⁻, and 433.1 corresponding to [(M−4)/4]⁻ were observed. The absorption spectrum of the compound in the aqueous solution was 529 nm.

[Compound (A4-1)]

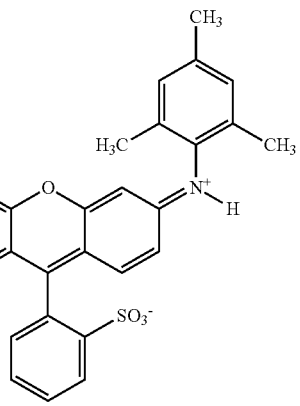

(A4-1)

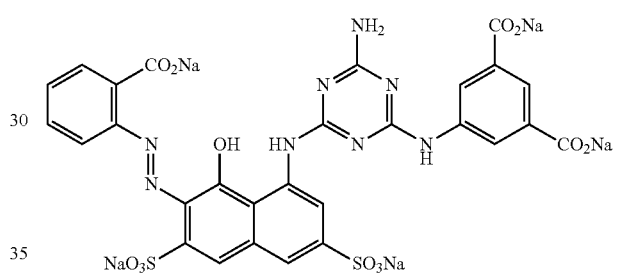

[Compound (A4-2)]

(A4-2)

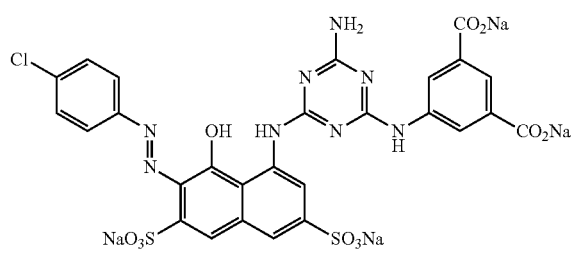

[Compound (A4-3)]

(A4-3)

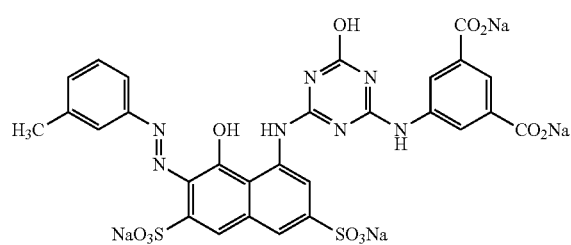

[Compound (A4-4)]

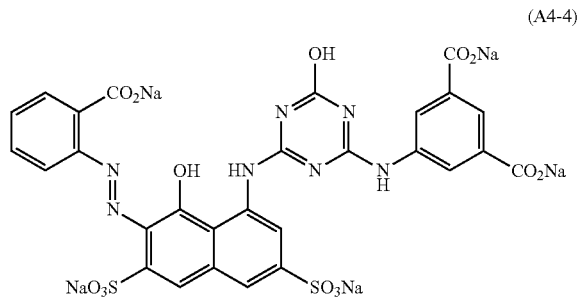

[Compound (A4-5)]

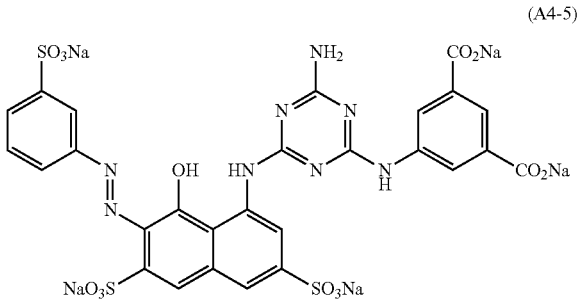

<Synthesis of Compound (A4-4)>

9.43 g of 8-amino-1-hydroxy-2-(2'-carboxyphenylazo)naphthalene-3,6-disulfonic acid and 600 mL of water were added to a 2 L beaker, the pH was adjusted to 8.5 using 2N sodium hydroxide, and then the internal temperature was lowered to 5° C. or less. After 4.06 g of cyanuric chloride was added thereto as a powder and three drops of calsolene oil were added thereto to perform reaction at 5° C. or less for 2 hours, the pH was adjusted to 6.5 using 2N sodium hydroxide, the insoluble material was filtered out and removed (A solution), and meanwhile, 4.58 g of 5-aminoisophthalic acid was dispersed in 100 mL of water, and dissolved (B solution) by adjusting the pH to 7 using 2N sodium hydroxide. B solution was added to A solution, reacted at room temperature overnight while maintaining the pH at 7 using 2N sodium hydroxide, and thereafter, 80 g of sodium chloride was added thereto, the pH was adjusted to 4 using concentrated hydrochloric acid, and the precipitated crystal was filtered out, and washed with 300 mL of acetone. The obtained crystal was dispersed in 600 mL of water, the pH was adjusted to 12 using 2N sodium hydroxide, and a very small amount of DABCO was added as an activator to perform reaction at 80° C. for 2 hours. The reaction solution was cooled to room temperature, the pH was adjusted to 3 or less using concentrated hydrochloric acid, 70 g of sodium chloride was added thereto, the mixture was stirred, and then the precipitated crystal was filtered out, and washed with 300 mL of acetone. The obtained crystal was again dissolved in 500 mL of water, the pH was adjusted to 8.5 with a dilute sodium hydroxide aqueous solution, and a solution desalted using a dialysis tube was concentrated and solidified to obtain 8.2 g of a green luster crystal of Compound (A4-4). As a result of MS spectrum, 370.6 corresponding to [(M−2)/2]⁻ of Compound (A4-4) was observed. The absorption maximum wavelength in the dilute aqueous solution was 544 nm.

Compounds (A4-1) to (A4-3) and (A4-5) may be synthesized in accordance with the above-described synthesis method.

Compound (B2-1)

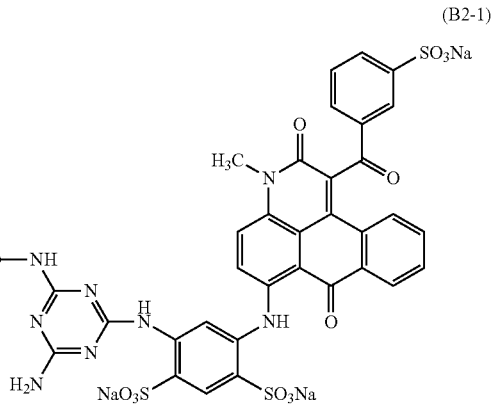

Compound (B2-2)

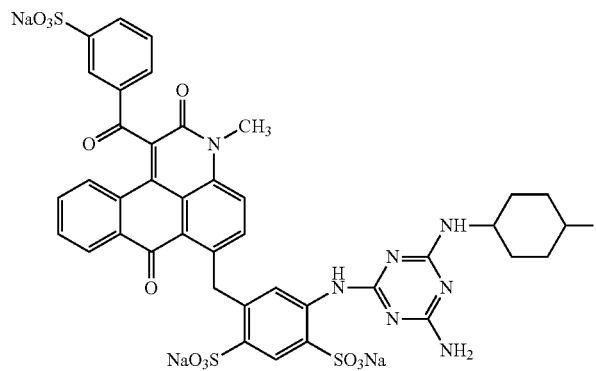

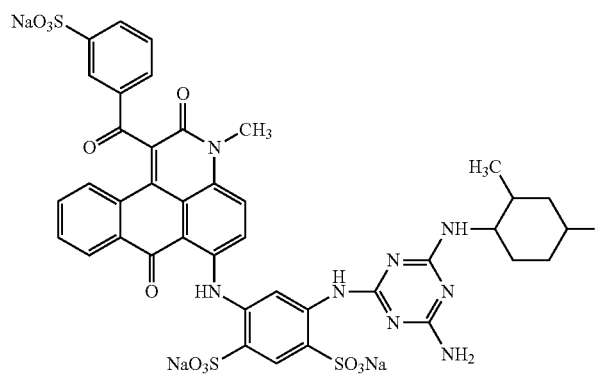

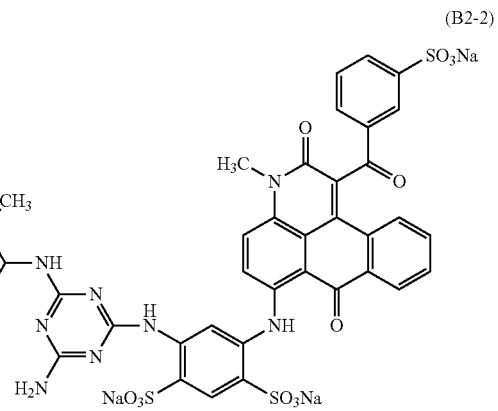

Compound (B2-3)
(B2-3)
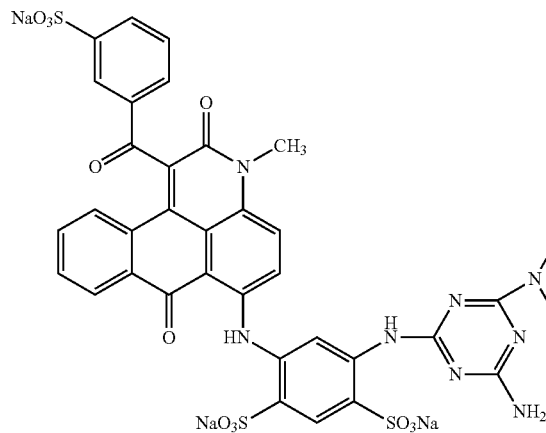
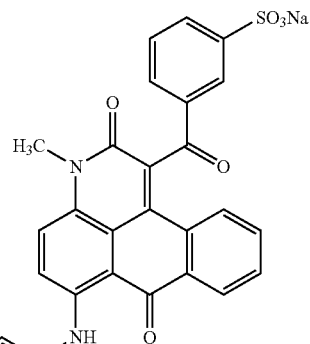
Compound (B3-1)
(B3-1)
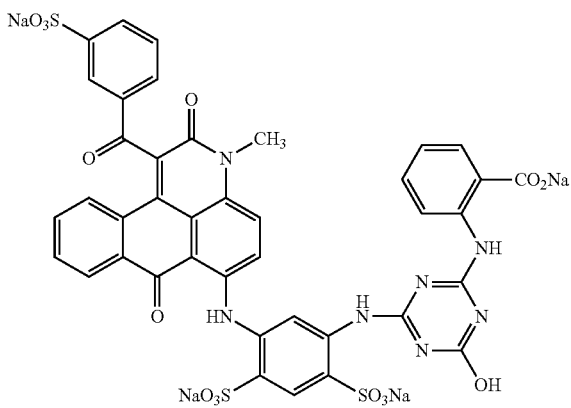
[Compound (C2-1)]
(C2-1)
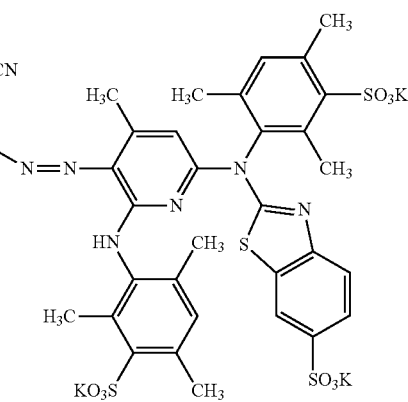
Compound (B3-2)
(B3-2)
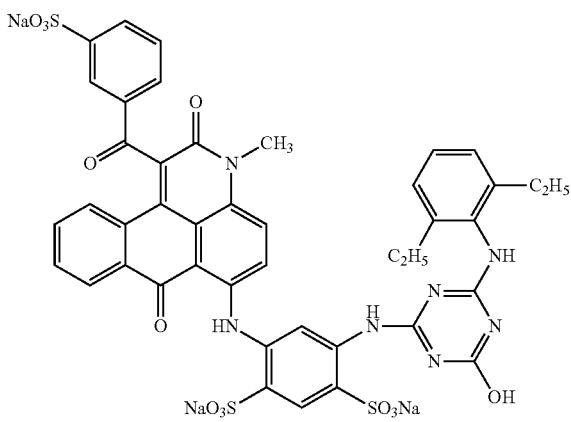
[Compound (C2-2)]
(C2-2)
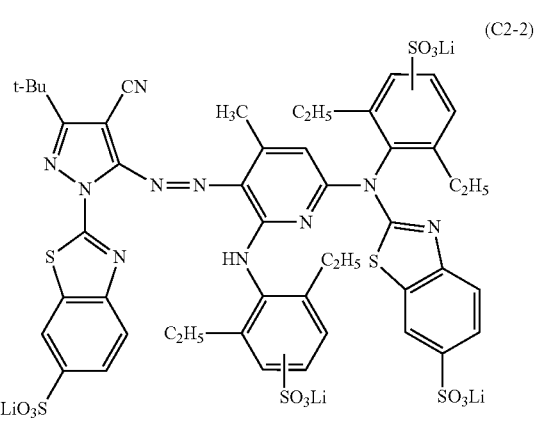

[Compound (C2-3)]

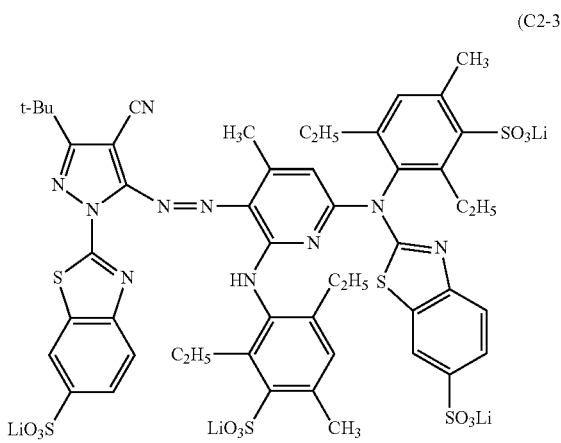

[Compound (C2-4)]

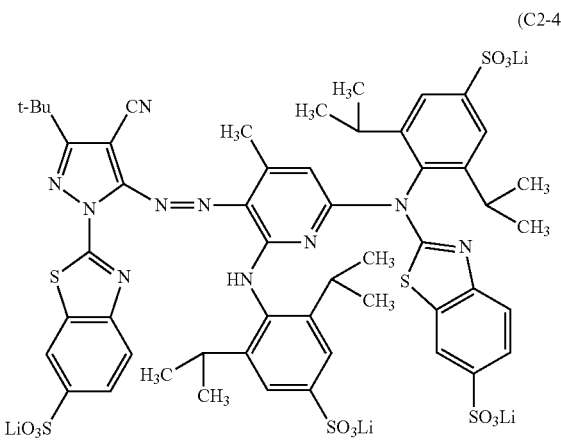

[Compound (C2-5)]

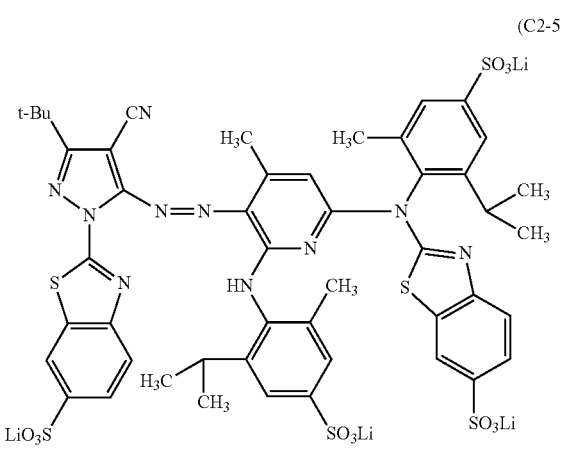

[Comparative Compound (AR289): C.I. Acid Red 289]

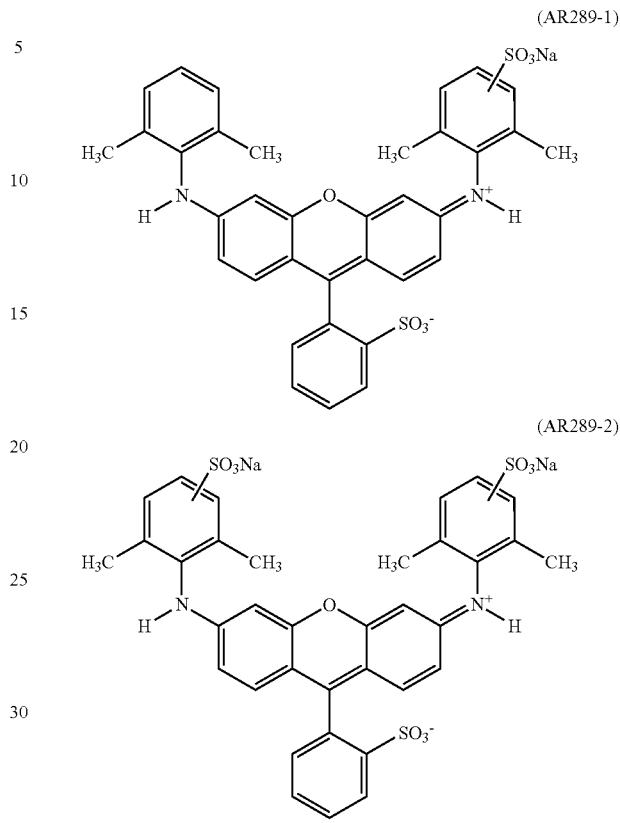

Provided that (AR289) is a mixture of (AR289-1) and (AR289-2).

The absorption maximum wavelength of Compound (1-1) in the dilute aqueous solution was 529 nm. The absorption spectrum is illustrated in FIG. 1.

First Embodiment

Example A1

Deionized water was added to the following components to bring the total weight of the mixture to 100 g, and then the mixture was stirred for 1 hour while being heated to 30° C. to 40° C. Thereafter, preparation was performed with KOH of 10 mol/L and pH=9, and a magenta ink solution was prepared by performing filtration under reduced pressure with a micro filter having an average pore diameter of 0.25 μm.

Compound of Formula (1) (Compound (1-1)) 2.0 g
Compound of Formula (A4) (Compound (A4-1)) 1.5 g
Diethylene glycol 10.65 g
Gycerin 14.70 g
Diethylene glycol monobutyl ether 12.70 g
Triethanolamine 0.65 g
Olfine E1010 (manufactured by Nissin Chemical Co., Ltd.) 0.9 g Examples A2 to A42 and Comparative Examples A1 to A3

Ink solutions of Examples A2 to A42 and Comparative Examples A1 to A3 were prepared by performing preparation in the same manner as in the preparation of the ink solution of Example A1, except that the dye and the dye addition amount were changed as shown in the following Tables A1 and A2. As a dye for comparison, C.I. Acid Red 289 (AR289) was used.

(Image Recording and Evaluation)

The inks for inkjet recording of the Examples and the Comparative Examples described above were subjected to the following evaluations. The results are shown in Tables A1 and A2.

Meanwhile, in Tables A1 and A2, moisture resistance was evaluated after each ink for inkjet recording was used to record an image on a photo gloss paper (PM photo paper <Glossy> (KA420PSK, EPSON) manufactured by EPSON Co., Ltd.) by an inkjet printer (manufactured by EPSON Co., Ltd.; PM-700C).

<Moisture Resistance>

During an inkjet recording, a check pattern (pattern obtained by alternately combining regular squares having a 1.5 mm angle at concentrations of 100% and 0%) was prepared, and a printed matter with a check pattern of magenta-white which was high in contrast was obtained. After printing, the printed matter with a check pattern, which had been dried for 24 hours, was left to stand under conditions of 80° C. and 70% RH for 3 days, and the degree of blurring from a colored portion to a white portion was confirmed and evaluated with the eyes to perform evaluation by a three-stage rating in which A was the case where blurring rarely occurred, B was the case where blurring slightly occurred, and C was the case where blurring clearly occurred.

Each recorded matter obtained by the method described above was subjected to the following evaluations by measuring the L*, a* and b* in the L*a*b* color system defined by CIE (International Commission on Illumination) for an image portion having a recording duty of 100% with a reflection densitometer Spectrolino (manufactured by Gretag-Macbeth AG) under the conditions of a light source: D50 and a visual field: 2 degrees.

(Evaluation of Chroma)

The chroma (c*) of the recorded matter was subjected to the following evaluation by performing calculation by the following Equation based on the measured values of color characteristics.

For an image portion having a recording duty of 100% in the recorded matter (gloss paper) obtained above, the values of L*, a* and b* were measured. From the values of L*, a* and b* obtained, the evaluation was performed by obtaining the chroma (c*) based on the following equation.

$$\text{Chroma } (c^*) = \sqrt{a^{*2} + b^{*2}}$$

A: c* was 80 or more, B: c* was 70 or more and less than 80, C: c* was less than 70

(Evaluation of Hue Angle)

Further, the hue angle (h°) when a* was 75 to 80 was obtained from the result of the chroma (L*, a* and b*) according to the following equation, and evaluated.

$$\text{Hue Angle}(h°) = 360 + \tan^{-1}\frac{b*}{a*}$$

A: h° was 340 or more and less than 345 B: h° was 335 or more and less than 340 C: h° was less than 335.

It was determined that when a chroma (c*) and a hue angle (h°) of an image of each recorded matter, which were obtained as described above, were 80 or more and 340 or more and less than 345, respectively, an image having a high magenta chromogenic property could be obtained.

<Ozone Resistance>

In a box which was set to an ozone gas concentration of 2.0±0.1 ppm, room temperature and a dark place using a Siemens-type ozonizer to which an alternating current voltage of 5 kV was applied while passing dry air through the double glass tube thereof, the photo gloss paper having the image formed thereon was left to stand for 7 days, and the image concentration before and after being left to stand under an ozone gas was measured by a reflection densitometer (X-Rite 310TR) and evaluated as a dye residual ratio. Meanwhile, the reflection concentration was measured at three points of 1, 1.5 and 2.0. The ozone gas concentration in the box was set using an ozone gas monitor (Model: OZG-EM-01) manufactured by APPLICS.

The evaluation was performed in a three-stage rating by defining a colorant residual ratio of 70% or more at any concentration as A, a colorant residual ratio less than 70% at one or two points as B, and a colorant residual ratio less than 70% at all concentrations as C.

TABLE A1

| | Dye of Formula (1) | | Dye of Formula (A4) | | Hue angle | Chroma | Moisture resistance | Ozone resistance |
|---|---|---|---|---|---|---|---|---|
| Ex. A1 | 1-1 | 2.0 g | A4-1 | 1.5 g | A | A | A | A |
| Ex. A2 | 1-1 | 2.0 g | A4-2 | 1.5 g | A | A | A | A |
| Ex. A3 | 1-1 | 2.0 g | A4-3 | 1.5 g | A | A | A | A |
| Ex. A4 | 1-1 | 2.0 g | A4-4 | 1.5 g | A | A | A | A |
| Ex. A5 | 1-1 | 2.0 g | A4-5 | 1.5 g | A | A | A | A |
| Ex. A6 | 1-2 | 2.0 g | A4-1 | 1.5 g | A | A | A | A |
| Ex. A7 | 1-3 | 2.0 g | A4-1 | 1.5 g | A | A | A | A |
| Ex. A8 | 1-4 | 2.0 g | A4-1 | 1.5 g | A | A | A | A |
| Ex. A9 | 1-5 | 2.0 g | A4-1 | 1.5 g | A | A | A | A |
| Ex. A10 | 1-6 | 2.0 g | A4-1 | 1.5 g | A | A | A | A |
| Ex. A11 | 1-7 | 2.0 g | A4-1 | 1.5 g | A | A | A | A |
| Ex. A12 | 1-8 | 2.0 g | A4-1 | 1.5 g | A | A | A | A |
| Ex. A13 | 1-9 | 2.0 g | A4-1 | 1.5 g | A | A | A | A |
| Ex. A14 | 1-10 | 2.0 g | A4-1 | 1.5 g | A | A | A | A |
| Ex. A15 | 1-11 | 2.0 g | A4-1 | 1.5 g | A | A | A | A |
| Ex. A16 | 1-12 | 2.0 g | A4-1 | 1.5 g | A | A | A | A |
| Ex. A17 | 1-13 | 2.0 g | A4-1 | 1.5 g | A | A | A | A |
| Ex. A18 | 1-14 | 2.0 g | A4-1 | 1.5 g | A | A | A | A |
| Ex. A19 | 1-15 | 2.0 g | A4-1 | 1.5 g | A | A | A | A |
| Ex. A20 | 1-16 | 2.0 g | A4-1 | 1.5 g | A | A | A | A |
| Ex. A21 | 1-17 | 2.0 g | A4-1 | 1.5 g | A | A | A | A |
| Ex. A22 | 1-18 | 2.0 g | A4-1 | 1.5 g | A | A | A | A |
| Ex. A23 | 1-19 | 2.0 g | A4-1 | 1.5 g | A | A | A | A |
| Ex. A24 | 1-20 | 2.0 g | A4-1 | 1.5 g | A | A | A | A |

TABLE A2

| | Dye of Formula (1) | | Dye of Formula (A4) | | Hue angle | Chroma | Moisture resistance | Ozone resistance |
|---|---|---|---|---|---|---|---|---|
| Ex. A28 | 1-1 | 3.325 g | A4-1 | 0.175 g | A | B | A | A |
| Ex. A29 | 1-1 | 3.15 g | A4-1 | 0.35 g | A | A | A | A |
| Ex. A30 | 1-1 | 2.8 g | A4-1 | 0.7 g | A | A | A | A |
| Ex. A31 | 1-1 | 1.75 g | A4-1 | 1.75 g | A | A | A | A |
| Ex. A32 | 1-1 | 0.7 g | A4-1 | 2.8 g | A | A | A | A |
| Ex. A33 | 1-1 | 0.35 g | A4-1 | 3.15 g | A | A | A | B |

TABLE A2-continued

|  | Dye of Formula (1) | | Dye of Formula (A4) | | Hue angle | Chroma | Moisture resistance | Ozone resistance |
|---|---|---|---|---|---|---|---|---|
| Ex. A34 | 1-1 | 0.175 g | A4-1 | 3.325 g | A | A | A | C |
| Ex. A35 | 1-1 | 0.5 g | A4-1 | 0.5 g | A | A | A | A |
| Ex. A36 | 1-1 | 1.0 g | A4-1 | 1.0 g | A | A | A | A |
| Ex. A37 | 1-1 | 2.5 g | A4-1 | 2.5 g | A | A | A | A |
| Ex. A38 | 1-1 | 3.0 g | A4-1 | 3.5 g | A | A | B | A |
| Ex. A39 | 1-1 | 4.0 g | A4-1 | 4.0 g | A | A | C | A |
| Ex. A40 | 1-1 | 1.5 g | A4-1 | 1.0 g | A | A | A | A |
|  |  |  | A4-2 | 1.0 g |  |  |  |  |
| Ex. A41 | 1-21 | 2.0 g | A4-1 | 1.5 g | A | A | A | B |
| Ex. A42 | 1-22 | 2.2 g | A4-1 | 1.3 g | A | A | A | B |
| C. Ex. A1 | — | — | A4-1 | 3.5 g | C | A | C | C |
| C. Ex. A2 | AR289 | 3.5 g | — | — | C | A | C | C |
| C. Ex. A3 | AR289 | 2.0 g | A4-1 | 1.5 g | B | A | C | C |

As clear from the result in Table A1, it can be seen that the inks of the Examples in which the coloring composition of the present invention was used had very high performance in terms of moisture resistance, ozone resistance, hue and chroma compared to the inks of the Comparative Examples.

Second Embodiment

Example B1

Deionized water was added to the following components to bring the total weight of the mixture to 100 g, and then the mixture was stirred for 1 hour while being heated to 30° C. to 40° C. Thereafter, preparation was performed with KOH of 10 mol/L and pH=9, and a magenta ink solution was prepared by performing filtration under reduced pressure with a micro filter having an average pore diameter of 0.25 him.

Compound of Formula (1) (Compound (1-1)) 2.0 g
Compound of Formula (B4) (Compound (B2-1)) 1.5 g
Diethylene glycol 10.65 g
Gycerin 14.70 g
Diethylene glycol monobutyl ether 12.70 g
Triethanolamine 0.65 g
Olfine E1010 (manufactured by Nissin Chemical Co., Ltd.) 0.9 g Examples B2 to B42 and Comparative Examples B1 to B3

Ink solutions of Examples B2 to B42 and Comparative Examples B1 to B3 were prepared by performing preparation in the same manner as in the preparation of the ink solution of Example B1, except that the dye and the dye addition amount were changed as shown in the following Tables B4 and B5. As a dye for comparison, C.I. Acid Red 289 (AR289) was used.

(Image Recording and Evaluation)

The inks for inkjet recording of the Examples and the Comparative Examples described above were subjected to the following evaluations. The results are shown in Tables B4 and B5.

Meanwhile, in Tables B4 and B5, ozone resistance, light fastness and moisture resistance were evaluated after each ink for inkjet recording was used to record an image on a photo gloss paper (PM photo paper <Glossy> (KA420PSK, EPSON) manufactured by EPSON Co., Ltd.) by an inkjet printer (manufactured by EPSON Co., Ltd.; PM-700C). Print concentration was evaluated after each ink for inkjet recording was used to record an image on a plain paper (plain paper (GF500, Canon) manufactured by Canon, Inc.) by an inkjet printer (manufactured by EPSON Co., Ltd.; PM-700C).

<Ozone Resistance>

In a box which was set to an ozone gas concentration of 5±0.1 ppm, room temperature and a dark place using a Siemens-type ozonizer to which an alternating current voltage of 5 kV was applied while passing dry air through the double glass tube thereof, the photo gloss paper having the image formed thereon was left to stand for 7 days, and the image concentration before and after being left to stand under an ozone gas was measured by a reflection densitometer (X-Rite 310TR) and evaluated as a dye residual ratio. Meanwhile, the reflection concentration was measured at three points of 1, 1.5 and 2.0. The ozone gas concentration in the box was set using an ozone gas monitor (Model: OZG-EM-01) manufactured by APPLICS.

The evaluation was performed in a three-stage rating by defining a colorant residual ratio of 70% or more at any concentration as A, a colorant residual ratio less than 70% at one or two points as B, and a colorant residual ratio less than 70% at all concentrations as C.

<Light Fastness>

After the image concentration Ci immediately after recording was measured, the image was irradiated with a xenon light (85,000 lux) for 7 days using a weather meter (Atlas C.165), and then the image concentration Cf was measured again and the dye residual ratio ((Ci−Cf)/Ci×100%) was calculated from the difference between image concentrations before and after irradiation with the xenon light to perform evaluation. The image concentration was measured using a reflection densitometer (X-Rite 310TR).

The dye residual ratio was measured at three points of 1, 1.5 and 2.0 in reflection concentration. The evaluation was performed in a three-stage rating by defining a colorant residual ratio of 80% or more at any concentration as A, a colorant residual ratio less than 80% at one or two points as B, and a colorant residual ratio less than 80% at all concentrations as C.

<Moisture Resistance>

During an inkjet recording, a check pattern (pattern obtained by alternately combining regular squares having a 1.5 mm angle at concentrations of 100% and 0%) was prepared, and a printed matter with a check pattern of magenta-white which was high in contrast was obtained. After printing, the printed matter with a check pattern, which had been dried for 24 hours, was left to stand under conditions of 80° C. and 70% RH for 3 days, and the degree of blurring from a colored portion to a white portion was confirmed and evaluated with the eyes to perform evaluation by a three-stage rating in which A was the case where blurring rarely occurred, B was the case where blurring slightly occurred, and C was the case where blurring clearly occurred.

<Print Concentration>

The reflection concentration scaled to 100% in print concentration was measured using an image concentration with a reflection densitometer (X-Rite 310TR), and the evaluation was performed in a three-stage rating by defining a print concentration of 2.2 or more as A, a print concentration of 2.0 or more and less than 2.2 as B, and a print concentration less than 2.0 as C.

As obvious from the results in Tables B4 and B5, it can be seen that the inks of the Examples in which coloring composition of the present invention was used had very high performance in terms of ozone resistance, light fastness, moisture resistance and print concentration compared to the inks of the Comparative Examples.

Third Embodiment

Example C1

Deionized water was added to the following components to bring the total weight of the mixture to 100 g, and then the mixture was stirred for 1 hour while being heated to 30° C. to 40° C. Thereafter, preparation was performed with KOH of 10 mol/L and pH=9, and a magenta ink solution was prepared by performing filtration under reduced pressure with a micro filter having an average pore diameter of 0.25 μm.

Compound of Formula (1) (Compound (1-1)) 2.0 g
Compound of Formula (C4) (Compound (C2-1)) 1.5 g

TABLE B4

|  | Dye of Formula (1) | | Dye of Formula (B4) or (B5) | | Light fastness | Ozone resistance | Print concentration | Moisture resistance |
|---|---|---|---|---|---|---|---|---|
| Ex. B1 | 1-1 | 2.0 g | B2-1 | 1.5 g | A | A | A | A |
| Ex. B2 | 1-1 | 2.0 g | B2-2 | 1.5 g | A | A | A | A |
| Ex. B3 | 1-1 | 2.0 g | B2-3 | 1.5 g | A | A | A | A |
| Ex. B4 | 1-1 | 2.0 g | B3-1 | 1.5 g | A | A | A | A |
| Ex. B5 | 1-1 | 2.0 g | B3-2 | 1.5 g | A | A | A | A |
| Ex. B6 | 1-2 | 2.0 g | B3-1 | 1.5 g | A | A | A | A |
| Ex. B7 | 1-3 | 2.0 g | B3-1 | 1.5 g | A | A | A | A |
| Ex. B8 | 1-4 | 2.0 g | B3-1 | 1.5 g | A | A | A | A |
| Ex. B9 | 1-5 | 2.0 g | B3-1 | 1.5 g | A | A | A | A |
| Ex. B10 | 1-6 | 2.0 g | B3-1 | 1.5 g | A | A | A | A |
| Ex. B11 | 1-7 | 2.0 g | B3-1 | 1.5 g | A | A | A | A |
| Ex. B12 | 1-8 | 2.0 g | B3-1 | 1.5 g | A | A | A | A |
| Ex. B13 | 1-9 | 2.0 g | B3-1 | 1.5 g | A | A | A | A |
| Ex. B14 | 1-10 | 2.0 g | B3-1 | 1.5 g | A | A | A | A |
| Ex. B15 | 1-11 | 2.0 g | B3-1 | 1.5 g | A | A | A | A |
| Ex. B16 | 1-12 | 2.0 g | B3-1 | 1.5 g | A | A | A | A |
| Ex. B17 | 1-13 | 2.0 g | B3-1 | 1.5 g | A | A | A | A |
| Ex. B18 | 1-14 | 2.0 g | B3-1 | 1.5 g | A | A | A | A |
| Ex. B19 | 1-15 | 2.0 g | B3-1 | 1.5 g | A | A | A | A |
| Ex. B20 | 1-16 | 2.0 g | B3-1 | 1.5 g | A | A | A | A |
| Ex. B21 | 1-17 | 2.0 g | B3-1 | 1.5 g | A | A | A | A |
| Ex. B22 | 1-18 | 2.0 g | B3-1 | 1.5 g | A | A | A | A |
| Ex. B23 | 1-19 | 2.0 g | B3-1 | 1.5 g | A | A | A | A |
| Ex. B24 | 1-20 | 2.0 g | B3-1 | 1.5 g | A | A | A | A |

TABLE B5

|  | Dye of Formula (1) | | Dye of Formula (B4) or (B5) | | Light fastness | Ozone resistance | Print concentration | Moisture resistance |
|---|---|---|---|---|---|---|---|---|
| Ex. B28 | 1-1 | 3.325 g | B3-1 | 0.175 g | B | A | A | A |
| Ex. B29 | 1-1 | 3.15 g | B3-1 | 0.35 g | A | A | A | A |
| Ex. B30 | 1-1 | 2.8 g | B3-1 | 0.7 g | A | A | A | A |
| Ex. B31 | 1-1 | 1.75 g | B3-1 | 1.75 g | A | A | A | A |
| Ex. B32 | 1-1 | 0.7 g | B3-1 | 2.8 g | A | A | B | B |
| Ex. B33 | 1-1 | 0.35 g | B3-1 | 3.15 g | A | A | C | B |
| Ex. B34 | 1-1 | 0.175 g | B3-1 | 3.325 g | A | A | C | C |
| Ex. B35 | 1-1 | 0.5 g | B2-1 | 0.5 g | A | A | C | A |
| Ex. B36 | 1-1 | 1.0 g | B2-1 | 1.0 g | A | A | B | A |
| Ex. B37 | 1-1 | 2.5 g | B2-1 | 2.5 g | A | A | A | A |
| Ex. B38 | 1-1 | 3.0 g | B2-1 | 3.5 g | A | A | A | B |
| Ex. B39 | 1-1 | 4.0 g | B2-1 | 4.0 g | A | A | A | C |
| Ex. B40 | 1-1 | 1.5 g | B2-1 B3-1 | 1.0 g 1.0 g | A | A | A | A |
| Ex. B41 | 1-21 | 2.0 g | B2-1 | 1.5 g | B | C | A | B |
| Ex. B42 | 1-22 | 2.2 g | B3-1 | 1.3 g | B | C | A | C |
| C. Ex. B1 | — | — | B3-1 | 3.5 g | A | A | C | C |
| C. Ex. B2 | AR289 | 3.5 g | — | — | C | C | A | C |
| C. Ex. B3 | AR289 | 2.0 g | B3-1 | 1.5 g | B | C | A | C |

Diethylene glycol 10.65 g
Gycerin 14.70 g
Diethylene glycol monobutyl ether 12.70 g
Triethanolamine 0.65 g
Olfine E1010 (manufactured by Nissin Chemical Co., Ltd.) 0.9 g Examples C2 to C42 and Comparative Examples C1 to C3

Ink solutions of Examples C2 to C42 and Comparative Examples C1 to C3 were prepared by performing preparation in the same manner as in the preparation of the ink solution of Example C1, except that the dye and the dye addition amount were changed as shown in the following Tables C1 and C2. As a dye for comparison, C.I. Acid Red 289 (AR289) was used.

(Image Recording and Evaluation)

The inks for inkjet recording of the Examples and the Comparative Examples described above were subjected to the following evaluations. The results are shown in Tables C1 and C2.

Meanwhile, in Tables C1 and C2, ozone resistance and light fastness were evaluated after each ink for inkjet recording was used to record an image on a photo gloss paper (PM photo paper <Glossy> (KA420PSK, EPSON) manufactured by EPSON Co., Ltd.) by an inkjet printer (manufactured by EPSON Co., Ltd.; PM-700C).

<Ozone Resistance>

In a box which was set to an ozone gas concentration of 5±0.1 ppm, room temperature and a dark place using a Siemens-type ozonizer to which an alternating current voltage of 5 kV was applied while passing dry air through the double glass tube thereof, the photo gloss paper having the image formed thereon was left to stand for 7 days, and the image concentration before and after being left to stand under an ozone gas was measured by a reflection densitometer (X-Rite 310TR) and evaluated as a dye residual ratio. Meanwhile, the reflection concentration was measured at three points of 1, 1.5 and 2.0. The ozone gas concentration in the box was set using an ozone gas monitor (Model: OZG-EM-01) manufactured by APPLICS.

The evaluation was performed in a three-stage rating by defining a colorant residual ratio of 70% or more at any concentration as A, a colorant residual ratio less than 70% at one or two points as B, and a colorant residual ratio less than 70% at all concentrations as C.

<Light Fastness>

After the image concentration Ci immediately after recording was measured, the image was irradiated with a xenon light (85,000 lux) for 7 days using a weather meter (Atlas C.165), and then the image concentration Cf was measured again and the dye residual ratio ((Ci−Cf)/Ci×100%) was calculated from the difference between image concentrations before and after irradiation with the xenon light to perform evaluation. The image concentration was measured using a reflection densitometer (X-Rite 310TR).

The dye residual ratio was measured at three points of 1, 1.5 and 2.0 in reflection concentration. The evaluation was performed in a three-stage rating by defining a colorant residual ratio of 80% or more at any concentration as A, a colorant residual ratio less than 80% at one or two points as B, and a colorant residual ratio less than 80% at all concentrations as C.

<Hue>

The hue was confirmed with the eyes and evaluated by a three-stage rating of best, good and poor. The evaluation results are shown in the following Table C1. In the following Table C1, A, B and C indicate that hue was the best, good and poor, respectively.

<Moisture Resistance>

During an inkjet recording, a check pattern (pattern obtained by alternately combining regular squares having a 1.5 mm angle at concentrations of 100% and 0%) was prepared, and a printed matter with a check pattern of magenta-white which was high in contrast was obtained.

After printing, the printed matter with a check pattern, which had been dried for 24 hours, was left to stand under conditions of 80° C. and 70% RH for 3 days, and the degree of blurring from a colored portion to a white portion was confirmed and evaluated to perform evaluation by a three-stage rating in which A was the case where blurring rarely occurred, B was the case where blurring slightly occurred, and C was the case where blurring clearly occurred.

TABLE C1

| | Dye of Formula (1) | | Dye of Formula (C4) | | Hue | Light fastness | Moisture resistance |
|---|---|---|---|---|---|---|---|
| Ex. C1 | 1-1 | 2.0 g | C2-1 | 1.5 g | A | A | A |
| Ex. C2 | 1-1 | 2.0 g | C2-2 | 1.5 g | A | A | A |
| Ex. C3 | 1-1 | 2.0 g | C2-3 | 1.5 g | A | A | A |
| Ex. C4 | 1-1 | 2.0 g | C2-4 | 1.5 g | A | A | A |
| Ex. C5 | 1-1 | 2.0 g | C2-5 | 1.5 g | A | A | A |
| Ex. C6 | 1-2 | 2.0 g | C2-3 | 1.5 g | A | A | A |
| Ex. C7 | 1-3 | 2.0 g | C2-3 | 1.5 g | A | A | A |
| Ex. C8 | 1-4 | 2.0 g | C2-3 | 1.5 g | A | A | A |
| Ex. C9 | 1-5 | 2.0 g | C2-3 | 1.5 g | A | A | A |
| Ex. C10 | 1-6 | 2.0 g | C2-3 | 1.5 g | A | A | A |
| Ex. C11 | 1-7 | 2.0 g | C2-3 | 1.5 g | A | A | A |
| Ex. C12 | 1-8 | 2.0 g | C2-3 | 1.5 g | A | A | A |
| Ex. C13 | 1-9 | 2.0 g | C2-3 | 1.5 g | A | A | A |
| Ex. C14 | 1-10 | 2.0 g | C2-3 | 1.5 g | A | A | A |
| Ex. C15 | 1-11 | 2.0 g | C2-3 | 1.5 g | A | A | A |
| Ex. C16 | 1-12 | 2.0 g | C2-3 | 1.5g | A | A | A |
| Ex. C17 | 1-13 | 2.0 g | C2-3 | 1.5 g | A | A | A |
| Ex. C18 | 1-14 | 2.0 g | C2-3 | 1.5 g | A | A | A |
| Ex. C19 | 1-15 | 2.0 g | C2-3 | 1.5 g | A | A | A |
| Ex. C20 | 1-16 | 2.0 g | C2-3 | 1.5 g | A | A | A |
| Ex. C21 | 1-17 | 2.0 g | C2-3 | 1.5 g | A | A | A |
| Ex. C22 | 1-18 | 2.0 g | C2-3 | 1.5 g | A | A | A |
| Ex. C23 | 1-19 | 2.0 g | C2-3 | 1.5 g | A | A | A |
| Ex. C24 | 1-20 | 2.0 g | C2-3 | 1.5 g | A | A | A |

TABLE C2

| | Dye of Formula (1) | | Dye of Formula (C4) | | Hue | Light fastness | Moisture resistance |
|---|---|---|---|---|---|---|---|
| Ex. C28 | 1-1 | 3.325 g | C2-3 | 0.175 g | A | B | A |
| Ex. C29 | 1-1 | 3.15 g | C2-3 | 0.35 g | A | A | A |
| Ex. C30 | 1-1 | 2.8 g | C2-3 | 0.7 g | A | A | A |
| Ex. C31 | 1-1 | 1.75 g | C2-3 | 1.75 g | A | A | A |
| Ex. C32 | 1-1 | 0.7 g | C2-3 | 2.8 g | B | A | A |
| Ex. C33 | 1-1 | 0.35 g | C2-3 | 3.15 g | C | A | B |
| Ex. C34 | 1-1 | 0.175 g | C2-3 | 3.325 g | C | A | C |
| Ex. C35 | 1-1 | 0.5 g | C2-3 | 0.5 g | A | A | A |
| Ex. C36 | 1-1 | 1.0 g | C2-3 | 1.0 g | A | A | A |
| Ex. C37 | 1-1 | 2.5 g | C2-3 | 2.5 g | A | A | A |
| Ex. C38 | 1-1 | 3.0 g | C2-3 | 3.5 g | A | A | B |
| Ex. C39 | 1-1 | 4.0 g | C2-3 | 4.0 g | A | A | C |
| Ex. C40 | 1-1 | 1.5 g | C2-1 C2-2 | 1.0 g 1.0 g | A | A | A |
| Ex. C41 | 1-21 | 2.0 g | C2-1 | 1.5 g | A | B | A |
| Ex. C42 | 1-22 | 2.2 g | C2-1 | 1.3 g | A | B | A |
| C. Ex. C1 | — | — | C2-1 | 3.5 g | C | A | C |
| C. Ex. C2 | AR289 | 3.5 g | — | — | A | C | C |
| C. Ex. C3 | AR289 | 2.0 g | C2-1 | 1.5 g | A | B | C |

As obvious from the results in Tables C1 and C2, it can be seen that the inks of the Examples in which the compound of the present invention was used had very high performance in terms of ozone resistance, light fastness, hue and moisture resistance compared to the inks of the Comparative Examples.

INDUSTRIAL APPLICABILITY

According to a first aspect of the present invention, provided is a coloring composition which is excellent in moisture resistance, ozone resistance, hue, and chroma. According to a second aspect, provided is a coloring composition which is sufficiently compatible with excellent image fastness such as ozone resistance, light fastness and moisture resistance, and good print concentration. According to a third aspect, provided is a coloring composition which is sufficiently compatible with excellent image fastness such as ozone resistance and light fastness, and good hue, and may obtain high moisture resistance. Furthermore, provided are an ink for inkjet recording including the coloring composition, and an inkjet recording method using the ink for inkjet recording. The coloring composition of the present invention is particularly useful as a magenta ink.

Although the present invention has been described in detail with reference to detailed and specific embodiments, it is obvious to those skilled in the art that various changes or modifications may be made without departing from the spirit and scope of the present invention.

The present application is based on Japanese Patent Application (Patent Application No. 2012-044337) filed on Feb. 29, 2012, Japanese Patent Application (Patent Application No. 2012-044338) filed on Feb. 29, 2012, and Japanese Patent Application (Patent Application No. 2012-044339) filed on Feb. 29, 2012, the contents of which are herein incorporated by reference.

What is claimed is:
1. A coloring composition comprising:
   a compound represented by the following Formula (1); and
   a compound selected from the group consisting of (A) to (C), wherein
   (A) is a compound represented by the following Formula (A4),
   (B) is at least one selected from the group consisting of a compound represented by the following Formula (B4) and a compound represented by the following Formula (B5), and
   (C) is a compound selected from the group consisting of compounds represented by the following Formula (C4):

Formula (1)

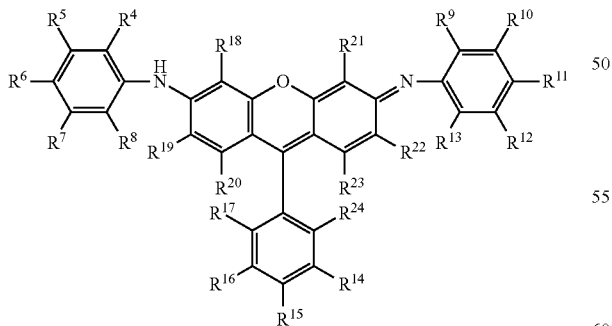

Formula (2)

wherein, in Formula (1),
L represents a linking group represented by Formula (V1), (V2), (V3) or (V4),
D represents a residue in which 1 to 5 hydrogen atoms are removed from a compound represented by Formula (2), wherein in Formula (2), $R^4$, $R^8$, $R^9$ and $R^{13}$ each independently represent a hydrogen atom or an alkyl group, and $R^5$ to $R^7$, $R^{10}$ to $R^{12}$ and $R^{14}$ to $R^{24}$ represent a hydrogen atom or a substituent, provided that at least one ionic hydrophilic groups are possessed, m represents an integer of 1 to 10, provided that a plurality of L's is optionally the same or different, and n represents an integer from 2 to 10, provided that a plurality of D's is optionally the same or different:

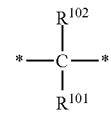

(V1)

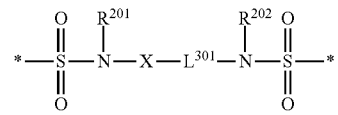

(V2)

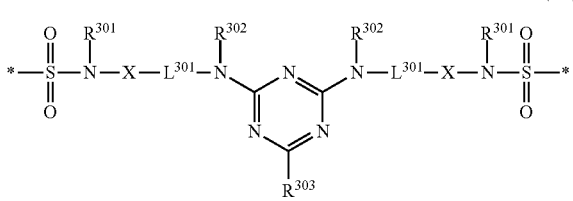

(V3)

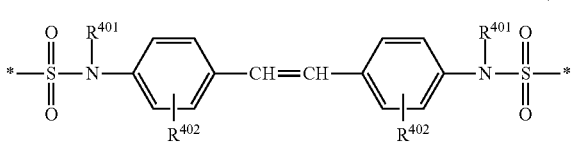

(V4)

wherein, in Formula (VI), $R^{101}$ and $R^{102}$ each independently represent a hydrogen B atom or a substituent, in Formula (V2), $R^{201}$ and $R^{202}$ each independently represent a hydrogen atom or a substituent, $L^{201}$ represents a divalent linking group, and $R^{201}$ and $R^{202}$ are optionally combined with each other to form a ring, in Formula (V3), $R^{301}$, $R^{302}$ and $R^{303}$ each independently represent a hydrogen atom or a substituent, X represents an alkylene group having 2 to 20 carbon atoms, which may have a substituent, and $L^{301}$ represents a single bond or a divalent linking group, and in Formula (V4), $R^{401}$ and $R^{402}$ each independently represent a hydrogen atom or a substituent:

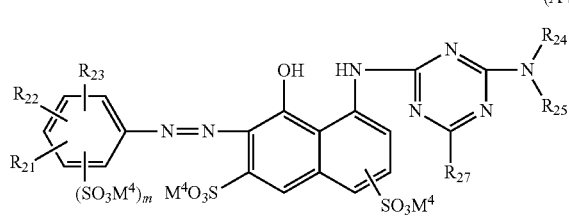

(A4)

wherein, in Formula (A4),
$R_{21}$, $R_{22}$ and $R_{23}$ each independently represent a hydrogen atom, a substituted or unsubstituted alkyl group having 1 to 9 carbon atoms, an alkoxy group having 1 to 9 carbon atoms, a halogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group having 1 to 9 carbon atoms, an arylsulfonyl group having 6 to 15 carbon atoms, a carboxyl group or a carboxylic acid ester group, $R_{27}$ represents a substituted or unsubstituted amino group, or —$OR_{26}$, m represents 0, 1 or 2, $R_{24}$, $R_{25}$ and $R_{26}$ each independently represent a hydrogen atom, a substituted or unsubstituted alkyl group having 1 to 18 carbon atoms, a substituted or unsubstituted alkenyl group having 2 to 18 carbon atoms, a substituted or unsubstituted aryl group, a substituted or unsubstituted aralkyl group or a substituted or unsubstituted heterocyclic group, $M^4$ represents a hydrogen atom or a counter cation, and $M^4$'s are optionally the same or different:

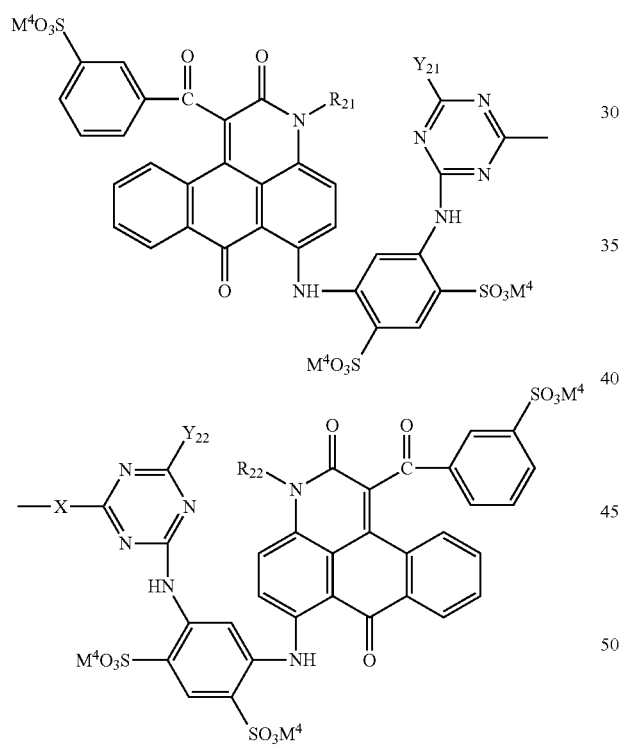

(B4)

wherein, $R_{21}$ and $R_{22}$ each independently represent a hydrogen atom or a substituted or unsubstituted alkyl group, $Y_{21}$ and $Y_{22}$ each independently represent a chlorine atom, a hydroxyl group, a substituted or unsubstituted amino group, an alkoxy group and a substituted or unsubstituted phenoxy group, X represents a divalent linking group, and $M^4$ represents a hydrogen atom or a counter cation, and $M^4$'s are optionally the same or different:

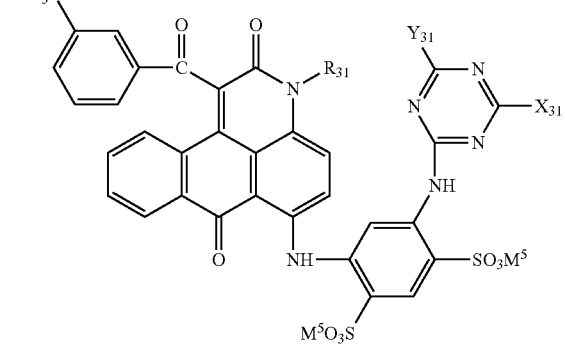

(B5)

wherein, in Formula (B5), $R_{31}$ represents a hydrogen atom or a substituted or unsubstituted alkyl group, $Y_{31}$ represents a chlorine atom, a hydroxyl group, a substituted or unsubstituted amino group or a morpholino group, $M^5$ represents a hydrogen atom or a counter cation, and $M^5$'s are optionally the same or different, and $X_{31}$ represents a group represented by the following Formula (B5-1):

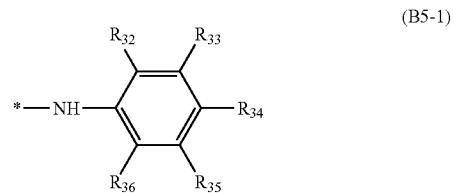

(B5-1)

wherein, in Formula (B5-1), $R_{32}$, $R_{33}$, $R_{34}$, $R_{35}$ and $R_{36}$ each independently represent a hydrogen atom, an alkyl group having 1 to 8 carbon atoms or —COOM' wherein M' represents a hydrogen atom or a counter cation, provided that at least one of $R_{32}$, $R_{33}$, $R_{34}$, $R_{35}$ and $R_{36}$ represents an alkyl group having 1 to 8 carbon atoms or —COOM':

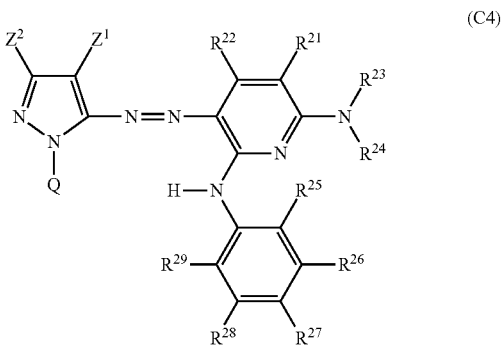

(C4)

wherein, in Formula (C4), $Z^1$ represents an electron-withdrawing group having a Hammett's substituent constant σp value of 0.20 or more, $Z^2$ represents a hydrogen atom, an aliphatic group, an aromatic group, an acyl group or a heterocyclic group, $R^{23}$ and $R^{24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, provided that there is no case where both $R^{23}$ and $R^{24}$ are a hydrogen atom at the same time, $R^{21}$ and $R^{22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkyl or arylsulfonylamino group, an aryloxycarbonylamino group, a nitro group, an alkyl or arylthio group, an alkyl or arylsulfonyl group, an alkyl or arylsulfinyl group, a sulfamoyl group, a sulfo group or a heterocyclic thio group, and $R^{21}$ and $R^{23}$ or $R^{23}$ and $R^{24}$ optionally combine with each other to form a 5- or 6-membered ring, $R^{25}$ and $R^{29}$ each independently represent an alkyl group, an alkoxy group or a halogen atom, provided that when both $R^{25}$ and $R^{29}$ are an alkyl group at the same time, a sum of the number of carbon atoms constituting the alkyl group is 3 or more, and these groups are optionally substituted, $R^{26}$, $R^{27}$ and $R^{28}$ each independently have the same meaning as $R^{21}$ and $R^{22}$, and $R^{25}$ and $R^{26}$, or $R^{28}$ and $R^{29}$ are optionally condensed with each other to form a ring, Q represents a hydrogen atom, an aliphatic group, an aromatic group or a heterocyclic group, each group of $Z^1$, $Z^2$, $R^{21}$, $R^{22}$, $R^{23}$, $R^{24}$ and Q optionally further has a substituent, and Formula (C4) has at least one ionic hydrophilic group.

2. The coloring composition of claim 1,
wherein in Formula (2), $R^5$ to $R^7$, $R^{10}$ to $R^{12}$ and $R^{14}$ to $R^{23}$ represent a hydrogen atom.

3. The coloring composition of claim 1,
wherein in Formula (1), D represents a residue in which one hydrogen atom is removed from hydrogen atoms as $R^5$ to $R^7$, $R^{10}$ to $R^{12}$, and $R^{24}$ of a compound represented by Formula (2).

4. The coloring composition of claim 1,
wherein the compound represented by Formula (1) is synthesized by a synthesis method comprising:
subjecting the compound represented by Formula (3) to chlorosulfonylation;
reacting a resulting product with a diamine compound represented by Formula (d), and
hydrolyzing a remaining chlorosulfonyl group:

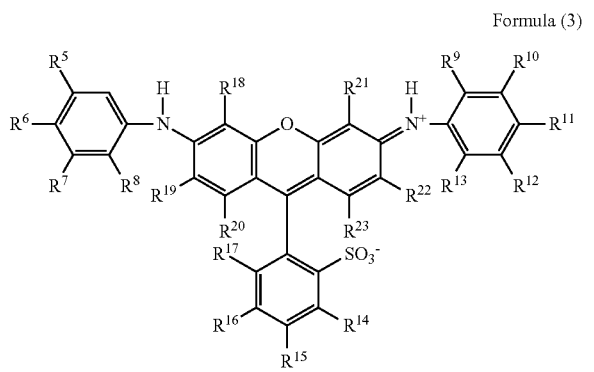

Formula (3)

-continued

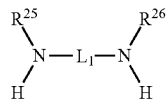

Formula (d)

wherein, in Formula (3), $R^4$ to $R^{23}$ each independently represent a hydrogen atom or a substituent,
in Formula (d), $R^{25}$ and $R^{26}$ each independently represent a hydrogen atom or a substituent, and
$L_1$ represents a divalent linking group.

5. The coloring composition of claim 1,
wherein in Formula (A4), at least one of $R_{24}$, $R_{25}$ and $R_{26}$ represents an alkyl group, an alkenyl group, an aryl group or an aralkyl group, which is substituted with 1 to 4 carboxyl groups.

6. The coloring composition of claim 1,
wherein in Formula (A4), one of $R_{24}$ and $R_{25}$ represents a hydrogen group and the other represents an alkyl group, an alkenyl group, an aryl group or an aralkyl group, which is substituted with 1 to 4 carboxyl groups.

7. The coloring composition of claim 1,
wherein in Formula (A4), $R_{21}$, $R_{22}$ and $R_{23}$ each independently represent a hydrogen atom, an alkyl group having 1 to 3 carbon atoms, a halogen atom or a carboxyl group.

8. The coloring composition of claim 1,
wherein in Formula (A4), $R_{21}$, $R_{22}$ and $R_{23}$ each independently represent a hydrogen atom, a halogen atom or a carboxyl group.

9. The coloring composition of claim 1,
wherein the ionic hydrophilic group in Formula (C4) is at least one group selected from the group consisting of a sulfo group, a carboxyl group, a phosphono group and a quaternary ammonium group.

10. The coloring composition of claim 1,
wherein in Formula (C4), $R^{23}$ and $R^{24}$ each independently represent a hydrogen atom, an aromatic group or a hetero group.

11. The coloring composition of claim 1,
wherein a content ratio of the compound represented by Formula (1) is 0.1% by mass to 20% by mass.

12. The coloring composition of claim 1,
wherein a content ratio of the compound represented by Formula (C4) is 1% by mass to 5% by mass.

13. The coloring composition of claim 2,
wherein a content ratio of the compound represented by Formula (1) is 0.1% by mass to 20% by mass.

14. The coloring composition of claim 1,
wherein a content ratio of the compound represented by Formula (A4) is 1% by mass to 5% by mass.

15. The coloring composition of claim 1,
wherein a mass ratio of a content of the compound represented by Formula (1) to a total content of the compound represented by Formula (A4) is 95/5 to 20/80.

16. The coloring composition of claim 1,
wherein a total content ratio of the compound represented by Formula (B4) and the compound represented by Formula (B5) is 0.1% by mass to 20% by mass.

17. The coloring composition of claim 1,
wherein a mass ratio of a content of the compound represented by Formula (1) to a total content of the compound represented by Formula (B4) and the compound represented by Formula (B5) is 95/5 to 20/80.

18. An ink for inkjet recording comprising the coloring composition of claim 1.

19. An inkjet recording method comprising forming an image by utilizing the coloring composition of claim 1.

20. An inkjet recording method comprising forming an image by utilizing the ink for inkjet recording of claim 18.

* * * * *